United States Patent
Xu et al.

(10) Patent No.: US 12,101,822 B2
(45) Date of Patent: *Sep. 24, 2024

(54) RANDOM ACCESS METHOD AND DEVICE

(71) Applicant: Huawei Technologies Co., Ltd., Shenzhen (CN)

(72) Inventors: Haibo Xu, Beijing (CN); Yiru Kuang, Beijing (CN); Zhenzhen Cao, Boulogne Billancourt (FR); Jian Wang, Beijing (CN); Xuelong Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/982,988

(22) Filed: Nov. 8, 2022

(65) Prior Publication Data

US 2023/0056461 A1 Feb. 23, 2023

Related U.S. Application Data

(63) Continuation of application No. 16/763,943, filed as application No. PCT/CN2018/112391 on Oct. 29, 2018, now Pat. No. 11,528,750.

(30) Foreign Application Priority Data

Nov. 15, 2017 (CN) .......................... 201711132799.X

(51) Int. Cl.
*H04L 12/24* (2006.01)
*H04L 5/00* (2006.01)
(Continued)

(52) U.S. Cl.
CPC ....... *H04W 74/0833* (2013.01); *H04L 5/0055* (2013.01); *H04L 5/0092* (2013.01);
(Continued)

(58) Field of Classification Search
None
See application file for complete search history.

(56) References Cited

U.S. PATENT DOCUMENTS 9,107,173 B2 * 8/2015 Gao ..................... H04W 74/004
9,713,052 B2 7/2017 Ahluwalia
(Continued)

FOREIGN PATENT DOCUMENTS

| CN | 101164351 A | 4/2008 |
| CN | 102740485 A | 10/2012 |

(Continued)

OTHER PUBLICATIONS

"3rd Generation Partnership Project; Technical Specification Group Radio Access Network; NR; Radio Resource Control (RRC); Protocol specification (Release 15)," 3GPP TS 38.331 V0.1.0, Oct. 2017, 42 pages.

(Continued)

*Primary Examiner* — Sithu Ko
(74) *Attorney, Agent, or Firm* — Slater Matsil, LLP

(57) ABSTRACT

A random access method and device. The method includes receiving, by user equipment, a radio resource control (RRC) connection reconfiguration message from a first network device, the RRC connection reconfiguration message indicating a primary serving cell of the second network device for a user equipment, an active uplink bandwidth part (BWP) in the primary serving cell, and an active downlink BWP in the primary serving cell, the RRC connection reconfiguration message includes an uplink BWP identifier indicating the active uplink BWP and a downlink BWP identifier indicating the active downlink BWP, the uplink BWP identifier corresponds to the active uplink BWP, the downlink BWP identifier corresponds to the active downlink BWP, and initiating, by the user equipment, a random access
(Continued)

procedure to the second network device on the active uplink BWP and the active downlink BWP.

19 Claims, 47 Drawing Sheets

(51) Int. Cl.
  *H04W 72/0453* (2023.01)
  *H04W 74/02* (2009.01)
  *H04W 74/0833* (2024.01)
  *H04W 76/27* (2018.01)
(52) U.S. Cl.
  CPC ....... *H04L 5/0098* (2013.01); *H04W 72/0453* (2013.01); *H04W 74/02* (2013.01); *H04W 76/27* (2018.02)

(56) References Cited

U.S. PATENT DOCUMENTS

| | | | |
|---|---|---|---|
| 10,237,039 | B2 | 3/2019 | Gauvreau et al. |
| 10,582,523 | B2 | 3/2020 | Kubota et al. |
| 10,602,506 | B2* | 3/2020 | Zhang ................... H04L 5/0053 |
| 10,693,620 | B2 | 6/2020 | Zhou et al. |
| 10,757,746 | B1 | 8/2020 | Futaki et al. |
| 10,897,399 | B2 | 1/2021 | Jin et al. |
| 11,277,862 | B2 | 3/2022 | Jeon et al. |
| 11,528,750 | B2 | 12/2022 | Xu et al. |
| 2011/0206000 | A1 | 8/2011 | Kwon et al. |
| 2014/0056278 | A1 | 2/2014 | Marinier et al. |
| 2016/0044744 | A1* | 2/2016 | Lee ....................... H04W 16/32 370/329 |
| 2017/0265176 | A1 | 9/2017 | Marinier et al. |
| 2017/0280481 | A1 | 9/2017 | Stern-Berkowitz et al. |
| 2018/0359790 | A1 | 12/2018 | Ingale et al. |
| 2019/0045491 | A1* | 2/2019 | Zhang ................. H04W 72/232 |
| 2019/0045571 | A1 | 2/2019 | Wu |
| 2019/0132824 | A1* | 5/2019 | Jeon ......................... H04L 5/00 |
| 2019/0132855 | A1* | 5/2019 | Lee ................... H04W 72/1268 |
| 2019/0141742 | A1* | 5/2019 | Zhou ..................... H04L 5/0064 |
| 2019/0335508 | A1* | 10/2019 | Agiwal ............. H04W 74/0833 |
| 2020/0266959 | A1* | 8/2020 | Yi ............................. H04J 11/00 |
| 2020/0288502 | A1* | 9/2020 | Lee ................... H04W 74/0891 |
| 2020/0389922 | A1* | 12/2020 | Xu ......................... H04W 76/27 |

FOREIGN PATENT DOCUMENTS

| | | |
|---|---|---|
| CN | 102883439 A | 1/2013 |
| CN | 102905333 A | 1/2013 |
| CN | 104186018 A | 12/2014 |
| CN | 105917727 A | 8/2016 |
| CN | 107251640 A | 10/2017 |
| CN | 109729559 B | 9/2020 |
| EP | 3432678 A1 | 1/2019 |
| EP | 3528538 A1 | 8/2019 |
| EP | 3713303 A1 | 9/2020 |
| JP | 2016171597 A | 9/2016 |
| KR | 20150053941 A | 5/2015 |
| KR | 20200070399 A | 6/2020 |
| KR | 102350845 B1 | 1/2022 |
| WO | 2017022870 A1 | 2/2017 |
| WO | 2017028889 A1 | 2/2017 |

OTHER PUBLICATIONS

"3rd Generation Partnership Project; Technical Specification Group Radio Access Network; NG Radio Access Network (NG-RAN); Xn application protocol (XnAP) (Release 15)," 3GPP TS 38.423 V0.4. 0, Oct. 2017, 63 pages.
"Control Plane Impacts for Bandwidth Parts," Agenda Item: 10.2.3, Source: Huawei, HiSilicon, Document for: Discussion and Decision, 3GPP TSG-RAN WG2 Meeting #99bis, R2-1710457, Oct. 9-13, 2017, 6 pages.
"3rd Generation Partnership Project; Technical Specification Group Radio Access Network; NR; Medium Access Control (MAC) protocol specification (Release 15)," 3GPP TS 38.321 V1.0.0, Sep. 2017, 46 pages.
"On Default Bandwidth Part," Source: Panasonic, Agenda Item: 5.1.3.3.1.1, Document for: Discussion and decision, 3GPP TSG-RAN WG1 NR Ad-Hoc#2, R1-1710787, Qingdao, P. R. China Jun. 27-30, 2017, 5 pages.
"On Bandwidth Part Operation," Agenda Item: 7.3.4.1, Source; Samsung, Document for: Discussion and Decision, 3GPP TSG RAN WG1 NR 90bis, R1-1717675, Oct. 9-13, 2017, 8 pages.
"Summary of Bandwidth Part Operation," Agenda Item: 7.3.4.1, Source: MediaTek Inc., Document for: Discussion, 3GPP TSG RAN WG1 Meeting 90bis, R1-1718839, Oct. 9-13, 2017, 13 pages.
"Signaling to Support Bandwidth Part," Agenda item:10.2.3, Source: Samsung, Document for: Discussion & Decision, 3GPP TSG-RAN WG2 NR #99bis Meeting, R2-1711188, Prague, Czech, Oct. 9-13, 2017, 7 pages.
"RRM Measurement to Support Bandwidth Parts in NR," Agenda item: 10.2.3, Source: Samsung,Document for: Discussion & Decision, 3GPP TSG-RAN WG2 NR #99bis Meeting, R2-1711190, Prague, Czech, Oct. 9-13, 2017, 7 pages.
"TS 38.423 v0.4.0 Covering Agreements of RAN3 #97bis," Agenda Item: 10, Source: Ericsson, Document for: draft TS, 3GPP TSG-RAN WG3 Meeting #97bis, R3-174242, Prague, Czech Republic, Oct. 9-13, 2017, 1 page.
"Presentation of Specification/Report to TSG: TS 38.321, Version 1.0.0," Source: RAN WG2, Document for: Information, 3GPP TSG-RAN Meeting #77, RP-171733, Sapporo, Japan, Sep. 11-14, 2017, 1 page.
Mediatek Inc et al., "Summary of Bandwidth Part Operation", 3GPP TSG RAN WG1 Meeting 90bis, R1-1718901 Prague, CZ, Oct. 9-13, 2017, 14 pages.

* cited by examiner

RANDOM ACCESS METHOD AND DEVICE

CROSS-REFERENCE TO RELATED APPLICATIONS

This application is a continuation of U.S. patent application Ser. No. 16/763,943, filed on May 13, 2020, which is a national stage of International Application No. PCT/CN2018/112391, filed on Oct. 29, 2018, which claims priority to Chinese Patent Application No. 201711132799.X, filed on Nov. 15, 2017. All of the aforementioned applications are hereby incorporated by reference in their entireties.

TECHNICAL FIELD

This application relates to communications technologies, and in particular, to a random access method and a device.

BACKGROUND

With continuous development of communications technologies, research and standardization on a 5th Generation (5G) mobile communications technology are underway. User equipment needs to access a network device, and therefore a random access procedure is still required in the 5G technology.

In the prior art, a plurality of uplink bandwidth parts (bandwidth part, BWP) are configured for user equipment. However, only one uplink BWP is in an active state, and the user equipment can send a message and the like to a network device by using the uplink BWP in the active state. In a random access procedure, the network device sends a message 0 to the user equipment. The message 0 is used to trigger the user equipment to perform random access. The user equipment sends a message 1 to the network device on the uplink BWP in the active state. The message 1 includes a random access preamble. The network device sends a message 2 to the user equipment. The message 2 is a random access response (RAR) message, the RAR message includes an uplink scheduling resource (UL grant), and the UL grant is a UL grant corresponding to the uplink BWP used by the user equipment to send the message 1 to the network device. Then the user equipment sends uplink data to the network device by using the UL grant.

However, in the prior art, different BWPs may have different configuration information, and the configuration information includes a transmission time length and/or a parameter set of a subcarrier spacing and a cyclic prefix length. In the random access procedure, configuration information of the uplink BWP used by the user equipment to send the message 1 to the network device may not match configuration information required when the user equipment sends the uplink data to the network device. Therefore, the user equipment cannot send the uplink data by using the UL grant that is in the RAR message and that corresponds to the uplink BWP, wasting the UL grant that is in the RAR message and that corresponds to the uplink BWP.

SUMMARY

This application provides a random access method and a device, to resolve a problem that a UL grant that is in an RAR message and that corresponds to an uplink BWP is wasted.

According to a first aspect, this application provides a random access method, where the method includes receiving, by user equipment, control signaling sent by a network device, where the control signaling is used to trigger the user equipment to perform a random access procedure, and the control signaling includes or indicates a bandwidth part (BWP) identifier, and initiating, by the user equipment, a random access procedure based on the control signaling.

In a possible design, the control signaling is a physical downlink control channel order (PDCCH order).

In a possible design, the initiating, by the user equipment, a random access procedure based on the control signaling includes initiating, by the user equipment, the random access procedure on a BWP corresponding to the BWP identifier.

In a possible design, before the initiating, by the user equipment, a random access procedure based on the control signaling, the method further includes activating, by the user equipment, the BWP.

In a possible design, the BWP is an uplink BWP.

In a possible design, the initiating, by the user equipment, the random access procedure on a BWP corresponding to the BWP identifier includes sending, by the user equipment, a random access preamble to the network device on the uplink BWP, receiving, by the user equipment, a first random access response (RAR) message sent by the network device, where the first RAR message includes a first uplink grant (UL grant), and performing, by the user equipment, uplink transmission on the uplink BWP, where a physical resource used for the uplink transmission is a physical resource indicated by the first UL grant.

In a possible design, the BWP is a BWP pair including an uplink BWP and a downlink BWP.

In a possible design, the initiating, by the user equipment, the random access procedure on a BWP corresponding to the BWP identifier includes sending, by the user equipment, a random access preamble to the network device on the uplink BWP of the BWP, receiving, by the user equipment, a second RAR message sent by the network device, where the second RAR message includes a second UL grant, and performing, by the user equipment, transmission on the uplink BWP of the BWP, where a physical resource used for the transmission is a physical resource indicated by the second UL grant.

In a possible design, the control signaling received by the user equipment in any serving cell includes the BWP identifier, or the control signaling received by the user equipment in any serving cell includes the BWP identifier, where at least two uplink BWPs are configured for the user equipment in at least one secondary serving cell, and a random access channel is configured for each of the at least two uplink BWPs, or the control signaling received by the user equipment in a secondary serving cell includes the BWP identifier, or the control signaling received by the user equipment in the at least one secondary serving cell includes the BWP identifier, where at least two uplink BWPs are configured for the user equipment in the at least one secondary serving cell, and a random access channel is configured for each of the at least two uplink BWPs.

According to a second aspect, this application provides a random access method, where the method includes sending, by a network device, control signaling to user equipment, where the control signaling is used to trigger the user equipment to perform a random access procedure, and the control signaling includes or indicates a bandwidth part (BWP) identifier.

In a possible design, the control signaling is a physical downlink control channel order (PDCCH order).

In a possible design, a BWP corresponding to the BWP identifier is an uplink BWP.

In a possible design, a BWP corresponding to the BWP identifier is a BWP pair including an uplink BWP and a downlink BWP.

According to a third aspect, this application provides a random access method, where the method includes receiving, by user equipment, a random access response (RAR) message sent by a network device, where the RAR message includes or indicates a bandwidth part (BWP) identifier, and performing, by the user equipment, uplink transmission on a first BWP corresponding to the BWP identifier.

In a possible design, the RAR message includes an uplink grant (UL grant), and the UL grant includes or indicates the BWP identifier.

In a possible design, a physical resource used for the uplink transmission is a physical resource indicated by the UL grant.

In a possible design, before the performing, by the user equipment, uplink transmission on a first BWP corresponding to the BWP identifier, the method further includes activating, by the user equipment, the first BWP.

In a possible design, before the receiving, by user equipment, an RAR message sent by a network device, the method further includes, receiving, by the user equipment, control signaling sent by the network device, where the control signaling is used to trigger the user equipment to perform a random access procedure, and sending, by the user equipment, a random access preamble to the network device on a second BWP.

In a possible design, the control signaling is a physical downlink control channel order (PDCCH order).

In a possible design, before the sending, by the user equipment, a random access preamble to the network device on a second BWP, the method further includes activating, by the user equipment, the second BWP.

In a possible design, the control signaling includes an identifier of the second BWP.

In a possible design, the control signaling received by the user equipment in any serving cell includes the identifier of the second BWP, or the control signaling received by the user equipment in any serving cell includes the identifier of the second BWP, where at least two uplink BWPs are configured for the user equipment in at least one secondary serving cell, and a random access channel is configured for each of the at least two uplink BWPs, or the control signaling received by the user equipment in a secondary serving cell includes the identifier of the second BWP, or the control signaling received by the user equipment in the at least one secondary serving cell includes the identifier of the second BWP, where at least two uplink BWPs are configured for the user equipment in the at least one secondary serving cell, and a random access channel is configured for each of the at least two uplink BWPs.

In a possible design, the second BWP is a BWP in a first serving cell of the user equipment, and the first serving cell is a serving cell used when the user equipment receives the control signaling, or the first serving cell is a serving cell scheduled by using a second serving cell used when the user equipment receives the control signaling.

In a possible design, the first BWP is an initial active BWP of the user equipment in the first serving cell, or the first BWP is a first active BWP of the user equipment in the first serving cell, or the first BWP is a default BWP of the user equipment in the first serving cell, or the first BWP is a BWP configured by the network device for the user equipment, and the first BWP is used by the user equipment to perform random access in the first serving cell, or the first BWP is a BWP configured by the network device for the user equipment, and the first BWP is a BWP used by the user equipment to perform contention free random access in the first serving cell, or the first BWP is a BWP activated when the user equipment performs random access, or the first BWP is a BWP activated when the user equipment performs contention free random access.

In a possible design, the first BWP and the second BWP are uplink BWPs, and the first BWP and the second BWP may be a same BWP, or may be different BWPs.

In a possible design, the receiving, by user equipment, an RAR message sent by a network device includes receiving, by the user equipment on a third BWP, the RAR message sent by the network device, where the third BWP is a downlink BWP, where the third BWP is an active BWP in the second serving cell when the user equipment receives the control signaling in the first serving cell, or the third BWP is a BWP used when the user equipment receives the control signaling in the first serving cell.

In a possible design, the first BWP and the second BWP each are a BWP pair including an uplink BWP and a downlink BWP, and the first BWP and the second BWP may be a same BWP, or may be different BWPs.

In a possible design, the receiving, by user equipment, an RAR message sent by a network device includes receiving, by the user equipment on the uplink BWP of the second BWP, the RAR message sent by the network device.

In a possible design, the receiving, by user equipment, an RAR message sent by a network device includes receiving, by the user equipment on a fourth BWP, the RAR message sent by the network device, where the fourth BWP is a BWP pair including an uplink BWP and a downlink BWP, where the fourth BWP is an active BWP in the second serving cell when the user equipment receives the control signaling in the first serving cell, or the fourth BWP is a BWP used when the user equipment receives the control signaling in the first serving cell.

In a possible design, if the fourth BWP is a BWP used when the user equipment receives the control signaling in the first serving cell, after the sending, by the user equipment, a random access preamble to the network device on a second BWP, the method further includes activating, by the user equipment, the fourth BWP, and deactivating the second BWP.

According to a fourth aspect, this application provides a random access method, where the method includes sending, by a network device, a random access response (RAR) message to user equipment, where the RAR message includes or indicates a bandwidth part (BWP) identifier, and the BWP identifier corresponds to a first BWP.

In a possible design, the RAR message includes an uplink grant (UL grant), and the UL grant includes or indicates the BWP identifier.

In a possible design, before the sending, by a network device, an RAR message to user equipment, the method further includes sending, by the network device, control signaling to the user equipment, where the control signaling is used to trigger the user equipment to perform a random access procedure.

In a possible design, the control signaling is a physical downlink control channel order (PDCCH order).

In a possible design, the control signaling includes an identifier of a second BWP.

In a possible design, the second BWP is a BWP in a first serving cell of the user equipment, and the first serving cell is a serving cell used when the user equipment receives the control signaling, or the first serving cell is a serving cell scheduled by using a second serving cell used when the user equipment receives the control signaling.

In a possible design, the first BWP is an initial active BWP of the user equipment in the first serving cell, or the first BWP is a first active BWP of the user equipment in the first serving cell, or the first BWP is a default BWP of the user equipment in the first serving cell, or the first BWP is a BWP configured by the network device for the user equipment, and the first BWP is used by the user equipment to perform random access in the first serving cell, or the first BWP is a BWP configured by the network device for the user equipment, and the first BWP is a BWP used by the user equipment to perform contention free random access in the first serving cell, or the first BWP is a BWP activated when the user equipment performs random access, or the first BWP is a BWP activated when the user equipment performs contention free random access. In a possible design, the first BWP and the second BWP are uplink BWPs, and the first BWP and the second BWP may be a same BWP, or may be different BWPs.

In a possible design, the sending, by a network device, an RAR message to user equipment includes sending, by the network device, the RAR message to the user equipment on a third BWP, where the third BWP is a downlink BWP, where the third BWP is an active BWP in the second serving cell when the user equipment receives the control signaling in the first serving cell, or the third BWP is a BWP used when the user equipment receives the control signaling in the first serving cell.

In a possible design, the first BWP and the second BWP each are a BWP pair including an uplink BWP and a downlink BWP, and the first BWP and the second BWP may be a same BWP, or may be different BWPs.

In a possible design, the sending, by a network device, an RAR message to user equipment includes sending, by the network device, the RAR message to the user equipment on the uplink BWP of the second BWP.

In a possible design, the sending, by a network device, an RAR message to user equipment includes sending, by the network device, the RAR message to the user equipment on a fourth BWP, where the fourth BWP is a BWP pair including an uplink BWP and a downlink BWP, where the fourth BWP is an active BWP in the second serving cell when the user equipment receives the control signaling in the first serving cell, or the fourth BWP is a BWP used when the user equipment receives the control signaling in the first serving cell.

According to a fifth aspect, this application provides a random access method, where the method includes receiving, by user equipment, a radio resource control (RRC) connection reconfiguration message sent by a first network device, where the RRC connection reconfiguration message is included in a first message sent by a second network device to the first network device, and the RRC connection reconfiguration message is used to indicate the primary serving cell under the second network device for the user equipment, and indicate an active bandwidth part (BWP) in the primary serving cell, and initiating, by the user equipment, a random access procedure on the active BWP.

In a possible design, the active BWP is a BWP in common configuration information of the primary serving cell, or the RRC connection reconfiguration message includes a first BWP identifier, and a BWP corresponding to the first BWP identifier is the active BWP.

In a possible design, the active BWP includes an uplink BWP and a downlink BWP, and the initiating, by the user equipment, a random access procedure on the active BWP includes sending, by the user equipment, a random access preamble to the second network device on the uplink BWP in the active BWP, receiving, by the user equipment on the downlink BWP in the active BWP, a random access response (RAR) message sent by the second network device, where the RAR message includes an uplink grant (UL grant), and performing, by the user equipment, uplink transmission on the uplink BWP in the active BWP, where a physical resource used for the uplink transmission is a physical resource indicated by the UL grant.

In a possible design, the active BWP is a BWP pair including an uplink BWP and a downlink BWP, and the initiating, by the user equipment, a random access procedure on the active BWP includes sending, by the user equipment, a random access preamble to the second network device on the uplink BWP of the BWP pair, receiving, by the user equipment on the downlink BWP of the BWP pair, an RAR message sent by the second network device, where the RAR message includes a UL grant, and performing, by the user equipment, uplink transmission on the uplink BWP of the BWP pair, where a physical resource used for the uplink transmission is a physical resource indicated by the UL grant.

In a possible design, the first message is a response message sent by the second network device after the second network device receives a second message sent by the first network device, and the second message includes at least one of the following information, including information about an uplink BWP or a BWP pair activated by the user equipment, information about all uplink BWPs or BWP pairs configured for the user equipment, and information about a logical channel of the user equipment, where the logical channel is a logical channel with a highest priority in all logical channels of the user equipment that have to-be-transmitted uplink data, or the logical channel is all logical channels of the user equipment that have to-be-transmitted uplink data, or the logical channel is all logical channels of the user equipment.

In a possible design, the information about the uplink BWP includes at least one of an identifier of the uplink BWP, a parameter set of a subcarrier spacing and a cyclic prefix length of the uplink BWP, and a bandwidth value of the uplink BWP, the information about the BWP pair includes at least one of an identifier of the BWP pair, a parameter set of a subcarrier spacing and a cyclic prefix length of the BWP pair, and a bandwidth value of the BWP pair, and the information about a logical channel includes at least one of an identifier of a logical channel, a parameter set, of a subcarrier spacing and a cyclic prefix length, to which each logical channel is mapped, a data radio bearer corresponding to each logical channel, and indication information, where the indication information indicates whether each logical channel or each corresponding data radio bearer has uplink data available for transmission.

According to a sixth aspect, this application provides a random access method, where the method includes receiving, by a first network device, a first message sent by a second network device, where the first message includes a radio resource control (RRC) connection reconfiguration message, and sending, by the first network device, the RRC connection reconfiguration message to user equipment, where the RRC connection reconfiguration message is used to indicate the primary serving cell under the second network device for the user equipment, and indicate an active bandwidth part (BWP) in the primary serving cell.

In a possible design, the active BWP is a BWP in common configuration information of the primary serving cell, or the RRC connection reconfiguration message includes a first BWP identifier, and a BWP corresponding to the first BWP identifier is the active BWP.

In a possible design, the active BWP includes an uplink BWP and a downlink BWP.

In a possible design, the active BWP is a BWP pair including an uplink BWP and a downlink BWP.

In a possible design, before the receiving, by a first network device, a first message sent by a second network device, the method further includes sending, by the first network device, a second message to the second network device, where the second message includes at least one of information about an uplink BWP or a BWP pair activated by the user equipment, information about all uplink BWPs or BWP pairs configured for the user equipment, and information about a logical channel of the user equipment, where the logical channel is a logical channel with a highest priority in all logical channels of the user equipment that have to-be-transmitted uplink data, or the logical channel is all logical channels of the user equipment that have to-be-transmitted uplink data, or the logical channel is all logical channels of the user equipment.

In a possible design, the information about the uplink BWP includes at least one of an identifier of the uplink BWP, a parameter set of a subcarrier spacing and a cyclic prefix length of the uplink BWP, and a bandwidth value of the uplink BWP, the information about the BWP pair includes at least one of an identifier of the BWP pair, a parameter set of a subcarrier spacing and a cyclic prefix length of the BWP pair, and a bandwidth value of the BWP pair, and the information about a logical channel includes at least one of an identifier of a logical channel, a parameter set, of a subcarrier spacing and a cyclic prefix length, to which each logical channel is mapped, a data radio bearer corresponding to each logical channel, and indication information, where the indication information indicates whether each logical channel or each corresponding data radio bearer has uplink data available for transmission.

According to a seventh aspect, this application provides a random access method, where the method includes receiving, by user equipment, a radio resource control (RRC) connection reconfiguration message sent by a first network device, where the RRC connection reconfiguration message is included in a first message sent by a second network device to the first network device, and the RRC connection reconfiguration message is used to indicate the primary serving cell under the second network device for the user equipment, and indicate an active bandwidth part (BWP) in the primary serving cell, sending, by the user equipment, a random access preamble to the second network device on the active BWP, receiving, by the user equipment on the active BWP, a random access response (RAR) message sent by the second network device, where the RAR message includes or indicates a first bandwidth part (BWP) identifier, and performing, by the user equipment, uplink transmission on a first BWP corresponding to the first BWP identifier.

In a possible design, the active BWP is a BWP in common configuration information of the primary serving cell, or the RRC connection reconfiguration message includes a second BWP identifier, and a BWP corresponding to the second BWP identifier is the active BWP.

In a possible design, the RAR message includes an uplink grant (UL grant), and the UL grant includes or indicates the BWP identifier.

In a possible design, a physical resource used for the uplink transmission is a physical resource indicated by the UL grant.

In a possible design, before the performing, by the user equipment, uplink transmission on a first BWP corresponding to the first BWP identifier, the method further includes activating, by the user equipment, the first BWP.

In a possible design, the first BWP is an uplink BWP, the active BWP includes an uplink BWP and a downlink BWP, and the first BWP and the uplink BWP in the active BWP may be a same BWP, or may be different BWPs, or the first BWP is a BWP pair including an uplink BWP and a downlink BWP, the active BWP is a BWP pair including an uplink BWP and a downlink BWP, and the first BWP and the active BWP may be a same BWP, or may be different BWPs.

In a possible design, the first message is a response message sent by the second network device after the second network device receives a second message sent by the first network device, and the second message includes at least one of information about an uplink BWP or a BWP pair activated by the user equipment, information about all uplink BWPs or BWP pairs configured for the user equipment, and information about a logical channel of the user equipment, where the logical channel is a logical channel with a highest priority in all logical channels of the user equipment that have to-be-transmitted uplink data, or the logical channel is all logical channels of the user equipment that have to-be-transmitted uplink data, or the logical channel is all logical channels of the user equipment.

In a possible design, the information about the uplink BWP includes at least one of an identifier of the uplink BWP, a parameter set of a subcarrier spacing and a cyclic prefix length of the uplink BWP, and a bandwidth value of the uplink BWP, the information about the BWP pair includes at least one of an identifier of the BWP pair, a parameter set of a subcarrier spacing and a cyclic prefix length of the BWP pair, and a bandwidth value of the BWP pair, and the information about a logical channel includes at least one of an identifier of a logical channel, a parameter set, of a subcarrier spacing and a cyclic prefix length, to which each logical channel is mapped, a data radio bearer corresponding to each logical channel, and indication information, where the indication information indicates whether each logical channel or each corresponding data radio bearer has uplink data available for transmission.

According to an eighth aspect, this application provides a random access method, where the method includes receiving, by a second network device on an active bandwidth part (BWP), a random access preamble sent by user equipment, where the random access preamble is sent by the user equipment after the user equipment receives a radio resource control (RRC) connection reconfiguration message sent by a first network device, and the RRC connection reconfiguration message is used to indicate the primary serving cell under the second network device for the user equipment, and indicate an active BWP in the primary serving cell, and sending, by the second network device, a random access response (RAR) message to the user equipment on the active BWP, where the RAR message includes or indicates a first bandwidth part (BWP) identifier, and the first BWP identifier corresponds to a first BWP.

In a possible design, the active BWP is a BWP in common configuration information of the primary serving cell, or the RRC connection reconfiguration message includes a second BWP identifier, and a BWP corresponding to the second BWP identifier is the active BWP.

In a possible design, the RAR message includes an uplink grant (UL grant), and the UL grant includes or indicates the BWP identifier.

In a possible design, a physical resource used for the uplink transmission is a physical resource indicated by the UL grant.

In a possible design, the first BWP is an uplink BWP, the active BWP includes an uplink BWP and a downlink BWP, and the first BWP and the uplink BWP in the active BWP may be a same BWP, or may be different BWPs, or the first BWP is a BWP pair including an uplink BWP and a downlink BWP, the active BWP is a BWP pair including an uplink BWP and a downlink BWP, and the first BWP and the active BWP may be a same BWP, or may be different BWPs.

In a possible design, before the receiving, by a second network device on an active BWP, a random access preamble sent by user equipment, the method further includes receiving, by the second network device, a second message sent by the first network device, where the second message includes at least one of information about an uplink BWP or a BWP pair activated by the user equipment, information about all uplink BWPs or BWP pairs configured for the user equipment, and information about a logical channel of the user equipment, where the logical channel is a logical channel with a highest priority in all logical channels of the user equipment that have to-be-transmitted uplink data, or the logical channel is all logical channels of the user equipment that have to-be-transmitted uplink data, or the logical channel is all logical channels of the user equipment.

In a possible design, the information about the uplink BWP includes at least one of an identifier of the uplink BWP, a parameter set of a subcarrier spacing and a cyclic prefix length of the uplink BWP, and a bandwidth value of the uplink BWP, the information about the BWP pair includes at least one of an identifier of the BWP pair, a parameter set of a subcarrier spacing and a cyclic prefix length of the BWP pair, and a bandwidth value of the BWP pair, and the information about a logical channel includes at least one of an identifier of a logical channel, a parameter set, of a subcarrier spacing and a cyclic prefix length, to which each logical channel is mapped, a data radio bearer corresponding to each logical channel, and indication information, where the indication information indicates whether each logical channel or each corresponding data radio bearer has uplink data available for transmission.

According to a ninth aspect, this application provides user equipment, where the user equipment includes a receiving module, configured to receive control signaling sent by a network device, where the control signaling is used to trigger the user equipment to perform a random access procedure, and the control signaling includes or indicates a bandwidth part (BWP) identifier, and an access module, configured to initiate a random access procedure based on the control signaling.

In a possible design, the control signaling is a physical downlink control channel order (PDCCH order).

In a possible design, the access module is specifically configured to: initiate the random access procedure on a BWP corresponding to the BWP identifier.

In a possible design, the user equipment further includes an activation module, configured to activate the BWP before the access module initiates the random access procedure based on the control signaling.

In a possible design, the BWP is an uplink BWP.

In a possible design, the access module includes a first sending submodule, configured to send a random access preamble to the network device on the uplink BWP, a first receiving submodule, configured to receive a first random access response (RAR) message sent by the network device, where the first RAR message includes a first uplink grant (UL grant), and a first transmission submodule, configured to perform uplink transmission on the uplink BWP, where a physical resource used for the uplink transmission is a physical resource indicated by the first UL grant.

In a possible design, the BWP is a BWP pair including an uplink BWP and a downlink BWP.

In a possible design, the access module includes a second sending submodule, configured to send a random access preamble to the network device on the uplink BWP of the BWP, a second receiving submodule, configured to receive a second RAR message sent by the network device, where the second RAR message includes a second UL grant, and a second transmission submodule, configured to perform transmission on the uplink BWP of the BWP, where a physical resource used for the transmission is a physical resource indicated by the second UL grant.

In a possible design, the control signaling received by the user equipment in any serving cell includes the BWP identifier, or the control signaling received by the user equipment in any serving cell includes the BWP identifier, where at least two uplink BWPs are configured for the user equipment in at least one secondary serving cell, and a random access channel is configured for each of the at least two uplink BWPs, or the control signaling received by the user equipment in a secondary serving cell includes the BWP identifier, or the control signaling received by the user equipment in the at least one secondary serving cell includes the BWP identifier, where at least two uplink BWPs are configured for the user equipment in the at least one secondary serving cell, and a random access channel is configured for each of the at least two uplink BWPs.

According to a tenth aspect, this application provides a network device, where the network device includes a sending module, configured to send control signaling to user equipment, where the control signaling is used to trigger the user equipment to perform a random access procedure, and the control signaling includes or indicates a bandwidth part (BWP) identifier.

In a possible design, the control signaling is a physical downlink control channel order (PDCCH order).

In a possible design, a BWP corresponding to the BWP identifier is an uplink BWP.

In a possible design, a BWP corresponding to the BWP identifier is a BWP pair including an uplink BWP and a downlink BWP.

According to an eleventh aspect, this application provides user equipment, where the user equipment includes a first receiving module, configured to receive a random access response (RAR) message sent by a network device, where the RAR message includes or indicates a bandwidth part (BWP) identifier, and a transmission module, configured to perform uplink transmission on a first BWP corresponding to the BWP identifier.

In a possible design, the RAR message includes an uplink grant (UL grant), and the UL grant includes or indicates the BWP identifier.

In a possible design, a physical resource used for the uplink transmission is a physical resource indicated by the UL grant.

In a possible design, the user equipment further includes a first activation module, configured to activate the first BWP before the transmission module performs uplink transmission on the first BWP corresponding to the BWP identifier.

In a possible design, the user equipment further includes a second receiving module, configured to: before the first receiving module receives the RAR message sent by the network device, receive control signaling sent by the network device, where the control signaling is used to trigger the user equipment to perform a random access procedure, and a sending module, configured to send a random access preamble to the network device on a second BWP.

In a possible design, the control signaling is a physical downlink control channel order (PDCCH order).

In a possible design, the user equipment further includes a second activation module, configured to activate the second BWP before the sending module sends the random access preamble to the network device on the second BWP.

In a possible design, the control signaling includes an identifier of the second BWP.

In a possible design, the control signaling received by the user equipment in any serving cell includes the identifier of the second BWP, or the control signaling received by the user equipment in any serving cell includes the identifier of the second BWP, where at least two uplink BWPs are configured for the user equipment in at least one secondary serving cell, and a random access channel is configured for each of the at least two uplink BWPs, or the control signaling received by the user equipment in a secondary serving cell includes the identifier of the second BWP, or the control signaling received by the user equipment in the at least one secondary serving cell includes the identifier of the second BWP, where at least two uplink BWPs are configured for the user equipment in the at least one secondary serving cell, and a random access channel is configured for each of the at least two uplink BWPs.

In a possible design, the second BWP is a BWP in a first serving cell of the user equipment, and the first serving cell is a serving cell used when the user equipment receives the control signaling, or the first serving cell is a serving cell scheduled by using a second serving cell used when the user equipment receives the control signaling.

In a possible design, the first BWP is an initial active BWP of the user equipment in the first serving cell, or the first BWP is a first active BWP of the user equipment in the first serving cell, or the first BWP is a default BWP of the user equipment in the first serving cell, or the first BWP is a BWP configured by the network device for the user equipment, and the first BWP is used by the user equipment to perform random access in the first serving cell, or the first BWP is a BWP configured by the network device for the user equipment, and the first BWP is a BWP used by the user equipment to perform contention free random access in the first serving cell, or the first BWP is a BWP activated when the user equipment performs random access, or the first BWP is a BWP activated when the user equipment performs contention free random access.

In a possible design, the first BWP and the second BWP are uplink BWPs, and the first BWP and the second BWP may be a same BWP, or may be different BWPs.

In a possible design, the first receiving module is specifically configured to: receive, on a third BWP, the RAR message sent by the network device, where the third BWP is a downlink BWP, where the third BWP is an active BWP in the second serving cell when the user equipment receives the control signaling in the first serving cell, or the third BWP is a BWP used when the user equipment receives the control signaling in the first serving cell.

In a possible design, the first receiving module is specifically configured to: receive, on the uplink BWP of the second BWP, the RAR message sent by the network device.

In a possible design, the first receiving module is specifically configured to: receive, on a fourth BWP, the RAR message sent by the network device, where the fourth BWP is a BWP pair including an uplink BWP and a downlink BWP, where the fourth BWP is an active BWP in the second serving cell when the user equipment receives the control signaling in the first serving cell, or the fourth BWP is a BWP used when the user equipment receives the control signaling in the first serving cell.

In a possible design, if the fourth BWP is a BWP used when the user equipment receives the control signaling in the first serving cell, the user equipment further includes a third activation module, configured to: after the sending module sends the random access preamble to the network device on the second BWP, activate the fourth BWP, and deactivate the second BWP.

According to a twelfth aspect, this application provides a network device, where the network device includes a first sending module, configured to send a random access response (RAR) message to user equipment, where the RAR message includes or indicates a bandwidth part (BWP) identifier, and the BWP identifier corresponds to a first BWP.

In a possible design, the RAR message includes an uplink grant (UL grant), and the UL grant includes or indicates the BWP identifier.

In a possible design, the network device further includes a second sending module, configured to: before the first sending module sends the RAR message to the user equipment, send control signaling to the user equipment, where the control signaling is used to trigger the user equipment to perform a random access procedure.

In a possible design, the control signaling is a physical downlink control channel order (PDCCH order).

In a possible design, the control signaling includes an identifier of a second BWP.

In a possible design, the second BWP is a BWP in a first serving cell of the user equipment, and the first serving cell is a serving cell used when the user equipment receives the control signaling, or the first serving cell is a serving cell scheduled by using a second serving cell used when the user equipment receives the control signaling.

In a possible design, the first BWP is an initial active BWP of the user equipment in the first serving cell, or the first BWP is a first active BWP of the user equipment in the first serving cell, or the first BWP is a default BWP of the user equipment in the first serving cell, or the first BWP is a BWP configured by the network device for the user equipment, and the first BWP is used by the user equipment to perform random access in the first serving cell, or the first BWP is a BWP configured by the network device for the user equipment, and the first BWP is a BWP used by the user equipment to perform contention free random access in the first serving cell, or the first BWP is a BWP activated when the user equipment performs random access, or the first BWP is a BWP activated when the user equipment performs contention free random access.

In a possible design, the first BWP and the second BWP are uplink BWPs, and the first BWP and the second BWP may be a same BWP, or may be different BWPs.

In a possible design, the first sending module is specifically configured to: send the RAR message to the user equipment on a third BWP, where the third BWP is a downlink BWP, where the third BWP is an active BWP in the second serving cell when the user equipment receives the control signaling in the first serving cell, or the third BWP is a BWP used when the user equipment receives the control signaling in the first serving cell.

In a possible design, the first BWP and the second BWP each are a BWP pair including an uplink BWP and a downlink BWP, and the first BWP and the second BWP may be a same BWP, or may be different BWPs.

In a possible design, the first sending module is specifically configured to: send the RAR message to the user equipment on the uplink BWP of the second BWP.

In a possible design, the first sending module is specifically configured to: send the RAR message to the user equipment on a fourth BWP, where the fourth BWP is a BWP pair including an uplink BWP and a downlink BWP, where the fourth BWP is an active BWP in the second serving cell when the user equipment receives the control signaling in the first serving cell, or the fourth BWP is a BWP used when the user equipment receives the control signaling in the first serving cell.

According to a thirteenth aspect, this application provides user equipment, where the user equipment includes a receiving module, configured to receive a radio resource control (RRC) connection reconfiguration message sent by a first network device, where the RRC connection reconfiguration message is included in a first message sent by a second network device to the first network device, and the RRC connection reconfiguration message is used to indicate the primary serving cell under the second network device for the user equipment, and indicate an active bandwidth part (BWP) in the primary serving cell, and an access module, configured to initiate a random access procedure on the active BWP.

In a possible design, the active BWP is a BWP in common configuration information of the primary serving cell, or the RRC connection reconfiguration message includes a first BWP identifier, and a BWP corresponding to the first BWP identifier is the active BWP.

In a possible design, the active BWP includes an uplink BWP and a downlink BWP, and the access module includes a first sending submodule, configured to send a random access preamble to the second network device on the uplink BWP in the active BWP, a first receiving submodule, configured to receive, by the user equipment on the downlink BWP in the active BWP, a random access response (RAR) message sent by the second network device, where the RAR message includes an uplink grant (UL grant), and a first transmission submodule, configured to perform, by the user equipment, uplink transmission on the uplink BWP in the active BWP, where a physical resource used for the uplink transmission is a physical resource indicated by the UL grant.

In a possible design, the active BWP is a BWP pair including an uplink BWP and a downlink BWP, and the access module includes a second sending submodule, configured to send a random access preamble to the second network device on the uplink BWP of the BWP pair, a second receiving submodule, configured to receive, on the downlink BWP of the BWP pair, an RAR message sent by the second network device, where the RAR message includes a UL grant, and a second transmission submodule, configured to perform uplink transmission on the uplink BWP of the BWP pair, where a physical resource used for the uplink transmission is a physical resource indicated by the UL grant.

In a possible design, the first message is a response message sent by the second network device after the second network device receives a second message sent by the first network device, and the second message includes at least one of information about an uplink BWP or a BWP pair activated by the user equipment, information about all uplink BWPs or BWP pairs configured for the user equipment, and information about a logical channel of the user equipment, where the logical channel is a logical channel with a highest priority in all logical channels of the user equipment that have to-be-transmitted uplink data, or the logical channel is all logical channels of the user equipment that have to-be-transmitted uplink data, or the logical channel is all logical channels of the user equipment.

In a possible design, the information about the uplink BWP includes at least one of an identifier of the uplink BWP, a parameter set of a subcarrier spacing and a cyclic prefix length of the uplink BWP, and a bandwidth value of the uplink BWP, the information about the BWP pair includes at least one of an identifier of the BWP pair, a parameter set of a subcarrier spacing and a cyclic prefix length of the BWP pair, and a bandwidth value of the BWP pair, and the information about a logical channel includes at least one of an identifier of a logical channel, a parameter set, of a subcarrier spacing and a cyclic prefix length, to which each logical channel is mapped, a data radio bearer corresponding to each logical channel, and indication information, where the indication information indicates whether each logical channel or each corresponding data radio bearer has uplink data available for transmission.

According to a fourteenth aspect, this application provides a first network device, where the first network device includes a receiving module, configured to receive a first message sent by a second network device, where the first message includes a radio resource control (RRC) connection reconfiguration message, and a first sending module, configured to send the RRC connection reconfiguration message to user equipment, where the RRC connection reconfiguration message is used to indicate the primary serving cell under the second network device for the user equipment, and indicate an active bandwidth part (BWP) in the primary serving cell.

In a possible design, the active BWP is a BWP in common configuration information of the primary serving cell, or the RRC connection reconfiguration message includes a first BWP identifier, and a BWP corresponding to the first BWP identifier is the active BWP.

In a possible design, the active BWP includes an uplink BWP and a downlink BWP.

In a possible design, the active BWP is a BWP pair including an uplink BWP and a downlink BWP.

In a possible design, the first network device further includes a second sending module, configured to: before the receiving module receives the first message sent by the second network device, send a second message to the second network device, where the second message includes at least one of information about an uplink BWP or a BWP pair activated by the user equipment, information about all uplink BWPs or BWP pairs configured for the user equipment, and information about a logical channel of the user equipment, where the logical channel is a logical channel with a highest priority in all logical channels of the user equipment that have to-be-transmitted uplink data, or the logical channel is all logical channels of the user equipment that have to-be-transmitted uplink data, or the logical channel is all logical channels of the user equipment.

In a possible design, the information about the uplink BWP includes at least one of an identifier of the uplink BWP, a parameter set of a subcarrier spacing and a cyclic prefix length of the uplink BWP, and a bandwidth value of the uplink BWP, the information about the BWP pair includes at least one of an identifier of the BWP pair, a parameter set of a subcarrier spacing and a cyclic prefix length of the BWP pair, and a bandwidth value of the BWP pair, and the information about a logical channel includes at least one of an identifier of a logical channel, a parameter set, of a subcarrier spacing and a cyclic prefix length, to which each logical channel is mapped, a data radio bearer corresponding to each logical channel, and indication information, where the indication information indicates whether each logical channel or each corresponding data radio bearer has uplink data available for transmission.

According to a fifteenth aspect, this application provides user equipment, where the user equipment includes a first receiving module, configured to receive a radio resource control (RRC) connection reconfiguration message sent by a first network device, where the RRC connection reconfiguration message is included in a first message sent by a second network device to the first network device, and the RRC connection reconfiguration message is used to indicate the primary serving cell under the second network device for the user equipment, and indicate an active bandwidth part (BWP) in the primary serving cell, a sending module, configured to send a random access preamble to the second network device on the active BWP, a second receiving module, configured to receive, on the active BWP, a random access response (RAR) message sent by the second network device, where the RAR message includes or indicates a first bandwidth part (BWP) identifier, and a transmission module, configured to perform uplink transmission on a first BWP corresponding to the first BWP identifier.

In a possible design, the active BWP is a BWP in common configuration information of the primary serving cell, or the RRC connection reconfiguration message includes a second BWP identifier, and a BWP corresponding to the second BWP identifier is the active BWP.

In a possible design, the RAR message includes an uplink grant (UL grant), and the UL grant includes or indicates the BWP identifier.

In a possible design, a physical resource used for the uplink transmission is a physical resource indicated by the UL grant.

In a possible design, the user equipment further includes an activation module, configured to activate the first BWP before the transmission module performs uplink transmission on the first BWP corresponding to the first BWP identifier.

In a possible design, the first BWP is an uplink BWP, the active BWP includes an uplink BWP and a downlink BWP, and the first BWP and the uplink BWP in the active BWP may be a same BWP, or may be different BWPs, or the first BWP is a BWP pair including an uplink BWP and a downlink BWP, the active BWP is a BWP pair including an uplink BWP and a downlink BWP, and the first BWP and the active BWP may be a same BWP, or may be different BWPs.

In a possible design, the first message is a response message sent by the second network device after the second network device receives a second message sent by the first network device, and the second message includes at least one of information about an uplink BWP or a BWP pair activated by the user equipment, information about all uplink BWPs or BWP pairs configured for the user equipment, and information about a logical channel of the user equipment, where the logical channel is a logical channel with a highest priority in all logical channels of the user equipment that have to-be-transmitted uplink data, or the logical channel is all logical channels of the user equipment that have to-be-transmitted uplink data, or the logical channel is all logical channels of the user equipment.

In a possible design, the information about the uplink BWP includes at least one of an identifier of the uplink BWP, a parameter set of a subcarrier spacing and a cyclic prefix length of the uplink BWP, and a bandwidth value of the uplink BWP, the information about the BWP pair includes at least one of an identifier of the BWP pair, a parameter set of a subcarrier spacing and a cyclic prefix length of the BWP pair, and a bandwidth value of the BWP pair, and the information about a logical channel includes at least one of an identifier of a logical channel, a parameter set, of a subcarrier spacing and a cyclic prefix length, to which each logical channel is mapped, a data radio bearer corresponding to each logical channel, and indication information, where the indication information indicates whether each logical channel or each corresponding data radio bearer has uplink data available for transmission.

According to a sixteenth aspect, this application provides a second network device, where the second network device includes a first receiving module, configured to receive, on an active bandwidth part (BWP), a random access preamble sent by user equipment, where the random access preamble is sent by the user equipment after the user equipment receives a radio resource control (RRC) connection reconfiguration message sent by a first network device, and the RRC connection reconfiguration message is used to indicate the primary serving cell under the second network device for the user equipment, and indicate an active BWP in the primary serving cell, and a sending module, configured to send a random access response (RAR) message to the user equipment on the active BWP, where the RAR message includes or indicates a first bandwidth part (BWP) identifier, and the first BWP identifier corresponds to a first BWP.

In a possible design, the active BWP is a BWP in common configuration information of the primary serving cell, or the RRC connection reconfiguration message includes a second BWP identifier, and a BWP corresponding to the second BWP identifier is the active BWP.

In a possible design, the RAR message includes an uplink grant (UL grant), and the UL grant includes or indicates the BWP identifier.

In a possible design, a physical resource used for the uplink transmission is a physical resource indicated by the UL grant.

In a possible design, the first BWP is an uplink BWP, the active BWP includes an uplink BWP and a downlink BWP, and the first BWP and the uplink BWP in the active BWP may be a same BWP, or may be different BWPs, or the first BWP is a BWP pair including an uplink BWP and a downlink BWP, the active BWP is a BWP pair including an uplink BWP and a downlink BWP, and the first BWP and the active BWP may be a same BWP, or may be different BWPs.

In a possible design, the second network device further includes a second receiving module, configured to: before the first receiving module receives, on the active BWP, the random access preamble sent by the user equipment, receive a second message sent by the first network device, where the second message includes at least one of information about an uplink BWP or a BWP pair activated by the user equipment, information about all uplink BWPs or BWP pairs configured for the user equipment, and information about a logical channel of the user equipment, where the logical channel is a logical channel with a highest priority in all logical channels of the user equipment that have to-be-transmitted uplink data, or the logical channel is all logical channels of the user equipment that have to-be-transmitted uplink data, or the logical channel is all logical channels of the user equipment.

In a possible design, the information about the uplink BWP includes at least one of an identifier of the uplink BWP, a parameter set of a subcarrier spacing and a cyclic prefix length of the uplink BWP, and a bandwidth value of the uplink BWP, the information about the BWP pair includes at least one of an identifier of the BWP pair, a parameter set of a subcarrier spacing and a cyclic prefix length of the BWP pair, and a bandwidth value of the BWP pair, and the information about a logical channel includes at least one of an identifier of a logical channel, a parameter set, of a subcarrier spacing and a cyclic prefix length, to which each logical channel is mapped, a data radio bearer corresponding to each logical channel, and indication information, where the indication information indicates whether each logical channel or each corresponding data radio bearer has uplink data available for transmission.

According to a seventeenth aspect, user equipment is provided, where the user equipment includes units or means configured to perform the steps of any method according to the first aspect.

According to an eighteenth aspect, user equipment is provided, where the user equipment includes a processor and a memory, the memory is configured to store a program, and the processor invokes the program stored in the memory to perform any method according to the first aspect.

According to a nineteenth aspect, user equipment is provided, where the user equipment includes at least one processing element or chip configured to perform any method according to the first aspect, and the chip is applied to the user equipment, the chip includes at least one communications interface, at least one processor, and at least one memory, the communications interface, the processor, and the memory are interconnected by using a circuit, and the processor invokes an instruction stored in the memory to perform the steps of the method according to the first aspect in the claims.

According to a twentieth aspect, a program is provided, where the program is configured to perform any method according to the first aspect when being executed by a processor.

According to a twenty-first aspect, a computer readable storage medium is provided, where the computer readable storage medium includes the program according to the twentieth aspect.

According to a twenty-second aspect, a network device is provided, where the network device includes units or means configured to perform the steps of any method according to the second aspect.

According to a twenty-third aspect, a network device is provided, where the network device includes a processor and a memory, the memory is configured to store a program, and the processor invokes the program stored in the memory to perform any method according to the second aspect.

According to a twenty-fourth aspect, a network device is provided, where the network device includes at least one processing element or chip configured to perform any method according to the second aspect, and the chip is applied to the network device, the chip includes at least one communications interface, at least one processor, and at least one memory, the communications interface, the processor, and the memory are interconnected by using a circuit, and the processor invokes an instruction stored in the memory to perform the steps of the method according to the second aspect in the claims.

According to a twenty-fifth aspect, a program is provided, where the program is configured to perform any method according to the second aspect when being executed by a processor.

According to a twenty-sixth aspect, a computer readable storage medium is provided, where the computer readable storage medium includes the program according to the twenty-fifth aspect.

According to a twenty-seventh aspect, user equipment is provided, where the user equipment includes units or means configured to perform the steps of any method according to the third aspect.

According to a twenty-eighth aspect, user equipment is provided, where the user equipment includes a processor and a memory, the memory is configured to store a program, and the processor invokes the program stored in the memory to perform any method according to the third aspect.

According to a twenty-ninth aspect, user equipment is provided, where the user equipment includes at least one processing element or chip configured to perform any method according to the third aspect, and the chip is applied to the user equipment, the chip includes at least one communications interface, at least one processor, and at least one memory, the communications interface, the processor, and the memory are interconnected by using a circuit, and the processor invokes an instruction stored in the memory to perform the steps of the method according to the third aspect.

According to a thirtieth aspect, a program is provided, where the program is configured to perform any method according to the third aspect when being executed by a processor.

According to a thirty-first aspect, a computer readable storage medium is provided, where the computer readable storage medium includes the program according to the thirtieth aspect.

According to a thirty-second aspect, a network device is provided, where the network device includes units or means configured to perform the steps of any method according to the fourth aspect.

According to a thirty-third aspect, a network device is provided, where the network device includes a processor and a memory, the memory is configured to store a program, and the processor invokes the program stored in the memory to perform any method according to the fourth aspect.

According to a thirty-fourth aspect, a network device is provided, where the network device includes at least one processing element or chip configured to perform any method according to the fourth aspect, and the chip is applied to the network device, the chip includes at least one communications interface, at least one processor, and at least one memory, the communications interface, the processor, and the memory are interconnected by using a circuit, and the processor invokes an instruction stored in the memory to perform the steps of the method according to the fourth aspect.

According to a thirty-fifth aspect, a program is provided, where the program is configured to perform any method according to the fourth aspect when being executed by a processor.

According to a thirty-sixth aspect, a computer readable storage medium is provided, where the computer readable storage medium includes the program according to the thirty-fifth aspect.

According to a thirty-seventh aspect, user equipment is provided, where the user equipment includes units or means configured to perform the steps of any method according to the fifth aspect.

According to a thirty-eighth aspect, user equipment is provided, where the user equipment includes a processor and a memory, the memory is configured to store a program, and the processor invokes the program stored in the memory to perform any method according to the fifth aspect.

According to a thirty-ninth aspect, user equipment is provided, where the user equipment includes at least one processing element or chip configured to perform any method according to the fifth aspect, and the chip is applied to the user equipment, the chip includes at least one communications interface, at least one processor, and at least one memory, the communications interface, the processor, and the memory are interconnected by using a circuit, and the processor invokes an instruction stored in the memory to perform the steps of the method according to the fifth aspect.

According to a fortieth aspect, a program is provided, where the program is configured to perform any method according to the fifth aspect when being executed by a processor.

According to a forty-first aspect, a computer readable storage medium is provided, where the computer readable storage medium includes the program according to the fortieth aspect.

According to a forty-second aspect, a network device is provided, where the network device includes units or means configured to perform the steps of any method according to the sixth aspect.

According to a forty-third aspect, a network device is provided, where the network device includes a processor and a memory, the memory is configured to store a program, and the processor invokes the program stored in the memory to perform any method according to the sixth aspect.

According to a forty-fourth aspect, a network device is provided, where the network device includes at least one processing element or chip configured to perform any method according to the sixth aspect, and the chip is applied to the network device, the chip includes at least one communications interface, at least one processor, and at least one memory, the communications interface, the processor, and the memory are interconnected by using a circuit, and the processor invokes an instruction stored in the memory to perform the steps of the method according to the sixth aspect.

According to a forty-fifth aspect, a program is provided, where the program is configured to perform any method according to the sixth aspect when being executed by a processor.

According to a forty-sixth aspect, a computer readable storage medium is provided, where the computer readable storage medium includes the program according to the forty-fifth aspect.

According to a forty-seventh aspect, user equipment is provided, where the user equipment includes units or means configured to perform the steps of any method according to the seventh aspect.

According to a forty-eighth aspect, user equipment is provided, where the user equipment includes a processor and a memory, the memory is configured to store a program, and the processor invokes the program stored in the memory to perform any method according to the seventh aspect.

According to a forty-ninth aspect, user equipment is provided, where the user equipment includes at least one processing element or chip configured to perform any method according to the seventh aspect, and the chip is applied to the user equipment, the chip includes at least one communications interface, at least one processor, and at least one memory, the communications interface, the processor, and the memory are interconnected by using a circuit, and the processor invokes an instruction stored in the memory to perform the steps of the method according to the seventh aspect.

According to a fiftieth aspect, a program is provided, where the program is configured to perform any method according to the seventh aspect when being executed by a processor.

According to a fifty-first aspect, a computer readable storage medium is provided, where the computer readable storage medium includes the program according to the fiftieth aspect.

According to a fifty-second aspect, a network device is provided, where the network device includes units or means configured to perform the steps of any method according to the eighth aspect.

According to a fifty-third aspect, a network device is provided, where the network device includes a processor and a memory, the memory is configured to store a program, and the processor invokes the program stored in the memory to perform any method according to the eighth aspect.

According to a fifty-fourth aspect, a network device is provided, where the network device includes at least one processing element or chip configured to perform any method according to the eighth aspect, and the chip is applied to the network device, the chip includes at least one communications interface, at least one processor, and at least one memory, the communications interface, the processor, and the memory are interconnected by using a circuit, and the processor invokes an instruction stored in the memory to perform the steps of the method according to the eighth aspect.

According to a fifty-fifth aspect, a program is provided, where the program is configured to perform any method according to the eighth aspect when being executed by a processor.

According to a fifty-sixth aspect, a computer readable storage medium is provided, where the computer readable storage medium includes the program according to the fifty-fifth aspect.

It can be learned that the user equipment receives the RAR message sent by the network device, where the RAR message includes or indicates the BWP identifier, and the user equipment performs uplink transmission on the first BWP corresponding to the BWP identifier. In this way, the user equipment can complete the random access procedure based on the BWP identifier indicated by the network device. The BWP corresponding to the BWP identifier is consistent with the BWP indicated by the UL grant sent by the network device, so that uplink data can be effectively transmitted by using the UL grant in the RAR message.

This application further provides a timer handling method and a device, to resolve a prior-art problem that because scenarios in which a timer is started, restarted, or stopped are incomprehensive, a terminal device may fail to correctly start, restart, or stop a timer, and therefore the terminal device cannot correctly switch to a default downlink BWP, affecting power consumption reduction of the terminal device.

According to a fifty-seventh aspect, this application provides a timer handling method, where the method includes receiving, by a terminal device, a physical downlink control channel order (PDCCH order) message sent by a network device, where a timer of the terminal device is running, and the timer is a timer used by the terminal device to switch from an active downlink bandwidth part (BWP) to a default downlink BWP, and starting or restarting, by the terminal device, the timer.

In a possible design, the PDCCH order message includes an identifier of the downlink BWP, and the downlink BWP indicated by the identifier of the downlink BWP is not a default downlink BWP.

According to a fifty-eighth aspect, this application provides a timer handling method, where the method includes receiving, by a terminal device, an indication message sent by a network device, where the indication message is used to instruct the terminal device to activate at least one secondary serving cell, and starting or restarting, by the terminal device, a timer associated with the secondary serving cell, where the timer is a timer used by the terminal device to switch from an active downlink bandwidth part (BWP) to a default downlink BWP.

In a possible design, the secondary serving cell is in an inactive state.

In a possible design, before the receiving, by a terminal device, an indication message sent by a network device, the method further includes receiving, by the terminal device, a radio resource control (RRC) message sent by the network device, where the RRC message includes indication information, the indication information is used to instruct to add or modify the at least one secondary serving cell, the RRC message further includes a first downlink BWP of the secondary serving cell, the first downlink BWP is a downlink BWP that is first activated when the secondary serving cell is activated, and the first downlink BWP is not a default downlink BWP.

In a possible design, the timer associated with the secondary serving cell is a timer maintained by a physical layer of the terminal device, and the starting or restarting, by the terminal device, a timer associated with the secondary serving cell includes instructing, by the terminal device by using a media access control (MAC) layer of the terminal device, the physical layer of the terminal device to start or restart the timer associated with the secondary serving cell.

According to a fifty-ninth aspect, a timer handling method is provided, where the method includes receiving, by a terminal device, an indication message sent by a network device, where the indication message is used to instruct the terminal device to deactivate at least one secondary serving cell, a timer associated with the secondary serving cell is running, and the timer is a timer used by the terminal device to switch from an active downlink bandwidth part (BWP) to a default downlink BWP, and stopping or resetting, by the terminal device, the timer associated with the secondary serving cell, or stopping and resetting, by the terminal device, the timer associated with the secondary serving cell.

In a possible design, the timer associated with the secondary serving cell is a timer maintained by a physical layer of the terminal device, and the stopping or resetting, by the terminal device, the timer associated with the secondary serving cell includes instructing, by the terminal device by using a media access control (MAC) layer of the terminal device, the physical layer of the terminal device to stop or reset the timer associated with the secondary serving cell, or the stopping and resetting, by the terminal device, the timer associated with the secondary serving cell includes instructing, by the terminal device by using a MAC layer of the terminal device, the physical layer of the terminal device to stop and reset the timer associated with the secondary serving cell.

According to a sixtieth aspect, a timer handling method is provided, where the method includes determining, by a terminal device, that a secondary serving cell deactivation timer of a secondary serving cell expires, where the timer associated with the secondary serving cell is running, and the timer is a timer used by the terminal device to switch from an active downlink bandwidth part (BWP) to a default downlink BWP, and stopping or resetting, by the terminal device, the timer associated with the secondary serving cell, or stopping and resetting, by the terminal device, the timer associated with the secondary serving cell.

In a possible design, the timer associated with the secondary serving cell is a timer maintained by a physical layer of the terminal device, and the stopping or resetting, by the terminal device, the timer associated with the secondary serving cell includes instructing, by the terminal device by using a media access control (MAC) layer of the terminal device, the physical layer of the terminal device to stop or reset the timer associated with the secondary serving cell, or the stopping and resetting, by the terminal device, the timer associated with the secondary serving cell includes instructing, by the terminal device by using a MAC layer of the terminal device, the physical layer of the terminal device to stop and reset the timer associated with the secondary serving cell.

According to a sixty-first aspect, a terminal device is provided, where the terminal device includes a receiving module, configured to receive a physical downlink control channel order (PDCCH order) message sent by a network device, where a timer of the terminal device is running, and the timer is a timer used by the terminal device to switch from an active downlink bandwidth part (BWP) to a default downlink BWP, and a running module, configured to start or restart the timer.

In a possible design, the PDCCH order message includes an identifier of the downlink BWP, and the downlink BWP indicated by the identifier of the downlink BWP is not a default downlink BWP.

According to a sixty-second aspect, a terminal device is provided, where the terminal device includes a first receiving module, configured to receive an indication message sent by a network device, where the indication message is used to instruct the terminal device to activate at least one secondary serving cell; and a running module, configured to start or restart a timer associated with the secondary serving cell, where the timer is a timer used by the terminal device to switch from an active downlink bandwidth part (BWP) to a default downlink BWP.

In a possible design, the secondary serving cell is in an inactive state.

In a possible design, the terminal device further includes a second receiving module, configured to: before the first receiving module receives the indication message sent by the network device, receive a radio resource control (RRC) message sent by the network device, where the RRC message includes indication information, the indication information is used to instruct to add or modify the at least one secondary serving cell, the RRC message further includes a first downlink BWP of the secondary serving cell, the first downlink BWP is a downlink BWP that is first activated when the secondary serving cell is activated, and the first downlink BWP is not a default downlink BWP.

In a possible design, the timer associated with the secondary serving cell is a timer maintained by a physical layer of the terminal device, and the running module is specifically configured to instruct, by using a media access control (MAC) layer of the terminal device, the physical layer of the terminal device to start or restart the timer associated with the secondary serving cell.

According to a sixty-third aspect, a terminal device is provided, where the terminal device includes a receiving module, configured to receive an indication message sent by a network device, where the indication message is used to instruct the terminal device to deactivate at least one secondary serving cell, a timer associated with the secondary serving cell is running, and the timer is a timer used by the terminal device to switch from an active downlink bandwidth part (BWP) to a default downlink BWP, and a processing module, configured to: stop or reset the timer associated with the secondary serving cell, or stop and reset, by the terminal device, the timer associated with the secondary serving cell.

In a possible design, the timer associated with the secondary serving cell is a timer maintained by a physical layer of the terminal device, and the processing module is specifically configured to: instruct, by using a media access control (MAC) layer of the terminal device, the physical layer of the terminal device to stop or reset the timer associated with the secondary serving cell, or instruct, by using a MAC layer of the terminal device, the physical layer of the terminal device to stop and reset the timer associated with the secondary serving cell.

According to a sixty-fourth aspect, a terminal device is provided, where the terminal device includes a determining module, configured to determine that a secondary serving cell deactivation timer of a secondary serving cell expires, where the timer associated with the secondary serving cell is running, and the timer is a timer used by the terminal device to switch from an active downlink bandwidth part (BWP) to a default downlink BWP, and a processing module, configured to: stop or reset the timer associated with the secondary serving cell, or stop and reset, by the terminal device, the timer associated with the secondary serving cell.

In a possible design, the timer associated with the secondary serving cell is a timer maintained by a physical layer of the terminal device, and the processing module is specifically configured to: instruct, by using a media access control (MAC) layer of the terminal device, the physical layer of the terminal device to stop or reset the timer associated with the secondary serving cell, or instruct, by using a MAC layer of the terminal device, the physical layer of the terminal device to stop and reset the timer associated with the secondary serving cell.

According to a sixty-fifth aspect, a terminal device is provided, where the terminal device includes units or means configured to perform the steps of any method according to the fifty-seventh aspect.

According to a sixty-sixth aspect, a terminal device is provided, where the terminal device includes a processor and a memory, the memory is configured to store a program, and the processor invokes the program stored in the memory to perform any method according to the fifty-seventh aspect.

According to a sixty-seventh aspect, a terminal device is provided, where the terminal device includes at least one processing element or chip configured to perform any method according to the fifty-seventh aspect.

According to a sixty-eighth aspect, a program is provided, where the program is configured to perform any method according to the fifty-seventh aspect when being executed by a processor.

According to a sixty-ninth aspect, a computer readable storage medium is provided, where the computer readable storage medium includes the program according to the sixty-eighth aspect.

According to a seventieth aspect, a terminal device is provided, where the terminal device includes units or means configured to perform the steps of any method according to the fifty-eighth aspect.

According to a seventy-first aspect, a terminal device is provided, where the terminal device includes a processor and a memory, the memory is configured to store a program, and the processor invokes the program stored in the memory to perform any method according to the fifty-eighth aspect.

According to a seventy-second aspect, a terminal device is provided, where the terminal device includes at least one processing element or chip configured to perform any method according to the fifty-eighth aspect.

According to a seventy-third aspect, a program is provided, where the program is configured to perform any method according to the fifty-eighth aspect when being executed by a processor.

According to a seventy-fourth aspect, a computer readable storage medium is provided, where the computer readable storage medium includes the program according to the seventy-third aspect.

According to a seventy-fifth aspect, a terminal device is provided, where the terminal device includes units or means configured to perform the steps of any method according to the fifty-ninth aspect.

According to a seventy-sixth aspect, a terminal device is provided, where the terminal device includes a processor and a memory, the memory is configured to store a program, and the processor invokes the program stored in the memory to perform any method according to the fifty-ninth aspect.

According to a seventy-seventh aspect, a terminal device is provided, where the terminal device includes at least one processing element or chip configured to perform any method according to the fifty-ninth aspect.

According to a seventy-eighth aspect, a program is provided, where the program is configured to perform any method according to the fifty-ninth aspect when being executed by a processor.

According to a seventy-ninth aspect, a computer readable storage medium is provided, where the computer readable storage medium includes the program according to the seventy-eighth aspect.

According to an eightieth aspect, a terminal device is provided, where the terminal device includes units or means configured to perform the steps of any method according to the sixtieth aspect.

According to an eighty-first aspect, a terminal device is provided, where the terminal device includes a processor and a memory, the memory is configured to store a program, and the processor invokes the program stored in the memory to perform any method according to the sixtieth aspect.

According to an eighty-second aspect, a terminal device is provided, where the terminal device includes at least one processing element or chip configured to perform any method according to the sixtieth aspect.

According to an eighty-third aspect, a program is provided, where the program is configured to perform any method according to the sixtieth aspect when being executed by a processor.

According to an eighty-fourth aspect, a computer readable storage medium is provided, where the computer readable storage medium includes the program according to the eighty-third aspect.

It can be learned that in the foregoing aspects, the terminal device receives the PDCCH order message sent by the network device, where the timer of the terminal device is running, and the timer is a timer used by the terminal device to switch from an active downlink BWP to a default downlink BWP, and the terminal device starts or restarts the timer. Therefore, when the timer of the terminal device is running, after the PDCCH order message sent by the network device is received, it is considered whether the timer is to be started or restarted. In this way, an operating scenario of the timer is provided.

DETAILED DESCRIPTION OF ILLUSTRATIVE EMBODIMENTS

Figure 1A:
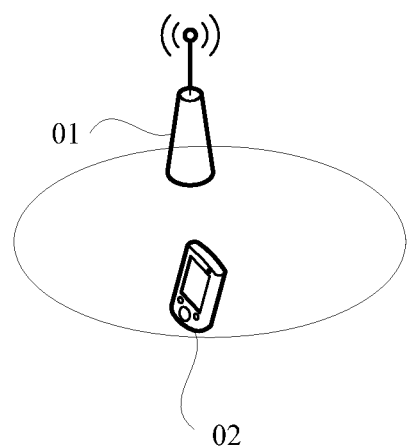
FIG. 1a is a schematic diagram of an application scenario according to an embodiment of this application.

The embodiments of this application are applied to a 5G communications system or another system that may occur in the future. For ease of understanding by a person skilled in the art, the following describes some terms in this application. It should be noted that a name of a network device and a name of a terminal may change when the solutions in the embodiments of this application are applied to the 5G system or another system that may occur in the future, but this does not affect implementation of the solutions in the embodiments of this application.

The embodiments of this application are applied to a 5G communications system or another system that may occur in the future. For ease of understanding by a person skilled in the art, the following describes some terms in this application. It should be noted that a name of a network device and a name of a terminal may change when the solutions in the embodiments of this application are applied to the 5G system or another system that may occur in the future, but this does not affect implementation of the solutions in the embodiments of this application.

(1) User equipment, also referred to as a terminal or a terminal device, is a device providing a user with voice and/or data connectivity, for example, a handheld device or an in-vehicle device with a wireless connection function. Common user equipment includes, for example, a mobile phone, a tablet computer, a notebook computer, a palmtop computer, a mobile Internet device (mobile internet device, MID), and a wearable device, where the wearable device is, for example, a smartwatch, a smart band, or a pedometer.

(2) A network device, also referred to as a radio access network (Radio Access Network, RAN) device, is a device for connecting user equipment to a wireless network. There are network devices of various communication standards. For example, the network devices include but are not limited to a base station, an evolved NodeB (evolved Node B, eNB), a radio network controller (radio network controller, RNC), a NodeB (Node B, NB), a network device controller (base station controller, BSC), a network device transceiver station (base transceiver station, BTS), a home network device (for example, a home evolved NodeB or a home Node B, HNB), a baseband unit (baseband unit, BBU), a relay station, a distribution unit (distribute unit, DU) of the base station, a central unit (central unit, CU) of the base station, and the like.

(3) In terms of a bandwidth part (band width part, BWP), when bandwidth of a cell is wide, user equipment may operate only on a part of bandwidth of the cell. Each part of bandwidth of the cell is referred to as one BWP.

(4) There are network devices of various frequency standards. For example, the network devices include but are not limited to a low-frequency network device and a high-frequency network device.

(5) "A plurality of" means two or more, and another quantifier is similar to this. The term "and/or" describes an association relationship between associated objects and represents that three relationships may exist. For example, A and/or B may represent the following three cases: Only A exists, both A and B exist, and only B exists. The character "/" usually indicates an "or" relationship between the associated objects.

Figure 1B:
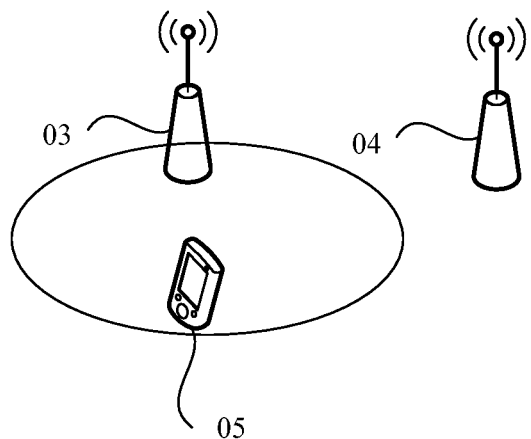
FIG. 1b is a schematic diagram of another application scenario according to an embodiment of this application.

FIG. 1a is a schematic diagram of an application scenario according to an embodiment of this application. A networking architecture shown in FIG. 1a mainly includes a network device 01 and user equipment 02. The network device 01 may communicate with the user equipment 02. FIG. 1b is a schematic diagram of another application scenario according to an embodiment of this application. A networking architecture shown in FIG. 1b mainly includes a network device 03, a network device 04, and user equipment 05. The user equipment 05 needs to be handed over from the network device 03 to the network device 04.

Figure 2:
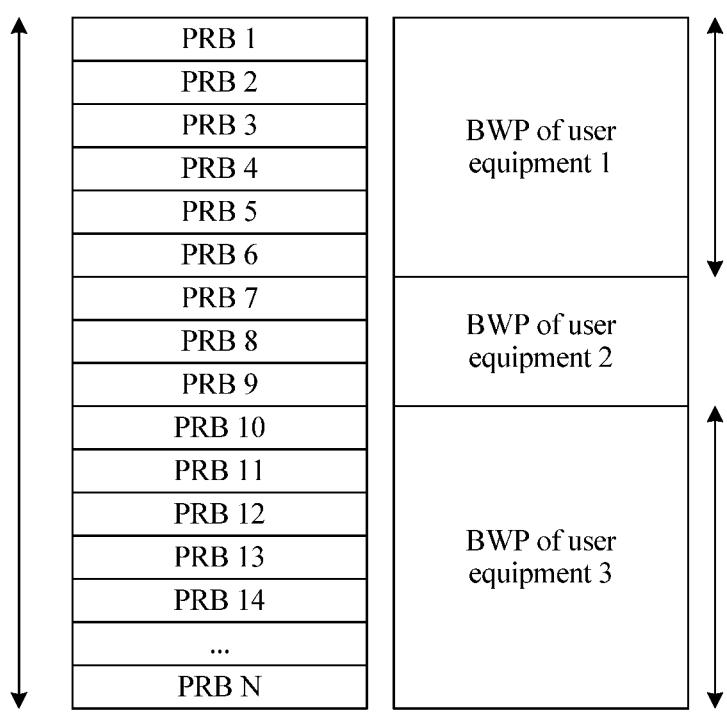
FIG. 2 is a signaling diagram of an application scenario according to an embodiment of this application.

In this application, on a broadband carrier, a network device may configure at least one downlink BWP and at least one uplink BWP for one user equipment. Each downlink BWP has one BWP identifier, and each uplink BWP has one BWP identifier. FIG. 2 is a schematic diagram of a BWP according to an embodiment of this application. Each BWP may occupy at least one physical resource block (physical resource block, PRB). One BWP supports one physical-layer parameter set of a subcarrier spacing (subcarrier spacing) and a cyclic prefix length (cyclic prefix). The parameter set includes subcarrier spacing configuration information, cyclic prefix length configuration information, and the like. Parameter sets supported by different BWPs may be the same or different.

In a first version of 5G, one user equipment has only one active downlink BWP and only one active uplink BWP at any moment in one serving cell. However, the user equipment may dynamically perform BWP switching. In other words, the user equipment may deactivate a BWP in an active state, and then the user equipment activates a BWP in an inactive state, to complete BWP switching. Specifically, in the prior art, a network device dynamically controls, by using downlink control information (downlink control information, DCI), user equipment to switch between different configured BWPs. For example, the network device schedules downlink transmission DCI to control the user equipment to switch between downlink BWPs. Specifically, the network device sends DCI to the user equipment. The DCI is DCI for downlink transmission scheduling, and the DCI includes a BWP identifier. Then the user equipment activates a downlink BWP corresponding to the BWP identifier, and the user equipment may receive, on the downlink BWP, a physical downlink shared channel (physical downlink shared channel, PDSCH) scheduled by using the DCI. For another example, the network device schedules uplink transmission DCI to control the user equipment to switch between uplink BWPs. Specifically, the network device sends DCI to the user equipment. The DCI is DCI for uplink transmission scheduling, and the DCI includes a BWP identifier. Then the user equipment activates an uplink BWP corresponding to the BWP identifier, and the user equipment may transmit, on the uplink BWP, a PUSCH scheduled by using the DCI.

One user equipment may have a plurality of services. Services with a same quality of service (quality of service, QoS) requirement may be mapped to a same data radio bearer for transmission. Services with different QoS requirements need to be mapped to different data radio bearers for transmission, and the services need to be transmitted by using uplink grants (UL grant). During transmission of each of the services with different QoS requirements, a UL grant corresponding to the service needs to be determined. The UL grant has configuration information corresponding to the QoS requirement of the service, and the configuration information includes the foregoing parameter set and/or a transmission time length.

A network device configures a mapping relationship between a logical channel corresponding to a data radio bearer and configuration information for user equipment, where the configuration information includes the foregoing parameter set and/or a transmission time length, to ensure that a data packet on each data radio bearer can be transmitted by using a suitable UL grant. The suitable UL grant has configuration information that matches a QoS requirement of the data packet. Specifically, the network device allocates a UL grant to the user equipment. Only when the user equipment determines that the foregoing parameter set and/or a transmission time length indicated by the UL grant match or matches a parameter set and/or a transmission time length of a logical channel, the user equipment can transmit data of the logical channel by using the UL grant.

In addition, a carrier aggregation function may be configured for a terminal device, and the terminal device is connected to one primary serving cell (primary cell, pCell) and at least one secondary serving cell (secondary cell, SCell). There are at least four secondary serving cells. Carrier aggregation means aggregating at least two component carriers (component carrier, CC), to provide wider transmission bandwidth for the terminal. The terminal device adds/modifies/deletes a secondary serving cell by using a radio resource control (radio resource control, RRC) connection reconfiguration message. An activation/deactivation mechanism for a secondary serving cell is provided to better manage power consumption of carrier aggregation. A secondary serving cell is activated/deactivated by using a media access control (media access control, MAC for short) control element (control Element, CE). The MAC CE may be configured to activate or deactivate at least one secondary serving cell. In addition, deactivation of a secondary serving cell may be controlled by using a secondary serving cell deactivation timer. Specifically, when a secondary serving cell deactivation timer expires, a secondary serving cell corresponding to the secondary serving cell deactivation timer is automatically deactivated. It can be learned that when the terminal device successfully adds a secondary serving cell, the secondary serving cell is configured by the network device for the terminal device, but the secondary serving cell is still in an inactive state, and the terminal device further needs to activate the secondary serving cell according to an activate command. The terminal device can perform data communication only on an active secondary serving cell.

One user equipment may transmit data on one carrier by using a plurality of UL grants. When a carrier aggregation function is configured for the user equipment, the user equipment may also transmit data on different carriers by using a plurality of UL grants.

In the prior art, different BWPs may have different configuration information, and it can be learned that the configuration information includes a parameter set and/or a transmission time length. The parameter set is a parameter set of a subcarrier spacing and a cyclic prefix length. In a contention free random access procedure, configuration information of an uplink BWP used by the user equipment to send a message 1 to the network device may not match configuration information required when the user equipment sends uplink data to the network device. Therefore, the user equipment cannot send the uplink data by using a UL grant that is in an RAR message and that corresponds to the uplink BWP, wasting the UL grant that is in the RAR message and that corresponds to the uplink BWP.

For example, a primary serving cell and one secondary serving cell are configured for the user equipment, and an uplink timing advance used on an uplink of the secondary serving cell is different from an uplink timing advance used on an uplink of the primary serving cell. Therefore, if the user equipment needs to transmit uplink data in the secondary serving cell, the user equipment first needs to implement uplink synchronization in the secondary serving cell through random access. In this case, the secondary serving cell and the primary serving cell belong to different timing advance groups (timing advance group, TAG). In the secondary serving cell, the network device configures two uplink BWPs and two downlink BWPs for the user equipment, and configured initial active BWPs are an uplink BWP 1 and a downlink BWP 1. A parameter set of a subcarrier spacing and a cyclic prefix length of the uplink BWP 1 is a parameter set A of a subcarrier spacing and a cyclic prefix length, and a parameter set of a subcarrier spacing and a cyclic prefix length of an uplink BWP 2 is a parameter set B of a subcarrier spacing and a cyclic prefix length. FIG. 2 is a signaling diagram of an application scenario according to an embodiment of this application. In step S11, a network device activates, by using a MAC CE, a secondary serving cell configured for user equipment. In this case, a downlink BWP 1 and an uplink BWP 1 of the secondary serving cell are activated. In step S12, the user equipment sends a buffer status report (buffer status report, BSR) message to the network device. The BSR message includes or indicates a parameter set that is of a subcarrier spacing and a cyclic prefix length and that can be used for to-be-transmitted data, namely, a parameter set B of a subcarrier spacing and a cyclic prefix length. In step S13, the network device determines, based on the BSR message, to use an uplink BWP of the secondary serving cell to transmit data. In step S14, the network device sends a physical downlink control channel order (physical downlink control channel order, PDCCH order) to the user equipment. The PDCCH order is used to trigger the user equipment to send a preamble on the uplink BWP 1 of the secondary serving cell. In step S15, the user equipment sends the preamble to the network device on the uplink BWP 1. In step S16, the network device sends an RAR message to the user equipment. The RAR message includes a UL grant, and the UL grant is a UL grant corresponding to the uplink BWP 1. However, in this case, data of the user equipment needs to be sent to the network device on an uplink BWP 2. In this case, configuration information of the uplink BWP 1 does not match configuration information of the uplink BWP 2. Therefore, the user equipment cannot transmit data by using the UL grant in the RAR message, wasting the UL grant in the RAR message.

It should be noted that the terms used in the embodiments of this application may be mutually referenced, and details are not described again.

The following first describes a contention free random access procedure. Random access procedures include a contention-based random access procedure and a contention free random access procedure, and the contention free random access procedure is initiated by user equipment based on triggering by a network device.

Figure 3:
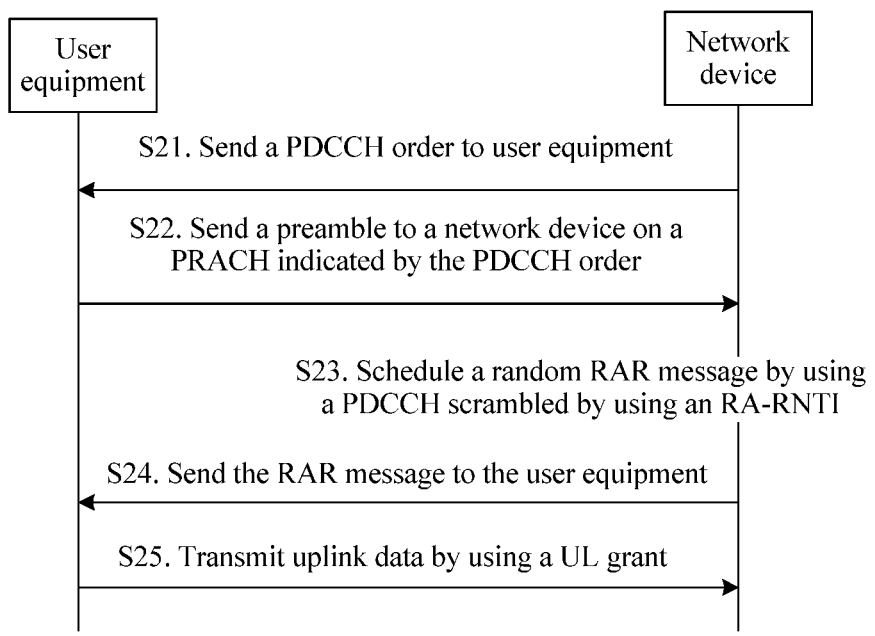
FIG. 3 is a signaling diagram 1 of a contention free random access procedure according to an embodiment of this application.

In a first case of the contention free random access procedure, the network device instructs, by using a PDCCH order, the user equipment to initiate random access. In an example scenario, downlink data on a base station side needs to be sent to user equipment, but the user equipment loses uplink synchronization, or a base station needs to schedule user equipment to transmit uplink data in an SCell, but the user equipment has not obtained an uplink timing advance of the SCell. FIG. 3 is a signaling diagram 1 of a contention free random access procedure according to an embodiment of this application. As shown in FIG. 3, in step S21, a network device sends a PDCCH order to user equipment. The PDCCH order is used to trigger the user equipment to perform random access, and the PDCCH order includes a preamble and configuration information of a physical random access channel (physical random access channel, PRACH) corresponding to the preamble. In this case, downlink data arrives at the user equipment, but the user equipment has not implemented uplink synchronization, or the user equipment needs to implement uplink synchronization in a secondary serving cell. In step S22, the user equipment sends a preamble to the network device on the PRACH indicated by the PDCCH order. The preamble is the preamble allocated in the PDCCH order. In step S23, the network device schedules a random RAR message by using a PDCCH scrambled by using an RA-RNTI. In step S24, the network device sends the RAR message to the user equipment. The RAR message includes a UL grant. In step S25, the user equipment transmits uplink data by using the UL grant, that is, the user equipment sends data or signaling to the network device by using the UL grant.

Figure 4:
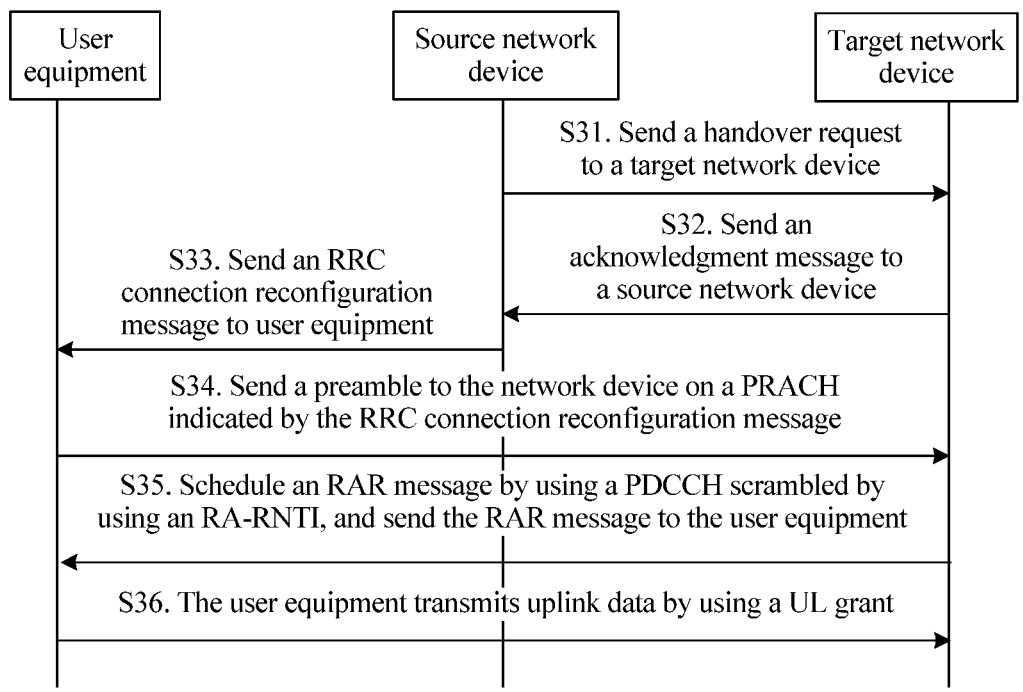
FIG. 4 is a signaling diagram 2 of a contention free random access procedure according to an embodiment of this application.

In a second case of the contention free random access procedure, a handover is required by the user equipment. FIG. 4 is a signaling diagram 2 of a contention free random access procedure according to an embodiment of this application. As shown in FIG. 4, in step S31, a source network device sends a handover request to a target network device.

In step S32, the target network device sends an acknowledgement message to the source network device. The acknowledgement message includes an RRC connection reconfiguration message. In step S33, the source network device sends the RRC connection reconfiguration message to user equipment. The RRC connection reconfiguration message is used to trigger the user equipment to perform random access, and the RRC connection reconfiguration message includes a preamble and configuration information of a PRACH corresponding to the preamble. In step S34, the user equipment sends a preamble to the target network device on the PRACH indicated by the RRC connection reconfiguration message. The preamble is the preamble allocated in the RRC connection reconfiguration message. In step S35, the target network device schedules a random RAR message by using a PDCCH scrambled by using an RA-RNTI, and the target network device sends the RAR message to the user equipment. The RAR message includes a UL grant. In step S36, the user equipment transmits uplink data by using the UL grant, that is, the user equipment sends data or signaling to the target network device by using the UL grant.

Figure 5:
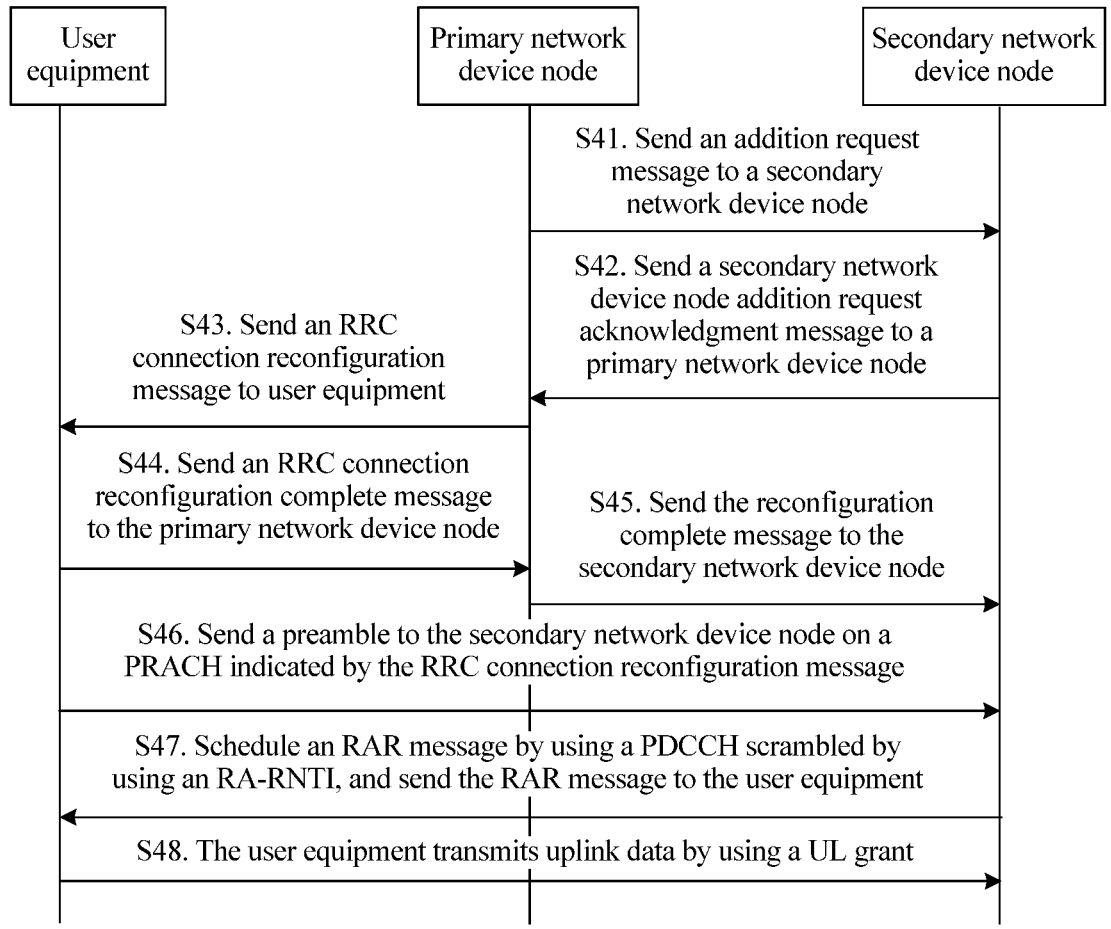
FIG. 5 is a signaling diagram 3 of a contention free random access procedure according to an embodiment of this application.

In a third case of the contention free random access procedure, dual connectivity is configured for the user equipment. FIG. 5 is a signaling diagram 3 of a contention free random access procedure according to an embodiment of this application. As shown in FIG. 5, in step S41, a primary network device node sends a secondary network device node addition request message to a secondary network device node. In S42, the secondary network device node sends a secondary network device node addition request acknowledgement message to the primary network device node. In S43, the primary network device node sends an RRC connection reconfiguration message to user equipment. In S44, the user equipment sends an RRC connection reconfiguration complete message to the primary network device node. In S45, the primary network device node sends the reconfiguration complete message to the secondary network device node. In S46, the user equipment sends a preamble to the secondary network device node on a PRACH indicated by the RRC connection reconfiguration message. In S47, the secondary network device node schedules an RAR message by using a PDCCH scrambled by using an RA-RNTI, and sends the RAR message to the user equipment. In S48, the user equipment transmits uplink data by using a UL grant.

Figure 6:
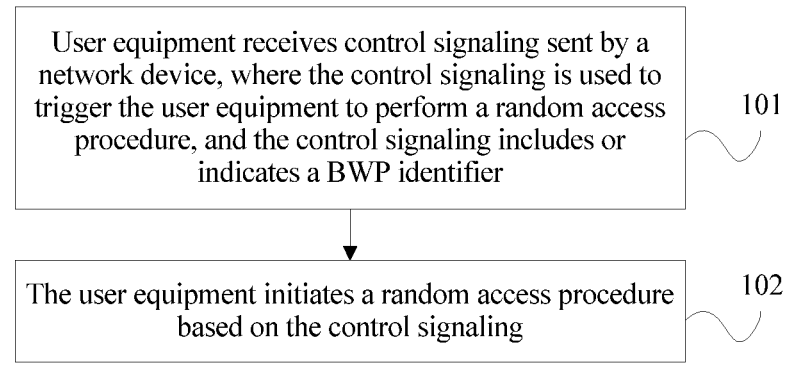
FIG. 6 is a schematic flowchart of a random access method according to an embodiment of the present invention.

The following describes the embodiments of this application. First, based on the contention free random access procedure in FIG. 3, in the scenario shown in FIG. 1a, the solutions of the embodiments of this application are as follows:

FIG. 6 is a schematic flowchart of a random access method according to an embodiment of the present invention. As shown in FIG. 6, the method is specifically as follows:

101. User equipment receives control signaling sent by a network device, where the control signaling is used to trigger the user equipment to perform a random access procedure, and the control signaling includes or indicates a BWP identifier.

In an optional implementation, the control signaling received by the user equipment in any serving cell includes the BWP identifier, or the control signaling received by the user equipment in any serving cell includes the BWP identifier, where at least two uplink BWPs are configured for the user equipment in at least one secondary serving cell, and a random access channel is configured for each of the at least two uplink BWPs, or the control signaling received by the user equipment in a secondary serving cell includes the BWP identifier, or the control signaling received by the user equipment in at least one secondary serving cell includes the BWP identifier, where at least two uplink BWPs are configured for the user equipment in the at least one secondary serving cell, and a random access channel is configured for each of the at least two uplink BWPs.

In this embodiment, the network device configures at least one BWP for the user equipment in the secondary serving cell, and a PRACH resource is configured for each of the at least one BWP. In this case, the user equipment operates in a serving cell. In other words, the user equipment communicates with the network device in a serving cell. Optionally, the user equipment operates in a secondary serving cell, and the secondary serving cell and a primary serving cell of the user equipment belong to different TAGs, or the user equipment operates in a primary serving cell.

The network device sends the control signaling to the user equipment. The control signaling may be signaling or a signal, and the control signaling is used to trigger the user equipment to perform a random access procedure. In addition, the control signaling includes the BWP identifier, or the control signaling indicates the BWP identifier.

In addition, the user equipment may determine, by using the following methods, whether the received control signaling includes a BWP identifier. Cross-carrier scheduling may be unavailable for the user equipment, or cross-carrier scheduling may be available for the user equipment.

In a first manner, the control signaling received by the user equipment in any serving cell always includes a BWP identifier.

In a second manner, at least two uplink BWPs are configured for the user equipment in any secondary serving cell, and a random access channel is configured for each of the at least two uplink BWPs. In this case, the control signaling received by the user equipment in any serving cell includes a BWP identifier. Optionally, if the terminal device operates in a secondary serving cell, the secondary serving cell and a primary serving cell of the terminal device belong to different TAGs. At least two uplink BWPs are configured for the user equipment in any secondary serving cell, and a random access channel is configured for only one of the at least two uplink BWPs. In this case, the control signaling received by the user equipment in any serving cell includes no BWP identifier. Optionally, if the terminal device operates in a secondary serving cell, the secondary serving cell and a primary serving cell of the terminal device belong to different TAGs.

In a third manner, if the terminal device operates in a primary serving cell, the control signaling received by the user equipment in the primary serving cell includes no BWP identifier. If the terminal device operates in a secondary serving cell, the control signaling received by the user equipment in the secondary serving cell includes a BWP identifier. Optionally, the secondary serving cell and a primary serving cell of the terminal device belong to different TAGs.

In a fourth manner, if the terminal device operates in a primary serving cell, the control signaling received by the user equipment in the primary serving cell includes no BWP identifier. At least two uplink BWPs are configured for the user equipment in at least one secondary serving cell, and a random access channel is configured for each of the at least two uplink BWPs. In this case, the control signaling received by the user equipment in the at least one secondary serving cell includes a BWP identifier. Optionally, the at least one secondary serving cell and a primary serving cell of the terminal device belong to different time TAGs. At least two uplink BWPs are configured for the user equipment in at least one secondary serving cell, and a random access channel is configured for only one of the at least two uplink BWPs. In this case, the control signaling received by the user equipment in the at least one secondary serving cell includes a BWP identifier. Optionally, the at least one secondary serving cell and a primary serving cell of the terminal device belong to different time TAGs.

102. The user equipment initiates a random access procedure based on the control signaling.

In this embodiment, the user equipment performs random access to the network device based on the BWP identifier.

Figure 7:
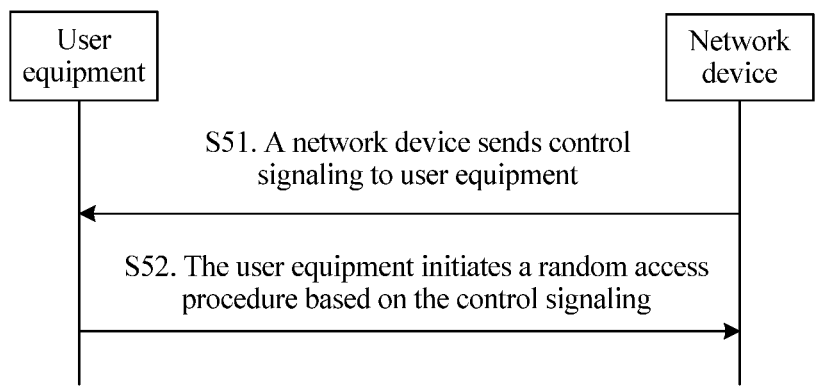
FIG. 7 is a signaling diagram of a random access method according to an embodiment of the present invention.

FIG. 7 is a signaling diagram of a random access method according to an embodiment of the present invention. As shown in FIG. 7, the method is specifically as follows:

S51. A network device sends control signaling to user equipment, where the control signaling is used to trigger the user equipment to perform a random access procedure, and the control signaling includes or indicates a BWP identifier.

S52. The user equipment initiates a random access procedure based on the control signaling.

Herein, step 101 in FIG. 6 is implemented in step S51. For S52, refer to step 102 in FIG. 6. Details are not described again.

In this embodiment, the user equipment receives the control signaling sent by the network device, where the control signaling is used to trigger the user equipment to perform a random access procedure, and the control signaling includes or indicates the BWP identifier, and the user equipment initiates the random access procedure based on the control signaling. In this way, the user equipment can complete the random access procedure based on the BWP identifier indicated by the network device. A BWP corresponding to the BWP identifier is consistent with a BWP indicated by a UL grant sent by the network device, so that uplink data can be effectively transmitted by using the UL grant in an RAR message.

Figure 8:
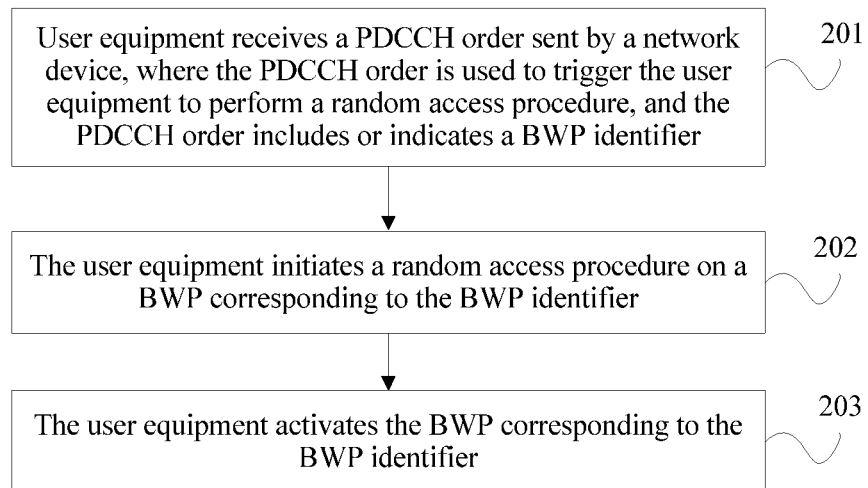
FIG. 8 is a schematic flowchart of another random access method according to an embodiment of the present invention.

FIG. 8 is a schematic flowchart of another random access method according to an embodiment of the present invention. As shown in FIG. 8, the method is specifically as follows:

201. User equipment receives a PDCCH order sent by a network device, where the PDCCH order is used to trigger the user equipment to perform a random access procedure, and the PDCCH order includes or indicates a BWP identifier.

In this embodiment, the network device configures at least one uplink BWP for the user equipment in the secondary serving cell, and a PRACH resource is configured for each of the at least one uplink BWP. In this case, the user equipment operates in a serving cell. In other words, the user equipment communicates with the network device in a serving cell. Optionally, the user equipment operates in a secondary serving cell, and the secondary serving cell and a primary serving cell of the user equipment belong to different TAGs, or the user equipment operates in a primary serving cell.

The network device sends the PDCCH order to the user equipment. The PDCCH order is used to trigger the user equipment to perform a random access procedure. In addition, the PDCCH order includes the BWP identifier, or the PDCCH order indicates the BWP identifier. Moreover, a BWP corresponding to the BWP identifier may be an uplink BWP, a downlink BWP, or a pair of an uplink BWP and a downlink BWP.

In this case, the user equipment has an active downlink BWP in a serving cell, and the user equipment may receive the PDCCH order on the downlink BWP of the current serving cell. Alternatively, the user equipment may receive the PDCCH order on a downlink BWP of another serving cell used to schedule a current serving cell. In this case, the PDCCH order includes a cell index (Cell Index) of the current serving cell.

202. The user equipment initiates a random access procedure on the BWP corresponding to the BWP identifier.

In this embodiment, the user equipment initiates the random access procedure to the network device on the BWP corresponding to the BWP identifier.

In an optional implementation, there are the following implementations of step 202:

In a first implementation of step 202, the BWP corresponding to the BWP identifier is an uplink BWP, and step 202 specifically includes the following steps:

2021a. The user equipment sends a random access preamble to the network device on the uplink BWP.

2022a. The user equipment receives a first RAR message sent by the network device, where the first RAR message includes a first UL grant.

2023a. The user equipment performs uplink transmission on the uplink BWP, where a physical resource used for the uplink transmission is a physical resource indicated by the first UL grant.

In this embodiment, the BWP of the BWP identifier protected or indicated by control signaling is an uplink BWP. In this case, after step 101, the user equipment sends the random access preamble to the network device on the uplink BWP. Then the network device sends the first RAR message to the user equipment, where the first RAR message includes the first UL grant, and the first UL grant is a UL grant corresponding to the uplink BWP. Then the user equipment sends data or signaling to the network device on the uplink BWP by using the physical resource indicated by the first UL grant.

In a second implementation of step 202, the BWP corresponding to the BWP identifier is a BWP pair including an uplink BWP and a downlink BWP, and step 202 specifically includes the following steps:

2021b. The user equipment sends a random access preamble to the network device on the uplink BWP of the BWP.

2022b. The user equipment receives a second RAR message sent by the network device, where the second RAR message includes a second UL grant.

2023b. The user equipment performs transmission on the uplink BWP of the BWP, where a physical resource used for the transmission is a physical resource indicated by the second UL grant.

In an optional implementation, before step 202, the method may further include step 203:

203. The user equipment activates the BWP corresponding to the BWP identifier.

In this embodiment, there are three cases as to whether the user equipment needs to activate the BWP corresponding to the BWP identifier.

In a first case, when the user equipment receives the PDCCH order, if the user equipment has no active BWP in the current serving cell, the user equipment needs to activate the BWP corresponding to the BWP identifier.

In a second case, when the user equipment receives the PDCCH order, if an active uplink BWP of the user equipment in a current first serving cell is another BWP, the user equipment switches to the BWP corresponding to the BWP identifier, in other words, the user equipment deactivates the another BWP, and activates the BWP corresponding to the BWP identifier.

In a third case, when the user equipment receives the PDCCH order, if an active uplink BWP of the user equipment in a current first serving cell is the BWP corresponding to the BWP identifier, the user equipment does not need to perform BWP switching.

In this step, in the first case or the second case, the user equipment needs to activate the BWP corresponding to the BWP identifier.

In this embodiment, the BWP of the BWP identifier protected or indicated by control signaling is a BWP pair including an uplink BWP and a downlink BWP. In this case, after step 101, the user equipment sends the random access preamble to the network device on the uplink BWP of the BWP. The network device receives the second RAR message from the user equipment, where the second RAR message includes the second UL grant, and the second UL grant is a UL grant corresponding to the uplink BWP of the BWP. The user equipment sends data or signaling to the network device on the uplink BWP of the BWP by using the physical resource indicated by the second UL grant.

Figure 9:
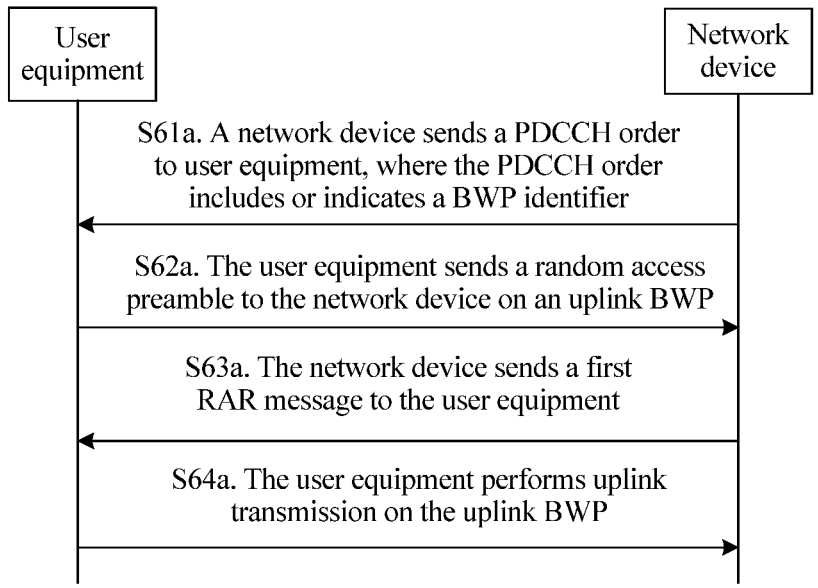
FIG. 9 is a signaling diagram 1 of another random access method according to an embodiment of the present invention.

FIG. 9 is a signaling diagram 1 of another random access method according to an embodiment of the present invention. As shown in FIG. 9, the method is specifically as follows:

S61*a*. A network device sends a PDCCH order to user equipment, where the PDCCH order is used to trigger the user equipment to perform a random access procedure, the PDCCH order includes or indicates a BWP identifier, and a BWP corresponding to the BWP identifier is an uplink BWP.

S62*a*. The user equipment sends a random access preamble to the network device on the uplink BWP.

S63*a*. The network device sends a first RAR message to the user equipment, where the first RAR message includes a first UL grant.

S64*a*. The user equipment performs uplink transmission on the uplink BWP, where a physical resource used for the uplink transmission is a physical resource indicated by the first UL grant.

Herein, steps S61*a* to S64*a* are step 201 and the first implementation of step 202 in FIG. 8. Details are not described again.

Figure 10:
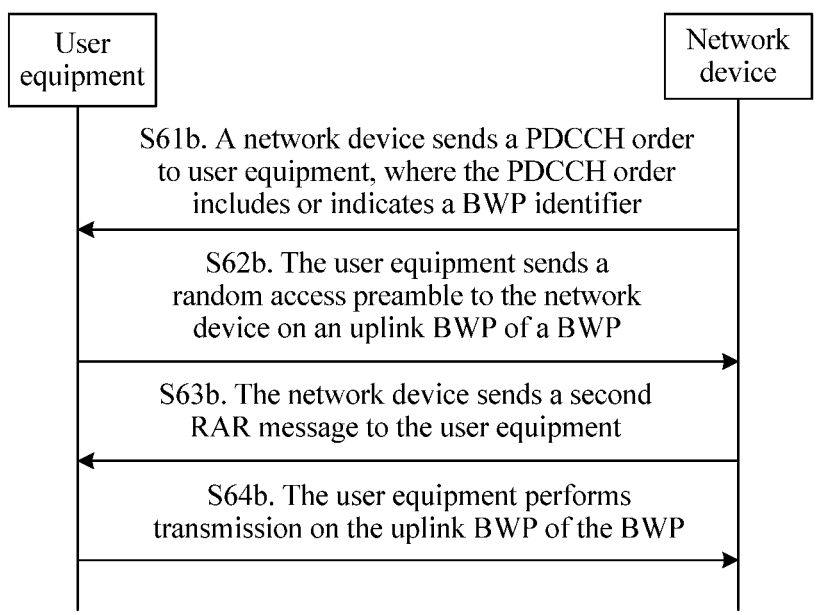
FIG. 10 is a signaling diagram 2 of another random access method according to an embodiment of the present invention.

FIG. 10 is a signaling diagram 2 of another random access method according to an embodiment of the present invention. As shown in FIG. 10, the method is specifically as follows:

S61*b*. A network device sends a PDCCH order to user equipment, where the PDCCH order is used to trigger the user equipment to perform a random access procedure, the PDCCH order includes or indicates a BWP identifier, and a BWP corresponding to the BWP identifier is a BWP pair including an uplink BWP and a downlink BWP.

S62*b*. The user equipment sends a random access preamble to the network device on the uplink BWP of the BWP.

S63*b*. The network device sends a second RAR message to the user equipment, where the second RAR message includes a second UL grant.

S64*b*. The user equipment performs transmission on the uplink BWP of the BWP, where a physical resource used for the transmission is a physical resource indicated by the second UL grant.

Herein, steps S61*b* to S64*b* are step 201 and the second implementation of step 202 in FIG. 8. Details are not described again.

In this embodiment, the user equipment receives control signaling sent by the network device, where the control signaling is used to trigger the user equipment to perform a random access procedure, and the control signaling includes or indicates the BWP identifier, and the user equipment initiates a random access procedure based on the control signaling. In this way, the user equipment can complete the random access procedure based on the BWP identifier indicated by the network device. The BWP corresponding to the BWP identifier is consistent with a BWP indicated by a UL grant sent by the network device, so that uplink data can be effectively transmitted by using the UL grant in an RAR message.

Figure 11:
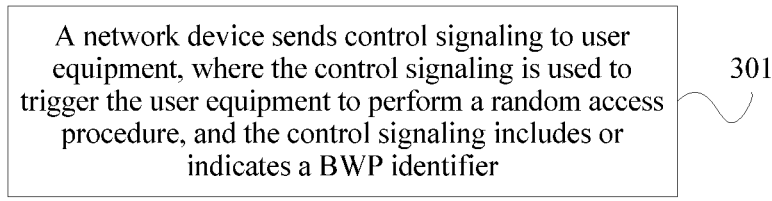
FIG. 11 is a schematic flowchart of another random access method according to an embodiment of the present invention.

FIG. 11 is a schematic flowchart of another random access method according to an embodiment of the present invention. As shown in FIG. 11, the method is specifically as follows:

301. A network device sends control signaling to user equipment, where the control signaling is used to trigger the user equipment to perform a random access procedure, and the control signaling includes or indicates a BWP identifier.

In an optional implementation, the control signaling is a PDCCH order.

In an optional implementation, a BWP is an uplink BWP, or a BWP corresponding to the BWP identifier is a BWP pair including an uplink BWP and a downlink BWP.

For the method provided in this embodiment, refer to the methods in FIG. 6 to FIG. 10. Details are not described again.

Figure 12:
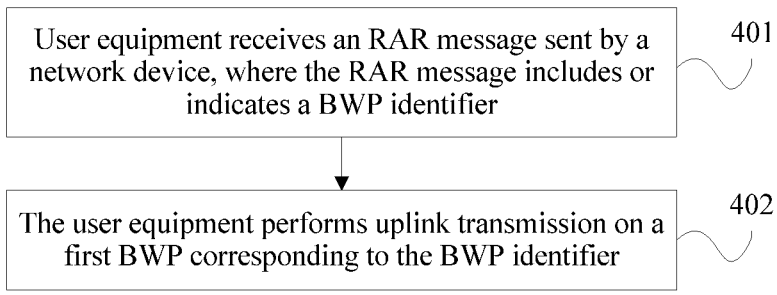
FIG. 12 is a schematic flowchart of another random access method according to an embodiment of the present invention.

FIG. 12 is a schematic flowchart of another random access method according to an embodiment of the present invention. As shown in FIG. 12, the method is specifically as follows:

401. User equipment receives an RAR message sent by a network device, where the RAR message includes or indicates a BWP identifier.

In this embodiment, in a contention free random access procedure, the network device sends the RAR message to the user equipment. The RAR message includes the BWP identifier, or the RAR message indicates the BWP identifier.

402. The user equipment performs uplink transmission on a first BWP corresponding to the BWP identifier.

In this embodiment, the user equipment sends data or signaling to the network device on the first BWP corresponding to the BWP identifier.

Figure 13:
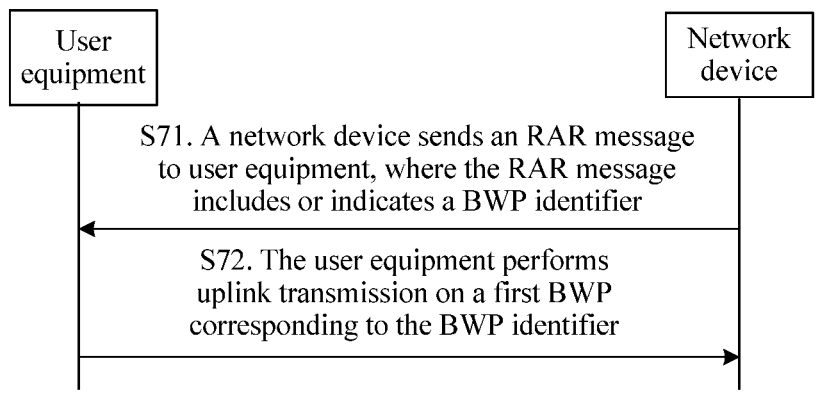
FIG. 13 is a signaling diagram of another random access method according to an embodiment of the present invention.

FIG. 13 is a signaling diagram of another random access method according to an embodiment of the present invention. As shown in FIG. 13, the method is specifically as follows:

S71. A network device sends an RAR message to user equipment, where the RAR message includes or indicates a BWP identifier.

S72. The user equipment performs uplink transmission on a first BWP corresponding to the BWP identifier.

Herein, step 401 in FIG. 12 is implemented in step S71. For S72, refer to step 402 in FIG. 12. Details are not described again.

In this embodiment, the user equipment receives the RAR message sent by the network device, where the RAR message includes or indicates the BWP identifier, and the user equipment performs uplink transmission on the first BWP corresponding to the BWP identifier. In this way, the user equipment can complete a random access procedure based on the BWP identifier indicated by the network device. The BWP corresponding to the BWP identifier is consistent with a BWP indicated by a UL grant sent by the network device, so that uplink data can be effectively transmitted by using the UL grant in the RAR message.

Figure 14:
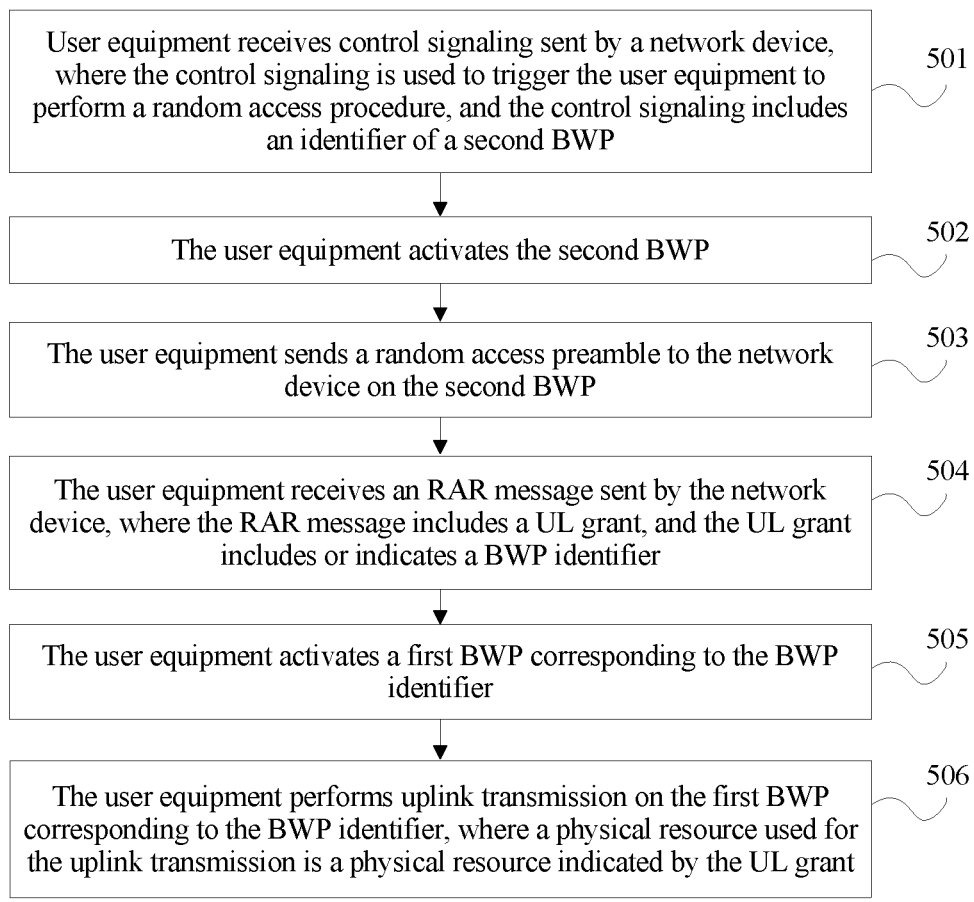
FIG. 14 is a schematic flowchart of another random access method according to an embodiment of the present invention.

FIG. 14 is a schematic flowchart of another random access method according to an embodiment of the present invention. As shown in FIG. 14, the method is specifically as follows:

501. User equipment receives control signaling sent by a network device, where the control signaling is used to trigger the user equipment to perform a random access procedure, and the control signaling includes an identifier of a second BWP.

In an optional implementation, the control signaling is a PDCCH order.

In an optional implementation, the control signaling received by the user equipment in any serving cell includes the identifier of the second BWP, or the control signaling received by the user equipment in any serving cell includes the identifier of the second BWP, where at least two uplink BWPs are configured for the user equipment in at least one secondary serving cell, and a random access channel is configured for each of the at least two uplink BWPs, or the control signaling received by the user equipment in a secondary serving cell includes the identifier of the second BWP, or the control signaling received by the user equipment in at least one secondary serving cell includes the identifier of the second BWP, where at least two uplink BWPs are configured for the user equipment in the at least one secondary serving cell, and a random access channel is configured for each of the at least two uplink BWPs.

In an optional implementation, the second BWP is a BWP in a first serving cell of the user equipment, and the first serving cell is a serving cell used when the user equipment receives the control signaling, or the first serving cell is a serving cell scheduled by using a second serving cell used when the user equipment receives the control signaling.

In this embodiment, at least one serving cell is configured for the user equipment, and the at least one serving cell includes the first serving cell. The user equipment receives, in the first serving cell, the control signaling sent by the network device.

In this embodiment, the network device configures at least one BWP for the user equipment in the first serving cell, and PRACH resources are configured only for some of the at least one BWP. In this case, the user equipment operates in the first serving cell. In other words, the user equipment communicates with the network device in the first serving cell. Optionally, the user equipment operates in a secondary serving cell, and the secondary serving cell and a primary serving cell of the user equipment belong to different TAGs, or the user equipment operates in a primary serving cell.

The network device sends the control signaling to the user equipment. The control signaling may be signaling or a signal, and the control signaling is used to trigger the user equipment to perform a random access procedure. In addition, the control signaling includes the BWP identifier, or the control signaling indicates the BWP identifier. Further, the control signaling is a PDCCH order, and the BWP corresponding to the BWP identifier may be an uplink BWP, a downlink BWP, or a pair of an uplink BWP and a downlink BWP. In this case, the user equipment has an active downlink BWP in the first serving cell, and the user equipment may receive the PDCCH order on the downlink BWP of the first serving cell. Alternatively, the user equipment may receive the PDCCH order on a downlink BWP of a second serving cell used to schedule the first serving cell. In this case, the PDCCH order includes a cell index of the current serving cell.

In addition, the user equipment may determine, by using the following methods, whether the received control signaling includes a BWP identifier. Cross-carrier scheduling may be unavailable for the user equipment, or cross-carrier scheduling may be available for the user equipment.

In a first manner, the control signaling received by the user equipment in any serving cell always includes an identifier of a second BWP.

In a second manner, at least two uplink BWPs are configured for the user equipment in any secondary serving cell, and a random access channel is configured for each of the at least two uplink BWPs. In this case, the control signaling received by the user equipment in any serving cell includes an identifier of a second BWP. Optionally, if the terminal device operates in a secondary serving cell, the secondary serving cell and a primary serving cell of the terminal device belong to different TAGs. At least two uplink BWPs are configured for the user equipment in any secondary serving cell, and a random access channel is configured for only one of the at least two uplink BWPs. In this case, the control signaling received by the user equipment in any serving cell includes no identifier of a second BWP. Optionally, if the terminal device operates in a secondary serving cell, the secondary serving cell and a primary serving cell of the terminal device belong to different TAGs.

In a third manner, if the terminal device operates in a primary serving cell, the control signaling received by the user equipment in the primary serving cell includes no identifier of a second BWP. If the terminal device operates in a secondary serving cell, the control signaling received by the user equipment in the secondary serving cell includes an identifier of a second BWP. Optionally, the secondary serving cell and a primary serving cell of the terminal device belong to different TAGs.

In a fourth manner, if the terminal device operates in a primary serving cell, the control signaling received by the user equipment in the primary serving cell includes no identifier of a second BWP. At least two uplink BWPs are configured for the user equipment in at least one secondary serving cell, and a random access channel is configured for each of the at least two uplink BWPs. In this case, the control signaling received by the user equipment in the at least one secondary serving cell includes an identifier of a second BWP. Optionally, the at least one secondary serving cell and a primary serving cell of the terminal device belong to different time TAGs. At least two uplink BWPs are configured for the user equipment in at least one secondary serving cell, and a random access channel is configured for only one of the at least two uplink BWPs. In this case, the control signaling received by the user equipment in the at least one secondary serving cell includes an identifier of a second BWP. Optionally, the at least one secondary serving cell and a primary serving cell of the terminal device belong to different time TAGs.

502. The user equipment activates the second BWP.

In this embodiment, there are three cases as to whether the user equipment needs to activate the second BWP.

In a first case, when the user equipment receives the PDCCH order, if the user equipment has no active BWP in the current serving cell, the user equipment needs to activate the second BWP.

In a second case, when the user equipment receives the PDCCH order, if an active uplink BWP of the user equipment in the current first serving cell is another BWP, the user equipment switches to the second BWP, in other words, the user equipment deactivates the another BWP, and activates the second BWP.

In a third case, when the user equipment receives the PDCCH order, if an active uplink BWP of the user equipment in the current first serving cell is the second BWP, the user equipment does not need to perform BWP switching.

In this step, in the first case or the second case, the user equipment needs to activate the second BWP.

503. The user equipment sends a random access preamble to the network device on the second BWP.

In this embodiment, the user equipment sends the random access preamble to the network device on the second BWP.

504. The user equipment receives an RAR message sent by the network device, where the RAR message includes a UL grant, and the UL grant includes or indicates a BWP identifier.

In this embodiment, the network device sends the RAR message to the user equipment. The RAR message includes the UL grant, and the RAR message includes the BWP identifier, or the RAR message indicates the BWP identifier. Specifically, the UL grant in the RAR message includes the BWP identifier, or the UL grant in the RAR message indicates the BWP identifier. Alternatively, the BWP identifier is directly included in the RAR message as an information field in the RAR message.

In an optional implementation, there are the following implementations of step 504:

In a first implementation of step 504, a first BWP and the second BWP are uplink BWPs, and the first BWP and the second BWP may be a same BWP, or may be different BWPs. Step 504 specifically includes receiving, by the user equipment on a third BWP, the RAR message sent by the network device, where the third BWP is a downlink BWP, where the third BWP is an active BWP in the second serving cell when the user equipment receives the control signaling in the first serving cell, or the third BWP is a BWP used when the user equipment receives the control signaling in the first serving cell.

In this embodiment, the first BWP is an uplink BWP, and the second BWP is also an uplink BWP. In this case, the first BWP and the second BWP may be a same BWP, or may be different BWPs. In step 504, the user equipment receives, on the third BWP, the RAR message sent by the network device, where the third BWP is a downlink BWP.

In a second implementation of step 504, a first BWP and the second BWP each are a BWP pair including an uplink BWP and a downlink BWP, and the first BWP and the second BWP may be a same BWP, or may be different BWPs. Step 504 specifically includes receiving, by the user equipment on the uplink BWP of the second BWP, the RAR message sent by the network device.

In this embodiment, the first BWP is a BWP pair including an uplink BWP and a downlink BWP, and the second BWP is a BWP pair including an uplink BWP and a downlink BWP. In addition, the first BWP and the second BWP may be a same BWP, or may be different BWPs. In step 504, the user equipment receives, on the uplink BWP of the second BWP, the RAR message sent by the network device.

In a third implementation of step 504, the user equipment receives, on a fourth BWP, the RAR message sent by the network device, where the fourth BWP is a BWP pair including an uplink BWP and a downlink BWP.

The fourth BWP is an active BWP in the second serving cell when the user equipment receives the control signaling in the first serving cell, or the fourth BWP is a BWP used when the user equipment receives the control signaling in the first serving cell.

In an optional implementation, if the fourth BWP is a BWP used when the user equipment receives the control signaling in the first serving cell, after step 503, the method further includes step 507: The user equipment activates the fourth BWP, and deactivates the second BWP.

In this embodiment, the fourth BWP is provided. Optionally, the fourth BWP is a BWP pair including an uplink BWP and a downlink BWP. The user equipment first needs to switch to the fourth BWP, in other words, the user equipment activates the fourth BWP, and deactivates the second BWP. Then the user equipment may receive, on the fourth BWP, the RAR message sent by the network device.

505. The user equipment activates the first BWP corresponding to the BWP identifier.

In an optional implementation, the first BWP is an initial active BWP of the user equipment in the first serving cell, or the first BWP is a first active BWP of the user equipment in the first serving cell, or the first BWP is a default BWP of the user equipment in the first serving cell, or the first BWP is a BWP configured by the network device for the user equipment, and the first BWP is used by the user equipment to perform random access in the first serving cell, or the first BWP is a BWP configured by the network device for the user equipment, and the first BWP is a BWP used by the user equipment to perform contention free random access in the first serving cell, or the first BWP is a BWP activated when the user equipment performs random access, or the first BWP is a BWP activated when the user equipment performs contention free random access.

In this embodiment, there are three cases as to whether the user equipment needs to activate the first BWP.

In a first case, if the BWP identifier is the identifier of the second BWP, the first BWP corresponding to the BWP is the second BWP, and it may be determined that the UL grant included in the RAR message is a UL grant corresponding to the second BWP of the user equipment in the first serving cell. In this case, the user equipment does not need to perform BWP switching, in other words, the first BWP is in an active state, and the user equipment does not need to further activate the first BWP. In this case, the user equipment may send data or signaling to the network device on the second BWP of the first serving cell based on the UL grant in the RAR message.

In a second case, if the BWP identifier is not the identifier of the second BWP, the first BWP corresponding to the BWP is different from the second BWP, and it may be determined that the UL grant included in the RAR message is a UL grant corresponding to the first BWP of the user equipment in the first serving cell. In this case, the user equipment needs to switch to the first BWP, in other words, deactivate the second BWP, and activate the first BWP. In this case, the user equipment may send data or signaling to the network device on the first BWP of the first serving cell based on the UL grant in the RAR message.

In this step, in the second case, the user equipment needs to activate the first BWP corresponding to the BWP identifier. Optionally, the first BWP is an initial active BWP of the user equipment in the first serving cell, or the first BWP is a first active BWP of the user equipment in the first serving cell, or the first BWP is a default BWP of the user equipment in the first serving cell, or the first BWP is a BWP configured by the network device for the user equipment, and the first BWP is used by the user equipment to perform random access in the first serving cell, or the first BWP is a BWP configured by the network device for the user equipment, and the first BWP is a BWP used by the user equipment to perform contention free random access in the first serving cell, or the first BWP is a BWP activated when the user equipment performs random access, or the first BWP is a BWP activated when the user equipment performs contention free random access.

The initial active BWP (initial BWP) may be an initial BWP (1) of the user equipment in an idle mode, or may be an initial BWP (2) configured by the network device for the user equipment when the user equipment is in a connected mode. For (1), the initial BWP is a BWP configured in system information indicated by or associated with a cell defining synchronization signal block (cell defining SS block) of the user equipment in the serving cell. For (2), the initial BWP is a BWP configured by the network device in a common configuration information element of the serving cell of the user equipment. The initial uplink bandwidth part may also be referred to as a cell defining uplink bandwidth part.

The first active BWP (First Active UL BWP) is a first uplink BWP that is of the serving cell of the user equipment and that is also activated when the serving cell is activated, and is configured by the network device in a dedicated configuration information element of the serving cell.

The default BWP (default BWP) is an active uplink BWP to which the user equipment falls back after the user equipment has no to-be-transmitted uplink data and/or no to-be-received downlink data for a period of time, and is configured by the network device in a cell-dedicated configuration information element of the serving cell. When the first BWP is a BWP activated when the user equipment performs random access, "random access" herein refers to any one of the following cases:

(1) The user equipment initiates a random access procedure, including A MAC entity of the user equipment triggers the random access procedure, an RRC layer of the user equipment triggers the random access procedure, the user equipment receives a PDCCH order sent by the network device and triggers the random access procedure, or the user equipment receives RRC signaling sent by the network device and triggers the random access procedure. (2) The user equipment starts to perform a random access procedure. (3) The user equipment starts to open a window used to monitor a random access response message. (4). The user equipment selects a random access preamble and a random access channel. (5) The user equipment sends a random access preamble. (6) The user equipment completes sending a random access preamble.

506. The user equipment performs uplink transmission on the first BWP corresponding to the BWP identifier, where a physical resource used for the uplink transmission is a physical resource indicated by the UL grant.

In this embodiment, the user equipment sends, on the first BWP indicated by the network device, data or an instruction to the network device by using the physical resource indicated by the UL grant in the RAR message.

Figure 15:
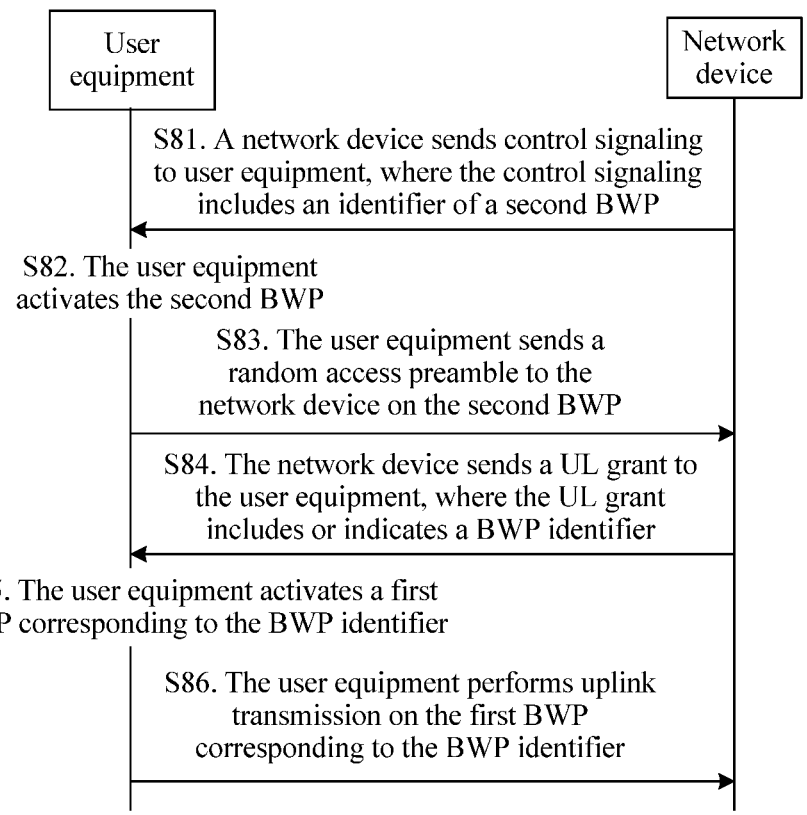
FIG. 15 is a signaling diagram of another random access method according to an embodiment of the present invention.

FIG. 15 is a signaling diagram of another random access method according to an embodiment of the present invention. As shown in FIG. 15, the method is specifically as follows:

S81. A network device sends control signaling to user equipment, where the control signaling is used to trigger the user equipment to perform a random access procedure, and the control signaling includes an identifier of a second BWP.

In an optional implementation, the control signaling is a PDCCH order.

In an optional implementation, the control signaling received by the user equipment in any serving cell includes the identifier of the second BWP, or the control signaling received by the user equipment in any serving cell includes the identifier of the second BWP, where at least two uplink BWPs are configured for the user equipment in at least one secondary serving cell, and a random access channel is configured for each of the at least two uplink BWPs, or the control signaling received by the user equipment in a secondary serving cell includes the identifier of the second BWP, or the control signaling received by the user equipment in at least one secondary serving cell includes the identifier of the second BWP, where at least two uplink BWPs are configured for the user equipment in the at least one secondary serving cell, and a random access channel is configured for each of the at least two uplink BWPs.

In an optional implementation, the second BWP is a BWP in a first serving cell of the user equipment, and the first serving cell is a serving cell used when the user equipment receives the control signaling, or the first serving cell is a serving cell scheduled by using a second serving cell used when the user equipment receives the control signaling.

S82. The user equipment activates the second BWP.

S83. The user equipment sends a random access preamble to the network device on the second BWP.

S84. The network device sends an RAR message to the user equipment, where the RAR message includes a UL grant, and the UL grant includes or indicates a BWP identifier.

S85. The user equipment activates a first BWP corresponding to the BWP identifier.

In an optional implementation, the first BWP is an initial active BWP of the user equipment in the first serving cell, or the first BWP is a first active BWP of the user equipment in the first serving cell, or the first BWP is a default BWP of the user equipment in the first serving cell, or the first BWP is a BWP configured by the network device for the user equipment, and the first BWP is used by the user equipment to perform random access in the first serving cell, or the first BWP is a BWP configured by the network device for the user equipment, and the first BWP is a BWP used by the user equipment to perform contention free random access in the first serving cell, or the first BWP is a BWP activated when the user equipment performs random access, or the first BWP is a BWP activated when the user equipment performs contention free random access.

S86. The user equipment performs uplink transmission on the first BWP corresponding to the BWP identifier, where a physical resource used for the uplink transmission is a physical resource indicated by the UL grant.

Herein, steps 501 to 506 in FIG. 14 are implemented in steps S81 to S86. Details are not described again.

In this embodiment, the network device sends the control signaling to the user equipment, where the control signaling is used to trigger the user equipment to perform a random access procedure, and the control signaling includes the identifier of the second BWP, the user equipment receives the RAR message sent by the network device, where the RAR message includes or indicates the BWP identifier, and the user equipment performs uplink transmission on the first BWP corresponding to the BWP identifier. In this way, the user equipment can send the random access preamble to the network device based on the identifier that is of the second BWP and that is indicated by the network device. The first BWP corresponding to the BWP identifier is consistent with the BWP indicated by the UL grant sent by the network device, so that uplink data can be effectively transmitted by using the UL grant in the RAR message.

Figure 16:
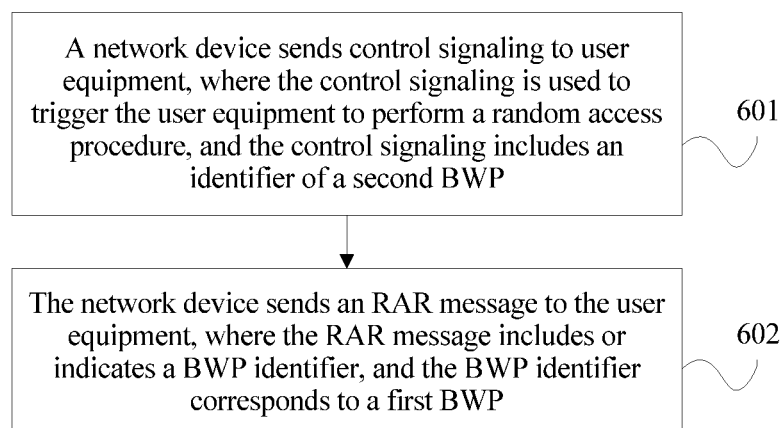
FIG. 16 is a schematic flowchart of another random access method according to an embodiment of the present invention.

FIG. 16 is a schematic flowchart of another random access method according to an embodiment of the present invention. As shown in FIG. 16, the method is specifically as follows:

601. A network device sends control signaling to user equipment, where the control signaling is used to trigger the user equipment to perform a random access procedure, and the control signaling includes an identifier of a second BWP.

In an optional implementation, the control signaling is a PDCCH order.

In an optional implementation, the second BWP is a BWP in a first serving cell of the user equipment, and the first serving cell is a serving cell used when the user equipment receives the control signaling, or the first serving cell is a serving cell scheduled by using a second serving cell used when the user equipment receives the control signaling.

602. The network device sends an RAR message to the user equipment, where the RAR message includes or indicates a BWP identifier, and the BWP identifier corresponds to a first BWP.

In an optional implementation, the RAR message includes a UL grant, and the UL grant includes or indicates the BWP identifier.

In an optional implementation, the first BWP is an initial active BWP of the user equipment in the first serving cell, or the first BWP is a first active BWP of the user equipment in the first serving cell, or the first BWP is a default BWP of the user equipment in the first serving cell, or the first BWP is a BWP configured by the network device for the user equipment, and the first BWP is used by the user equipment to perform random access in the first serving cell, or the first BWP is a BWP configured by the network device for the user equipment, and the first BWP is a BWP used by the user equipment to perform contention free random access in the first serving cell, or the first BWP is a BWP activated when the user equipment performs random access, or the first BWP is a BWP activated when the user equipment performs contention free random access.

In an optional implementation, the first BWP and the second BWP are uplink BWPs, and the first BWP and the second BWP may be a same BWP, or may be different BWPs.

In an optional implementation, step 602 specifically includes sending, by the network device, the RAR message to the user equipment on a third BWP, where the third BWP is a downlink BWP.

The third BWP is an active BWP in the second serving cell when the user equipment receives the control signaling in the first serving cell, or the third BWP is a BWP used when the user equipment receives the control signaling in the first serving cell.

In an optional implementation, the first BWP and the second BWP each are a BWP pair including an uplink BWP and a downlink BWP, and the first BWP and the second BWP may be a same BWP, or may be different BWPs. Step 602 specifically includes sending, by the network device, the RAR message to the user equipment on the uplink BWP of the second BWP.

In an optional implementation, step 602 specifically includes sending, by the network device, the RAR message to the user equipment on a fourth BWP, where the fourth BWP is a BWP pair including an uplink BWP and a downlink BWP.

The fourth BWP is an active BWP in the second serving cell when the user equipment receives the control signaling in the first serving cell, or the fourth BWP is a BWP used when the user equipment receives the control signaling in the first serving cell.

For the method provided in this embodiment, refer to the methods in FIG. 12 to FIG. 15. Details are not described again.

Figure 17:
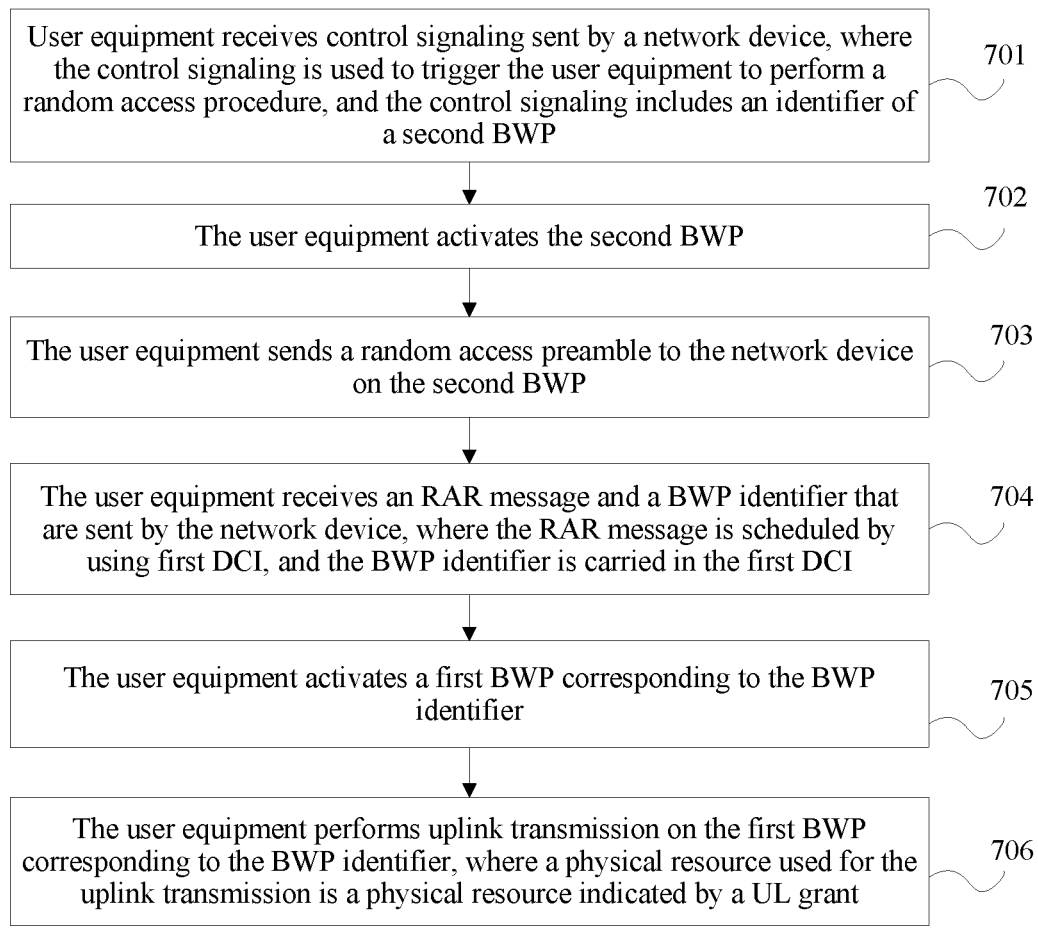
FIG. 17 is a schematic flowchart of another random access method according to an embodiment of the present invention.

FIG. 17 is a schematic flowchart of another random access method according to an embodiment of the present invention. As shown in FIG. 17, the method is specifically as follows:

701. User equipment receives control signaling sent by a network device, where the control signaling is used to trigger the user equipment to perform a random access procedure, and the control signaling includes an identifier of a second BWP.

In an optional implementation, the control signaling is a PDCCH order.

In an optional implementation, the control signaling received by the user equipment in any serving cell includes the identifier of the second BWP, or the control signaling received by the user equipment in any serving cell includes the identifier of the second BWP, where at least two uplink BWPs are configured for the user equipment in at least one secondary serving cell, and a random access channel is configured for each of the at least two uplink BWPs, or the control signaling received by the user equipment in a secondary serving cell includes the identifier of the second BWP, or the control signaling received by the user equipment in at least one secondary serving cell includes the identifier of the second BWP, where at least two uplink BWPs are configured for the user equipment in the at least one secondary serving cell, and a random access channel is configured for each of the at least two uplink BWPs.

In an optional implementation, the second BWP is a BWP in a first serving cell of the user equipment, and the first serving cell is a serving cell used when the user equipment receives the control signaling, or the first serving cell is a serving cell scheduled by using a second serving cell used when the user equipment receives the control signaling.

In this embodiment, for this step, refer to step 501 in FIG. 14. Details are not described again.

702. The user equipment activates the second BWP.

In this embodiment, for this step, refer to step 502 in FIG. 14. Details are not described again.

703. The user equipment sends a random access preamble to the network device on the second BWP.

In this embodiment, for this step, refer to step 503 in FIG. 14. Details are not described again.

704. The user equipment receives an RAR message and a BWP identifier that are sent by the network device, where the RAR message includes a UL grant, the RAR message is scheduled by using first DCI, and the BWP identifier is carried in the first DCI.

In an optional implementation, a first BWP and the second BWP are uplink BWPs, and the first BWP and the second BWP may be a same BWP, or may be different BWPs. Step 704 specifically includes receiving, by the user equipment on a third BWP, the RAR message sent by the network device, where the third BWP is a downlink BWP.

The third BWP is an active BWP in the second serving cell when the user equipment receives the control signaling in the first serving cell, or the third BWP is a BWP used when the user equipment receives the control signaling in the first serving cell.

In an optional implementation, a first BWP and the second BWP each are a BWP pair including an uplink BWP and a downlink BWP, and the first BWP and the second BWP may be a same BWP, or may be different BWPs. Step 704 specifically includes receiving, by the user equipment on the uplink BWP of the second BWP, the RAR message sent by the network device.

In an optional implementation, step 704 specifically includes receiving, by the user equipment on a fourth BWP, the RAR message sent by the network device, where the fourth BWP is a BWP pair including an uplink BWP and a downlink BWP.

The fourth BWP is an active BWP in the second serving cell when the user equipment receives the control signaling in the first serving cell, or the fourth BWP is a BWP used when the user equipment receives the control signaling in the first serving cell.

In an optional implementation, if the fourth BWP is a BWP used when the user equipment receives the control signaling in the first serving cell, after step 703, the method further includes step 707: The user equipment activates the fourth BWP, and deactivates the second BWP.

705. The user equipment activates the first BWP corresponding to the BWP identifier.

In an optional implementation, the first BWP is an initial active BWP of the user equipment in the first serving cell, or the first BWP is a first active BWP of the user equipment in the first serving cell, or the first BWP is a default BWP of the user equipment in the first serving cell, or the first BWP is a BWP configured by the network device for the user equipment, and the first BWP is used by the user equipment to perform random access in the first serving cell, or the first BWP is a BWP configured by the network device for the user equipment, and the first BWP is a BWP used by the user equipment to perform contention free random access in the first serving cell, or the first BWP is a BWP activated when the user equipment performs random access, or the first BWP is a BWP activated when the user equipment performs contention free random access.

In this embodiment, there are three cases as to whether the user equipment needs to activate the first BWP.

In a first case, if the BWP identifier is the identifier of the second BWP, the first BWP corresponding to the BWP is the second BWP, and it may be determined that the UL grant included in the RAR message is a UL grant corresponding to the second BWP of the user equipment in the first serving cell. In this case, the user equipment does not need to perform BWP switching, in other words, the first BWP is in an active state, and the user equipment does not need to further activate the first BWP. In this case, the user equipment may send data or signaling to the network device on the second BWP of the first serving cell based on the UL grant in the RAR message.

In a second case, if the BWP identifier is not the identifier of the second BWP, the first BWP corresponding to the BWP is different from the second BWP, and it may be determined that the UL grant included in the RAR message is a UL grant corresponding to the first BWP of the user equipment in the first serving cell. In this case, the user equipment needs to switch to the first BWP, in other words, deactivate the second BWP, and activate the first BWP. In this case, the user equipment may send data or signaling to the network device on the first BWP of the first serving cell based on the UL grant in the RAR message.

In this step, in the second case, the user equipment needs to activate the first BWP corresponding to the BWP identifier. Optionally, the first BWP is an initial active BWP of the user equipment in the first serving cell, or the first BWP is a first active BWP of the user equipment in the first serving cell, or the first BWP is a default BWP of the user equipment in the first serving cell, or the first BWP is a BWP configured by the network device for the user equipment, and the first BWP is used by the user equipment to perform random access in the first serving cell, or the first BWP is a BWP configured by the network device for the user equipment, and the first BWP is a BWP used by the user equipment to perform contention free random access in the first serving cell, or the first BWP is a BWP activated when the user equipment performs random access, or the first BWP is a BWP activated when the user equipment performs contention free random access.

In addition, in the second case, after the user equipment determines that the RAR message is received, the user equipment needs to switch to the first BWP when determining that an identifier that is of a preamble and that is included in the RAR message is an identifier of the preamble sent by the user equipment.

706. The user equipment performs uplink transmission on the first BWP corresponding to the BWP identifier, where a physical resource used for the uplink transmission is a physical resource indicated by the UL grant.

In this embodiment, for this step, refer to step 506 in FIG. 14. Details are not described again.

Figure 18:
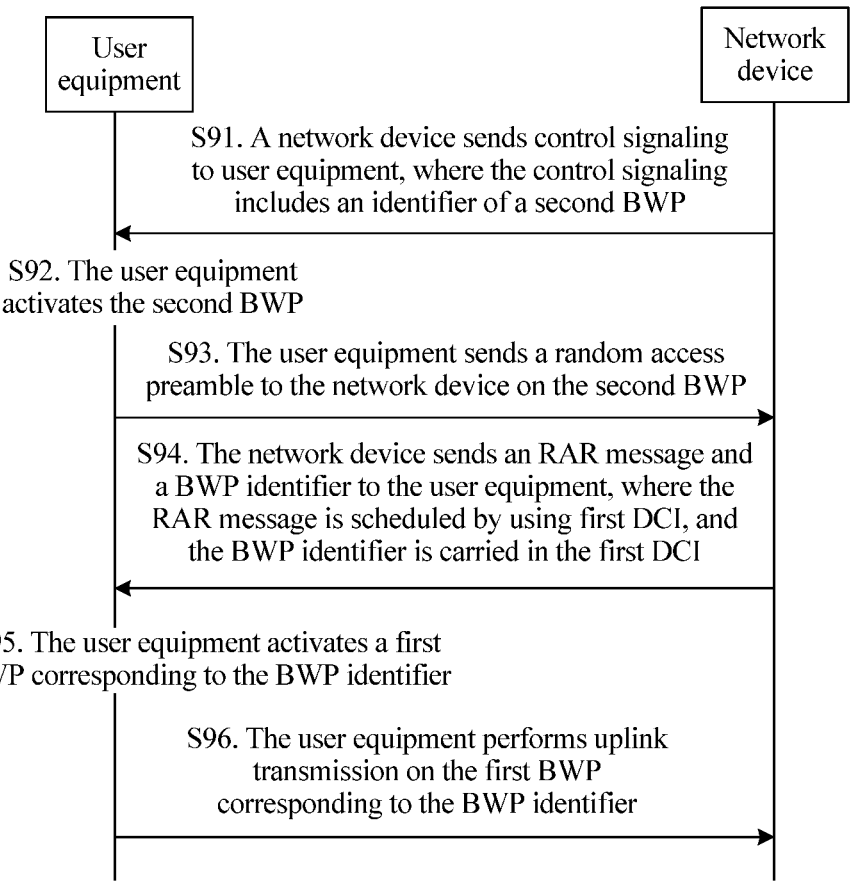
FIG. 18 is a signaling diagram of another random access method according to an embodiment of the present invention.

FIG. 18 is a signaling diagram of another random access method according to an embodiment of the present invention. As shown in FIG. 18, the method is specifically as follows:

S91. A network device sends control signaling to user equipment, where the control signaling is used to trigger the user equipment to perform a random access procedure, and the control signaling includes an identifier of a second BWP.

In an optional implementation, the control signaling is a PDCCH order.

In an optional implementation, the control signaling received by the user equipment in any serving cell includes the identifier of the second BWP, or the control signaling received by the user equipment in any serving cell includes the identifier of the second BWP, where at least two uplink BWPs are configured for the user equipment in at least one secondary serving cell, and a random access channel is configured for each of the at least two uplink BWPs, or the control signaling received by the user equipment in a secondary serving cell includes the identifier of the second BWP, or the control signaling received by the user equipment in at least one secondary serving cell includes the identifier of the second BWP, where at least two uplink BWPs are configured for the user equipment in the at least one secondary serving cell, and a random access channel is configured for each of the at least two uplink BWPs.

In an optional implementation, the second BWP is a BWP in a first serving cell of the user equipment, and the first serving cell is a serving cell used when the user equipment receives the control signaling, or the first serving cell is a serving cell scheduled by using a second serving cell used when the user equipment receives the control signaling.

S92. The user equipment activates the second BWP.

S93. The user equipment sends a random access preamble to the network device on the second BWP.

S94. The network device sends an RAR message and a BWP identifier to the user equipment, where the RAR message includes a UL grant, the RAR message is scheduled by using first DCI, and the BWP identifier is carried in the first DCI.

S95. The user equipment activates a first BWP corresponding to the BWP identifier.

In an optional implementation, the first BWP is an initial active BWP of the user equipment in the first serving cell, or the first BWP is a first active BWP of the user equipment in the first serving cell, or the first BWP is a default BWP of the user equipment in the first serving cell, or the first BWP is a BWP configured by the network device for the user equipment, and the first BWP is used by the user equipment to perform random access in the first serving cell, or the first BWP is a BWP configured by the network device for the user equipment, and the first BWP is a BWP used by the user equipment to perform contention free random access in the first serving cell, or the first BWP is a BWP activated when the user equipment performs random access, or the first BWP is a BWP activated when the user equipment performs contention free random access.

S96. The user equipment performs uplink transmission on the first BWP corresponding to the BWP identifier, where a physical resource used for the uplink transmission is a physical resource indicated by the UL grant.

Herein, steps 701 to 706 in FIG. 17 are implemented in steps S81 to S86. Details are not described again.

In this embodiment, the user equipment receives the RAR message and the BWP identifier that are sent by the network device, where the RAR message includes the UL grant, the RAR message is scheduled by using the first DCI, and the BWP identifier is carried in the first DCI, and the user equipment performs uplink transmission on the first BWP corresponding to the BWP identifier. In this way, the user equipment can complete a random access procedure based on the BWP identifier indicated by the network device. The BWP corresponding to the BWP identifier is consistent with the BWP indicated by the UL grant sent by the network device, so that uplink data can be effectively transmitted by using the UL grant in the RAR message.

Figure 19:
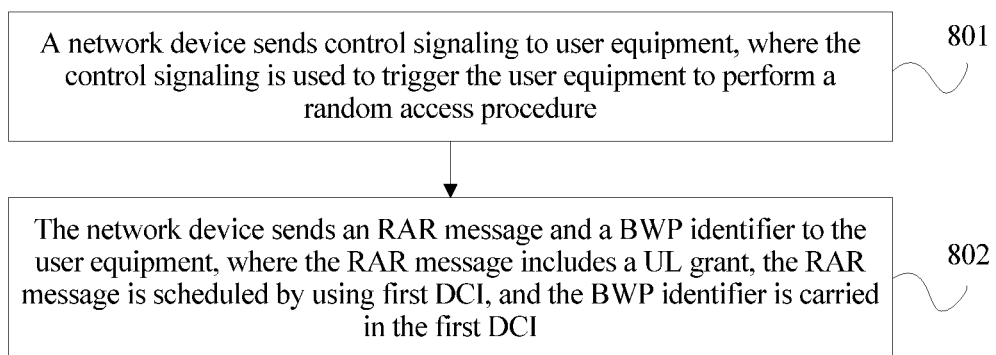
FIG. 19 is a schematic flowchart of another random access method according to an embodiment of the present invention.

FIG. 19 is a schematic flowchart of another random access method according to an embodiment of the present invention. As shown in FIG. 19, the method is specifically as follows:

801. A network device sends control signaling to user equipment, where the control signaling is used to trigger the user equipment to perform a random access procedure.

In an optional implementation, the control signaling is a PDCCH order.

In an optional implementation, the control signaling includes an identifier of a second BWP.

In an optional implementation, the second BWP is a BWP in a first serving cell of the user equipment, and the first serving cell is a serving cell used when the user equipment receives the control signaling, or the first serving cell is a serving cell scheduled by using a second serving cell used when the user equipment receives the control signaling.

802. The network device sends an RAR message and a BWP identifier to the user equipment, where the RAR message includes a UL grant, the RAR message is scheduled by using first DCI, and the BWP identifier is carried in the first DCI.

In an optional implementation, the RAR message includes the UL grant, and the UL grant includes or indicates the BWP identifier.

In an optional implementation, a first BWP is an initial active BWP of the user equipment in the first serving cell, or a first BWP is a first active BWP of the user equipment in the first serving cell, or a first BWP is a default BWP of the user equipment in the first serving cell, or a first BWP is a BWP configured by the network device for the user equipment, and the first BWP is used by the user equipment to perform random access in the first serving cell, or a first BWP is a BWP configured by the network device for the user equipment, and the first BWP is a BWP used by the user equipment to perform contention free random access in the first serving cell, or a first BWP is a BWP activated when the user equipment performs random access, or a first BWP is a BWP activated when the user equipment performs contention free random access.

In an optional implementation, the first BWP and the second BWP are uplink BWPs, and the first BWP and the second BWP may be a same BWP, or may be different BWPs.

In an optional implementation, step 602 specifically includes sending, by the network device, the RAR message to the user equipment on a third BWP, where the third BWP is a downlink BWP.

The third BWP is an active BWP in the second serving cell when the user equipment receives the control signaling in the first serving cell, or the third BWP is a BWP used when the user equipment receives the control signaling in the first serving cell.

In an optional implementation, the first BWP and the second BWP each are a BWP pair including an uplink BWP and a downlink BWP, and the first BWP and the second BWP may be a same BWP, or may be different BWPs. Step 602 specifically includes sending, by the network device, the RAR message to the user equipment on the uplink BWP of the second BWP.

In an optional implementation, step 602 specifically includes sending, by the network device, the RAR message to the user equipment on a fourth BWP, where the fourth BWP is a BWP pair including an uplink BWP and a downlink BWP.

The fourth BWP is an active BWP in the second serving cell when the user equipment receives the control signaling in the first serving cell, or the fourth BWP is a BWP used when the user equipment receives the control signaling in the first serving cell.

For the method provided in this embodiment, refer to the methods in FIG. 17 and FIG. 18. Details are not described again.

Figure 20:
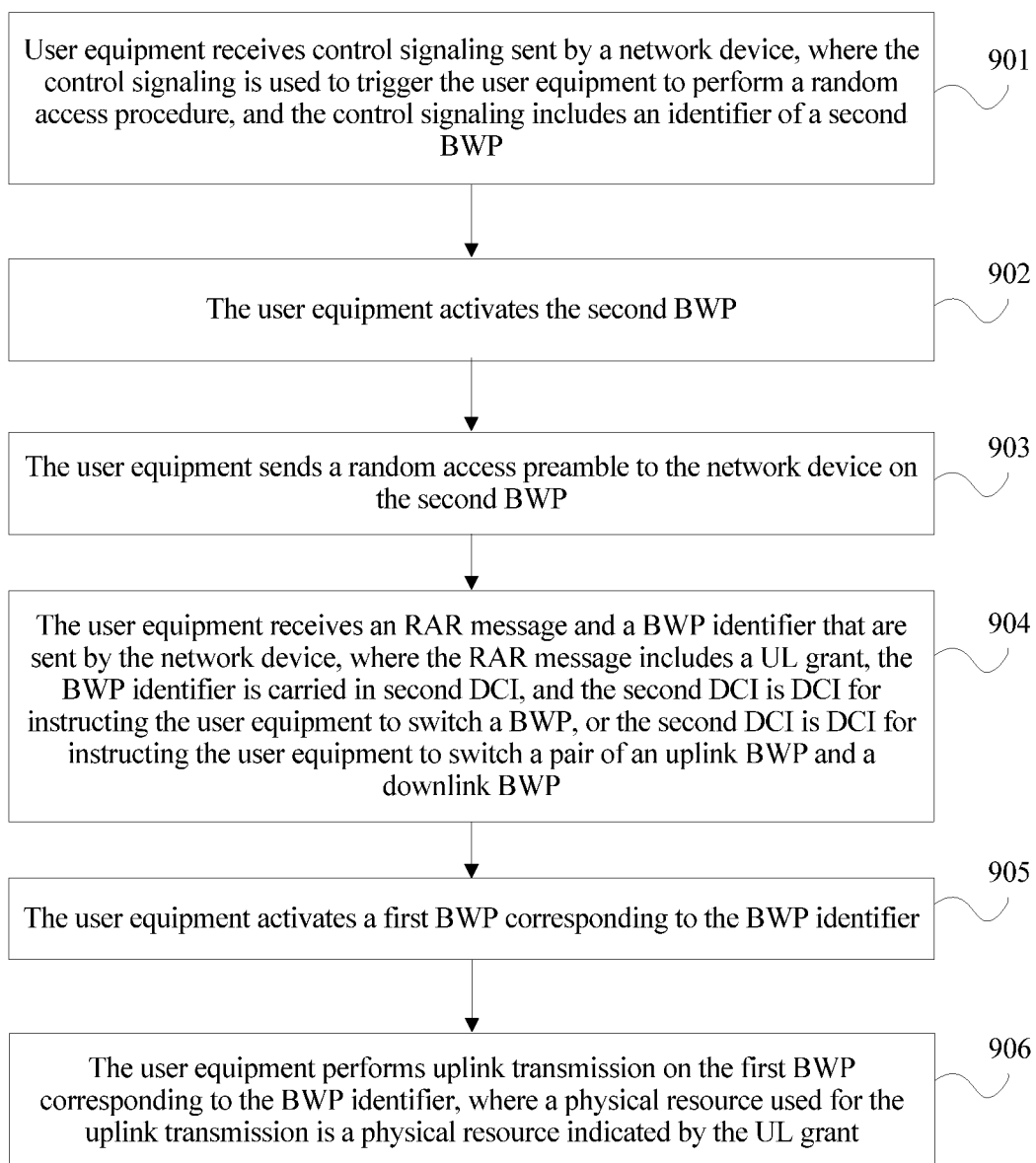
FIG. 20 is a schematic flowchart of another random access method according to an embodiment of the present invention.

FIG. 20 is a schematic flowchart of another random access method according to an embodiment of the present invention. As shown in FIG. 20, the method is specifically as follows:

901. User equipment receives control signaling sent by a network device, where the control signaling is used to trigger the user equipment to perform a random access procedure, and the control signaling includes an identifier of a second BWP.

In an optional implementation, the control signaling is a PDCCH order.

In an optional implementation, the control signaling received by the user equipment in any serving cell includes the identifier of the second BWP, or the control signaling received by the user equipment in any serving cell includes the identifier of the second BWP, where at least two uplink BWPs are configured for the user equipment in at least one secondary serving cell, and a random access channel is configured for each of the at least two uplink BWPs, or the control signaling received by the user equipment in a secondary serving cell includes the identifier of the second BWP, or the control signaling received by the user equipment in at least one secondary serving cell includes the identifier of the second BWP, where at least two uplink BWPs are configured for the user equipment in the at least one secondary serving cell, and a random access channel is configured for each of the at least two uplink BWPs.

In an optional implementation, the second BWP is a BWP in a first serving cell of the user equipment, and the first serving cell is a serving cell used when the user equipment receives the control signaling, or the first serving cell is a serving cell scheduled by using a second serving cell used when the user equipment receives the control signaling.

In this embodiment, for this step, refer to step 501 in FIG. 14. Details are not described again.

902. The user equipment activates the second BWP.

In this embodiment, for this step, refer to step 502 in FIG. 14. Details are not described again.

903. The user equipment sends a random access preamble to the network device on the second BWP.

In this embodiment, for this step, refer to step 503 in FIG. 14. Details are not described again.

904. The user equipment receives an RAR message and a BWP identifier that are sent by the network device, where the RAR message includes a UL grant, the BWP identifier is carried in second DCI, and the second DCI is DCI for instructing the terminal device to switch a BWP, or the second DCI is DCI for instructing the terminal device to switch a pair of an uplink BWP and a downlink BWP.

In an optional implementation, a first BWP and the second BWP are uplink BWPs, and the first BWP and the second BWP may be a same BWP, or may be different BWPs. Step 904 specifically includes receiving, by the user equipment on a third BWP, the RAR message sent by the network device, where the third BWP is a downlink BWP.

The third BWP is an active BWP in the second serving cell when the user equipment receives the control signaling in the first serving cell, or the third BWP is a BWP used when the user equipment receives the control signaling in the first serving cell.

In an optional implementation, a first BWP and the second BWP each are a BWP pair including an uplink BWP and a downlink BWP, and the first BWP and the second BWP may be a same BWP, or may be different BWPs. Step 904 specifically includes receiving, by the user equipment on the uplink BWP of the second BWP, the RAR message sent by the network device.

In an optional implementation, step 904 specifically includes receiving, by the user equipment on a fourth BWP, the RAR message sent by the network device, where the fourth BWP is a BWP pair including an uplink BWP and a downlink BWP.

The fourth BWP is an active BWP in the second serving cell when the user equipment receives the control signaling in the first serving cell, or the fourth BWP is a BWP used when the user equipment receives the control signaling in the first serving cell.

In an optional implementation, if the fourth BWP is a BWP used when the user equipment receives the control signaling in the first serving cell, after step 903, the method further includes step 907: The user equipment activates the fourth BWP, and deactivates the second BWP.

905. The user equipment activates the first BWP corresponding to the BWP identifier.

In an optional implementation, the first BWP is an initial active BWP of the user equipment in the first serving cell, or the first BWP is a first active BWP of the user equipment in the first serving cell, or the first BWP is a default BWP of the user equipment in the first serving cell, or the first BWP is a BWP configured by the network device for the user equipment, and the first BWP is used by the user equipment to perform random access in the first serving cell, or the first BWP is a BWP configured by the network device for the user equipment, and the first BWP is a BWP used by the user equipment to perform contention free random access in the first serving cell, or the first BWP is a BWP activated when the user equipment performs random access, or the first BWP is a BWP activated when the user equipment performs contention free random access.

In this embodiment, there are three cases as to whether the user equipment needs to activate the first BWP.

In a first case, if the BWP identifier is the identifier of the second BWP, the first BWP corresponding to the BWP is the second BWP, and it may be determined that the UL grant included in the RAR message is a UL grant corresponding to the second BWP of the user equipment in the first serving cell. In this case, the user equipment does not need to perform BWP switching, in other words, the first BWP is in an active state, and the user equipment does not need to further activate the first BWP. In this case, the user equipment may send data or signaling to the network device on the second BWP of the first serving cell based on the UL grant in the RAR message.

In a second case, if the BWP identifier is not the identifier of the second BWP, the first BWP corresponding to the BWP is different from the second BWP, and it may be determined that the UL grant included in the RAR message is a UL grant corresponding to the first BWP of the user equipment in the first serving cell. In this case, the user equipment needs to switch to the first BWP, in other words, deactivate the second BWP, and activate the first BWP. In this case, the user equipment may send data or signaling to the network device on the first BWP of the first serving cell based on the UL grant in the RAR message.

In this step, in the second case, the user equipment needs to activate the first BWP corresponding to the BWP identifier. Optionally, the first BWP is an initial active BWP of the user equipment in the first serving cell, or the first BWP is a first active BWP of the user equipment in the first serving cell, or the first BWP is a default BWP of the user equipment in the first serving cell, or the first BWP is a BWP configured by the network device for the user equipment, and the first BWP is used by the user equipment to perform random access in the first serving cell, or the first BWP is a BWP configured by the network device for the user equipment, and the first BWP is a BWP used by the user equipment to perform contention free random access in the first serving cell, or the first BWP is a BWP activated when the user equipment performs random access, or the first BWP is a BWP activated when the user equipment performs contention free random access.

In addition, in the second case, after the user equipment determines that the RAR message is received, the user equipment needs to switch to the first BWP when determining that an identifier that is of a preamble and that is included in the RAR message is an identifier of the preamble sent by the user equipment.

906. The user equipment performs uplink transmission on the first BWP corresponding to the BWP identifier, where a physical resource used for the uplink transmission is a physical resource indicated by the UL grant.

In this embodiment, for this step, refer to step 706 in FIG. 14. Details are not described again.

Figure 21:
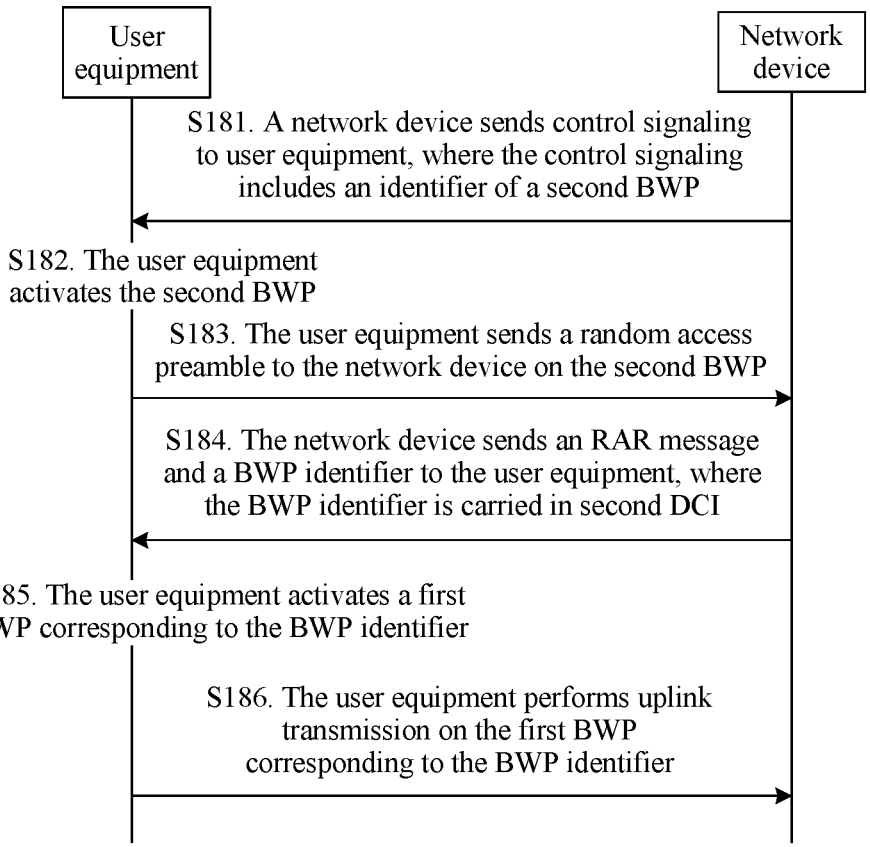
FIG. 21 is a signaling diagram of another random access method according to an embodiment of the present invention.

FIG. 21 is a signaling diagram of another random access method according to an embodiment of the present invention. As shown in FIG. 21, the method is specifically as follows:

S181. A network device sends control signaling to user equipment, where the control signaling is used to trigger the user equipment to perform a random access procedure, and the control signaling includes an identifier of a second BWP.

In an optional implementation, the control signaling is a PDCCH order.

In an optional implementation, the control signaling received by the user equipment in any serving cell includes the identifier of the second BWP, or the control signaling received by the user equipment in any serving cell includes the identifier of the second BWP, where at least two uplink BWPs are configured for the user equipment in at least one secondary serving cell, and a random access channel is configured for each of the at least two uplink BWPs, or the control signaling received by the user equipment in a secondary serving cell includes the identifier of the second BWP, or the control signaling received by the user equipment in at least one secondary serving cell includes the identifier of the second BWP, where at least two uplink BWPs are configured for the user equipment in the at least one secondary serving cell, and a random access channel is configured for each of the at least two uplink BWPs.

In an optional implementation, the second BWP is a BWP in a first serving cell of the user equipment, and the first serving cell is a serving cell used when the user equipment receives the control signaling, or the first serving cell is a serving cell scheduled by using a second serving cell used when the user equipment receives the control signaling.

S182. The user equipment activates the second BWP.

S183. The user equipment sends a random access preamble to the network device on the second BWP.

S184. The network device sends an RAR message and a BWP identifier to the user equipment, where the RAR message includes a UL grant, the BWP identifier is carried in second DCI, and the second DCI is DCI for instructing the terminal device to switch a BWP, or the second DCI is DCI for instructing the terminal device to switch a pair of an uplink BWP and a downlink BWP.

S185. The user equipment activates a first BWP corresponding to the BWP identifier.

In an optional implementation, the first BWP is an initial active BWP of the user equipment in the first serving cell, or the first BWP is a first active BWP of the user equipment in the first serving cell, or the first BWP is a default BWP of the user equipment in the first serving cell, or the first BWP is a BWP configured by the network device for the user equipment, and the first BWP is used by the user equipment to perform random access in the first serving cell, or the first BWP is a BWP configured by the network device for the user equipment, and the first BWP is a BWP used by the user equipment to perform contention free random access in the first serving cell, or the first BWP is a BWP activated when the user equipment performs random access, or the first BWP is a BWP activated when the user equipment performs contention free random access.

S186. The user equipment performs uplink transmission on the first BWP corresponding to the BWP identifier, where a physical resource used for the uplink transmission is a physical resource indicated by the UL grant.

Herein, steps 901 to 906 in FIG. 20 are implemented in steps S181 to S186. Details are not described again.

In this embodiment, the user equipment receives the RAR message and the BWP identifier that are sent by the network device, where the RAR message includes the UL grant, the BWP identifier is carried in the second DCI, and the second DCI is DCI for instructing the terminal device to switch a BWP, or the second DCI is DCI for instructing the terminal device to switch a pair of an uplink BWP and a downlink BWP, and the user equipment performs uplink transmission on the first BWP corresponding to the BWP identifier. In this way, the user equipment can complete a random access procedure based on the BWP identifier indicated by the network device. The BWP corresponding to the BWP identifier is consistent with the BWP indicated by the UL grant sent by the network device, so that uplink data can be effectively transmitted by using the UL grant in the RAR message.

Figure 22:
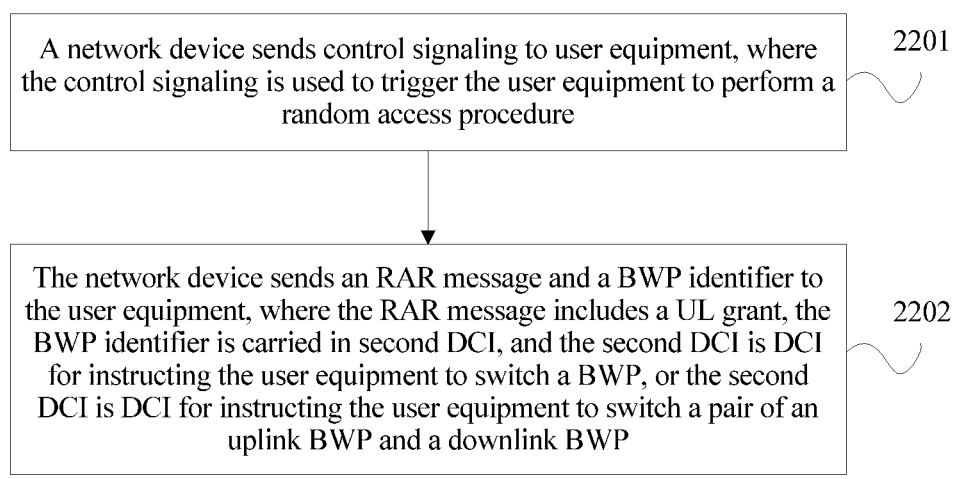
FIG. 22 is a schematic flowchart of another random access method according to an embodiment of the present invention.

FIG. 22 is a schematic flowchart of another random access method according to an embodiment of the present invention. As shown in FIG. 22, the method is specifically as follows:

2201. A network device sends control signaling to user equipment, where the control signaling is used to trigger the user equipment to perform a random access procedure.

In an optional implementation, the control signaling is a PDCCH order.

In an optional implementation, the control signaling includes an identifier of a second BWP.

In an optional implementation, the second BWP is a BWP in a first serving cell of the user equipment, and the first serving cell is a serving cell used when the user equipment receives the control signaling, or the first serving cell is a serving cell scheduled by using a second serving cell used when the user equipment receives the control signaling.

2202. The network device sends an RAR message and a BWP identifier to the user equipment, where the RAR message includes a UL grant, the BWP identifier is carried in second DCI, and the second DCI is DCI for instructing the terminal device to switch a BWP, or the second DCI is DCI for instructing the terminal device to switch a pair of an uplink BWP and a downlink BWP.

In an optional implementation, the RAR message includes the UL grant, and the UL grant includes or indicates the BWP identifier.

In an optional implementation, a first BWP is an initial active BWP of the user equipment in the first serving cell, or a first BWP is a first active BWP of the user equipment in the first serving cell, or a first BWP is a default BWP of the user equipment in the first serving cell, or a first BWP is a BWP configured by the network device for the user equipment, and the first BWP is used by the user equipment to perform random access in the first serving cell, or a first BWP is a BWP configured by the network device for the user equipment, and the first BWP is a BWP used by the user equipment to perform contention free random access in the first serving cell, or a first BWP is a BWP activated when the user equipment performs random access, or a first BWP is a BWP activated when the user equipment performs contention free random access.

In an optional implementation, the first BWP and the second BWP are uplink BWPs, and the first BWP and the second BWP may be a same BWP, or may be different BWPs.

In an optional implementation, step 2202 specifically includes sending, by the network device, the RAR message to the user equipment on a third BWP, where the third BWP is a downlink BWP.

The third BWP is an active BWP in the second serving cell when the user equipment receives the control signaling in the first serving cell, or the third BWP is a BWP used when the user equipment receives the control signaling in the first serving cell.

In an optional implementation, the first BWP and the second BWP each are a BWP pair including an uplink BWP and a downlink BWP, and the first BWP and the second BWP may be a same BWP, or may be different BWPs. Step

602 specifically includes sending, by the network device, the RAR message to the user equipment on the uplink BWP of the second BWP.

In an optional implementation, step 2202 specifically includes sending, by the network device, the RAR message to the user equipment on a fourth BWP, where the fourth BWP is a BWP pair including an uplink BWP and a downlink BWP.

The fourth BWP is an active BWP in the second serving cell when the user equipment receives the control signaling in the first serving cell, or the fourth BWP is a BWP used when the user equipment receives the control signaling in the first serving cell.

For the method provided in this embodiment, refer to the methods in FIG. 20 and FIG. 21. Details are not described again.

Figure 23:
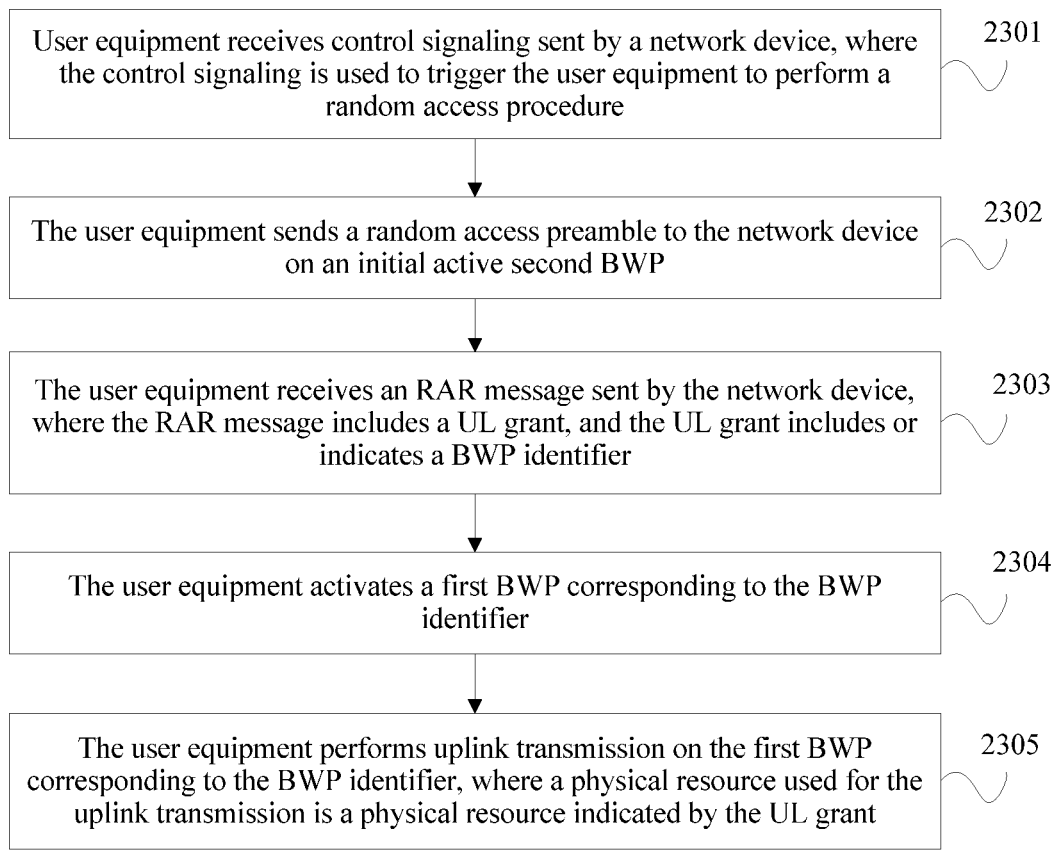
FIG. 23 is a schematic flowchart of another random access method according to an embodiment of the present invention.

FIG. 23 is a schematic flowchart of another random access method according to an embodiment of the present invention. As shown in FIG. 23, the method is specifically as follows:

2301. User equipment receives control signaling sent by a network device, where the control signaling is used to trigger the user equipment to perform a random access procedure.

In an optional implementation, the control signaling is a PDCCH order.

In this embodiment, at least one serving cell is configured for the user equipment, and the at least one serving cell includes a first serving cell. The user equipment receives, in the first serving cell, the control signaling sent by the network device.

In this embodiment, the network device configures an initial active second BWP for the user equipment in the first serving cell, and configures a PRACH resource only for the initial active second BWP. The initial active second BWP may be configured by the network device or selected by the user equipment. In this case, the user equipment operates in the first serving cell. In other words, the user equipment communicates with the network device in the first serving cell. Optionally, the user equipment operates in a secondary serving cell, and the secondary serving cell and a primary serving cell of the user equipment belong to different TAGs, or the user equipment operates in a primary serving cell.

The network device sends the control signaling to the user equipment. The control signaling may be signaling or a signal, and the control signaling is used to trigger the user equipment to perform a random access procedure. Further, the control signaling is a PDCCH order. In this case, the user equipment has an initial active downlink BWP in the first serving cell, and the user equipment may receive the PDCCH order on the downlink BWP of the first serving cell. Alternatively, the user equipment may receive the PDCCH order on an initial active downlink BWP of a second serving cell used to schedule the first serving cell. In this case, the PDCCH order includes a cell index of the current serving cell.

In this step, the control signaling does not carry a BWP identifier or indicate a BWP identifier.

2302. The user equipment sends a random access preamble to the network device on the initial active second BWP.

In this embodiment, because the user equipment has an initial active second BWP, and a PRACH resource is configured only for the initial active second BWP, the user equipment directly sends the random access preamble to the network device on the initial active second BWP. For example, when the user equipment communicates with the network device in a secondary serving cell, the initial active second BWP is a BWP activated when the user equipment activates the secondary serving cell.

2303. The user equipment receives an RAR message sent by the network device, where the RAR message includes a UL grant, and the UL grant includes or indicates a BWP identifier.

In this embodiment, the network device sends the RAR message to the user equipment. The RAR message includes the UL grant, and the RAR message includes the BWP identifier, or the RAR message indicates the BWP identifier. Specifically, the UL grant in the RAR message includes the BWP identifier, or the UL grant in the RAR message indicates the BWP identifier. Alternatively, the BWP identifier is directly included in the RAR message as an information field in the RAR message.

In an optional implementation, there are the following implementations of step 2303:

In a first implementation of step 2303, a first BWP and the second BWP are uplink BWPs, and the first BWP and the second BWP may be a same BWP, or may be different BWPs. Step 2303 specifically includes receiving, by the user equipment on a third BWP, the RAR message sent by the network device, where the third BWP is a downlink BWP.

The third BWP is an active BWP in the second serving cell when the user equipment receives the control signaling in the first serving cell, or the third BWP is a BWP used when the user equipment receives the control signaling in the first serving cell.

In this embodiment, the first BWP is an uplink BWP, and the second BWP is also an uplink BWP. In this case, the first BWP and the second BWP may be a same BWP, or may be different BWPs. In step 2303, the user equipment receives, on the third BWP, the RAR message sent by the network device, where the third BWP is a downlink BWP.

In a second implementation of step 2303, a first BWP and the second BWP each are a BWP pair including an uplink BWP and a downlink BWP, and the first BWP and the second BWP may be a same BWP, or may be different BWPs. Step 2303 specifically includes receiving, by the user equipment on the uplink BWP of the second BWP, the RAR message sent by the network device.

In this embodiment, the first BWP is a BWP pair including an uplink BWP and a downlink BWP, and the second BWP is a BWP pair including an uplink BWP and a downlink BWP. In addition, the first BWP and the second BWP may be a same BWP, or may be different BWPs. In step 2303, the user equipment receives, on the uplink BWP of the second BWP, the RAR message sent by the network device.

In a third implementation of step 2303, the user equipment receives, on a fourth BWP, the RAR message sent by the network device, where the fourth BWP is a BWP pair including an uplink BWP and a downlink BWP.

The fourth BWP is an active BWP in the second serving cell when the user equipment receives the control signaling in the first serving cell, or the fourth BWP is a BWP used when the user equipment receives the control signaling in the first serving cell.

In an optional implementation, if the fourth BWP is a BWP used when the user equipment receives the control signaling in the first serving cell, after step 503, the method further includes step 507: The user equipment activates the fourth BWP, and deactivates the second BWP.

In this embodiment, the fourth BWP is provided. Optionally, the fourth BWP is a BWP pair including an uplink BWP and a downlink BWP. The user equipment first needs to switch to the fourth BWP, in other words, the user equipment activates the fourth BWP, and deactivates the second BWP. Then the user equipment may receive, on the fourth BWP, the RAR message sent by the network device.

2304. The user equipment activates the first BWP corresponding to the BWP identifier.

In an optional implementation, the first BWP is an initial active BWP of the user equipment in the first serving cell, or the first BWP is a first active BWP of the user equipment in the first serving cell, or the first BWP is a default BWP of the user equipment in the first serving cell, or the first BWP is a BWP configured by the network device for the user equipment, and the first BWP is used by the user equipment to perform random access in the first serving cell, or the first BWP is a BWP configured by the network device for the user equipment, and the first BWP is a BWP used by the user equipment to perform contention free random access in the first serving cell, or the first BWP is a BWP activated when the user equipment performs random access, or the first BWP is a BWP activated when the user equipment performs contention free random access.

In this embodiment, there are three cases as to whether the user equipment needs to activate the first BWP.

In a first case, if the BWP identifier is an identifier of the initial active second BWP, the first BWP corresponding to the BWP is the second BWP, and it may be determined that the UL grant included in the RAR message is a UL grant corresponding to the second BWP of the user equipment in the first serving cell. In this case, the user equipment does not need to perform BWP switching, in other words, the first BWP is in an active state, and the user equipment does not need to further activate the first BWP. In this case, the user equipment may send data or signaling to the network device on the second BWP of the first serving cell based on the UL grant in the RAR message.

In a second case, if the BWP identifier is not an identifier of the initial active second BWP, the first BWP corresponding to the BWP is different from the second BWP, and it may be determined that the UL grant included in the RAR message is a UL grant corresponding to the first BWP of the user equipment in the first serving cell. In this case, the user equipment needs to switch to the first BWP, in other words, deactivate the second BWP, and activate the first BWP. In this case, the user equipment may send data or signaling to the network device on the first BWP of the first serving cell based on the UL grant in the RAR message.

In this step, in the second case, the user equipment needs to activate the first BWP corresponding to the BWP identifier.

2305. The user equipment performs uplink transmission on the first BWP corresponding to the BWP identifier, where a physical resource used for the uplink transmission is a physical resource indicated by the UL grant.

In this embodiment, the user equipment sends, on the first BWP indicated by the network device, data or an instruction to the network device by using the physical resource indicated by the UL grant in the RAR message.

Figure 24:
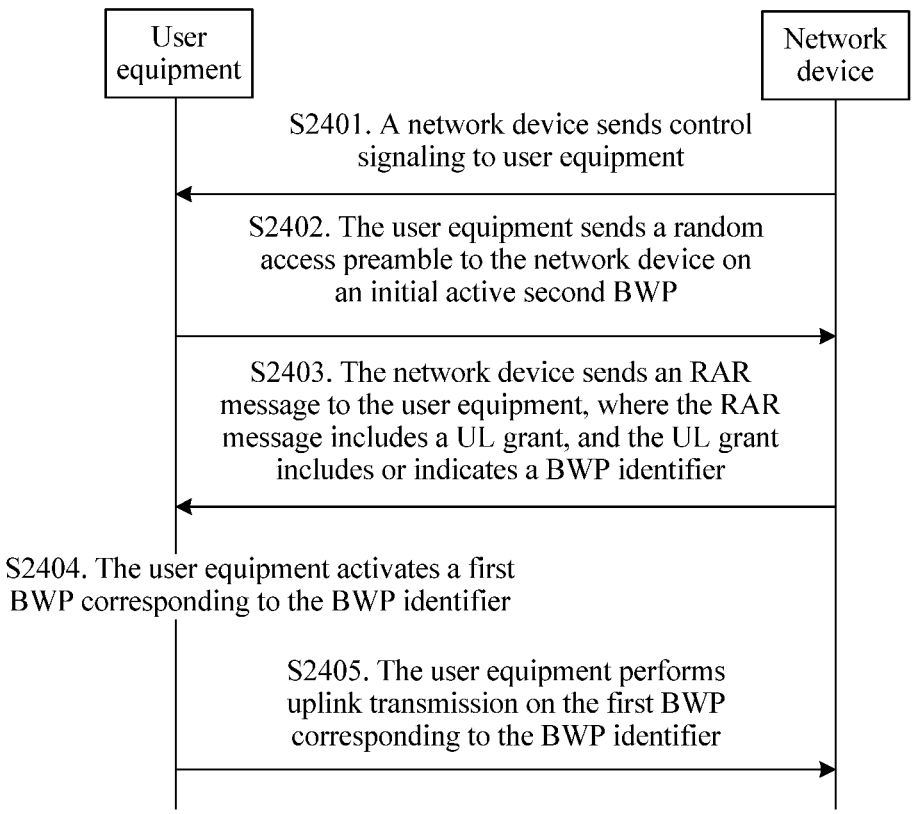
FIG. 24 is a signaling diagram of another random access method according to an embodiment of the present invention.

FIG. 24 is a signaling diagram of another random access method according to an embodiment of the present invention. As shown in FIG. 24, the method is specifically as follows:

S2401. A network device sends control signaling to user equipment, where the control signaling is used to trigger the user equipment to perform a random access procedure.

In an optional implementation, the control signaling is a PDCCH order.

S2402. The user equipment sends a random access preamble to the network device on an initial active second BWP.

S2403. The network device sends an RAR message to the user equipment, where the RAR message includes a UL grant, and the UL grant includes or indicates a BWP identifier.

S2404. The user equipment activates a first BWP corresponding to the BWP identifier.

In an optional implementation, the first BWP is an initial active BWP of the user equipment in a first serving cell, or the first BWP is a first active BWP of the user equipment in a first serving cell, or the first BWP is a default BWP of the user equipment in a first serving cell, or the first BWP is a BWP configured by the network device for the user equipment, and the first BWP is used by the user equipment to perform random access in a first serving cell, or the first BWP is a BWP configured by the network device for the user equipment, and the first BWP is a BWP used by the user equipment to perform contention free random access in a first serving cell, or the first BWP is a BWP activated when the user equipment performs random access, or the first BWP is a BWP activated when the user equipment performs contention free random access.

S2405. The user equipment performs uplink transmission on the first BWP corresponding to the BWP identifier, where a physical resource used for the uplink transmission is a physical resource indicated by the UL grant.

Herein, steps 2301 to 2305 in FIG. 23 are implemented in steps S2401 to S2405. Details are not described again.

In this embodiment, the user equipment receives the control signaling sent by the network device, the user equipment sends the random access preamble to the network device on the initial active second BWP, the user equipment receives the RAR message sent by the network device, where the RAR message includes or indicates the BWP identifier, and the user equipment performs uplink transmission on the first BWP corresponding to the BWP identifier. In this way, the user equipment can perform uplink transmission on the first BWP indicated by the network device. The first BWP corresponding to the BWP identifier is consistent with the BWP indicated by the UL grant sent by the network device, so that uplink data can be effectively transmitted by using the UL grant in the RAR message.

Figure 25:
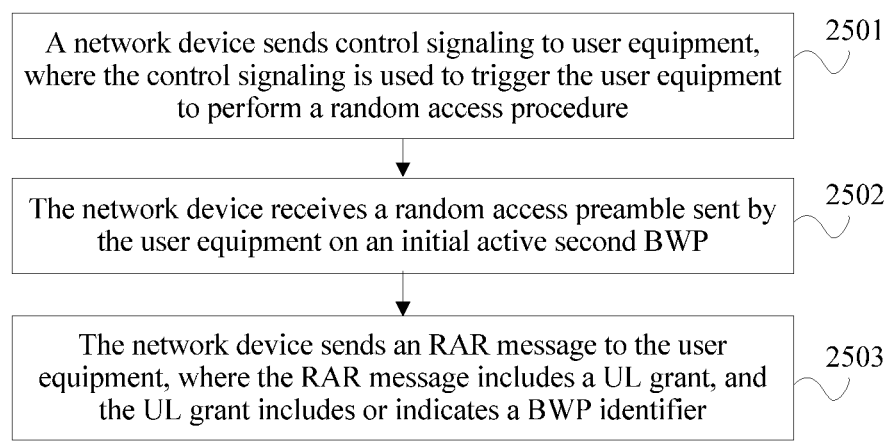
FIG. 25 is a schematic flowchart of another random access method according to an embodiment of the present invention.

FIG. 25 is a schematic flowchart of another random access method according to an embodiment of the present invention. As shown in FIG. 25, the method is specifically as follows:

2501. A network device sends control signaling to user equipment, where the control signaling is used to trigger the user equipment to perform a random access procedure.

In an optional implementation, the control signaling is a PDCCH order.

2502. The network device receives a random access preamble sent by the user equipment on an initial active second BWP.

2503. The network device sends an RAR message to the user equipment, where the RAR message includes a UL grant, and the UL grant includes or indicates a BWP identifier.

For the method provided in this embodiment, refer to the methods in FIG. 23 and FIG. 24. Details are not described again.

Figure 26:
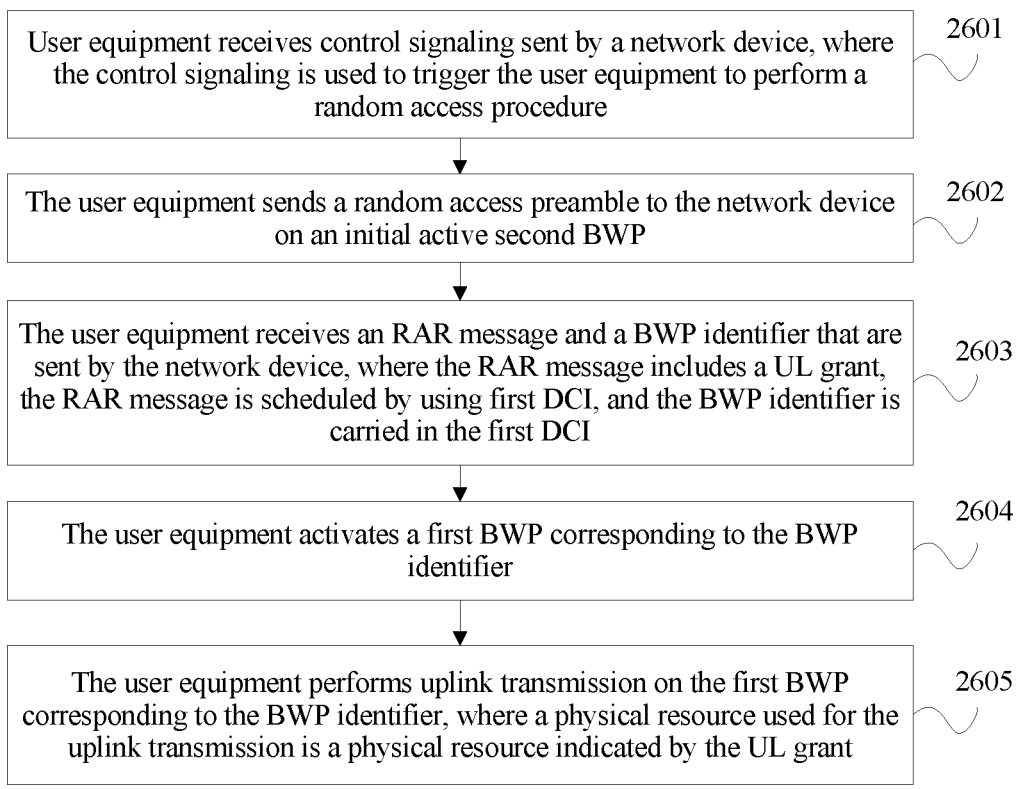
FIG. 26 is a schematic flowchart of another random access method according to an embodiment of the present invention.

FIG. 26 is a schematic flowchart of another random access method according to an embodiment of the present invention. As shown in FIG. 26, the method is specifically as follows:

2601. User equipment receives control signaling sent by a network device, where the control signaling is used to trigger the user equipment to perform a random access procedure.

In an optional implementation, the control signaling is a PDCCH order.

In this embodiment, for this step, refer to step 2301 in FIG. 23. Details are not described again.

2602. The user equipment sends a random access preamble to the network device on an initial active second BWP.

In this embodiment, for this step, refer to step 2302 in FIG. 23. Details are not described again.

2603. The user equipment receives an RAR message and a BWP identifier that are sent by the network device, where the RAR message includes a UL grant, the RAR message is scheduled by using first DCI, and the BWP identifier is carried in the first DCI.

In an optional implementation, a first BWP and the second BWP are uplink BWPs, and the first BWP and the second BWP may be a same BWP, or may be different BWPs. Step 2603 specifically includes receiving, by the user equipment on a third BWP, the RAR message sent by the network device, where the third BWP is a downlink BWP.

The third BWP is an active BWP in a second serving cell when the user equipment receives the control signaling in a first serving cell, or the third BWP is a BWP used when the user equipment receives the control signaling in a first serving cell.

In an optional implementation, a first BWP and the second BWP each are a BWP pair including an uplink BWP and a downlink BWP, and the first BWP and the second BWP may be a same BWP, or may be different BWPs. Step 2603 specifically includes receiving, by the user equipment on the uplink BWP of the second BWP, the RAR message sent by the network device.

In an optional implementation, step 704 specifically includes receiving, by the user equipment on a fourth BWP, the RAR message sent by the network device, where the fourth BWP is a BWP pair including an uplink BWP and a downlink BWP.

The fourth BWP is an active BWP in a second serving cell when the user equipment receives the control signaling in a first serving cell, or the fourth BWP is a BWP used when the user equipment receives the control signaling in a first serving cell.

In an optional implementation, if the fourth BWP is a BWP used when the user equipment receives the control signaling in the first serving cell, after step 2602, the method further includes step 2606: The user equipment activates the fourth BWP, and deactivates the second BWP.

2604. The user equipment activates the first BWP corresponding to the BWP identifier.

In an optional implementation, the first BWP is an initial active BWP of the user equipment in the first serving cell, or the first BWP is a first active BWP of the user equipment in the first serving cell, or the first BWP is a default BWP of the user equipment in the first serving cell, or the first BWP is a BWP configured by the network device for the user equipment, and the first BWP is used by the user equipment to perform random access in the first serving cell, or the first BWP is a BWP configured by the network device for the user equipment, and the first BWP is a BWP used by the user equipment to perform contention free random access in the first serving cell, or the first BWP is a BWP activated when the user equipment performs random access, or the first BWP is a BWP activated when the user equipment performs contention free random access.

In this embodiment, there are three cases as to whether the user equipment needs to activate the first BWP.

In a first case, for this step, refer to step 2304 in FIG. 23. Details are not described again.

2605. The user equipment performs uplink transmission on the first BWP corresponding to the BWP identifier, where a physical resource used for the uplink transmission is a physical resource indicated by the UL grant.

In this embodiment, for this step, refer to step 2305 in FIG. 23. Details are not described again.

Figure 27:
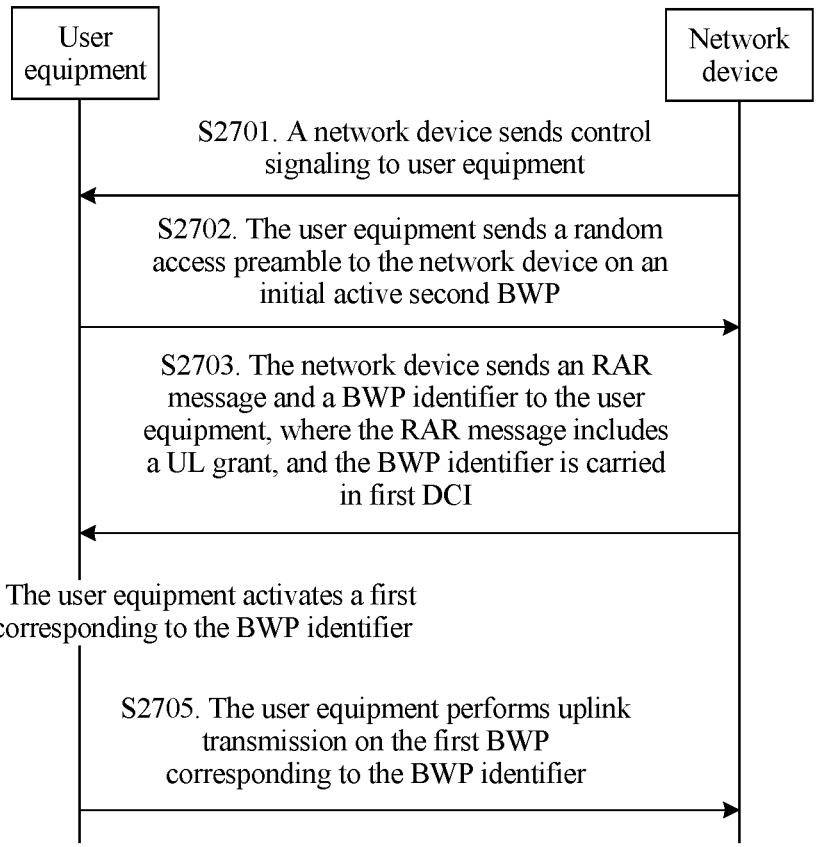
FIG. 27 is a signaling diagram of another random access method according to an embodiment of the present invention.

FIG. 27 is a signaling diagram of another random access method according to an embodiment of the present invention. As shown in FIG. 27, the method is specifically as follows:

S2701. A network device sends control signaling to user equipment, where the control signaling is used to trigger the user equipment to perform a random access procedure.

In an optional implementation, the control signaling is a PDCCH order.

S2702. The user equipment sends a random access preamble to the network device on an initial active second BWP.

S2703. The network device sends an RAR message and a BWP identifier to the user equipment, where the RAR message includes a UL grant, the RAR message is scheduled by using first DCI, and the BWP identifier is carried in the first DCI.

S2704. The user equipment activates a first BWP corresponding to the BWP identifier.

In an optional implementation, the first BWP is an initial active BWP of the user equipment in a first serving cell, or the first BWP is a first active BWP of the user equipment in a first serving cell, or the first BWP is a default BWP of the user equipment in a first serving cell, or the first BWP is a BWP configured by the network device for the user equipment, and the first BWP is used by the user equipment to perform random access in a first serving cell, or the first BWP is a BWP configured by the network device for the user equipment, and the first BWP is a BWP used by the user equipment to perform contention free random access in a first serving cell, or the first BWP is a BWP activated when the user equipment performs random access, or the first BWP is a BWP activated when the user equipment performs contention free random access.

S2705. The user equipment performs uplink transmission on the first BWP corresponding to the BWP identifier, where a physical resource used for the uplink transmission is a physical resource indicated by the UL grant.

Herein, steps 2601 to 2605 in FIG. 26 are implemented in steps S2701 to S2705. Details are not described again.

In this embodiment, the user equipment receives the control signaling sent by the network device, the user equipment sends the random access preamble to the network device on the initial active second BWP, the user equipment receives the RAR message and the BWP identifier that are sent by the network device, where the RAR message includes the UL grant, the RAR message is scheduled by using the first DCI, and the BWP identifier is carried in the first DCI, and the user equipment performs uplink transmission on the first BWP corresponding to the BWP identifier. In this way, the user equipment can perform uplink transmission on the first BWP indicated by the network device. The first BWP corresponding to the BWP identifier is consistent with the BWP indicated by the UL grant sent by the network device, so that uplink data can be effectively transmitted by using the UL grant in the RAR message.

Figure 28:
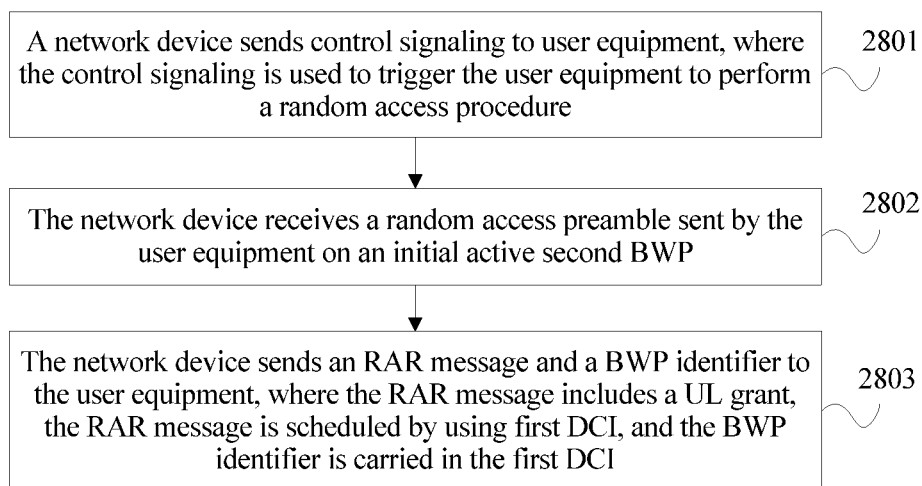
FIG. 28 is a schematic flowchart of another random access method according to an embodiment of the present invention.

FIG. 28 is a schematic flowchart of another random access method according to an embodiment of the present invention. As shown in FIG. 28, the method is specifically as follows:

2801. A network device sends control signaling to user equipment, where the control signaling is used to trigger the user equipment to perform a random access procedure.

In an optional implementation, the control signaling is a PDCCH order.

2802. The network device receives a random access preamble sent by the user equipment on an initial active second BWP.

2803. The network device sends an RAR message and a BWP identifier to the user equipment, where the RAR message includes a UL grant, the RAR message is scheduled by using first DCI, and the BWP identifier is carried in the first DCI.

For the method provided in this embodiment, refer to the methods in FIG. 26 and FIG. 27. Details are not described again.

Figure 29:
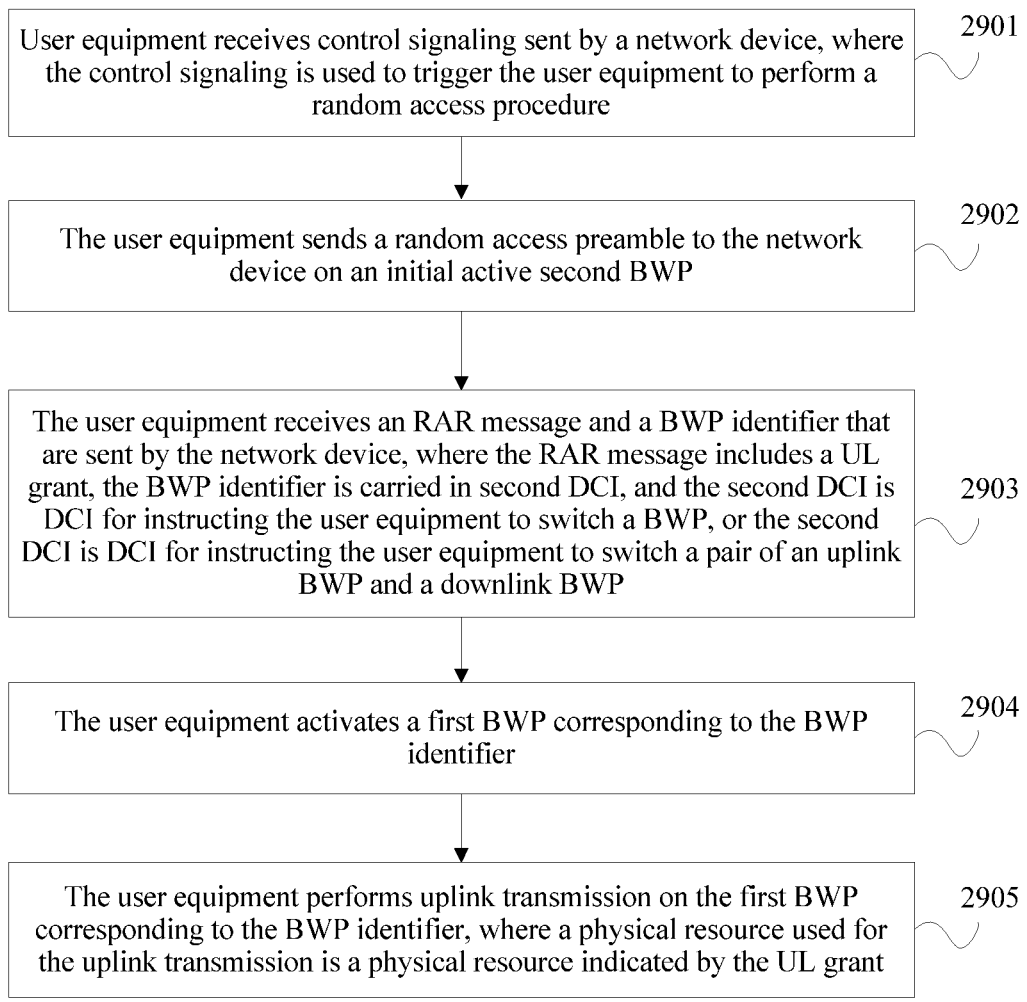
FIG. 29 is a schematic flowchart of another random access method according to an embodiment of the present invention.

FIG. 29 is a schematic flowchart of another random access method according to an embodiment of the present invention. As shown in FIG. 29, the method is specifically as follows:

2901. User equipment receives control signaling sent by a network device, where the control signaling is used to trigger the user equipment to perform a random access procedure.

In an optional implementation, the control signaling is a PDCCH order.

In this embodiment, for this step, refer to step 2301 in FIG. 23. Details are not described again.

2902. The user equipment sends a random access preamble to the network device on an initial active second BWP.

In this embodiment, for this step, refer to step 2302 in FIG. 23. Details are not described again.

2903. The user equipment receives an RAR message and a BWP identifier that are sent by the network device, where the RAR message includes a UL grant, the BWP identifier is carried in second DCI, and the second DCI is DCI for instructing the terminal device to switch a BWP, or the second DCI is DCI for instructing the terminal device to switch a pair of an uplink BWP and a downlink BWP.

In an optional implementation, a first BWP and the second BWP are uplink BWPs, and the first BWP and the second BWP may be a same BWP, or may be different BWPs. Step 2903 specifically includes receiving, by the user equipment on a third BWP, the RAR message sent by the network device, where the third BWP is a downlink BWP.

The third BWP is an active BWP in a second serving cell when the user equipment receives the control signaling in a first serving cell, or the third BWP is a BWP used when the user equipment receives the control signaling in a first serving cell.

In an optional implementation, a first BWP and the second BWP each are a BWP pair including an uplink BWP and a downlink BWP, and the first BWP and the second BWP may be a same BWP, or may be different BWPs. Step 2903 specifically includes receiving, by the user equipment on the uplink BWP of the second BWP, the RAR message sent by the network device.

In an optional implementation, step 704 specifically includes receiving, by the user equipment on a fourth BWP, the RAR message sent by the network device, where the fourth BWP is a BWP pair including an uplink BWP and a downlink BWP.

The fourth BWP is an active BWP in a second serving cell when the user equipment receives the control signaling in a first serving cell, or the fourth BWP is a BWP used when the user equipment receives the control signaling in a first serving cell.

In an optional implementation, if the fourth BWP is a BWP used when the user equipment receives the control signaling in the first serving cell, after step 2902, the method further includes step 2906: The user equipment activates the fourth BWP, and deactivates the second BWP.

2904. The user equipment activates the first BWP corresponding to the BWP identifier.

In an optional implementation, the first BWP is an initial active BWP of the user equipment in the first serving cell, or the first BWP is a first active BWP of the user equipment in the first serving cell, or the first BWP is a default BWP of the user equipment in the first serving cell, or the first BWP is a BWP configured by the network device for the user equipment, and the first BWP is used by the user equipment to perform random access in the first serving cell, or the first BWP is a BWP configured by the network device for the user equipment, and the first BWP is a BWP used by the user equipment to perform contention free random access in the first serving cell, or the first BWP is a BWP activated when the user equipment performs random access, or the first BWP is a BWP activated when the user equipment performs contention free random access.

In this embodiment, there are three cases as to whether the user equipment needs to activate the first BWP.

In a first case, for this step, refer to step 2304 in FIG. 23. Details are not described again.

2905. The user equipment performs uplink transmission on the first BWP corresponding to the BWP identifier, where a physical resource used for the uplink transmission is a physical resource indicated by the UL grant.

In this embodiment, for this step, refer to step 2305 in FIG. 23. Details are not described again.

Figure 30:
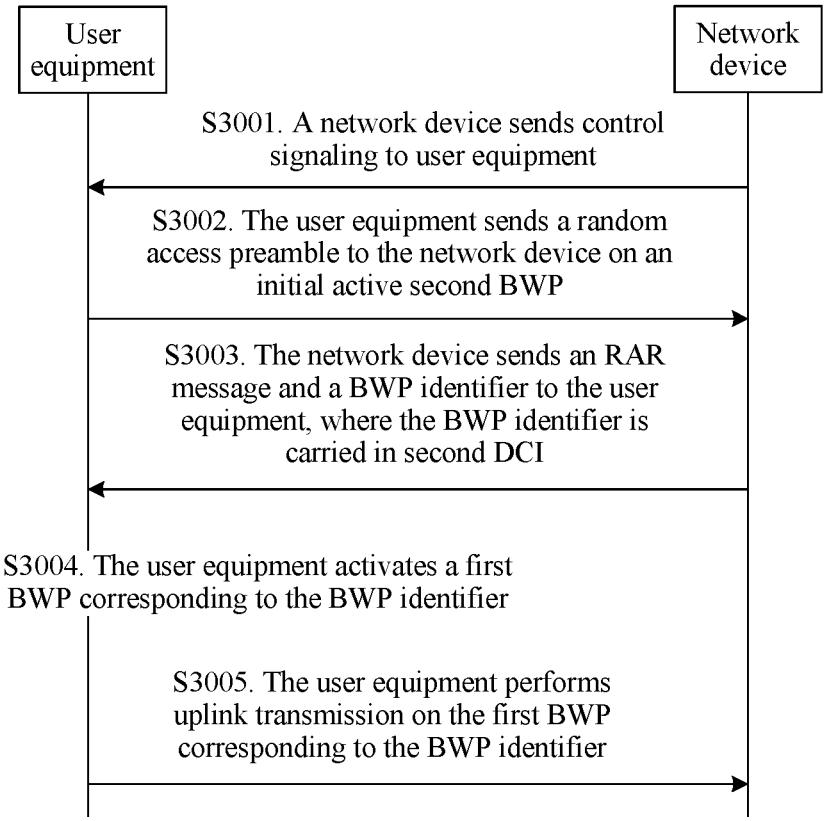
FIG. 30 is a signaling diagram of another random access method according to an embodiment of the present invention.

FIG. 30 is a signaling diagram of another random access method according to an embodiment of the present invention. As shown in FIG. 30, the method is specifically as follows:

S3001. A network device sends control signaling to user equipment, where the control signaling is used to trigger the user equipment to perform a random access procedure.

In an optional implementation, the control signaling is a PDCCH order.

S3002. The user equipment sends a random access preamble to the network device on an initial active second BWP.

S3003. The network device sends an RAR message and a BWP identifier to the user equipment, where the RAR message includes a UL grant, the BWP identifier is carried in second DCI, and the second DCI is DCI for instructing the terminal device to switch a BWP, or the second DCI is DCI for instructing the terminal device to switch a pair of an uplink BWP and a downlink BWP.

S3004. The user equipment activates a first BWP corresponding to the BWP identifier.

In an optional implementation, the first BWP is an initial active BWP of the user equipment in a first serving cell, or the first BWP is a first active BWP of the user equipment in a first serving cell, or the first BWP is a default BWP of the user equipment in a first serving cell, or the first BWP is a BWP configured by the network device for the user equipment, and the first BWP is used by the user equipment to perform random access in a first serving cell.

S3005. The user equipment performs uplink transmission on the first BWP corresponding to the BWP identifier, where a physical resource used for the uplink transmission is a physical resource indicated by the UL grant.

Herein, steps 2901 to 2905 in FIG. 29 are implemented in steps S3001 to S3005. Details are not described again.

In this embodiment, the user equipment receives the control signaling sent by the network device, the user equipment sends the random access preamble to the network device on the initial active second BWP, the user equipment receives the RAR message and the BWP identifier that are sent by the network device, where the RAR message includes the UL grant, and the BWP identifier is carried in the second DCI, the user equipment receives the RAR message and the BWP identifier that are sent by the network device, and the user equipment performs uplink transmission on the first BWP corresponding to the BWP identifier. In this way, the user equipment can perform uplink transmission on the first BWP indicated by the network device. The first BWP corresponding to the BWP identifier is consistent with the BWP indicated by the UL grant sent by the network device, so that uplink data can be effectively transmitted by using the UL grant in the RAR message.

Figure 31:
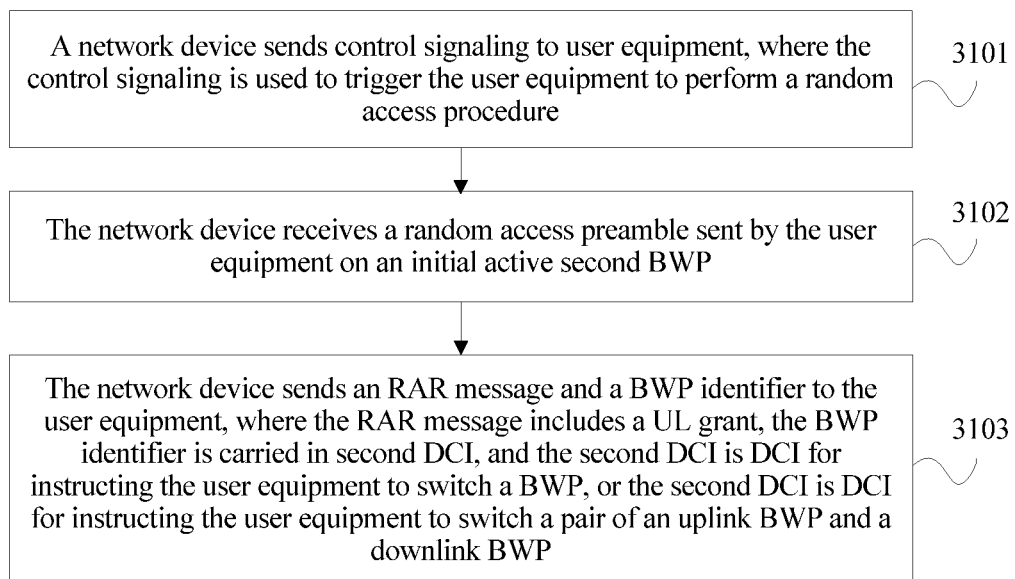
FIG. 31 is a schematic flowchart of another random access method according to an embodiment of the present invention.

FIG. 31 is a schematic flowchart of another random access method according to an embodiment of the present invention. As shown in FIG. 31, the method is specifically as follows:

3101. A network device sends control signaling to user equipment, where the control signaling is used to trigger the user equipment to perform a random access procedure.

In an optional implementation, the control signaling is a PDCCH order.

3102. The network device receives a random access preamble sent by the user equipment on an initial active second BWP.

3103. The network device sends an RAR message and a BWP identifier to the user equipment, where the RAR message includes a UL grant, the BWP identifier is carried in second DCI, and the second DCI is DCI for instructing the terminal device to switch a BWP, or the second DCI is DCI for instructing the terminal device to switch a pair of an uplink BWP and a downlink BWP.

For the method provided in this embodiment, refer to the methods in FIG. 29 and FIG. 30. Details are not described again.

Figure 32:
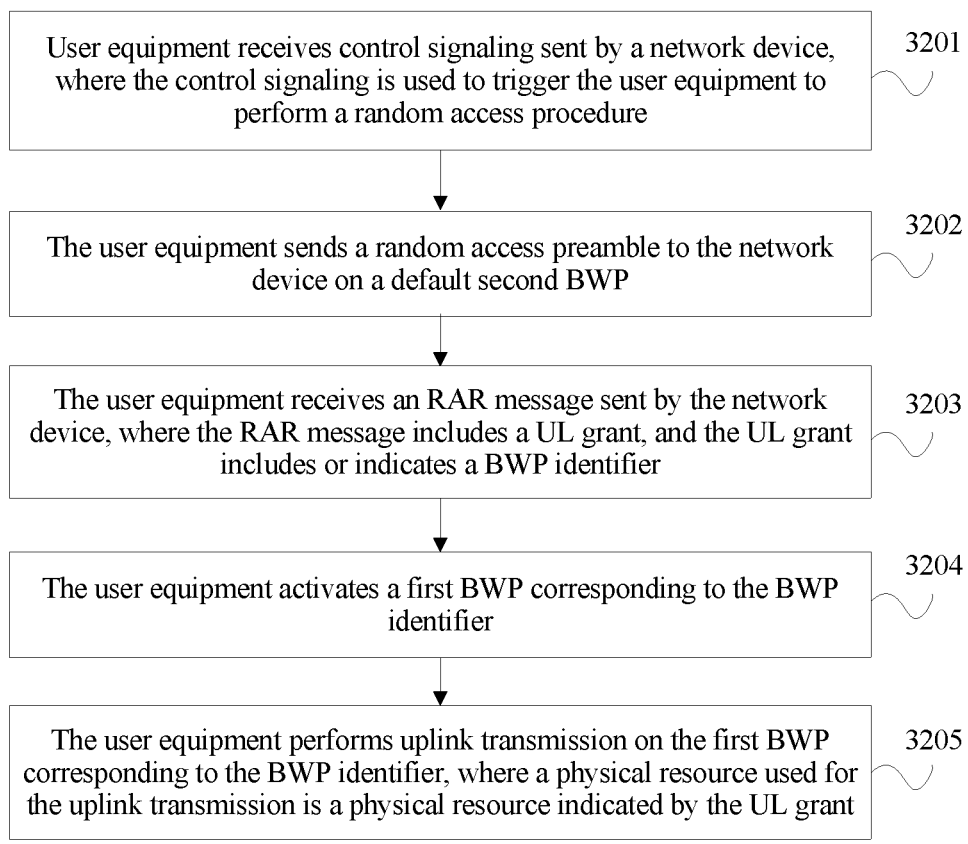
FIG. 32 is a schematic flowchart of another random access method according to an embodiment of the present invention.

FIG. 32 is a schematic flowchart of another random access method according to an embodiment of the present invention. As shown in FIG. 32, the method is specifically as follows:

3201. User equipment receives control signaling sent by a network device, where the control signaling is used to trigger the user equipment to perform a random access procedure.

In an optional implementation, the control signaling is a PDCCH order.

In this embodiment, at least one serving cell is configured for the user equipment, and the at least one serving cell includes a first serving cell. The user equipment receives, in the first serving cell, the control signaling sent by the network device.

In this embodiment, the network device configures a default second BWP for the user equipment in the first serving cell, and configures a PRACH resource only for the default second BWP. The default second BWP may be configured by the network device or selected by the user equipment. In this case, the user equipment operates in the first serving cell. In other words, the user equipment communicates with the network device in the first serving cell. Optionally, the user equipment operates in a secondary serving cell, and the secondary serving cell and a primary serving cell of the user equipment belong to different TAGs, or the user equipment operates in a primary serving cell.

The network device sends the control signaling to the user equipment. The control signaling may be signaling or a signal, and the control signaling is used to trigger the user equipment to perform a random access procedure. Further, the control signaling is a PDCCH order. In this case, the user equipment has a default downlink BWP in the first serving cell, and the user equipment may receive the PDCCH order on the downlink BWP of the first serving cell. Alternatively, the user equipment may receive the PDCCH order on a default downlink BWP of a second serving cell used to schedule the first serving cell. In this case, the PDCCH order includes a cell index of the current serving cell.

In this step, the control signaling does not carry a BWP identifier or indicate a BWP identifier.

3202. The user equipment sends a random access preamble to the network device on the default second BWP.

In this embodiment, because the user equipment has a default second BWP, and a PRACH resource is configured only for the default second BWP, the user equipment directly sends the random access preamble to the network device on the default second BWP. For example, when the user equipment communicates with the network device in a secondary serving cell, the default second BWP is a BWP activated when the user equipment activates the secondary serving cell.

3203. The user equipment receives an RAR message sent by the network device, where the RAR message includes a UL grant, and the UL grant includes or indicates a BWP identifier.

In this embodiment, the network device sends the RAR message to the user equipment. The RAR message includes the UL grant, and the RAR message includes the BWP identifier, or the RAR message indicates the BWP identifier. Specifically, the UL grant in the RAR message includes the BWP identifier, or the UL grant in the RAR message indicates the BWP identifier. Alternatively, the BWP identifier is directly included in the RAR message as an information field in the RAR message.

In an optional implementation, there are the following implementations of step 3203:

In a first implementation of step 3203, a first BWP and the second BWP are uplink BWPs, and the first BWP and the second BWP may be a same BWP, or may be different BWPs. Step 3203 specifically includes receiving, by the user equipment on a third BWP, the RAR message sent by the network device, where the third BWP is a downlink BWP.

The third BWP is an active BWP in the second serving cell when the user equipment receives the control signaling in the first serving cell, or the third BWP is a BWP used when the user equipment receives the control signaling in the first serving cell.

In this embodiment, the first BWP is an uplink BWP, and the second BWP is also an uplink BWP. In this case, the first BWP and the second BWP may be a same BWP, or may be different BWPs. In step 3203, the user equipment receives, on the third BWP, the RAR message sent by the network device, where the third BWP is a downlink BWP.

In a second implementation of step 3203, a first BWP and the second BWP each are a BWP pair including an uplink BWP and a downlink BWP, and the first BWP and the second BWP may be a same BWP, or may be different BWPs. Step 3203 specifically includes receiving, by the user equipment on the uplink BWP of the second BWP, the RAR message sent by the network device.

In this embodiment, the first BWP is a BWP pair including an uplink BWP and a downlink BWP, and the second BWP is a BWP pair including an uplink BWP and a downlink BWP. In addition, the first BWP and the second BWP may be a same BWP, or may be different BWPs. In step 3203, the user equipment receives, on the uplink BWP of the second BWP, the RAR message sent by the network device.

In a third implementation of step 3203, the user equipment receives, on a fourth BWP, the RAR message sent by the network device, where the fourth BWP is a BWP pair including an uplink BWP and a downlink BWP.

The fourth BWP is an active BWP in the second serving cell when the user equipment receives the control signaling in the first serving cell, or the fourth BWP is a BWP used when the user equipment receives the control signaling in the first serving cell.

In an optional implementation, if the fourth BWP is a BWP used when the user equipment receives the control signaling in the first serving cell, after step 503, the method further includes step 507: The user equipment activates the fourth BWP, and deactivates the second BWP.

In this embodiment, the fourth BWP is provided. Optionally, the fourth BWP is a BWP pair including an uplink BWP and a downlink BWP. The user equipment first needs to switch to the fourth BWP, in other words, the user equipment activates the fourth BWP, and deactivates the second BWP. Then the user equipment may receive, on the fourth BWP, the RAR message sent by the network device.

3204. The user equipment activates the first BWP corresponding to the BWP identifier.

In an optional implementation, the first BWP is a default BWP of the user equipment in the first serving cell, or the first BWP is a first active BWP of the user equipment in the first serving cell, or the first BWP is a default BWP of the user equipment in the first serving cell, or the first BWP is a BWP configured by the network device for the user equipment, and the first BWP is used by the user equipment to perform random access in the first serving cell, or the first BWP is a BWP configured by the network device for the user equipment, and the first BWP is a BWP used by the user equipment to perform contention free random access in the first serving cell, or the first BWP is a BWP activated when the user equipment performs random access, or the first BWP is a BWP activated when the user equipment performs contention free random access.

In this embodiment, there are three cases as to whether the user equipment needs to activate the first BWP.

In a first case, if the BWP identifier is an identifier of the default second BWP, the first BWP corresponding to the BWP is the second BWP, and it may be determined that the UL grant included in the RAR message is a UL grant corresponding to the second BWP of the user equipment in the first serving cell. In this case, the user equipment does not need to perform BWP switching, in other words, the first BWP is in an active state, and the user equipment does not need to further activate the first BWP. In this case, the user equipment may send data or signaling to the network device on the second BWP of the first serving cell based on the UL grant in the RAR message.

In a second case, if the BWP identifier is not an identifier of the default second BWP, the first BWP corresponding to the BWP is different from the second BWP, and it may be determined that the UL grant included in the RAR message is a UL grant corresponding to the first BWP of the user equipment in the first serving cell. In this case, the user equipment needs to switch to the first BWP, in other words, deactivate the second BWP, and activate the first BWP. In this case, the user equipment may send data or signaling to the network device on the first BWP of the first serving cell based on the UL grant in the RAR message.

In this step, in the second case, the user equipment needs to activate the first BWP corresponding to the BWP identifier.

3205. The user equipment performs uplink transmission on the first BWP corresponding to the BWP identifier, where a physical resource used for the uplink transmission is a physical resource indicated by the UL grant.

In this embodiment, the user equipment sends, on the first BWP indicated by the network device, data or an instruction to the network device by using the physical resource indicated by the UL grant in the RAR message.

Figure 33:
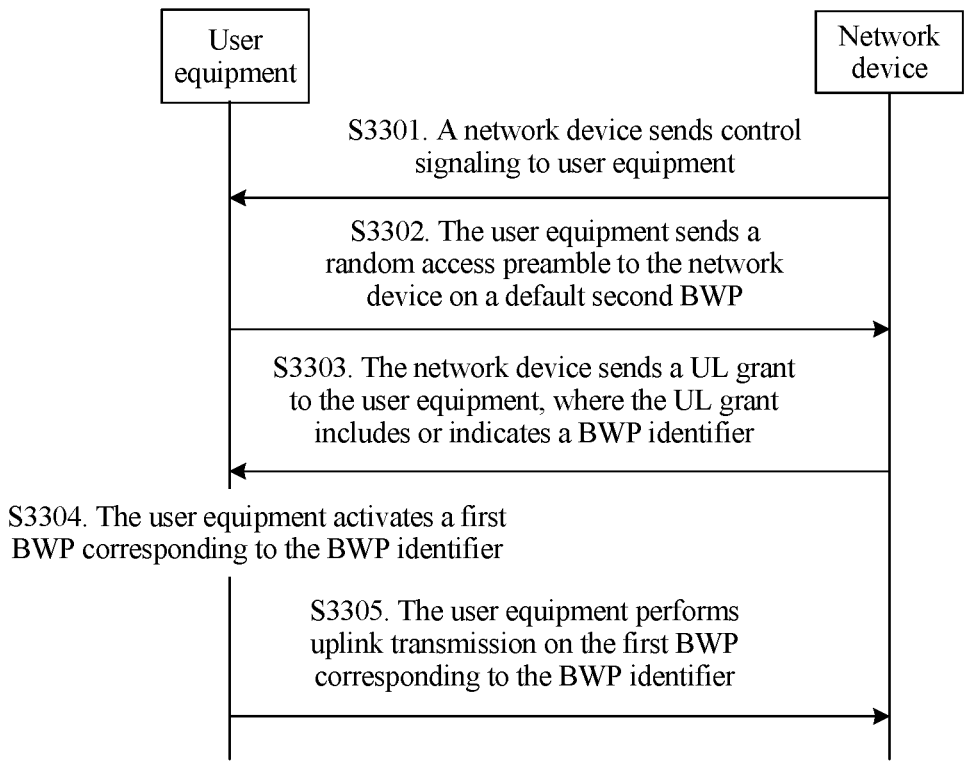
FIG. 33 is a signaling diagram of another random access method according to an embodiment of the present invention.

FIG. 33 is a signaling diagram of another random access method according to an embodiment of the present invention. As shown in FIG. 33, the method is specifically as follows:

S3301. A network device sends control signaling to user equipment, where the control signaling is used to trigger the user equipment to perform a random access procedure.

In an optional implementation, the control signaling is a PDCCH order.

S3302. The user equipment sends a random access preamble to the network device on a default second BWP.

S3303. The network device sends an RAR message to the user equipment, where the RAR message includes a UL grant, and the UL grant includes or indicates a BWP identifier.

S3304. The user equipment activates a first BWP corresponding to the BWP identifier.

In an optional implementation, the first BWP is a default BWP of the user equipment in a first serving cell, or the first BWP is a first active BWP of the user equipment in a first serving cell, or the first BWP is a default BWP of the user equipment in a first serving cell, or the first BWP is a BWP configured by the network device for the user equipment, and the first BWP is used by the user equipment to perform random access in a first serving cell, or the first BWP is a BWP configured by the network device for the user equipment, and the first BWP is a BWP used by the user equipment to perform contention free random access in a first serving cell, or the first BWP is a BWP activated when the user equipment performs random access, or the first BWP is a BWP activated when the user equipment performs contention free random access.

S3305. The user equipment performs uplink transmission on the first BWP corresponding to the BWP identifier, where a physical resource used for the uplink transmission is a physical resource indicated by the UL grant.

Herein, steps 3201 to 3205 in FIG. 32 are implemented in steps S3301 to S3305. Details are not described again.

In this embodiment, the user equipment receives the control signaling sent by the network device, the user equipment sends the random access preamble to the network device on the default second BWP, the user equipment receives the RAR message sent by the network device, where the RAR message includes or indicates the BWP identifier, and the user equipment performs uplink transmission on the first BWP corresponding to the BWP identifier. In this way, the user equipment can perform uplink transmission on the first BWP indicated by the network device. The first BWP corresponding to the BWP identifier is consistent with the BWP indicated by the UL grant sent by the network device, so that uplink data can be effectively transmitted by using the UL grant in the RAR message.

Figure 34:
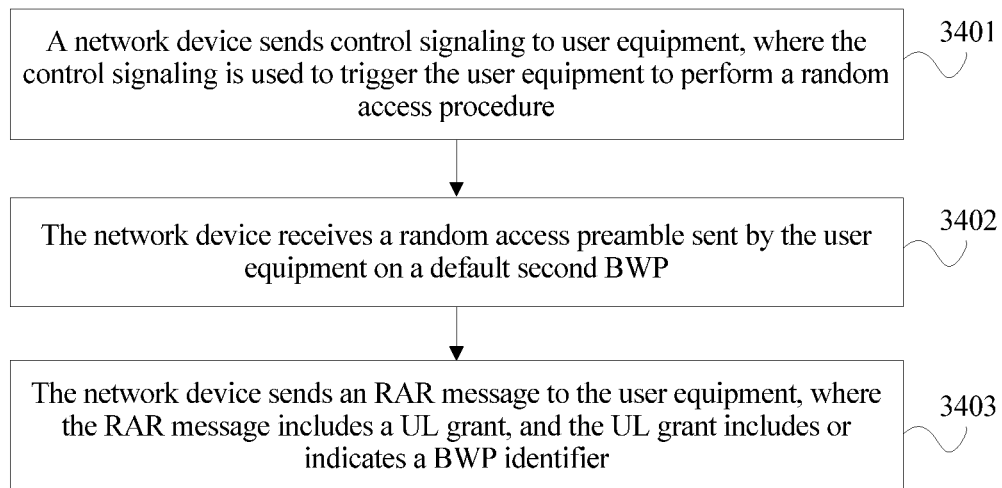
FIG. 34 is a schematic flowchart of another random access method according to an embodiment of the present invention.

FIG. 34 is a schematic flowchart of another random access method according to an embodiment of the present invention. As shown in FIG. 34, the method is specifically as follows:

3401. A network device sends control signaling to user equipment, where the control signaling is used to trigger the user equipment to perform a random access procedure.

In an optional implementation, the control signaling is a PDCCH order.

3402. The network device receives a random access preamble sent by the user equipment on a default second BWP.

3403. The network device sends an RAR message to the user equipment, where the RAR message includes a UL grant, and the UL grant includes or indicates a BWP identifier.

For the method provided in this embodiment, refer to the methods in FIG. 32 and FIG. 33. Details are not described again.

Figure 35:
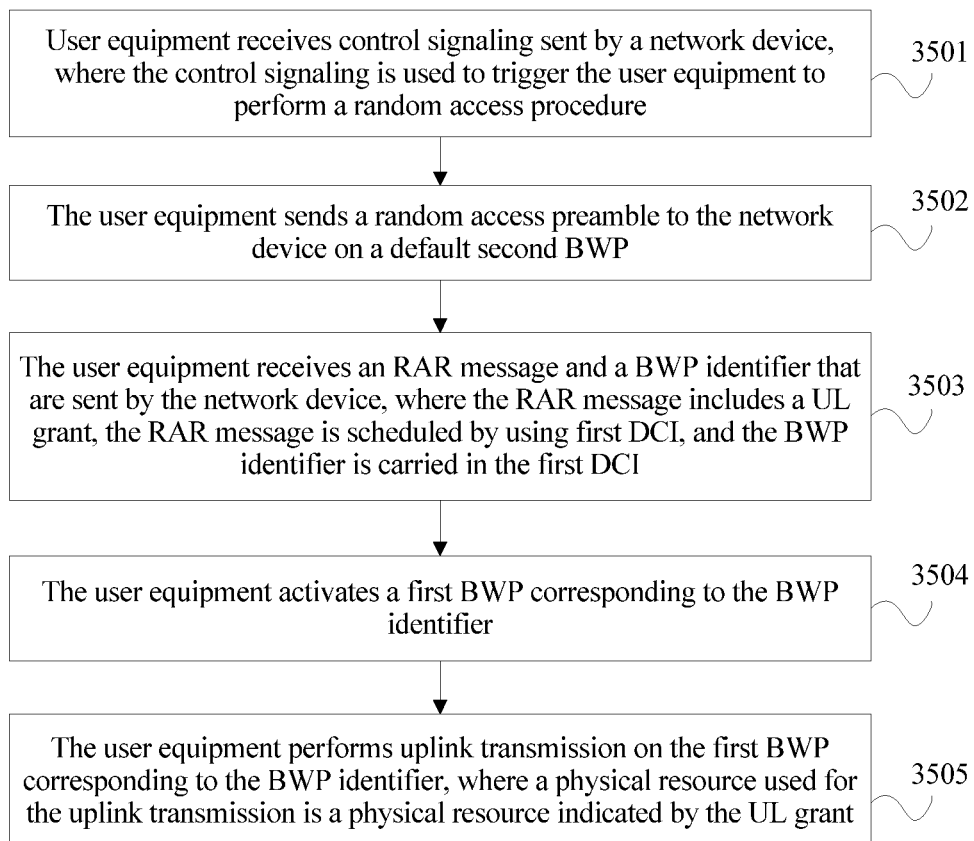
FIG. 35 is a schematic flowchart of another random access method according to an embodiment of the present invention.

FIG. 35 is a schematic flowchart of another random access method according to an embodiment of the present invention. As shown in FIG. 35, the method is specifically as follows:

3501. User equipment receives control signaling sent by a network device, where the control signaling is used to trigger the user equipment to perform a random access procedure.

In an optional implementation, the control signaling is a PDCCH order.

In this embodiment, for this step, refer to step 3201 in FIG. 32. Details are not described again.

3502. The user equipment sends a random access preamble to the network device on a default second BWP.

In this embodiment, for this step, refer to step 3202 in FIG. 32. Details are not described again.

3503. The user equipment receives an RAR message and a BWP identifier that are sent by the network device, where the RAR message includes a UL grant, the RAR message is scheduled by using first DCI, and the BWP identifier is carried in the first DCI.

In an optional implementation, a first BWP and the second BWP are uplink BWPs, and the first BWP and the second BWP may be a same BWP, or may be different BWPs. Step 3503 specifically includes receiving, by the user equipment on a third BWP, the RAR message sent by the network device, where the third BWP is a downlink BWP.

The third BWP is an active BWP in a second serving cell when the user equipment receives the control signaling in a first serving cell, or the third BWP is a BWP used when the user equipment receives the control signaling in a first serving cell.

In an optional implementation, a first BWP and the second BWP each are a BWP pair including an uplink BWP and a downlink BWP, and the first BWP and the second BWP may be a same BWP, or may be different BWPs. Step 3503 specifically includes receiving, by the user equipment on the uplink BWP of the second BWP, the RAR message sent by the network device.

In an optional implementation, step 3503 specifically includes receiving, by the user equipment on a fourth BWP, the RAR message sent by the network device, where the fourth BWP is a BWP pair including an uplink BWP and a downlink BWP.

The fourth BWP is an active BWP in a second serving cell when the user equipment receives the control signaling in a first serving cell, or the fourth BWP is a BWP used when the user equipment receives the control signaling in a first serving cell.

In an optional implementation, if the fourth BWP is a BWP used when the user equipment receives the control signaling in the first serving cell, after step 3502, the method further includes step 3506: The user equipment activates the fourth BWP, and deactivates the second BWP.

3504. The user equipment activates the first BWP corresponding to the BWP identifier.

In an optional implementation, the first BWP is a default BWP of the user equipment in the first serving cell, or the first BWP is a first active BWP of the user equipment in the first serving cell, or the first BWP is a default BWP of the user equipment in the first serving cell, or the first BWP is a BWP configured by the network device for the user equipment, and the first BWP is used by the user equipment to perform random access in the first serving cell, or the first BWP is a BWP configured by the network device for the user equipment, and the first BWP is a BWP used by the user equipment to perform contention free random access in the first serving cell, or the first BWP is a BWP activated when the user equipment performs random access, or the first BWP is a BWP activated when the user equipment performs contention free random access.

In this embodiment, for this step, refer to step 3204 in FIG. 32. Details are not described again.

3505. The user equipment performs uplink transmission on the first BWP corresponding to the BWP identifier, where a physical resource used for the uplink transmission is a physical resource indicated by the UL grant.

In this embodiment, for this step, refer to step 3205 in FIG. 32. Details are not described again.

Figure 36:
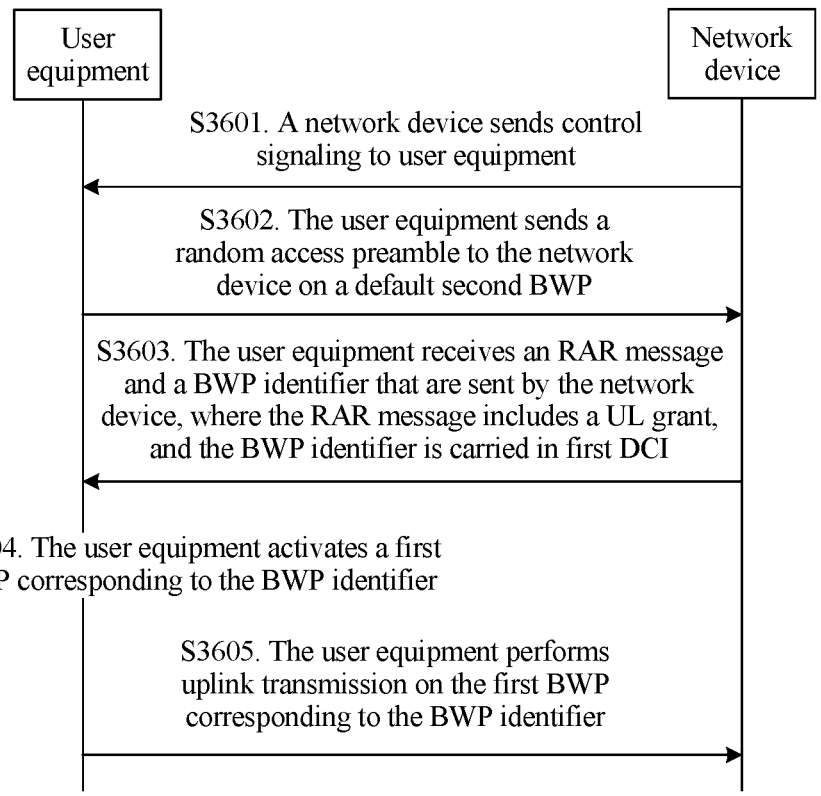
FIG. 36 is a signaling diagram of another random access method according to an embodiment of the present invention.

FIG. 36 is a signaling diagram of another random access method according to an embodiment of the present invention. As shown in FIG. 36, the method is specifically as follows:

S3601. A network device sends control signaling to user equipment, where the control signaling is used to trigger the user equipment to perform a random access procedure.

In an optional implementation, the control signaling is a PDCCH order.

S3602. The user equipment sends a random access preamble to the network device on a default second BWP.

S3603. The user equipment receives an RAR message and a BWP identifier that are sent by the network device, where the RAR message includes a UL grant, the RAR message is scheduled by using first DCI, and the BWP identifier is carried in the first DCI.

S3604. The user equipment activates a first BWP corresponding to the BWP identifier.

In an optional implementation, the first BWP is a default BWP of the user equipment in a first serving cell, or the first BWP is a first active BWP of the user equipment in a first serving cell, or the first BWP is a default BWP of the user equipment in a first serving cell, or the first BWP is a BWP configured by the network device for the user equipment, and the first BWP is used by the user equipment to perform random access in a first serving cell, or the first BWP is a BWP configured by the network device for the user equipment, and the first BWP is a BWP used by the user equipment to perform contention free random access in a first serving cell, or the first BWP is a BWP activated when the user equipment performs random access, or the first BWP is a BWP activated when the user equipment performs contention free random access.

S3605. The user equipment performs uplink transmission on the first BWP corresponding to the BWP identifier, where a physical resource used for the uplink transmission is a physical resource indicated by the UL grant.

Herein, steps 3501 to 3505 in FIG. 35 are implemented in steps S3601 to S3605. Details are not described again.

In this embodiment, the user equipment receives the control signaling sent by the network device, the user equipment sends the random access preamble to the network device on the default second BWP, the user equipment receives the RAR message and the BWP identifier that are sent by the network device, where the RAR message includes the UL grant, the RAR message is scheduled by using the first DCI, and the BWP identifier is carried in the first DCI, and the user equipment performs uplink transmission on the first BWP corresponding to the BWP identifier. In this way, the user equipment can perform uplink transmission on the first BWP indicated by the network device. The first BWP corresponding to the BWP identifier is consistent with the BWP indicated by the UL grant sent by the network device, so that uplink data can be effectively transmitted by using the UL grant in the RAR message.

Figure 37:
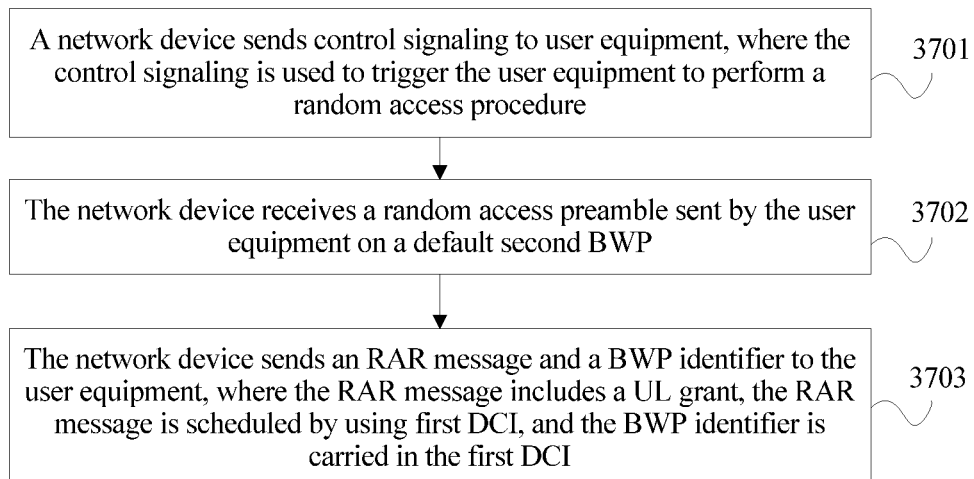
FIG. 37 is a schematic flowchart of another random access method according to an embodiment of the present invention.

FIG. 37 is a schematic flowchart of another random access method according to an embodiment of the present invention. As shown in FIG. 37, the method is specifically as follows:

3701. A network device sends control signaling to user equipment, where the control signaling is used to trigger the user equipment to perform a random access procedure.

In an optional implementation, the control signaling is a PDCCH order.

3702. The network device receives a random access preamble sent by the user equipment on a default second BWP.

3703. The network device sends an RAR message and a BWP identifier to the user equipment, where the RAR message includes a UL grant, the RAR message is scheduled by using first DCI, and the BWP identifier is carried in the first DCI.

For the method provided in this embodiment, refer to the methods in FIG. 35 and FIG. 36. Details are not described again.

Figure 38:
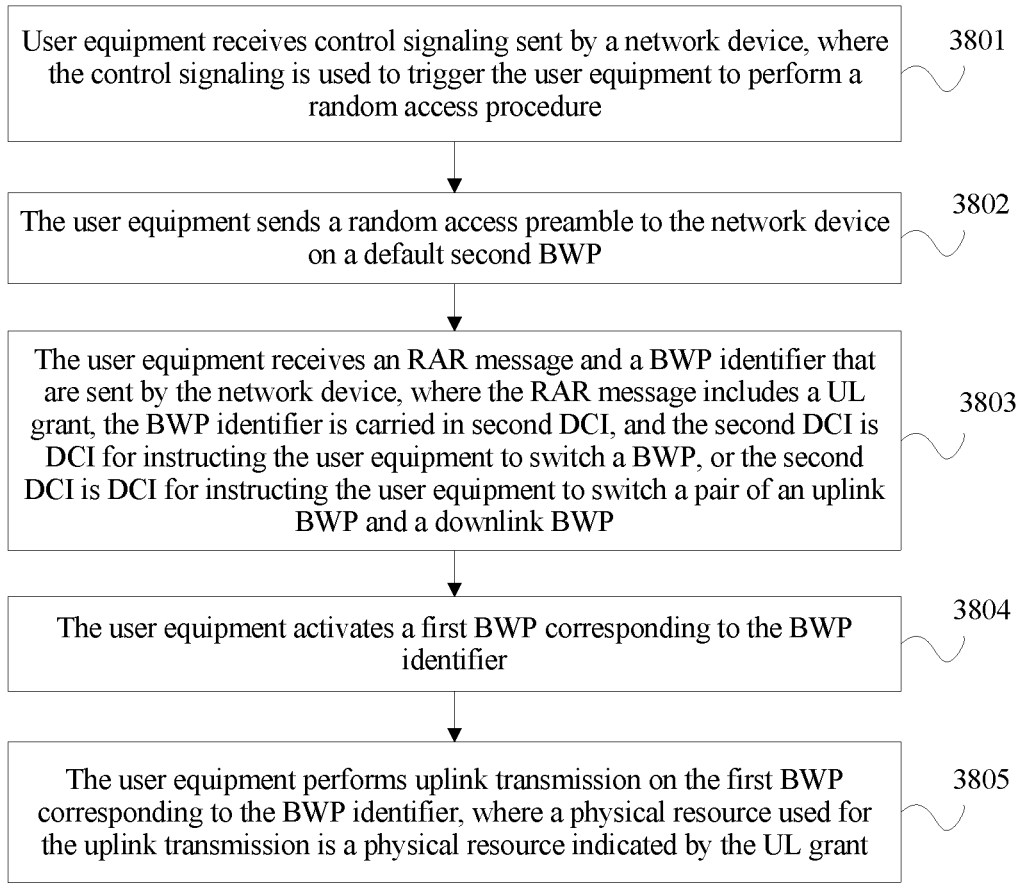
FIG. 38 is a schematic flowchart of another random access method according to an embodiment of the present invention.

FIG. 38 is a schematic flowchart of another random access method according to an embodiment of the present invention. As shown in FIG. 38, the method is specifically as follows:

3801. User equipment receives control signaling sent by a network device, where the control signaling is used to trigger the user equipment to perform a random access procedure.

In an optional implementation, the control signaling is a PDCCH order.

In this embodiment, for this step, refer to step 3201 in FIG. 32. Details are not described again.

3802. The user equipment sends a random access preamble to the network device on a default second BWP.

In this embodiment, for this step, refer to step 3202 in FIG. 32. Details are not described again.

3803. The user equipment receives an RAR message and a BWP identifier that are sent by the network device, where the RAR message includes a UL grant, the BWP identifier is carried in second DCI, and the second DCI is DCI for instructing the terminal device to switch a BWP, or the second DCI is DCI for instructing the terminal device to switch a pair of an uplink BWP and a downlink BWP.

In an optional implementation, a first BWP and the second BWP are uplink BWPs, and the first BWP and the second BWP may be a same BWP, or may be different BWPs. Step 3803 specifically includes receiving, by the user equipment on a third BWP, the RAR message sent by the network device, where the third BWP is a downlink BWP.

The third BWP is an active BWP in a second serving cell when the user equipment receives the control signaling in a first serving cell, or the third BWP is a BWP used when the user equipment receives the control signaling in a first serving cell.

In an optional implementation, a first BWP and the second BWP each are a BWP pair including an uplink BWP and a downlink BWP, and the first BWP and the second BWP may be a same BWP, or may be different BWPs. Step 3803 specifically includes receiving, by the user equipment on the uplink BWP of the second BWP, the RAR message sent by the network device.

In an optional implementation, step 3803 specifically includes receiving, by the user equipment on a fourth BWP, the RAR message sent by the network device, where the fourth BWP is a BWP pair including an uplink BWP and a downlink BWP.

The fourth BWP is an active BWP in a second serving cell when the user equipment receives the control signaling in a first serving cell, or the fourth BWP is a BWP used when the user equipment receives the control signaling in a first serving cell.

In an optional implementation, if the fourth BWP is a BWP used when the user equipment receives the control signaling in the first serving cell, after step 3802, the method further includes step 3806: The user equipment activates the fourth BWP, and deactivates the second BWP.

3804. The user equipment activates the first BWP corresponding to the BWP identifier.

In an optional implementation, the first BWP is a default BWP of the user equipment in the first serving cell, or the first BWP is a first active BWP of the user equipment in the first serving cell, or the first BWP is a default BWP of the user equipment in the first serving cell, or the first BWP is a BWP configured by the network device for the user equipment, and the first BWP is used by the user equipment to perform random access in the first serving cell, or the first BWP is a BWP configured by the network device for the user equipment, and the first BWP is a BWP used by the user equipment to perform contention free random access in the first serving cell, or the first BWP is a BWP activated when the user equipment performs random access, or the first BWP is a BWP activated when the user equipment performs contention free random access.

In this embodiment, for this step, refer to step 3204 in FIG. 32. Details are not described again.

3805. The user equipment performs uplink transmission on the first BWP corresponding to the BWP identifier, where a physical resource used for the uplink transmission is a physical resource indicated by the UL grant.

In this embodiment, for this step, refer to step 3205 in FIG. 32. Details are not described again.

Figure 39:
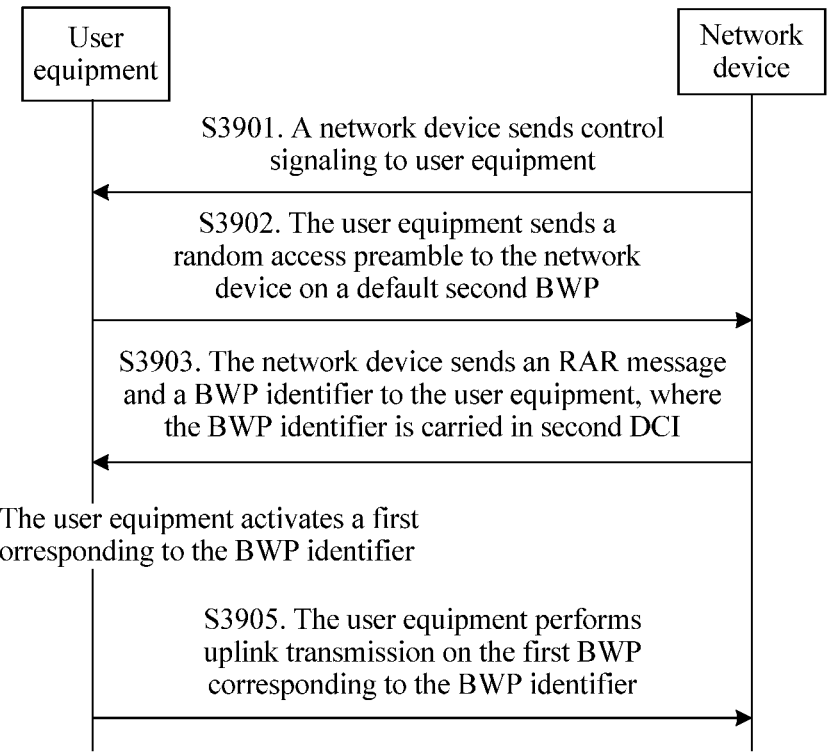
FIG. 39 is a signaling diagram of another random access method according to an embodiment of the present invention.

FIG. 39 is a signaling diagram of another random access method according to an embodiment of the present invention. As shown in FIG. 39, the method is specifically as follows:

S3901. A network device sends control signaling to user equipment, where the control signaling is used to trigger the user equipment to perform a random access procedure.

In an optional implementation, the control signaling is a PDCCH order.

S3902. The user equipment sends a random access preamble to the network device on a default second BWP.

S3903. The network device sends an RAR message and a BWP identifier to the user equipment, where the RAR message includes a UL grant, the BWP identifier is carried in second DCI, and the second DCI is DCI for instructing the terminal device to switch a BWP, or the second DCI is DCI for instructing the terminal device to switch a pair of an uplink BWP and a downlink BWP.

S3904. The user equipment activates a first BWP corresponding to the BWP identifier.

In an optional implementation, the first BWP is a default BWP of the user equipment in a first serving cell, or the first BWP is a first active BWP of the user equipment in a first serving cell, or the first BWP is a default BWP of the user equipment in a first serving cell, or the first BWP is a BWP configured by the network device for the user equipment, and the first BWP is used by the user equipment to perform random access in a first serving cell, or the first BWP is a BWP configured by the network device for the user equipment, and the first BWP is a BWP used by the user equipment to perform contention free random access in a first serving cell, or the first BWP is a BWP activated when the user equipment performs random access, or the first BWP is a BWP activated when the user equipment performs contention free random access.

S3905. The user equipment performs uplink transmission on the first BWP corresponding to the BWP identifier, where a physical resource used for the uplink transmission is a physical resource indicated by the UL grant.

Herein, steps 3801 to 3805 in FIG. 38 are implemented in steps S3901 to S3905. Details are not described again.

In this embodiment, the user equipment receives the control signaling sent by the network device, the user equipment sends the random access preamble to the network device on the default second BWP, the user equipment receives the RAR message and the BWP identifier that are sent by the network device, where the RAR message includes the UL grant, and the BWP identifier is carried in the second DCI, and the user equipment performs uplink transmission on the first BWP corresponding to the BWP identifier. In this way, the user equipment can perform uplink transmission on the first BWP indicated by the network device. The first BWP corresponding to the BWP identifier is consistent with the BWP indicated by the UL grant sent by the network device, so that uplink data can be effectively transmitted by using the UL grant in the RAR message.

Figure 40:
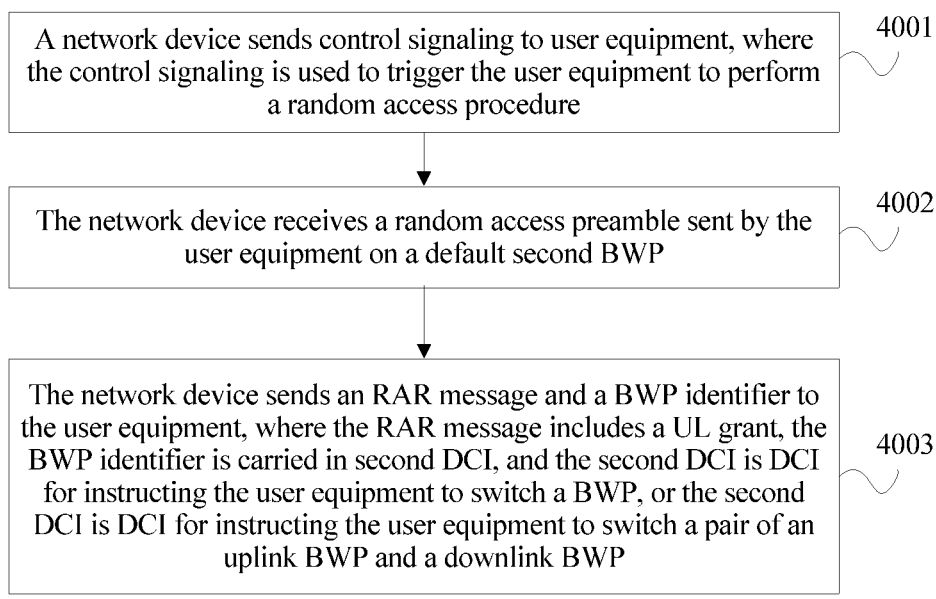
FIG. 40 is a schematic flowchart of another random access method according to an embodiment of the present invention.

FIG. 40 is a schematic flowchart of another random access method according to an embodiment of the present invention. As shown in FIG. 40, the method is specifically as follows:

4001. A network device sends control signaling to user equipment, where the control signaling is used to trigger the user equipment to perform a random access procedure.

In an optional implementation, the control signaling is a PDCCH order.

4002. The network device receives a random access preamble sent by the user equipment on a default second BWP.

4003. The network device sends an RAR message and a BWP identifier to the user equipment, where the RAR message includes a UL grant, the BWP identifier is carried in second DCI, and the second DCI is DCI for instructing the terminal device to switch a BWP, or the second DCI is DCI for instructing the terminal device to switch a pair of an uplink BWP and a downlink BWP.

For the method provided in this embodiment, refer to the methods in FIG. 38 and FIG. 39. Details are not described again.

Based on the contention free random access procedure in FIG. 4 or FIG. 5, in the scenario shown in FIG. 1b, the solutions of the embodiments of this application are as follows: The method provided below is not only applicable to a case in which user equipment is handed over from a source network device to a target network device, but also applicable to a case in which a network device configures dual connectivity for user equipment. For the case in which the user equipment is handed over from the source network device to the target network device, a first message in the following method may be, for example, a handover request message, and a second message may be, for example, a handover request acknowledgment message. For the case in which the network device configures dual connectivity for the user equipment, a first message in the following method may be, for example, a secondary node (secondary Node) addition request message, and a second message may be, for example, a secondary node secondary node addition request acknowledgment message.

Figure 41:
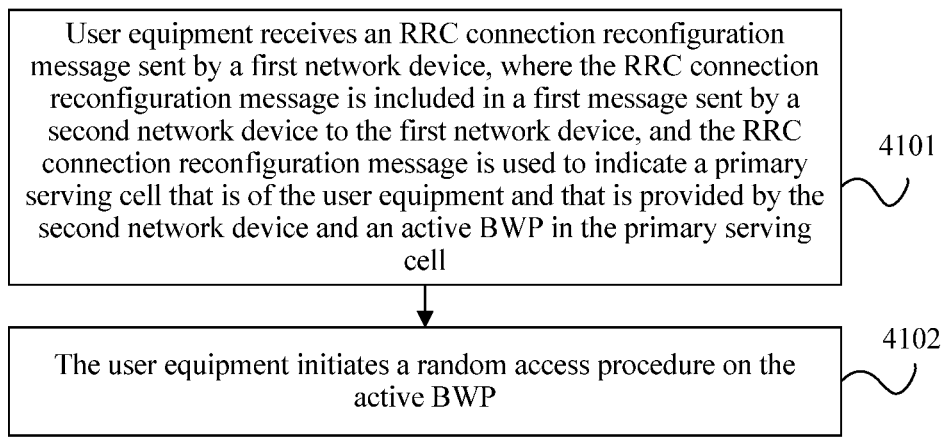
FIG. 41 is a schematic flowchart of another random access method according to an embodiment of the present invention.

FIG. 41 is a schematic flowchart of another random access method according to an embodiment of the present invention. As shown in FIG. 41, the method is specifically as follows:

4101. User equipment receives an RRC connection reconfiguration message sent by a first network device, where the RRC connection reconfiguration message is included in a first message sent by a second network device to the first network device, and the RRC connection reconfiguration message is used to indicate the primary serving cell under the second network device for the user equipment, and indicate an active BWP in the primary serving cell.

In an optional implementation, the first message is a response message sent by the second network device after the second network device receives a second message sent by the first network device, and the second message includes at least one of information about an uplink BWP or a BWP pair activated by the user equipment, information about all uplink BWPs or BWP pairs configured for the user equipment, and information about a logical channel of the user equipment, where the logical channel is a logical channel with a highest priority in all logical channels of the user equipment that have to-be-transmitted uplink data, or the logical channel is all logical channels of the user equipment that have to-be-transmitted uplink data, or the logical channel is all logical channels of the user equipment.

In an optional implementation, the information about the uplink BWP includes at least one of an identifier of the uplink BWP, a parameter set of a subcarrier spacing and a cyclic prefix length of the uplink BWP, and a bandwidth value of the uplink BWP, the information about the BWP pair includes at least one of an identifier of the BWP pair, a parameter set of a subcarrier spacing and a cyclic prefix length of the BWP pair, and a bandwidth value of the BWP pair, and the information about a logical channel includes at least one of an identifier of a logical channel, a parameter set, of a subcarrier spacing and a cyclic prefix length, to which each logical channel is mapped, a data radio bearer corresponding to each logical channel, and indication information, where the indication information indicates whether each logical channel or each corresponding data radio bearer has uplink data available for transmission.

In this embodiment, the network device configures at least one BWP for the user equipment in the secondary serving cell, and a PRACH resource is configured for each of the at least one BWP.

The first network device sends the second message to the second network device. The second message includes at least one of (1) the information about the uplink BWP or the BWP pair activated by the user equipment, (2) the information about all the uplink BWPs or the BWP pairs configured for the user equipment, (3) information about a logical channel of the user equipment, where the logical channel is a logical channel with a highest priority in all logical channels of the user equipment that have to-be-transmitted uplink data, (4) information about a logical channel of the user equipment, where the logical channel is all logical channels of the user equipment that have to-be-transmitted uplink data, and (5) information about a logical channel of the user equipment, where the logical channel is all logical channels of the user equipment.

Then the second network device sends the first message to the first network device. The first message includes the RRC connection reconfiguration message, the RRC connection reconfiguration message indicates the primary serving cell used by the user equipment in the second network device, and the RRC connection reconfiguration message indicates the active BWP of the user equipment in the primary serving cell.

The first network device sends the RRC connection reconfiguration message to the user equipment.

In an optional implementation, the active BWP is a BWP in common configuration information of the primary serving cell, or the RRC connection reconfiguration message includes a first BWP identifier, and a BWP corresponding to the first BWP identifier is the active BWP.

4102. The user equipment initiates a random access procedure on the active BWP.

In an optional implementation, there are the following implementations of step 4102:

In a first implementation of step 4102, the active BWP includes an uplink BWP and a downlink BWP, and step 4102 specifically includes the following steps:

4102 1*a*. The user equipment sends a random access preamble to the second network device on the uplink BWP in the active BWP.

4102 2*a*. The user equipment receives, on the downlink BWP in the active BWP, an RAR message sent by the second network device, where the RAR message includes a UL grant.

4102 3*a*. The user equipment performs uplink transmission on the uplink BWP in the active BWP, where a physical resource used for the uplink transmission is a physical resource indicated by the UL grant.

In this embodiment, the active BWP includes the uplink BWP and the downlink BWP. The user equipment may send the preamble to the second network device on the uplink BWP in the active BWP. Then the second network device sends the RAR message to the user equipment, where the RAR message includes the UL grant, and the UL grant is a UL grant corresponding to the uplink BWP in the active BWP. The user equipment receives the RAR message on the downlink BWP in the active BWP. Then the user equipment sends data or signaling to the second network device on the uplink BWP in the active BWP by using the physical resource indicated by the UL grant in the RAR message.

In a second implementation of step 4102, the active BWP is a BWP pair including an uplink BWP and a downlink BWP, step 4102 specifically includes the following steps:

4102*b*. The user equipment sends a random access preamble to the second network device on the uplink BWP of the BWP pair.

4102*b*. The user equipment receives, on the downlink BWP of the BWP pair, an RAR message sent by the second network device, where the RAR message includes a UL grant.

4102*b*. The user equipment performs uplink transmission on the uplink BWP of the BWP pair, where a physical resource used for the uplink transmission is a physical resource indicated by the UL grant.

In this embodiment, the active BWP is the BWP pair including an uplink BWP and a downlink BWP. The user equipment may send the preamble to the second network device on the uplink BWP of the BWP pair. Then the second network device sends the RAR message to the user equipment, where the RAR message includes the UL grant, and the UL grant is a UL grant corresponding to the uplink BWP of the BWP pair. The user equipment receives the RAR message on the downlink BWP of the BWP pair. Then the user equipment sends data or signaling to the second network device on the uplink BWP of the BWP pair by using the physical resource indicated by the UL grant in the RAR message.

Figure 42:
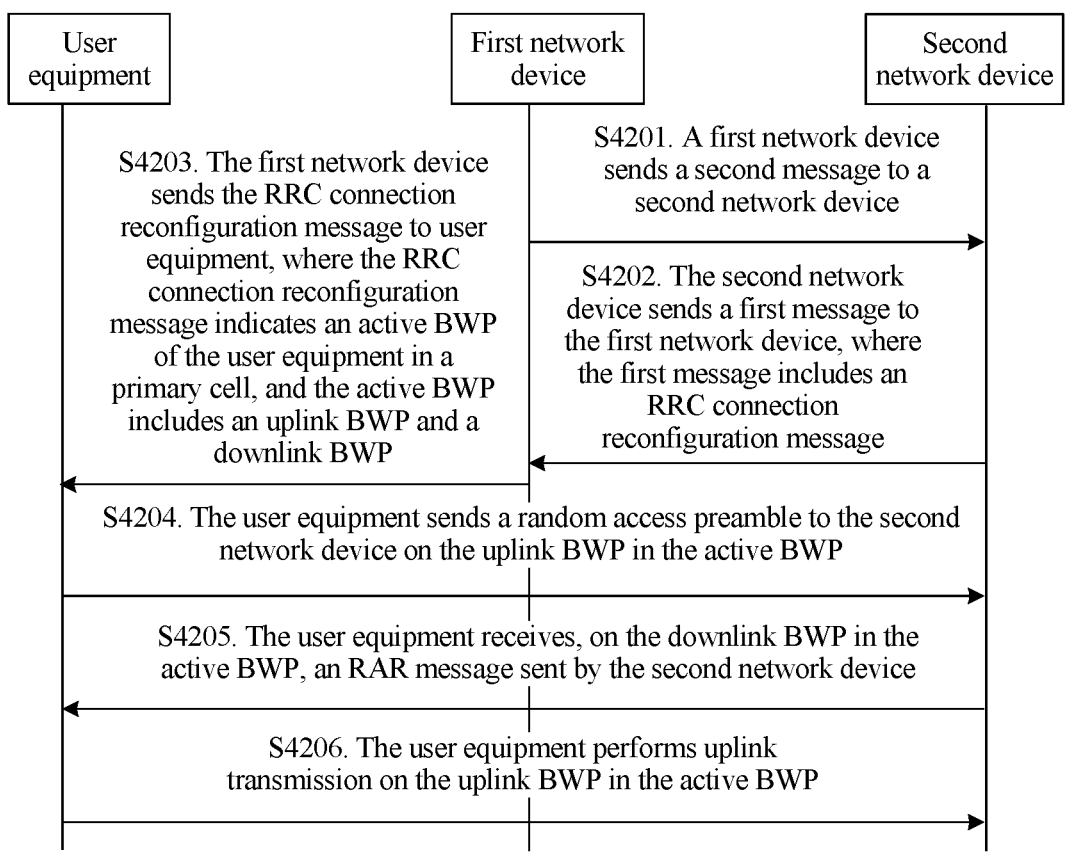
FIG. 42 is a signaling diagram 1 of another random access method according to an embodiment of the present invention.

FIG. 42 is a signaling diagram 1 of another random access method according to an embodiment of the present invention. As shown in FIG. 42, the method is specifically as follows:

S4201. A first network device sends a second message to a second network device.

In an optional implementation, the second message includes at least one of (1) information about an uplink BWP or a BWP pair activated by user equipment, (2) information about all uplink BWPs or BWP pairs configured for the user equipment, (3) information about a logical channel of the user equipment, where the logical channel is a logical channel with a highest priority in all logical channels of the user equipment that have to-be-transmitted uplink data, (4) information about a logical channel of the user equipment, where the logical channel is all logical channels of the user equipment that have to-be-transmitted uplink data, and (5) information about a logical channel of the user equipment, where the logical channel is all logical channels of the user equipment.

In an optional implementation, the information about the uplink BWP includes at least one of an identifier of the uplink BWP, a parameter set of a subcarrier spacing and a cyclic prefix length of the uplink BWP, and a bandwidth value of the uplink BWP, the information about the BWP pair includes at least one of an identifier of the BWP pair, a parameter set of a subcarrier spacing and a cyclic prefix length of the BWP pair, and a bandwidth value of the BWP pair, and the information about a logical channel includes at least one of an identifier of a logical channel, a parameter set, of a subcarrier spacing and a cyclic prefix length, to which each logical channel is mapped, a data radio bearer corresponding to each logical channel, and indication information, where the indication information indicates whether each logical channel or each corresponding data radio bearer has uplink data available for transmission.

S4202. The second network device sends a first message to the first network device, where the first message includes an RRC connection reconfiguration message, the RRC connection reconfiguration message indicates a primary serving cell used by the user equipment in the second network device, the RRC connection reconfiguration message indicates an active BWP of the user equipment in the primary serving cell, and the active BWP includes an uplink BWP and a downlink BWP.

In an optional implementation, the active BWP is a BWP in common configuration information of the primary serving cell, or the RRC connection reconfiguration message includes a first BWP identifier, and a BWP corresponding to the first BWP identifier is the active BWP.

S4203. The first network device sends the RRC connection reconfiguration message to the user equipment.

S4204. The user equipment sends a random access preamble to the second network device on the uplink BWP in the active BWP.

S4205. The user equipment receives, on the downlink BWP in the active BWP, an RAR message sent by the second network device, where the RAR message includes a UL grant.

S4206. The user equipment performs uplink transmission on the uplink BWP in the active BWP, where a physical resource used for the uplink transmission is a physical resource indicated by the UL grant.

Herein, steps S4201 to S4206 are step 401 and a first implementation of step 402 in FIG. 41. Details are not described again.

Figure 43:
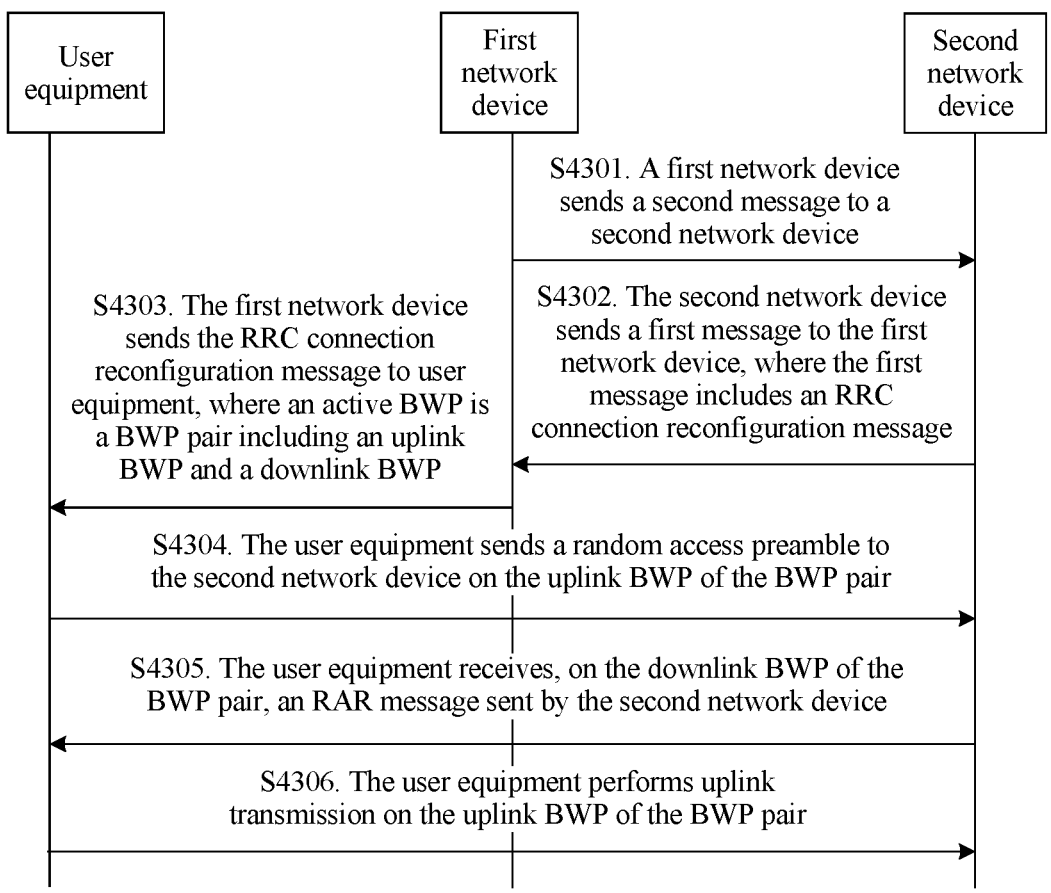
FIG. 43 is a signaling diagram 2 of another random access method according to an embodiment of the present invention.

FIG. 43 is a signaling diagram 2 of another random access method according to an embodiment of the present invention. As shown in FIG. 43, the method is specifically as follows:

S4301. A first network device sends a second message to a second network device.

In an optional implementation, the second message includes at least one of (1) information about an uplink BWP or a BWP pair activated by user equipment, (2) information about all uplink BWPs or BWP pairs configured for the user equipment, (3) information about a logical channel of the user equipment, where the logical channel is a logical channel with a highest priority in all logical channels of the user equipment that have to-be-transmitted uplink data, (4) information about a logical channel of the user equipment, where the logical channel is all logical channels of the user equipment that have to-be-transmitted uplink data, and (5) information about a logical channel of the user equipment, where the logical channel is all logical channels of the user equipment.

In an optional implementation, the information about the uplink BWP includes at least one of an identifier of the uplink BWP, a parameter set of a subcarrier spacing and a cyclic prefix length of the uplink BWP, and a bandwidth value of the uplink BWP, the information about the BWP pair includes at least one of an identifier of the BWP pair, a parameter set of a subcarrier spacing and a cyclic prefix length of the BWP pair, and a bandwidth value of the BWP pair, and the information about a logical channel includes at least one of an identifier of a logical channel, a parameter set, of a subcarrier spacing and a cyclic prefix length, to which each logical channel is mapped, a data radio bearer corresponding to each logical channel, and indication information, where the indication information indicates whether each logical channel or each corresponding data radio bearer has uplink data available for transmission.

S4302. The second network device sends a first message to the first network device, where the first message includes an RRC connection reconfiguration message, the RRC connection reconfiguration message indicates a primary serving cell used by the user equipment in the second network device, the RRC connection reconfiguration message indicates an active BWP of the user equipment in the primary serving cell, and the active BWP is a BWP pair including an uplink BWP and a downlink BWP.

In an optional implementation, the active BWP is a BWP in common configuration information of the primary serving cell, or the RRC connection reconfiguration message includes a first BWP identifier, and a BWP corresponding to the first BWP identifier is the active BWP.

S4303. The first network device sends the RRC connection reconfiguration message to the user equipment.

S4304. The user equipment sends a random access preamble to the second network device on the uplink BWP of the BWP pair.

S4305. The user equipment receives, on the downlink BWP of the BWP pair, an RAR message sent by the second network device, where the RAR message includes a UL grant.

S4306. The user equipment performs uplink transmission on the uplink BWP of the BWP pair, where a physical resource used for the uplink transmission is a physical resource indicated by the UL grant.

Herein, steps S4301 to S4306 are step 401 and a second implementation of step 402 in FIG. 41. Details are not described again.

In this embodiment, the user equipment receives the RRC connection reconfiguration message sent by the first network device, where the RRC connection reconfiguration message is used to indicate the primary serving cell of the user equipment in the second network device and the active BWP in the primary serving cell, and the user equipment initiates a random access procedure on the active BWP. In this way, the user equipment can complete the random access procedure based on the active BWP indicated by the network device. The active BWP is consistent with a BWP indicated by the UL grant sent by the network device, so that uplink data can be effectively transmitted by using the UL grant in the RAR message.

Figure 44:
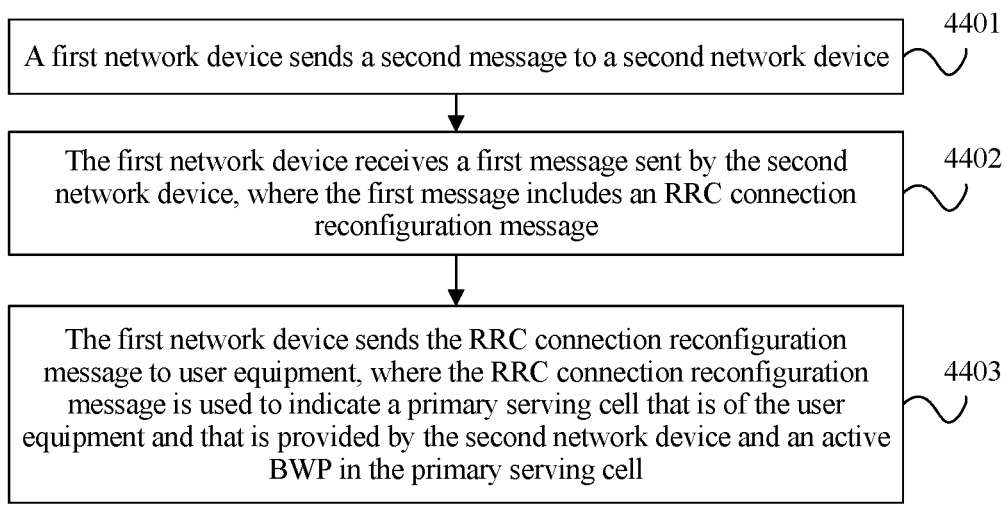
FIG. 44 is a schematic flowchart of another random access method according to an embodiment of the present invention.

FIG. 44 is a schematic flowchart of another random access method according to an embodiment of the present invention. As shown in FIG. 44, the method is specifically as follows:

4401. A first network device sends a second message to a second network device.

The second message includes at least one of information about an uplink BWP or a BWP pair activated by user equipment, information about all uplink BWPs or BWP pairs configured for the user equipment, and information about a logical channel of the user equipment, where the logical channel is a logical channel with a highest priority in all logical channels of the user equipment that have to-be-transmitted uplink data, or the logical channel is all logical channels of the user equipment that have to-be-transmitted uplink data, or the logical channel is all logical channels of the user equipment.

In an optional implementation, the information about the uplink BWP includes at least one of an identifier of the uplink BWP, a parameter set of a subcarrier spacing and a cyclic prefix length of the uplink BWP, and a bandwidth value of the uplink BWP, the information about the BWP pair includes at least one of an identifier of the BWP pair, a parameter set of a subcarrier spacing and a cyclic prefix length of the BWP pair, and a bandwidth value of the BWP pair, and the information about a logical channel includes at least one of an identifier of a logical channel, a parameter set, of a subcarrier spacing and a cyclic prefix length, to which each logical channel is mapped, a data radio bearer corresponding to each logical channel, and indication information, where the indication information indicates whether each logical channel or each corresponding data radio bearer has uplink data available for transmission.

4402. The first network device receives a first message sent by the second network device, where the first message includes an RRC connection reconfiguration message.

In an optional implementation, an active BWP is a BWP in common configuration information of a primary serving cell, or the RRC connection reconfiguration message includes a first BWP identifier, and a BWP corresponding to the first BWP identifier is an active BWP.

In an optional implementation, the active BWP includes an uplink BWP and a downlink BWP.

4403. The first network device sends the RRC connection reconfiguration message to the user equipment, where the RRC connection reconfiguration message is used to indicate the primary serving cell that is of the user equipment and that is provided by the second network device and the active BWP in the primary serving cell.

In an optional implementation, the active BWP is a BWP pair including an uplink BWP and a downlink BWP.

For the method provided in this embodiment, refer to the methods in FIG. 41 to FIG. 43. Details are not described again.

Figure 45:
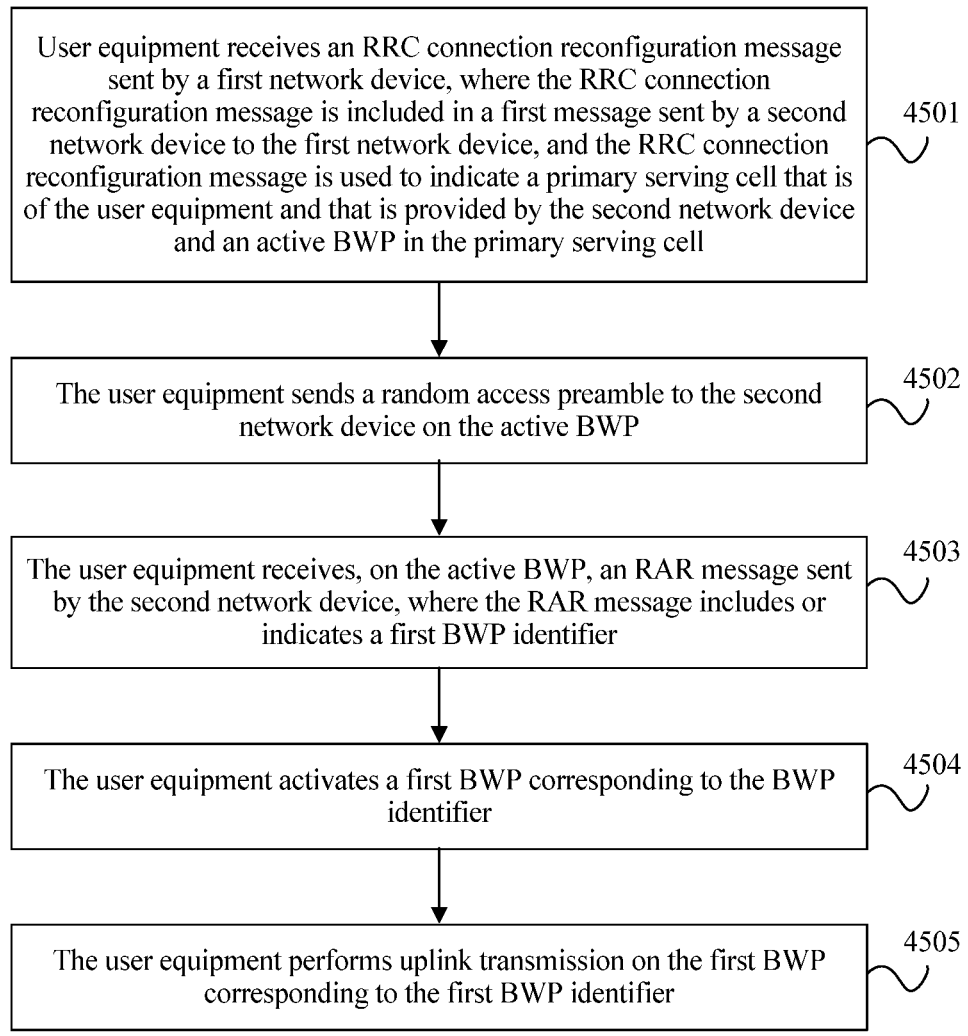
FIG. 45 is a schematic flowchart of another random access method according to an embodiment of the present invention.

FIG. 45 is a schematic flowchart of another random access method according to an embodiment of the present invention. As shown in FIG. 45, the method is specifically as follows:

4501. User equipment receives an RRC connection reconfiguration message sent by a first network device, where the RRC connection reconfiguration message is included in a first message sent by a second network device to the first network device, and the RRC connection reconfiguration message is used to indicate the primary serving cell under the second network device for the user equipment, and indicate an active BWP in the primary serving cell.

In an optional implementation, the first message is a response message sent by the second network device after the second network device receives a second message sent by the first network device, and the second message includes at least one of information about an uplink BWP or a BWP pair activated by the user equipment, information about all uplink BWPs or BWP pairs configured for the user equipment, and information about a logical channel of the user equipment, where the logical channel is a logical channel with a highest priority in all logical channels of the user equipment that have to-be-transmitted uplink data, or the logical channel is all logical channels of the user equipment that have to-be-transmitted uplink data, or the logical channel is all logical channels of the user equipment.

In an optional implementation, the information about the uplink BWP includes at least one of an identifier of the uplink BWP, a parameter set of a subcarrier spacing and a cyclic prefix length of the uplink BWP, and a bandwidth value of the uplink BWP, the information about the BWP pair includes at least one of an identifier of the BWP pair, a parameter set of a subcarrier spacing and a cyclic prefix length of the BWP pair, and a bandwidth value of the BWP pair, and the information about a logical channel includes at least one of an identifier of a logical channel, a parameter set, of a subcarrier spacing and a cyclic prefix length, to which each logical channel is mapped, a data radio bearer corresponding to each logical channel, and indication information, where the indication information indicates whether each logical channel or each corresponding data radio bearer has uplink data available for transmission.

In this embodiment, the network device configures at least one BWP for the user equipment in the secondary serving cell, but configures a PRACH resource for only one of the at least one BWP. The BWP for which a PRACH resource is configured is an initial active BWP or a default BWP.

The first network device sends the second message to the second network device. The second message includes at least one of (1) the information about the uplink BWP or the BWP pair activated by the user equipment, (2) the information about all the uplink BWPs or the BWP pairs configured for the user equipment, (3) information about a logical channel of the user equipment, where the logical channel is a logical channel with a highest priority in all logical channels of the user equipment that have to-be-transmitted uplink data, (4) information about a logical channel of the user equipment, where the logical channel is all logical channels of the user equipment that have to-be-transmitted uplink data, and (5) information about a logical channel of the user equipment, where the logical channel is all logical channels of the user equipment.

Then the second network device sends the first message to the first network device. The first message includes the RRC connection reconfiguration message, the RRC connection reconfiguration message indicates the primary serving cell used by the user equipment in the second network device, and the RRC connection reconfiguration message indicates the active BWP of the user equipment in the primary serving cell.

The first network device sends the RRC connection reconfiguration message to the user equipment.

In an optional implementation, the active BWP is a BWP in common configuration information of the primary serving cell, or the RRC connection reconfiguration message includes a first BWP identifier, and a BWP corresponding to the first BWP identifier is the active BWP.

4502. The user equipment sends a random access preamble to the second network device on the active BWP.

In this embodiment, the user equipment sends the preamble to the second network device on the active BWP.

4503. The user equipment receives, on the active BWP, an RAR message sent by the second network device, where the RAR message includes or indicates the first BWP identifier.

In an optional implementation, the RAR message includes a UL grant, and the UL grant includes or indicates the BWP identifier.

In this embodiment, the second network device sends the RAR message to the user equipment. The RAR message includes the first BWP identifier, or the RAR message indicates the first BWP identifier. The user equipment receives the RAR message on the active BWP.

4504. The user equipment activates a first BWP corresponding to the BWP identifier.

In an optional implementation, the first BWP is an uplink BWP, the active BWP includes an uplink BWP and a downlink BWP, and the first BWP and the uplink BWP in the active BWP may be a same BWP, or may be different BWPs, or the first BWP is a BWP pair including an uplink BWP and a downlink BWP, the active BWP is a BWP pair including an uplink BWP and a downlink BWP, and the first BWP and the active BWP may be a same BWP, or may be different BWPs.

In this embodiment, there are three cases as to whether the user equipment needs to activate the BWP corresponding to the BWP identifier.

In a first case, when the user equipment receives a PDCCH order, if the user equipment has no active BWP in a current serving cell, the user equipment needs to activate the BWP corresponding to the BWP identifier.

In a second case, when the user equipment receives a PDCCH order, if an active uplink BWP of the user equipment in a current first serving cell is another BWP, the user equipment switches to the BWP corresponding to the BWP identifier, in other words, the user equipment deactivates the another BWP, and activates the BWP corresponding to the BWP identifier.

In a third case, when the user equipment receives a PDCCH order, if an active uplink BWP of the user equipment in a current first serving cell is the BWP corresponding to the BWP identifier, the user equipment does not need to perform BWP switching.

In this step, in the first case or the second case, the user equipment needs to activate the BWP corresponding to the BWP identifier.

4505. The user equipment performs uplink transmission on the first BWP corresponding to the first BWP identifier.

In an optional implementation, a physical resource used for the uplink transmission is a physical resource indicated by the UL grant.

In this step, the user equipment sends data or signaling to the network device on the first BWP by using the physical resource indicated by the UL grant in the RAR message.

Figure 46:
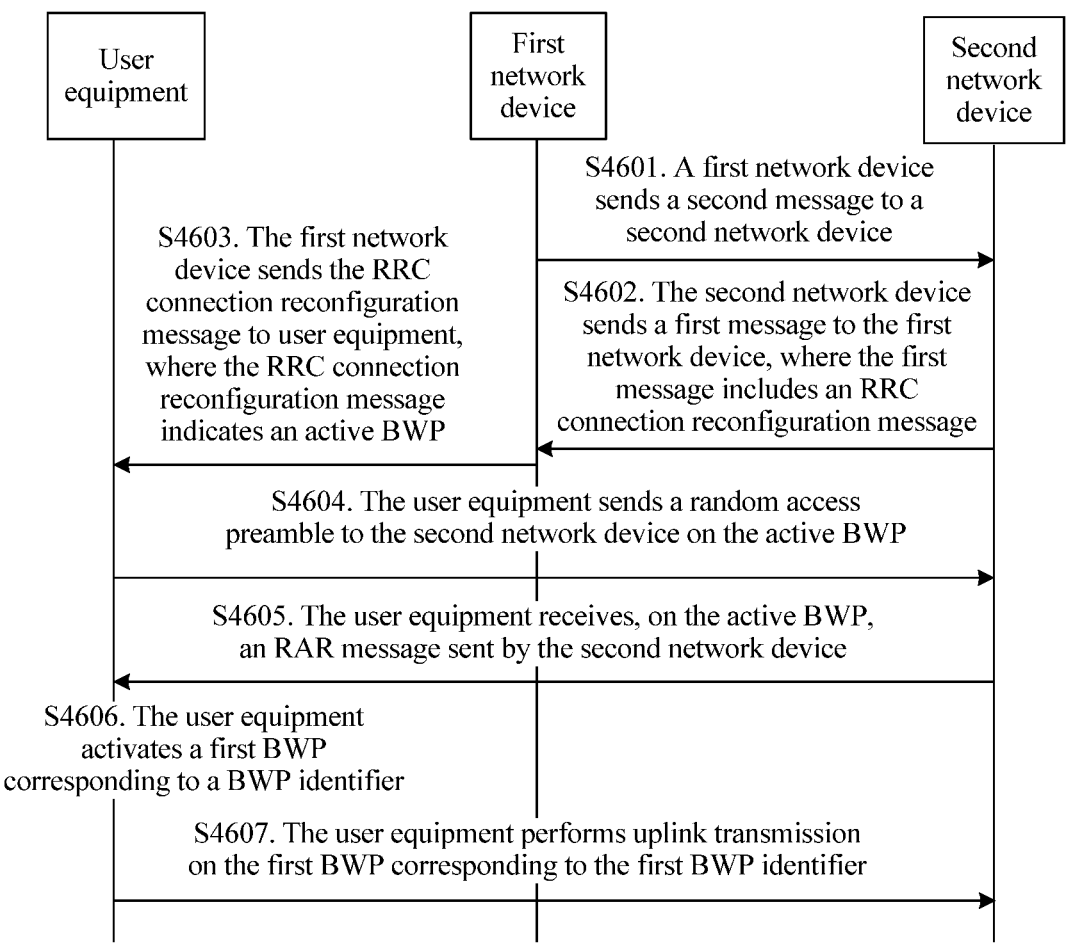
FIG. 46 is signaling of another random access method according to an embodiment of the present invention.

FIG. 46 is signaling of another random access method according to an embodiment of the present invention. As shown in FIG. 46, the method is specifically as follows:

S4601. A first network device sends a second message to a second network device, where the second message includes at least one of (1) information about an uplink BWP or a BWP pair activated by user equipment, (2) information about all uplink BWPs or BWP pairs configured for the user equipment, (3) information about a logical channel of the user equipment, where the logical channel is a logical channel with a highest priority in all logical channels of the user equipment that have to-be-transmitted uplink data, (4) information about a logical channel of the user equipment, where the logical channel is all logical channels of the user equipment that have to-be-transmitted uplink data, and (5) information about a logical channel of the user equipment, where the logical channel is all logical channels of the user equipment.

S4602. The second network device sends a first message to the first network device, where the first message includes an RRC connection reconfiguration message, the RRC connection reconfiguration message indicates a primary serving cell used by the user equipment in the second network device, and the RRC connection reconfiguration message indicates an active BWP of the user equipment in the primary serving cell.

S4603. The first network device sends the RRC connection reconfiguration message to the user equipment, where the RRC connection reconfiguration message is used to indicate the primary serving cell that is of the user equipment and that is provided by the second network device and the active BWP in the primary serving cell.

S4604. The user equipment sends a random access preamble to the second network device on the active BWP.

In this embodiment, the user equipment sends the preamble to the second network device on the active BWP.

S4605. The user equipment receives, on the active BWP, an RAR message sent by the second network device, where the RAR message includes or indicates a first BWP identifier.

S4606. The user equipment activates a first BWP corresponding to the BWP identifier.

S4607. The user equipment performs uplink transmission on the first BWP corresponding to the first BWP identifier.

Herein, steps S4601 to S4607 are steps 4501 to 4505 in FIG. 45. Details are not described again.

In this embodiment, the user equipment receives the RRC connection reconfiguration message sent by the first network device, where the RRC connection reconfiguration message is used to indicate the primary serving cell of the user equipment in the second network device and the active BWP in the primary serving cell, the user equipment sends the preamble to the second network device on the active BWP, the user equipment receives, on the active BWP, the RAR message and the first BWP identifier that are sent by the second network device, and the user equipment performs uplink transmission on the first BWP corresponding to the first BWP identifier. In this way, the user equipment can send the preamble to the second network device based on the active BWP indicated by the network device, and then the user equipment sends data or information to the network device based on the first BWP indicated by the network device. The first BWP is consistent with a BWP indicated by a UL grant sent by the network device, so that uplink data can be effectively transmitted by using the UL grant in the RAR message.

Figure 47:
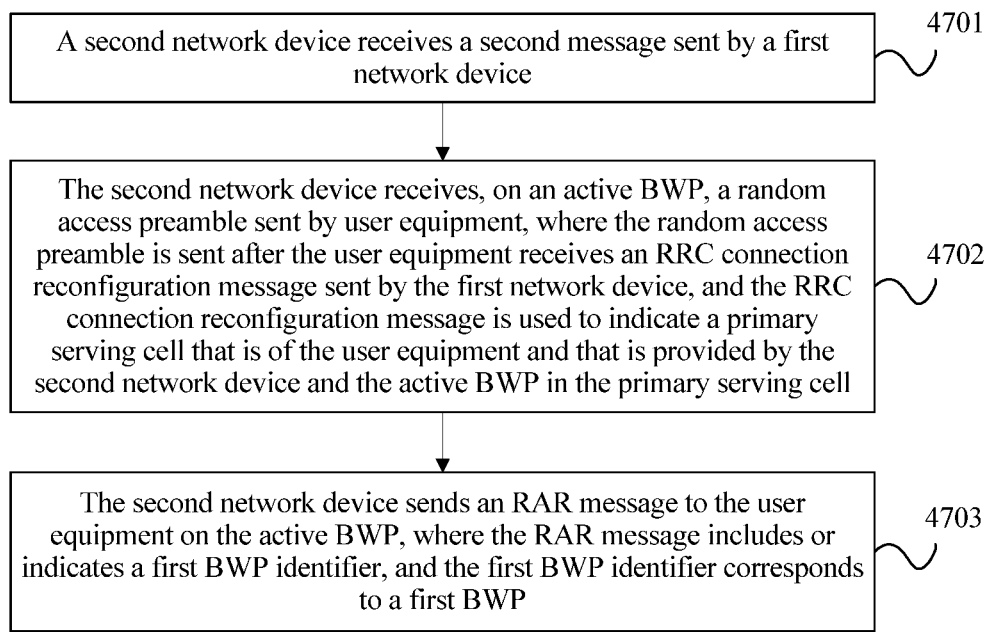
FIG. 47 is a schematic flowchart of another random access method according to an embodiment of the present invention.

FIG. 47 is a schematic flowchart of another random access method according to an embodiment of the present invention. As shown in FIG. 47, the method is specifically as follows:

4701. A second network device receives a second message sent by a first network device.

The second message includes at least one of information about an uplink BWP or a BWP pair activated by user equipment, information about all uplink BWPs or BWP pairs configured for the user equipment, and information about a logical channel of the user equipment, where the logical channel is a logical channel with a highest priority in all logical channels of the user equipment that have to-be-transmitted uplink data, or the logical channel is all logical channels of the user equipment that have to-be-transmitted uplink data, or the logical channel is all logical channels of the user equipment.

In an optional implementation method, the information about the uplink BWP includes at least one of an identifier of the uplink BWP, a parameter set of a subcarrier spacing and a cyclic prefix length of the uplink BWP, and a bandwidth value of the uplink BWP, the information about the BWP pair includes at least one of an identifier of the BWP pair, a parameter set of a subcarrier spacing and a cyclic prefix length of the BWP pair, and a bandwidth value of the BWP pair, and the information about a logical channel includes at least one of an identifier of a logical channel, a parameter set, of a subcarrier spacing and a cyclic prefix length, to which each logical channel is mapped, a data radio bearer corresponding to each logical channel, and indication information, where the indication information indicates whether each logical channel or each corresponding data radio bearer has uplink data available for transmission.

4702. The second network device receives, on an active BWP, a random access preamble sent by the user equipment, where the random access preamble is sent after the user equipment receives an RRC connection reconfiguration message sent by the first network device, and the RRC connection reconfiguration message is used to indicate the primary serving cell under the second network device for the user equipment, and indicate an active BWP in the primary serving cell.

In an optional implementation method, the active BWP is a BWP in common configuration information of the primary serving cell, or the RRC connection reconfiguration message includes a second BWP identifier, and a BWP corresponding to the second BWP identifier is the active BWP.

In an optional implementation method, the RAR message includes a UL grant, and the UL grant includes or indicates the BWP identifier.

4703. The second network device sends an RAR message to the user equipment on the active BWP, where the RAR message includes or indicates a first BWP identifier, and the first BWP identifier corresponds to a first BWP.

In an optional implementation method, a physical resource used for uplink transmission is a physical resource indicated by the UL grant.

In an optional implementation method, the first BWP is an uplink BWP, the active BWP includes an uplink BWP and a downlink BWP, and the first BWP and the uplink BWP in the active BWP may be a same BWP, or may be different BWPs.

In an optional implementation method, the first BWP is a BWP pair including an uplink BWP and a downlink BWP, the active BWP is a BWP pair including an uplink BWP and a downlink BWP, and the first BWP and the active BWP may be a same BWP, or may be different BWPs.

For the method provided in this embodiment, refer to the methods in FIG. 45 and FIG. 46. Details are not described again.

Figure 48:
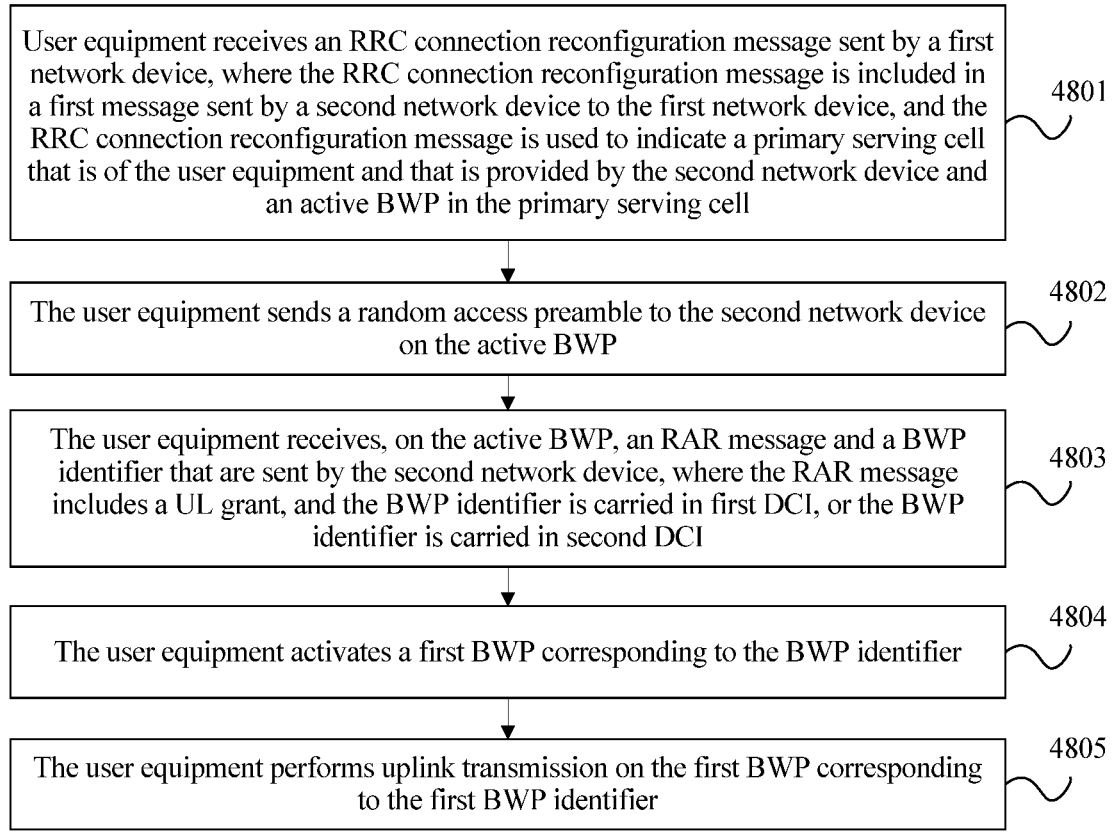
FIG. 48 is a schematic flowchart of another random access method according to an embodiment of the present invention.

FIG. 48 is a schematic flowchart of another random access method according to an embodiment of the present invention. As shown in FIG. 48, the method is specifically as follows:

4801. User equipment receives an RRC connection reconfiguration message sent by a first network device, where the RRC connection reconfiguration message is included in a first message sent by a second network device to the first network device, and the RRC connection reconfiguration message is used to indicate the primary serving cell under the second network device for the user equipment, and indicate an active BWP in the primary serving cell.

In this embodiment, for this step, refer to step 4501 in FIG. 45. Details are not described again.

4802. The user equipment sends a random access preamble to the second network device on the active BWP.

In this embodiment, for this step, refer to step 4502 in FIG. 45. Details are not described again.

4803. The user equipment receives, on the active BWP, an RAR message and a BWP identifier that are sent by the second network device, where the RAR message includes a UL grant, the RAR message is scheduled by using first DCI, and the BWP identifier is carried in the first DCI, or the user equipment receives, on the active BWP, an RAR message and a BWP identifier that are sent by the second network device, where the RAR message includes a UL grant, the BWP identifier is carried in second DCI, and the second DCI is DCI for instructing the terminal device to switch a BWP, or the second DCI is DCI for instructing the terminal device to switch a pair of an uplink BWP and a downlink BWP.

4804. The user equipment activates a first BWP corresponding to the BWP identifier.

In this embodiment, there are three cases as to whether the user equipment needs to activate the first BWP.

In a first case, if the BWP identifier is an identifier of the active BWP in step 4801, the first BWP corresponding to the BWP is the active BWP in step 4801, and it may be determined that the UL grant included in the RAR message is a UL grant corresponding to the active BWP, in step 4801, of the user equipment in a first serving cell. In this case, the user equipment does not need to perform BWP switching, in other words, the first BWP is in an active state, and the user equipment does not need to further activate the first BWP. In this case, the user equipment may send data or signaling to the network device on the active BWP of the first serving cell in step 4801 based on the UL grant in the RAR message.

In a second case, if the BWP identifier is not an identifier of the active BWP in step 4801, the first BWP corresponding to the BWP is different from the active BWP in step 4801, and it may be determined that the UL grant included in the RAR message is a UL grant corresponding to the first BWP of the user equipment in a first serving cell. In this case, the user equipment needs to switch to the first BWP, in other words, deactivate the active BWP in step 4801, and activate the first BWP. In this case, the user equipment may send data or signaling to the network device on the first BWP of the first serving cell based on the UL grant in the RAR message.

In this step, in the second case, the user equipment needs to activate the first BWP corresponding to the BWP identifier.

In addition, in the second case, after the user equipment determines that the RAR message is received, the user equipment needs to switch to the first BWP when determining that an identifier that is of a preamble and that is included in the RAR message is an identifier of the preamble sent by the user equipment.

4805. The user equipment performs uplink transmission on the first BWP corresponding to the first BWP identifier.

For this step, refer to step 4505 in FIG. 45. Details are not described again.

Figure 49:
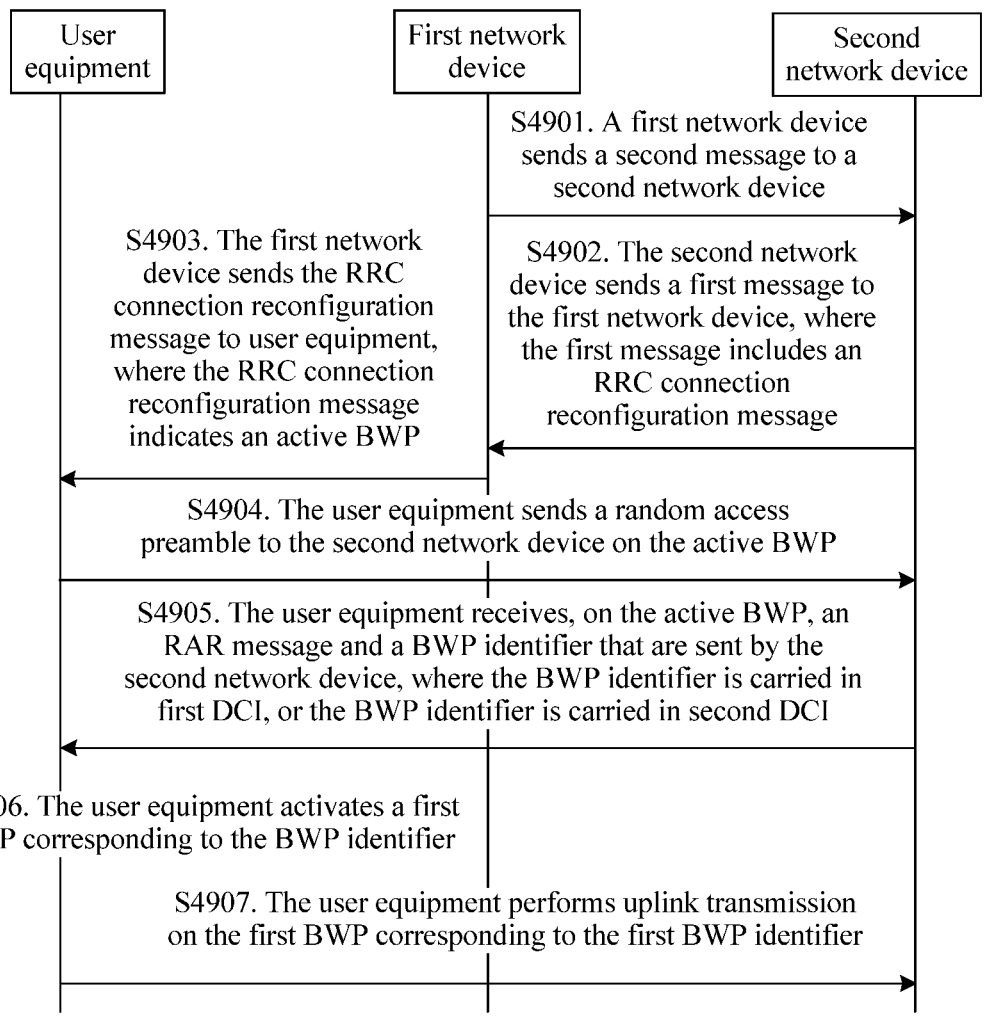
FIG. 49 is signaling of another random access method according to an embodiment of the present invention.

FIG. 49 is signaling of another random access method according to an embodiment of the present invention. As shown in FIG. 49, the method is specifically as follows:

S4901. A first network device sends a second message to a second network device, where the second message includes at least one of (1) information about an uplink BWP or a BWP pair activated by user equipment, (2) information about all uplink BWPs or BWP pairs configured for the user equipment, (3) information about a logical channel of the user equipment, where the logical channel is a logical channel with a highest priority in all logical channels of the user equipment that have to-be-transmitted uplink data, (4) information about a logical channel of the user equipment, where the logical channel is all logical channels of the user equipment that have to-be-transmitted uplink data, and (5) information about a logical channel of the user equipment, where the logical channel is all logical channels of the user equipment.

S4902. The second network device sends a first message to the first network device, where the first message includes an RRC connection reconfiguration message, the RRC connection reconfiguration message indicates a primary serving cell used by the user equipment in the second network device, and the RRC connection reconfiguration message indicates an active BWP of the user equipment in the primary serving cell.

S4903. The first network device sends the RRC connection reconfiguration message to the user equipment, where the RRC connection reconfiguration message is used to indicate the primary serving cell that is of the user equipment and that is provided by the second network device and the active BWP in the primary serving cell.

S4904. The user equipment sends a random access preamble to the second network device on the active BWP.

In this embodiment, the user equipment sends the preamble to the second network device on the active BWP.

S4905. The user equipment receives, on the active BWP, an RAR message and a BWP identifier that are sent by the second network device, where the RAR message includes a UL grant, the RAR message is scheduled by using first DCI, and the BWP identifier is carried in the first DCI, or the user equipment receives, on the active BWP, an RAR message and a BWP identifier that are sent by the second network device, where the RAR message includes a UL grant, the BWP identifier is carried in second DCI, and the second DCI is DCI for instructing the terminal device to switch a BWP, or the second DCI is DCI for instructing the terminal device to switch a pair of an uplink BWP and a downlink BWP.

S4906. The user equipment activates a first BWP corresponding to the BWP identifier.

S4907. The user equipment performs uplink transmission on the first BWP corresponding to the first BWP identifier.

Herein, steps S4901 to S4907 are steps 4801 to 4805 in FIG. 48. Details are not described again.

In this embodiment, the user equipment receives the RRC connection reconfiguration message sent by the first network device, where the RRC connection reconfiguration message is used to indicate the primary serving cell of the user equipment in the second network device and the active BWP in the primary serving cell, the user equipment sends the preamble to the second network device on the active BWP, the user equipment receives, on the active BWP, the RAR message and the first BWP identifier that are sent by the second network device, and the user equipment performs uplink transmission on the first BWP corresponding to the first BWP identifier. In this way, the user equipment can send the preamble to the second network device based on the active BWP indicated by the network device, and then the user equipment sends data or information to the network device based on the first BWP indicated by the network device. The first BWP is consistent with a BWP indicated by the UL grant sent by the network device, so that uplink data can be effectively transmitted by using the UL grant in the RAR message.

Figure 50:
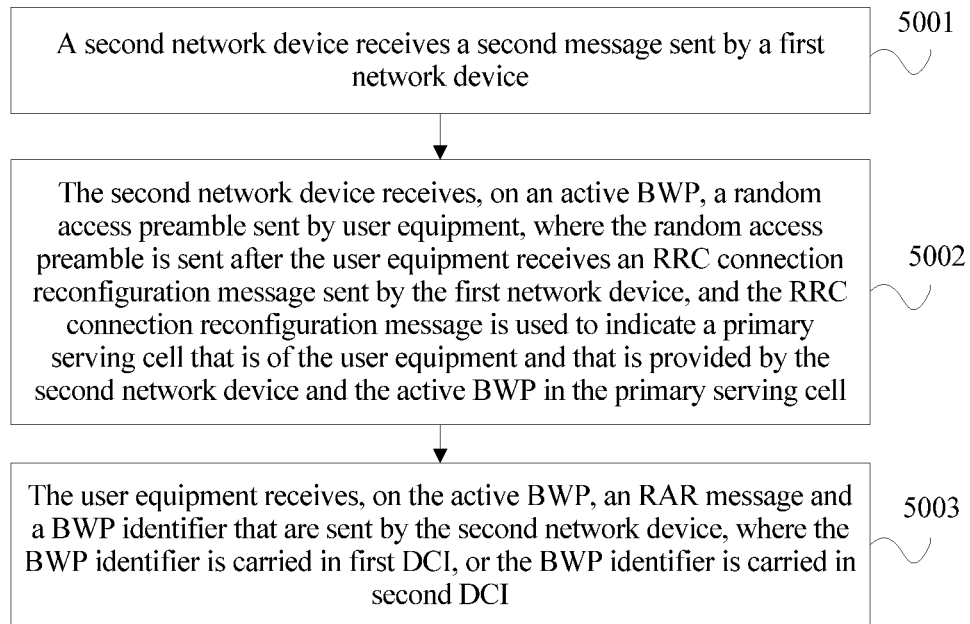
FIG. 50 is a schematic flowchart of another random access method according to an embodiment of the present invention.

FIG. 50 is a schematic flowchart of another random access method according to an embodiment of the present invention. As shown in FIG. 50, the method is specifically as follows:

5001. A second network device receives a second message sent by a first network device.

The second message includes at least one of information about an uplink BWP or a BWP pair activated by user equipment, information about all uplink BWPs or BWP pairs configured for the user equipment, and information about a logical channel of the user equipment, where the logical channel is a logical channel with a highest priority in all logical channels of the user equipment that have to-be-transmitted uplink data, or the logical channel is all logical channels of the user equipment that have to-be-transmitted uplink data, or the logical channel is all logical channels of the user equipment.

In an optional implementation method, the information about the uplink BWP includes at least one of an identifier of the uplink BWP, a parameter set of a subcarrier spacing and a cyclic prefix length of the uplink BWP, and a bandwidth value of the uplink BWP, the information about the BWP pair includes at least one of an identifier of the BWP pair, a parameter set of a subcarrier spacing and a cyclic prefix length of the BWP pair, and a bandwidth value of the BWP pair, and the information about a logical channel includes at least one of an identifier of a logical channel, a parameter set, of a subcarrier spacing and a cyclic prefix length, to which each logical channel is mapped, a data radio bearer corresponding to each logical channel, and indication information, where the indication information indicates whether each logical channel or each corresponding data radio bearer has uplink data available for transmission.

5002. The second network device receives, on an active BWP, a random access preamble sent by the user equipment, where the random access preamble is sent after the user equipment receives an RRC connection reconfiguration message sent by the first network device, and the RRC connection reconfiguration message is used to indicate the primary serving cell under the second network device for the user equipment, and indicate an active BWP in the primary serving cell.

In an optional implementation method, the active BWP is a BWP in common configuration information of the primary serving cell, or the RRC connection reconfiguration message includes a second BWP identifier, and a BWP corresponding to the second BWP identifier is the active BWP.

In an optional implementation method, the RAR message includes the UL grant, and the UL grant includes or indicates the BWP identifier.

5003. The user equipment receives, on the active BWP, an RAR message and a BWP identifier that are sent by the second network device, where the RAR message includes a UL grant, the RAR message is scheduled by using first DCI, and the BWP identifier is carried in the first DCI, or the user equipment receives, on the active BWP, an RAR message and a BWP identifier that are sent by the second network device, where the RAR message includes a UL grant, the BWP identifier is carried in second DCI, and the second DCI is DCI for instructing the terminal device to switch a BWP, or the second DCI is DCI for instructing the terminal device to switch a pair of an uplink BWP and a downlink BWP.

In an optional implementation method, a physical resource used for uplink transmission is a physical resource indicated by the UL grant.

In an optional implementation method, a first BWP is an uplink BWP, the active BWP includes an uplink BWP and a downlink BWP, and the first BWP and the uplink BWP in the active BWP may be a same BWP, or may be different BWPs.

In an optional implementation method, a first BWP is a BWP pair including an uplink BWP and a downlink BWP, the active BWP is a BWP pair including an uplink BWP and a downlink BWP, and the first BWP and the active BWP may be a same BWP, or may be different BWPs.

For the method provided in this embodiment, refer to the methods in FIG. 48 and FIG. 49. Details are not described again.

Figure 51:
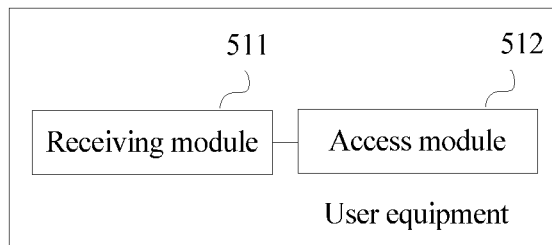
FIG. 51 is a schematic structural diagram of user equipment according to an embodiment of this application.

FIG. 51 is a schematic structural diagram of user equipment according to an embodiment of this application. As shown in FIG. 51, the user equipment includes a receiving module 511, configured to receive control signaling sent by a network device, where the control signaling is used to trigger the user equipment to perform a random access procedure, and the control signaling includes or indicates a BWP identifier, and an access module 512, configured to initiate a random access procedure based on the control signaling.

In an optional implementation, the control signaling is a PDCCH order.

In an optional implementation, the access module 512 is specifically configured to: initiate the random access procedure on a BWP corresponding to the BWP identifier.

In an optional implementation, the user equipment further includes an activation module, configured to activate the BWP before the access module 512 initiates the random access procedure based on the control signaling.

In an optional implementation, the BWP is an uplink BWP, and the access module 512 includes a first sending submodule, configured to send a random access preamble to the network device on the uplink BWP, a first receiving submodule, configured to receive a first RAR message sent by the network device, where the first RAR message includes a first UL grant, and a first transmission submodule, configured to perform uplink transmission on the uplink BWP, where a physical resource used for the uplink transmission is a physical resource indicated by the first UL grant.

In an optional implementation, the BWP is a BWP pair including an uplink BWP and a downlink BWP, and the access module 512 includes a second sending submodule, configured to send a random access preamble to the network device on the uplink BWP of the BWP, a second receiving submodule, configured to receive a second RAR message sent by the network device, where the second RAR message includes a second UL grant, and a second transmission submodule, configured to perform transmission on the uplink BWP of the BWP, where a physical resource used for the transmission is a physical resource indicated by the second UL grant.

In an optional implementation, the control signaling received by the user equipment in any serving cell includes the BWP identifier, or the control signaling received by the user equipment in any serving cell includes the BWP identifier, where at least two uplink BWPs are configured for the user equipment in at least one secondary serving cell, and a random access channel is configured for each of the at least two uplink BWPs, or the control signaling received by the user equipment in a secondary serving cell includes the BWP identifier, or the control signaling received by the user equipment in at least one secondary serving cell includes the BWP identifier, where at least two uplink BWPs are configured for the user equipment in the at least one secondary serving cell, and a random access channel is configured for each of the at least two uplink BWPs.

The user equipment in this embodiment may be configured to perform the technical solutions of the embodiments shown in FIG. 6 to FIG. 10 in the foregoing methods. Implementation principles and technical effects of the user equipment are similar to those in the foregoing embodiments, and details are not described herein again.

Figure 52:
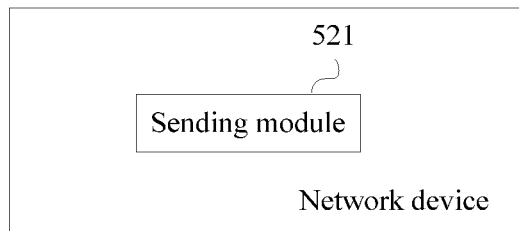
FIG. 52 is a schematic structural diagram of a network device according to an embodiment of this application.

FIG. 52 is a schematic structural diagram of a network device according to an embodiment of this application. As shown in FIG. 52, the network device includes a sending module 521, configured to send control signaling to user equipment, where the control signaling is used to trigger the user equipment to perform a random access procedure, and the control signaling includes or indicates a BWP identifier.

In an optional implementation, the control signaling is a PDCCH order.

In an optional implementation, a BWP corresponding to the BWP identifier is an uplink BWP.

In an optional implementation, a BWP corresponding to the BWP identifier is a BWP pair including an uplink BWP and a downlink BWP.

The network device in this embodiment may be configured to perform the technical solutions of the embodiment shown in FIG. 11 in the foregoing methods. Implementation principles and technical effects of the network device are similar to those in the foregoing embodiment, and details are not described herein again.

Figure 53:
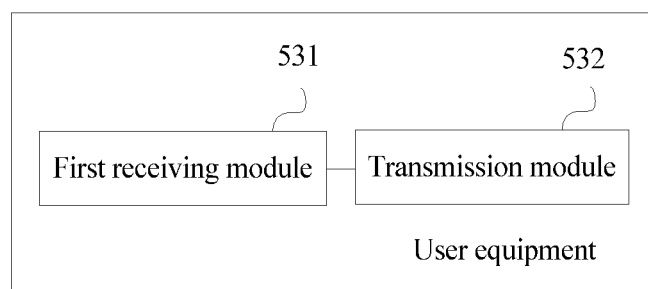
FIG. 53 is a schematic structural diagram of another user equipment according to an embodiment of this application.

FIG. 53 is a schematic structural diagram of another user equipment according to an embodiment of this application. As shown in FIG. 53, the user equipment includes a first receiving module 531, configured to receive an RAR message sent by a network device, where the RAR message includes or indicates a BWP identifier, and a transmission module 532, configured to perform uplink transmission on a first BWP corresponding to the BWP identifier.

In an optional implementation, the RAR message includes a UL grant, and the UL grant includes or indicates the BWP identifier.

In an optional implementation, a physical resource used for the uplink transmission is a physical resource indicated by the UL grant.

In an optional implementation, the user equipment further includes a first activation module, configured to activate the first BWP before the transmission module 532 performs uplink transmission on the first BWP corresponding to the BWP identifier.

In an optional implementation, the user equipment further includes a second receiving module, configured to: before the first receiving module 531 receives the RAR message sent by the network device, receive control signaling sent by the network device, where the control signaling is used to trigger the user equipment to perform a random access procedure, and a sending module, configured to send a random access preamble to the network device on a second BWP.

In an optional implementation, the control signaling is a PDCCH order.

In an optional implementation, the user equipment further includes a second activation module, configured to activate the second BWP before the sending module sends the random access preamble to the network device on the second BWP.

In an optional implementation, the control signaling includes an identifier of the second BWP.

In an optional implementation, the control signaling received by the user equipment in any serving cell includes the identifier of the second BWP, or the control signaling received by the user equipment in any serving cell includes the identifier of the second BWP, where at least two uplink BWPs are configured for the user equipment in at least one secondary serving cell, and a random access channel is configured for each of the at least two uplink BWPs, or the control signaling received by the user equipment in a secondary serving cell includes the identifier of the second BWP, or the control signaling received by the user equipment in at least one secondary serving cell includes the identifier of the second BWP, where at least two uplink BWPs are configured for the user equipment in the at least one secondary serving cell, and a random access channel is configured for each of the at least two uplink BWPs.

In an optional implementation, the second BWP is a BWP of the user equipment in a first serving cell, and the first serving cell is a serving cell used when the user equipment receives the control signaling, or the first serving cell is a serving cell scheduled by using a second serving cell used when the user equipment receives the control signaling.

In an optional implementation, the first BWP is an initial active BWP of the user equipment in the first serving cell, or the first BWP is a first active BWP of the user equipment in the first serving cell, or the first BWP is a default BWP of the user equipment in the first serving cell, or the first BWP is a BWP configured by the network device for the user equipment, and the first BWP is used by the user equipment to perform random access in the first serving cell, or the first BWP is a BWP configured by the network device for the user equipment, and the first BWP is a BWP used by the user equipment to perform contention free random access in the first serving cell, or the first BWP is a BWP activated when the user equipment performs random access, or the first BWP is a BWP activated when the user equipment performs contention free random access.

In an optional implementation, the first BWP and the second BWP are uplink BWPs, and the first BWP and the second BWP may be a same BWP, or may be different BWPs. The first receiving module 531 is specifically configured to: receive, on a third BWP, the RAR message sent by the network device, where the third BWP is a downlink BWP, where the third BWP is an active BWP in the second serving cell when the user equipment receives the control signaling in the first serving cell, or the third BWP is a BWP used when the user equipment receives the control signaling in the first serving cell.

In an optional implementation, the first BWP and the second BWP each are a BWP pair including an uplink BWP and a downlink BWP, and the first BWP and the second BWP may be a same BWP, or may be different BWPs. The first receiving module 531 is specifically configured to: receive, on the uplink BWP of the second BWP, the RAR message sent by the network device.

In an optional implementation, the first receiving module 531 is specifically configured to: receive, on a fourth BWP, the RAR message sent by the network device, where the fourth BWP is a BWP pair including an uplink BWP and a downlink BWP, where the fourth BWP is an active BWP in the second serving cell when the user equipment receives the control signaling in the first serving cell, or the fourth BWP is a BWP used when the user equipment receives the control signaling in the first serving cell.

In an optional implementation, if the fourth BWP is a BWP used when the user equipment receives the control signaling in the first serving cell, the user equipment further includes a third activation module, configured to: after the sending module sends the random access preamble to the network device on the second BWP, activate the fourth BWP, and deactivate the second BWP.

The user equipment in this embodiment may be configured to perform the technical solutions of the embodiments shown in FIG. 12 to FIG. 15, or FIG. 17 and FIG. 18, or FIG. 20 and FIG. 21, or FIG. 23 and FIG. 24, or FIG. 26 and FIG. 27, or FIG. 29 and FIG. 30, or FIG. 32 and FIG. 33, or FIG. 35 and FIG. 36, or FIG. 38 and FIG. 39 in the foregoing methods. Implementation principles and technical effects of the user equipment are similar to those in the foregoing embodiments, and details are not described herein again.

Figure 54:
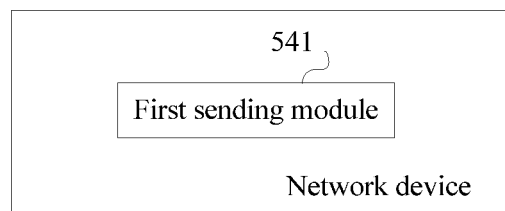
FIG. 54 is a schematic structural diagram of another network device according to an embodiment of this application.

FIG. 54 is a schematic structural diagram of another network device according to an embodiment of this application. As shown in FIG. 54, the network device includes a first sending module 541, configured to send an RAR message to user equipment, where the RAR message includes or indicates a BWP identifier, and the BWP identifier corresponds to a first BWP.

In an optional implementation, the RAR message includes a UL grant, and the UL grant includes or indicates the BWP identifier.

In an optional implementation, the network device further includes a second sending module, configured to: before the first sending module 541 sends the RAR message to the user equipment, send control signaling to the user equipment, where the control signaling is used to trigger the user equipment to perform a random access procedure.

In an optional implementation, the control signaling is a PDCCH order.

In an optional implementation, the control signaling includes an identifier of a second BWP.

In an optional implementation, the second BWP is a BWP in a first serving cell of the user equipment, and the first serving cell is a serving cell used when the user equipment receives the control signaling, or the first serving cell is a serving cell scheduled by using a second serving cell used when the user equipment receives the control signaling.

In an optional implementation, the first BWP is an initial active BWP of the user equipment in the first serving cell, or the first BWP is a first active BWP of the user equipment in the first serving cell, or the first BWP is a default BWP of the user equipment in the first serving cell, or the first BWP is a BWP configured by the network device for the user equipment, and the first BWP is used by the user equipment to perform random access in the first serving cell, or the first BWP is a BWP configured by the network device for the user equipment, and the first BWP is a BWP used by the user equipment to perform contention free random access in the first serving cell, or the first BWP is a BWP activated when the user equipment performs random access, or the first BWP is a BWP activated when the user equipment performs contention free random access.

In an optional implementation, the first BWP and the second BWP are uplink BWPs, and the first BWP and the second BWP may be a same BWP, or may be different BWPs. The first sending module 541 is specifically configured to: send the RAR message to the user equipment on a third BWP, where the third BWP is a downlink BWP, where the third BWP is an active BWP in the second serving cell when the user equipment receives the control signaling in the first serving cell, or the third BWP is a BWP used when the user equipment receives the control signaling in the first serving cell.

In an optional implementation, the first BWP and the second BWP each are a BWP pair including an uplink BWP and a downlink BWP, and the first BWP and the second BWP may be a same BWP, or may be different BWPs. The first sending module 541 is specifically configured to: send the RAR message to the user equipment on the uplink BWP of the second BWP.

In an optional implementation, the first sending module 541 is specifically configured to: send the RAR message to the user equipment on a fourth BWP, where the fourth BWP is a BWP pair including an uplink BWP and a downlink BWP, where the fourth BWP is an active BWP in the second serving cell when the user equipment receives the control signaling in the first serving cell, or the fourth BWP is a BWP used when the user equipment receives the control signaling in the first serving cell.

The network device in this embodiment may be configured to perform the technical solutions of the embodiment shown in FIG. 16, FIG. 19, FIG. 22, FIG. 25, FIG. 28, FIG. 34, FIG. 37, or FIG. 40 in the foregoing methods. Implementation principles and technical effects of the network device are similar to those in the foregoing embodiment, and details are not described herein again.

Figure 55:
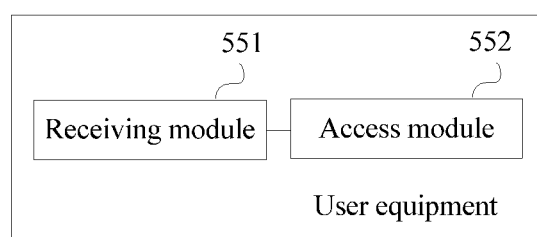
FIG. 55 is a schematic structural diagram of another user equipment according to an embodiment of this application.

FIG. 55 is a schematic structural diagram of another user equipment according to an embodiment of this application. As shown in FIG. 55, the user equipment includes a receiving module 551, configured to receive an RRC connection reconfiguration message sent by a first network device, where the RRC connection reconfiguration message is included in a first message sent by a second network device to the first network device, and the RRC connection reconfiguration message is used to indicate the primary serving cell under the second network device for the user equipment, and indicate an active BWP in the primary serving cell, and an access module 552, configured to initiate a random access procedure on the active BWP.

In an optional implementation, the active BWP is a BWP in common configuration information of the primary serving cell, or the RRC connection reconfiguration message includes a first BWP identifier, and a BWP corresponding to the first BWP identifier is the active BWP.

In an optional implementation, the active BWP includes an uplink BWP and a downlink BWP, and the access module 552 includes a first sending submodule, configured to send a random access preamble to the second network device on the uplink BWP in the active BWP, a first receiving submodule, configured to receive, by the user equipment on the downlink BWP in the active BWP, an RAR message sent by the second network device, where the RAR message includes a UL grant, and a first transmission submodule, configured to perform, by the user equipment, uplink transmission on the uplink BWP in the active BWP, where a physical resource used for the uplink transmission is a physical resource indicated by the UL grant.

In an optional implementation, the active BWP is a BWP pair including an uplink BWP and a downlink BWP, and the access module 552 includes a second sending submodule, configured to send a random access preamble to the second network device on the uplink BWP of the BWP pair, a second receiving submodule, configured to receive, on the downlink BWP of the BWP pair, an RAR message sent by the second network device, where the RAR message includes a UL grant, and a second transmission submodule, configured to perform uplink transmission on the uplink BWP of the BWP pair, where a physical resource used for the uplink transmission is a physical resource indicated by the UL grant.

In an optional implementation, the first message is a response message sent by the second network device after the second network device receives a second message sent by the first network device, and the second message includes at least one of information about an uplink BWP or a BWP pair activated by the user equipment, information about all uplink BWPs or BWP pairs configured for the user equipment, and information about a logical channel of the user equipment, where the logical channel is a logical channel with a highest priority in all logical channels of the user equipment that have to-be-transmitted uplink data, or the logical channel is all logical channels of the user equipment that have to-be-transmitted uplink data, or the logical channel is all logical channels of the user equipment.

In an optional implementation, the information about the uplink BWP includes at least one of an identifier of the uplink BWP, a parameter set of a subcarrier spacing and a cyclic prefix length of the uplink BWP, and a bandwidth value of the uplink BWP, the information about the BWP pair includes at least one of an identifier of the BWP pair, a parameter set of a subcarrier spacing and a cyclic prefix length of the BWP pair, and a bandwidth value of the BWP pair, and the information about a logical channel includes at least one of an identifier of a logical channel, a parameter set, of a subcarrier spacing and a cyclic prefix length, to which each logical channel is mapped, a data radio bearer corresponding to each logical channel, and indication information, where the indication information indicates whether each logical channel or each corresponding data radio bearer has uplink data available for transmission.

The user equipment in this embodiment may be configured to perform the technical solutions of the embodiments shown in FIG. 41 to FIG. 43 in the foregoing methods. Implementation principles and technical effects of the user equipment are similar to those in the foregoing embodiments, and details are not described herein again.

Figure 56:
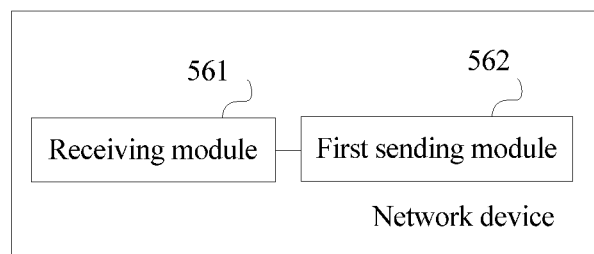
FIG. 56 is a schematic structural diagram of another network device according to an embodiment of this application.

FIG. 56 is a schematic structural diagram of another network device according to an embodiment of this application. As shown in FIG. 56, the network device includes a receiving module 561, configured to receive a first message sent by a second network device, where the first message includes an RRC connection reconfiguration message, and a first sending module 562, configured to send the RRC connection reconfiguration message to user equipment, where the RRC connection reconfiguration message is used to indicate the primary serving cell under the second network device for the user equipment, and indicate an active BWP in the primary serving cell.

In an optional implementation, the active BWP is a BWP in common configuration information of the primary serving cell, or the RRC connection reconfiguration message includes a first BWP identifier, and a BWP corresponding to the first BWP identifier is the active BWP.

In an optional implementation, the active BWP includes an uplink BWP and a downlink BWP.

In an optional implementation, the active BWP is a BWP pair including an uplink BWP and a downlink BWP.

In an optional implementation, the first network device further includes a second sending module, configured to: before the receiving module 561 receives the first message sent by the second network device, send a second message to the second network device, where the second message includes at least one of information about an uplink BWP or a BWP pair activated by the user equipment, information about all uplink BWPs or BWP pairs configured for the user equipment, and information about a logical channel of the user equipment, where the logical channel is a logical channel with a highest priority in all logical channels of the user equipment that have to-be-transmitted uplink data, or the logical channel is all logical channels of the user equipment that have to-be-transmitted uplink data, or the logical channel is all logical channels of the user equipment.

In an optional implementation, the information about the uplink BWP includes at least one of an identifier of the uplink BWP, a parameter set of a subcarrier spacing and a cyclic prefix length of the uplink BWP, and a bandwidth value of the uplink BWP, the information about the BWP pair includes at least one of an identifier of the BWP pair, a parameter set of a subcarrier spacing and a cyclic prefix length of the BWP pair, and a bandwidth value of the BWP pair, and the information about a logical channel includes at least one of an identifier of a logical channel, a parameter set, of a subcarrier spacing and a cyclic prefix length, to which each logical channel is mapped, a data radio bearer corresponding to each logical channel, and indication information, where the indication information indicates whether each logical channel or each corresponding data radio bearer has uplink data available for transmission.

The network device in this embodiment may be configured to perform the technical solutions of the embodiment shown in FIG. 44 in the foregoing methods. Implementation principles and technical effects of the network device are similar to those in the foregoing embodiment, and details are not described herein again.

Figure 57:
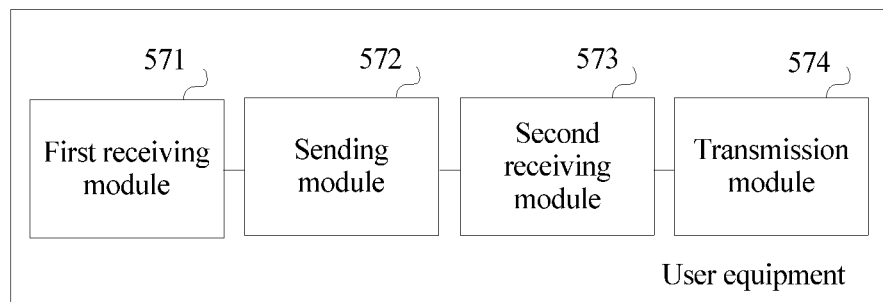
FIG. 57 is a schematic structural diagram of another user equipment according to an embodiment of this application.

FIG. 57 is a schematic structural diagram of another user equipment according to an embodiment of this application. As shown in FIG. 57, the user equipment includes a first receiving module 571, configured to receive an RRC connection reconfiguration message sent by a first network device, where the RRC connection reconfiguration message is included in a first message sent by a second network device to the first network device, and the RRC connection reconfiguration message is used to indicate the primary serving cell under the second network device for the user equipment, and indicate an active BWP in the primary serving cell, a sending module 572, configured to send a random access preamble to the second network device on the active BWP, a second receiving module 573, configured to receive, on the active BWP, an RAR message sent by the second network device, where the RAR message includes or indicates a first BWP identifier, and a transmission module 574, configured to perform uplink transmission on a first BWP corresponding to the first BWP identifier.

In an optional implementation, the active BWP is a BWP in common configuration information of the primary serving cell, or the RRC connection reconfiguration message includes a second BWP identifier, and a BWP corresponding to the second BWP identifier is the active BWP.

In an optional implementation, the RAR message includes a UL grant, and the UL grant includes or indicates the BWP identifier.

In an optional implementation, a physical resource used for the uplink transmission is a physical resource indicated by the UL grant.

In an optional implementation, the user equipment further includes an activation module, configured to activate the first BWP before the transmission module 574 performs uplink transmission on the first BWP corresponding to the first BWP identifier.

In an optional implementation, the first BWP is an uplink BWP, the active BWP includes an uplink BWP and a downlink BWP, and the first BWP and the uplink BWP in the active BWP may be a same BWP, or may be different BWPs, or the first BWP is a BWP pair including an uplink BWP and a downlink BWP, the active BWP is a BWP pair including an uplink BWP and a downlink BWP, and the first BWP and the active BWP may be a same BWP, or may be different BWPs.

In an optional implementation, the first message is a response message sent by the second network device after the second network device receives a second message sent by the first network device, and the second message includes at least one of information about an uplink BWP or a BWP pair activated by the user equipment, information about all uplink BWPs or BWP pairs configured for the user equipment, and information about a logical channel of the user equipment, where the logical channel is a logical channel with a highest priority in all logical channels of the user equipment that have to-be-transmitted uplink data, or the logical channel is all logical channels of the user equipment that have to-be-transmitted uplink data, or the logical channel is all logical channels of the user equipment.

In an optional implementation, the information about the uplink BWP includes at least one of an identifier of the uplink BWP, a parameter set of a subcarrier spacing and a cyclic prefix length of the uplink BWP, and a bandwidth value of the uplink BWP, the information about the BWP pair includes at least one of an identifier of the BWP pair, a parameter set of a subcarrier spacing and a cyclic prefix length of the BWP pair, and a bandwidth value of the BWP pair, and the information about a logical channel includes at least one of an identifier of a logical channel, a parameter set, of a subcarrier spacing and a cyclic prefix length, to which each logical channel is mapped, a data radio bearer corresponding to each logical channel, and indication information, where the indication information indicates whether each logical channel or each corresponding data radio bearer has uplink data available for transmission.

The user equipment in this embodiment may be configured to perform the technical solutions of the embodiments shown in FIG. 45 and FIG. 46, or FIG. 48 and FIG. 49 in the foregoing methods. Implementation principles and technical effects of the user equipment are similar to those in the foregoing embodiments, and details are not described herein again.

Figure 58:
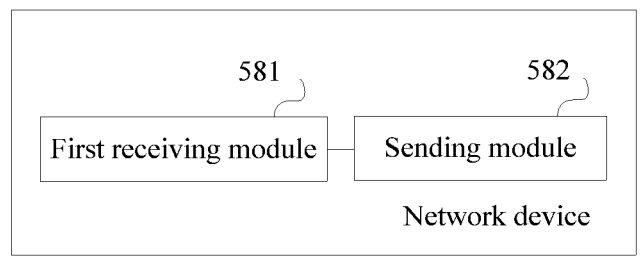
FIG. 58 is a schematic structural diagram of another network device according to an embodiment of this application.

FIG. 58 is a schematic structural diagram of another network device according to an embodiment of this application. As shown in FIG. 58, the network device includes a first receiving module 581, configured to receive, on an active BWP, a random access preamble sent by user equipment, where the random access preamble is sent after the user equipment receives an RRC connection reconfiguration message sent by a first network device, and the RRC connection reconfiguration message is used to indicate the primary serving cell under the second network device for the user equipment, and indicate an active BWP in the primary serving cell, and a sending module 582, configured to send an RAR message to the user equipment on the active BWP, where the RAR message includes or indicates a first BWP identifier, and the first BWP identifier corresponds to a first BWP.

In an optional implementation, the active BWP is a BWP in common configuration information of the primary serving cell, or the RRC connection reconfiguration message includes a second BWP identifier, and a BWP corresponding to the second BWP identifier is the active BWP.

In an optional implementation, the RAR message includes a UL grant, and the UL grant includes or indicates the BWP identifier.

In an optional implementation, a physical resource used for uplink transmission is a physical resource indicated by the UL grant.

In an optional implementation, the first BWP is an uplink BWP, the active BWP includes an uplink BWP and a downlink BWP, and the first BWP and the uplink BWP in the active BWP may be a same BWP, or may be different BWPs, or the first BWP is a BWP pair including an uplink BWP and a downlink BWP, the active BWP is a BWP pair including an uplink BWP and a downlink BWP, and the first BWP and the active BWP may be a same BWP, or may be different BWPs.

In an optional implementation, the second network device further includes a second receiving module, configured to: before the first receiving module receives, on the active BWP, the random access preamble sent by the user equipment, receive a second message sent by the first network device, where the second message includes at least one of information about an uplink BWP or a BWP pair activated by the user equipment, information about all uplink BWPs or BWP pairs configured for the user equipment, and information about a logical channel of the user equipment, where the logical channel is a logical channel with a highest priority in all logical channels of the user equipment that have to-be-transmitted uplink data, or the logical channel is all logical channels of the user equipment that have to-be-transmitted uplink data, or the logical channel is all logical channels of the user equipment.

In an optional implementation, the information about the uplink BWP includes at least one of an identifier of the uplink BWP, a parameter set of a subcarrier spacing and a cyclic prefix length of the uplink BWP, and a bandwidth value of the uplink BWP, the information about the BWP pair includes at least one of an identifier of the BWP pair, a parameter set of a subcarrier spacing and a cyclic prefix length of the BWP pair, and a bandwidth value of the BWP pair, and the information about a logical channel includes at least one of an identifier of a logical channel, a parameter set, of a subcarrier spacing and a cyclic prefix length, to which each logical channel is mapped, a data radio bearer corresponding to each logical channel, and indication information, where the indication information indicates whether each logical channel or each corresponding data radio bearer has uplink data available for transmission.

The network device in this embodiment may be configured to perform the technical solutions of the embodiment shown in FIG. 47 or FIG. 50 in the foregoing methods. Implementation principles and technical effects of the network device are similar to those in the foregoing embodiment, and details are not described herein again.

Figure 59:
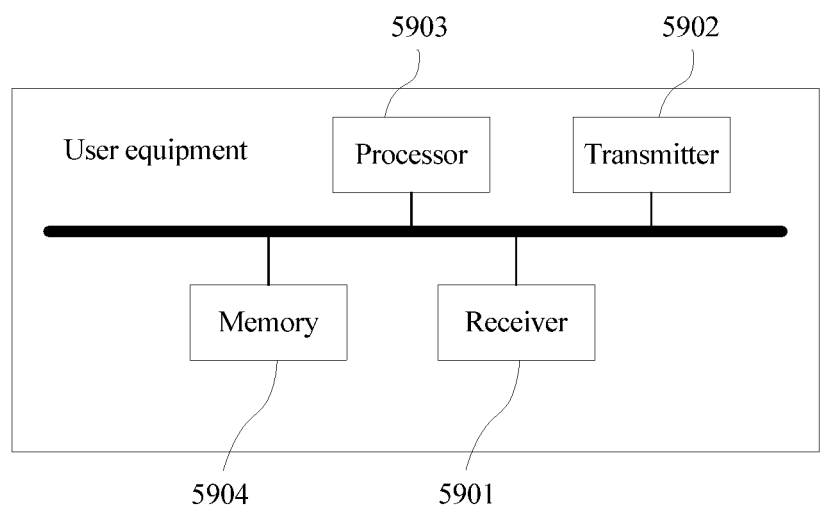
FIG. 59 is a schematic structural diagram of another user equipment according to an embodiment of this application.

FIG. 59 is a schematic structural diagram of another user equipment according to an embodiment of this application. The user equipment may be configured to perform the actions or steps of the user equipment in the embodiments shown in FIG. 6 to FIG. 10. The user equipment specifically includes a receiver 5901, a transmitter 5902, a processor 5903, and a memory 5904.

The components in the user equipment are configured to implement the actions in the embodiments shown in FIG. 6 to FIG. 10. Details are not described again.

In the embodiments of the present invention, reference may be made to each other for the foregoing embodiments. Same or similar steps and nouns are not described again.

Alternatively, some or all of the foregoing modules may be implemented in a form of an integrated circuit that is embedded in a chip of the user equipment. The modules may be implemented separately or may be integrated together. The foregoing modules may be configured as one or more integrated circuits for implementing the foregoing methods, for example, one or more application-specific integrated circuits (Application Specific Integrated Circuit, ASIC), one or more microprocessors (digital signal processor, DSP), or one or more field programmable gate arrays (Field Programmable Gate Array, FPGA).

Figure 60:
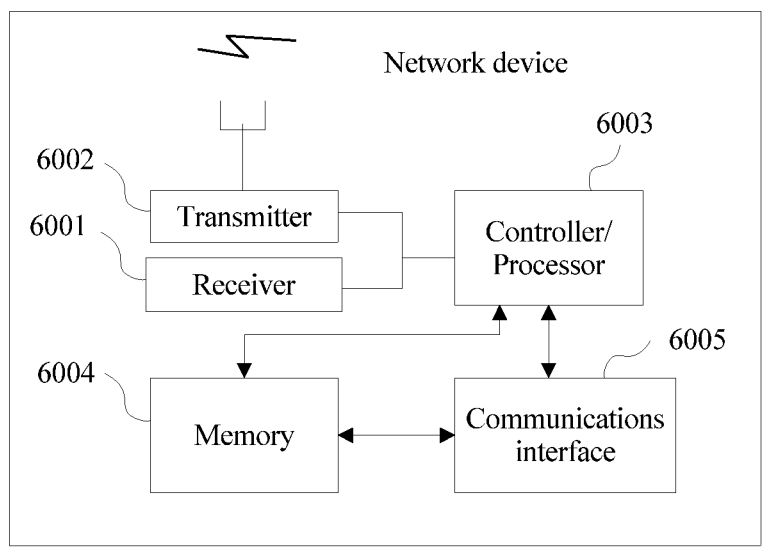
FIG. 60 is a schematic structural diagram of another network device according to an embodiment of this application.

FIG. 60 is a schematic structural diagram of another network device according to an embodiment of this application. The network device may be configured to perform the actions or steps of the user equipment in the embodiment shown in FIG. 11. The network device specifically includes a receiver 6001, a transmitter 6002, a processor 6003, and a memory 6004.

The components in the user equipment are configured to implement the actions in the embodiment shown in FIG. 11. Details are not described again.

In the embodiments of the present invention, reference may be made to each other for the foregoing embodiments. Same or similar steps and nouns are not described again.

The processor 6003 may be alternatively a controller, and is represented as "Controller/Processor 6003" in FIG. 60. The transmitter 6002 and the receiver 6001 are configured to support the network device in sending information to or receiving information from the terminal device in the foregoing embodiments and support radio communication between the terminal device and another terminal device. The processor 6003 performs various functions of communicating with the terminal device.

Further, the network device may further include the memory 6004, and the memory 6004 is configured to store program code and data of the network device. In addition, the network device may further include a communications interface 6005. The communications interface 6005 is configured to support the network device in communicating with another network entity.

The processor 6003 is, for example, a central processing unit (Central Processing Unit, CPU), or may be configured as one or more integrated circuits for implementing the foregoing methods, for example, one or more ASIs, one or more DSPs, or one or more FPGAs. The memory 6004 may be one memory, or may be a general term for a plurality of storage elements.

Figure 61:
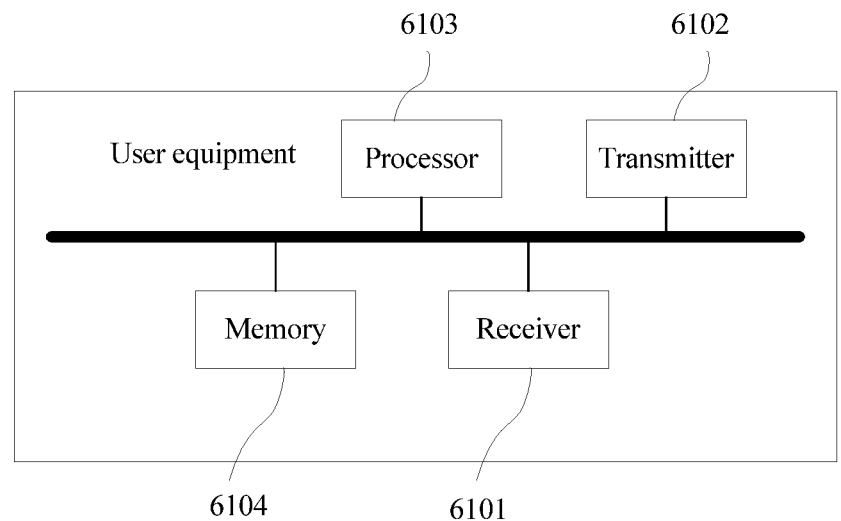
FIG. 61 is a schematic structural diagram of another user equipment according to an embodiment of this application.

FIG. 61 is a schematic structural diagram of another user equipment according to an embodiment of this application. The user equipment may be configured to perform the actions or steps of the user equipment in the embodiments shown in FIG. 12 to FIG. 15, or FIG. 17 and FIG. 18, or FIG. 20 and FIG. 21, or FIG. 23 and FIG. 24, or FIG. 26 and FIG. 27, or FIG. 29 and FIG. 30, or FIG. 32 and FIG. 33, or FIG. 35 and FIG. 36, or FIG. 38 and FIG. 39. The user equipment specifically includes a receiver 6101, a transmitter 6102, a processor 6103, and a memory 6104.

The components in the user equipment are configured to implement the actions in the embodiments shown in FIG. 12 to FIG. 15, or FIG. 17 and FIG. 18, or FIG. 20 and FIG. 21, or FIG. 23 and FIG. 24, or FIG. 26 and FIG. 27, or FIG. 29 and FIG. 30, or FIG. 32 and FIG. 33, or FIG. 35 and FIG. 36, or FIG. 38 and FIG. 39. Details are not described again.

In the embodiments of the present invention, reference may be made to each other for the foregoing embodiments. Same or similar steps and nouns are not described again.

Alternatively, some or all of the foregoing modules may be implemented in a form of an integrated circuit that is embedded in a chip of the user equipment. The modules may be implemented separately or may be integrated together. The foregoing modules may be configured as one or more integrated circuits for implementing the foregoing methods, for example, one or more ASICs, one or more DSPs, or one or more FPGAs.

Figure 62:
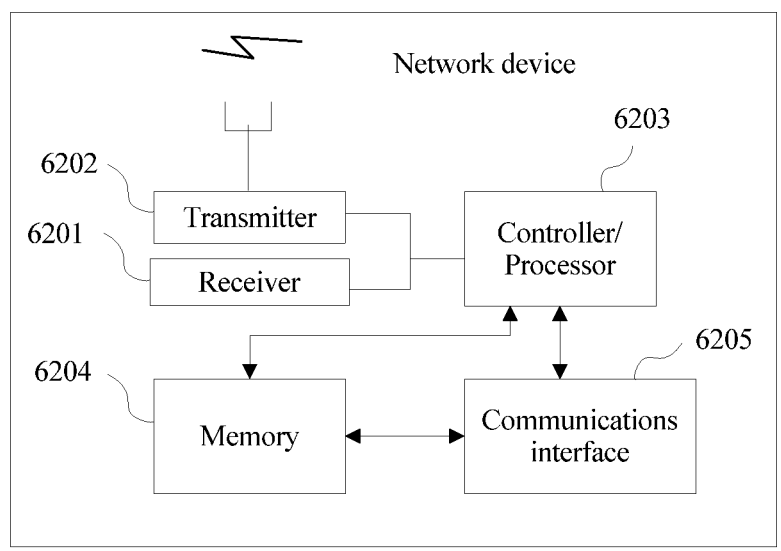
FIG. 62 is a schematic structural diagram of another network device according to an embodiment of this application.

FIG. 62 is a schematic structural diagram of another network device according to an embodiment of this application. The network device may be configured to perform the actions or steps of the user equipment in the embodiment shown in FIG. 16, FIG. 19, FIG. 22, FIG. 25, FIG. 28, FIG. 34, FIG. 37, or FIG. 40. The network device specifically includes a receiver 6201, a transmitter 6202, a processor 6203, and a memory 6204.

The components in the user equipment are configured to implement the actions in the embodiment shown in FIG. 16, FIG. 19, FIG. 22, FIG. 25, FIG. 28, FIG. 34, FIG. 37, or FIG. 40. Details are not described again.

In the embodiments of the present invention, reference may be made to each other for the foregoing embodiments. Same or similar steps and nouns are not described again.

The processor 6203 may be alternatively a controller, and is represented as "Controller/Processor 6203" in FIG. 62. The transmitter 6202 and the receiver 6201 are configured to support the network device in sending information to or receiving information from the terminal device in the foregoing embodiments and support radio communication between the terminal device and another terminal device. The processor 6203 performs various functions of communicating with the terminal device.

Further, the network device may further include the memory 6204, and the memory 6204 is configured to store program code and data of the network device. In addition, the network device may further include a communications interface 6205. The communications interface 6205 is configured to support the network device in communicating with another network entity.

The processor 6203 is, for example, a central processing unit (Central Processing Unit, CPU), or may be configured as one or more integrated circuits for implementing the foregoing methods, for example, one or more ASIs, one or more DSPs, or one or more FPGAs. The memory 6204 may be one memory, or may be a general term for a plurality of storage elements.

Figure 63:
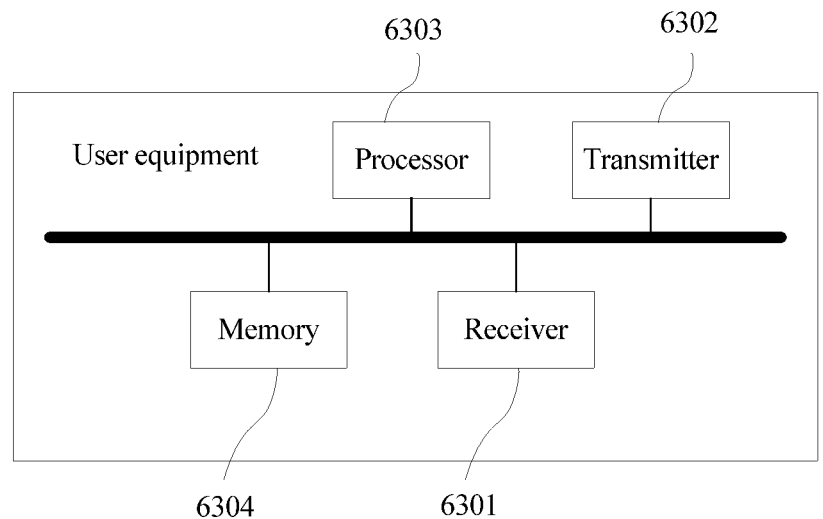
FIG. 63 is a schematic structural diagram of another user equipment according to an embodiment of this application.

FIG. 63 is a schematic structural diagram of another user equipment according to an embodiment of this application. The user equipment may be configured to perform the actions or steps of the user equipment in the embodiments shown in FIG. 41 to FIG. 43. The user equipment specifically includes a receiver 6301, a transmitter 6302, a processor 6303, and a memory 6304.

The components in the user equipment are configured to implement the actions in the embodiments shown in FIG. 41 to FIG. 43. Details are not described again.

In the embodiments of the present invention, reference may be made to each other for the foregoing embodiments. Same or similar steps and nouns are not described again.

Alternatively, some or all of the foregoing modules may be implemented in a form of an integrated circuit that is embedded in a chip of the user equipment. The modules may be implemented separately or may be integrated together. The foregoing modules may be configured as one or more integrated circuits for implementing the foregoing methods, for example, one or more ASICs, one or more DSPs, or one or more FPGAs.

Figure 64:
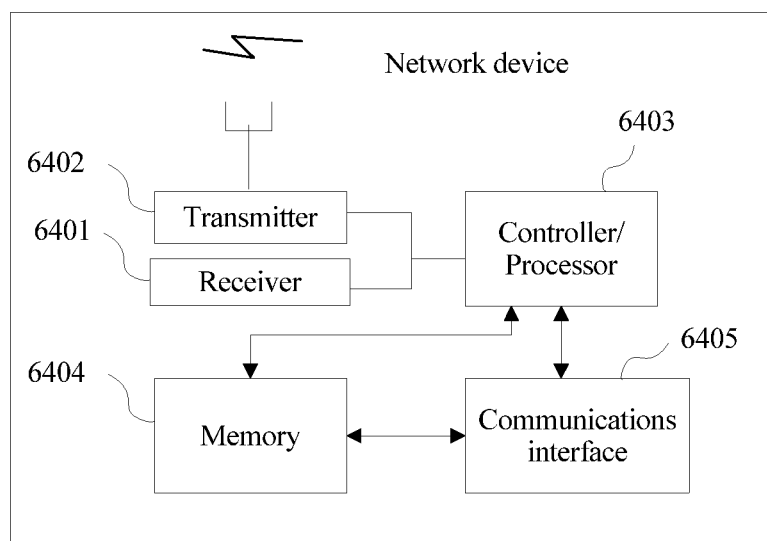
FIG. 64 is a schematic structural diagram of another network device according to an embodiment of this application.

FIG. 64 is a schematic structural diagram of another network device according to an embodiment of this application. The network device may be configured to perform the actions or steps of the user equipment in the embodiment shown in FIG. 44. The network device specifically includes a receiver 6401, a transmitter 6402, a processor 6403, and a memory 6404.

The components in the user equipment are configured to implement the actions in the embodiment shown in FIG. 44. Details are not described again.

In the embodiments of the present invention, reference may be made to each other for the foregoing embodiments. Same or similar steps and nouns are not described again.

The processor 6403 may be alternatively a controller, and is represented as "Controller/Processor 6403" in FIG. 64. The transmitter 6402 and the receiver 6401 are configured to support the network device in sending information to or receiving information from the terminal device in the foregoing embodiments and support radio communication between the terminal device and another terminal device. The processor 6403 performs various functions of communicating with the terminal device.

Further, the network device may further include the memory 6404, and the memory 6404 is configured to store program code and data of the network device. In addition, the network device may further include a communications interface 6405. The communications interface 6405 is configured to support the network device in communicating with another network entity.

The processor 6403 is, for example, a central processing unit (Central Processing Unit, CPU), or may be configured as one or more integrated circuits for implementing the foregoing methods, for example, one or more ASIs, one or more DSPs, or one or more FPGAs. The memory 6404 may be one memory, or may be a general term for a plurality of storage elements.

Figure 65:
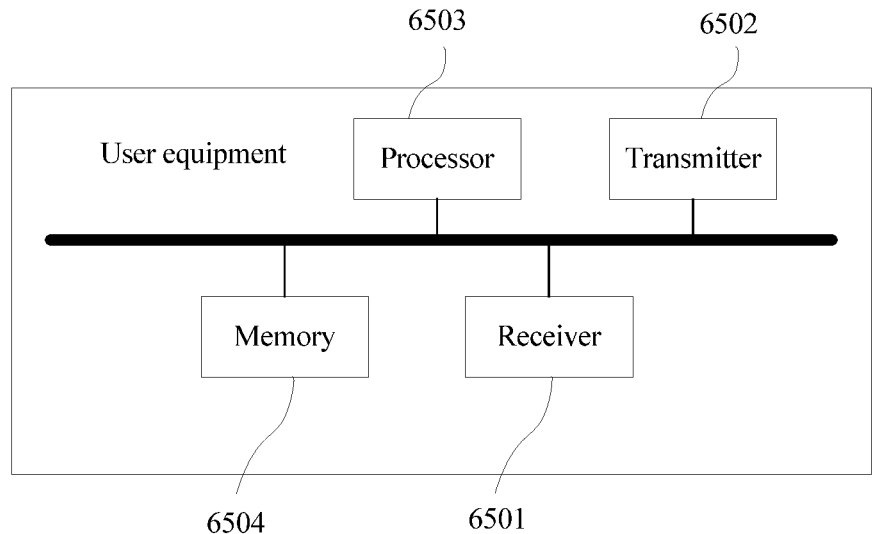
FIG. 65 is a schematic structural diagram of another user equipment according to an embodiment of this application.

FIG. 65 is a schematic structural diagram of another user equipment according to an embodiment of this application. The user equipment may be configured to perform the actions or steps of the user equipment in the embodiments shown in FIG. 45 and FIG. 46, or FIG. 48 and FIG. 49. The user equipment specifically includes a receiver 6501, a transmitter 6502, a processor 6503, and a memory 6504.

The components in the user equipment are configured to implement the actions in the embodiments shown in FIG. 45 and FIG. 46, or FIG. 48 and FIG. 49. Details are not described again.

In the embodiments of the present invention, reference may be made to each other for the foregoing embodiments. Same or similar steps and nouns are not described again.

Alternatively, some or all of the foregoing modules may be implemented in a form of an integrated circuit that is embedded in a chip of the user equipment. The modules may be implemented separately or may be integrated together. The foregoing modules may be configured as one or more integrated circuits for implementing the foregoing methods, for example, one or more ASICs, one or more DSPs, or one or more FPGAs.

Figure 66:
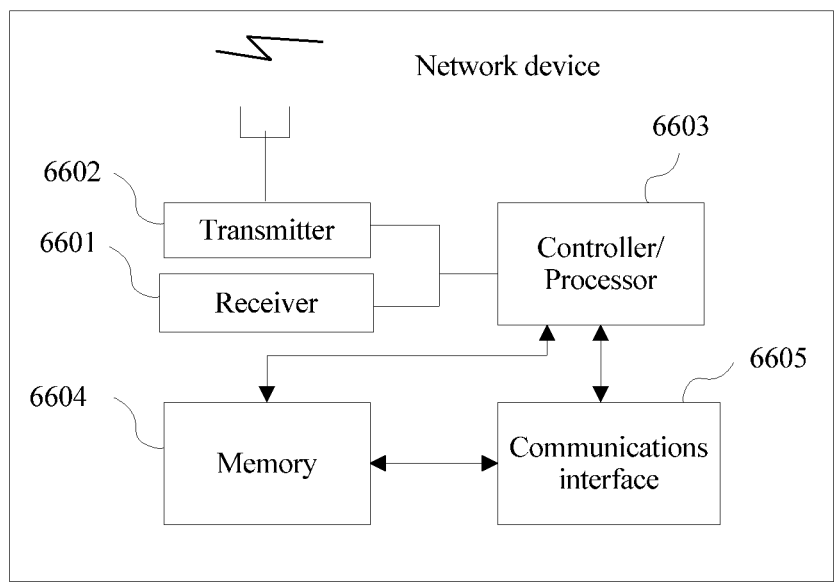
FIG. 66 is a schematic structural diagram of another network device according to an embodiment of this application.

FIG. 66 is a schematic structural diagram of another network device according to an embodiment of this application. The network device may be configured to perform the actions or steps of the user equipment in the embodiment shown in FIG. 47 or FIG. 50. The network device specifically includes a receiver 6601, a transmitter 6602, a processor 6603, and a memory 6604.

The components in the user equipment are configured to implement the actions in the embodiment shown in FIG. 47 or FIG. 50. Details are not described again.

In the embodiments of the present invention, reference may be made to each other for the foregoing embodiments. Same or similar steps and nouns are not described again.

The processor 6603 may be alternatively a controller, and is represented as "Controller/Processor 6603" in FIG. 66. The transmitter 6602 and the receiver 6601 are configured to support the network device in sending information to or receiving information from the terminal device in the foregoing embodiments and support radio communication between the terminal device and another terminal device. The processor 6603 performs various functions of communicating with the terminal device.

Further, the network device may further include the memory 6604, and the memory 6604 is configured to store program code and data of the network device. In addition, the network device may further include a communications interface 6605. The communications interface 6605 is configured to support the network device in communicating with another network entity.

The processor 6603 is, for example, a central processing unit (Central Processing Unit, CPU), or may be configured as one or more integrated circuits for implementing the foregoing methods, for example, one or more ASIs, one or more DSPs, or one or more FPGAs. The memory 6604 may be one memory, or may be a general term for a plurality of storage elements.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the procedures or functions according to the embodiments of this application are generated. The computer may be a general-purpose computer, a dedicated computer, a computer network, or another programmable apparatus. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer readable storage medium may be any usable medium accessible to a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (solid state disk, SSD)), or the like.

A person skilled in the art should be aware that in the foregoing one or more examples, functions described in the embodiments of this application may be implemented by hardware, software, firmware, or any combination thereof. When this application is implemented by software, these functions may be stored in a computer readable medium or transmitted as one or more instructions or code in the computer readable medium. The computer readable medium includes a computer storage medium and a communications medium, where the communications medium includes any medium that enables a computer program to be transmitted from one place to another. The storage medium may be any usable medium accessible to a general-purpose or dedicated computer.

The embodiments of this application are applied to a 5G communications system or another system that may occur in the future. For ease of understanding by a person skilled in the art, the following describes some terms in this application. It should be noted that a name of a network device and a name of a terminal may change when the solutions in the embodiments of this application are applied to the 5G system or another system that may occur in the future, but this does not affect implementation of the solutions in the embodiments of this application.

(1) A terminal device, also referred to as a terminal or user equipment, is a device providing a user with voice and/or data connectivity, for example, a handheld device or an in-vehicle device with a wireless connection function. Common terminal devices include, for example, a mobile phone, a tablet computer, a notebook computer, a palmtop computer, a mobile Internet device (mobile internet device, MID), and a wearable device, where the wearable device is, for example, a smartwatch, a smart band, or a pedometer.

(2) A network device, also referred to as a radio access network (Radio Access Network, RAN) device, is a device for connecting a terminal device to a wireless network. There are network devices of various communication standards. For example, the network devices include but are not limited to a base station, an evolved NodeB (evolved Node B, eNB), a radio network controller (radio network controller, RNC), a NodeB (Node B, NB), a network device controller (Base Station Controller, BSC), a network device transceiver station (Base Transceiver Station, BTS), a home network device (for example, a home evolved NodeB or a home Node B, HNB), a baseband unit (BaseBand Unit, BBU), and the like.

(3) In terms of a bandwidth part (band width part, BWP), when bandwidth of a cell is wide, a terminal device may operate only on a part of bandwidth of the cell. Each part of bandwidth of the cell is referred to as one BWP.

(4) There are network devices of various frequency standards. For example, the network devices include but are not limited to a low-frequency network device and a high-frequency network device.

(5) "A plurality of" means two or more, and another quantifier is similar to this. The term "and/or" describes an association relationship between associated objects and represents that three relationships may exist. For example, A and/or B may represent the following three cases: Only A exists, both A and B exist, and only B exists. The character "/" usually indicates an "or" relationship between the associated objects.

Figure 67:
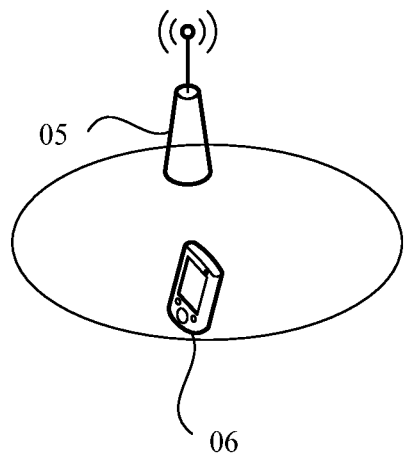
FIG. 67 is a schematic diagram of an application scenario according to an embodiment of this application.

FIG. 67 is a schematic diagram of an application scenario according to an embodiment of this application. A networking architecture shown in FIG. 67 mainly includes a network device 05 and a terminal device 06. The terminal device 05 may communicate with the network device 06. In this application, the network device may configure at least one downlink BWP and at least one uplink BWP for one terminal device. The at least one downlink BWP includes a default downlink BWP, and downlink bandwidth corresponding to the default downlink BWP is relatively narrow. Therefore, when the terminal device transmits data on the default downlink BWP, the terminal device only needs to monitor downlink control information on a narrowband, and only needs to perform blind detection in relatively small search space, thereby reducing power consumption of the terminal device. The terminal device may control the terminal device to fall back to the default downlink BWP to operate, to reduce power consumption of the terminal device. A timer is set for the terminal device. The timer is a timer for controlling the terminal device to fall back to a default downlink BWP. When the terminal device operates on an active downlink BWP, the terminal device starts a timer, so that the timer is started to run, where the active downlink BWP is not a default downlink BWP. When the timer expires, it indicates that there has been no downlink scheduling for the terminal device in a period of time. In this case, the terminal device does not need to perform data communication on wide bandwidth, but only needs to operate on narrow bandwidth. Therefore, the terminal device automatically switches to a default downlink BWP to operate, where the default downlink BWP is a downlink BWP activated by the terminal device.

In a carrier aggregation scenario, it is specified in a current standard that when a secondary serving cell is configured, a timer associated with the secondary serving cell and a default downlink BWP also need to be configured. A network device sends an RRC connection reconfiguration message to a terminal device. The RRC connection reconfiguration message is used to instruct to configure or reconfigure a secondary serving cell, and the RRC connection reconfiguration message indicates a downlink BWP and/or an uplink BWP that are or is first activated when a secondary serving cell is activated. The first active downlink BWP may not be a default downlink BWP. It can be learned that when a secondary serving cell is activated in an existing activation manner, it may be directly considered that a first downlink BWP and/or a first uplink BWP are or is also activated.

The following describes an operating mechanism of the timer: When the terminal device switches from a current active downlink BWP to another active downlink BWP, the terminal device starts the timer, where the another active downlink BWP is not a default downlink BWP. When the terminal device successfully obtains downlink control information through decoding on the current active downlink BWP, and schedules a physical downlink shared channel (Physical Downlink Shared Channel, PDSCH for short) by using the downlink control information, the terminal device restarts the timer. When the timer expires, the terminal device switches from the current active downlink BWP to the default downlink BWP, and then the terminal device operates on the default downlink BWP.

It should be noted that the terms used in the embodiments of this application may be mutually referenced, and details are not described again.

Figure 68:
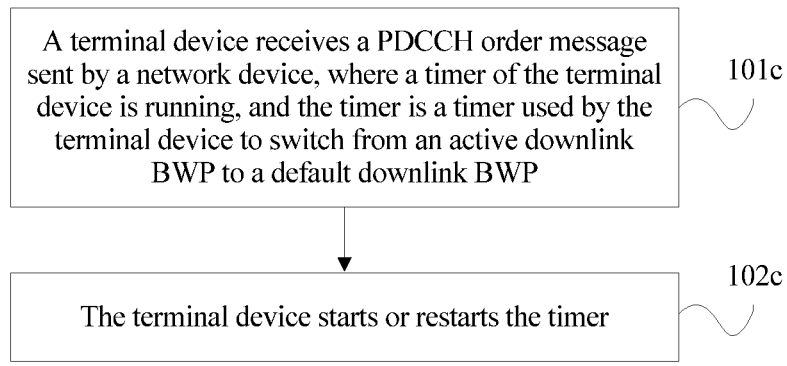
FIG. 68 is a schematic flowchart of a timer handling method according to an embodiment of the present invention.

FIG. 68 is a schematic flowchart of a timer handling method according to an embodiment of the present invention. As shown in FIG. 2, the method is specifically as follows:

101c. A terminal device receives a physical downlink control channel order (physical downlink control channel order, PDCCH order) message sent by a network device, where a timer of the terminal device is running, and the timer is a timer used by the terminal device to switch from an active downlink BWP to a default downlink BWP.

In this embodiment, when the terminal device loses uplink synchronization, and the terminal device receives downlink data, the network device may send the PDCCH order message to the terminal device. The PDCCH order message is used to trigger the terminal device to perform a contention free random access procedure. Through the random access procedure, the terminal device may implement uplink synchronization with the network device again and then receive downlink data sent by the network device.

The terminal device maintains a timer. The timer is used for timing, and the timer has specified duration. When duration for which the timer runs is equal to or exceeds the specified duration, it is considered that the timer expires. In the prior art, if the terminal device determines that the timer expires, the terminal device performs BWP switching, in other words, the terminal device switches from a current active downlink BWP to a default downlink BWP. Optionally, the timer may be referred to as a BWP fallback timer.

In this embodiment, after the terminal device receives the PDCCH order message sent by the network device, if the terminal device performs data communication on an active downlink BWP, and the active downlink BWP is not a default downlink BWP, the terminal device may determine that the timer of the terminal device is running.

102c. The terminal device starts or restarts the timer.

In this embodiment, after step 101c, after the terminal device receives the PDCCH order message sent by the network device, it indicates that the network device is to perform data communication with the terminal device. In this case, if the terminal device needs to still operate on a downlink BWP, and the downlink BWP is not a default downlink BWP, the terminal device needs to start or restart the timer.

A process in which the terminal device restarts the timer is as follows: The terminal device resets a value of the timer to an initial value, and then the terminal device starts the timer.

In an optional implementation, the PDCCH order message includes an identifier of a downlink BWP, and the downlink BWP indicated by the identifier of the downlink BWP is not a default downlink BWP.

In this embodiment, the PDCCH order message sent by the network device carries an identifier of a downlink BWP, and the downlink BWP is not a default downlink BWP. In this case, in step 102c, the PDCCH order message indicates that the terminal device needs to perform downlink BWP switching. In step 102c, the terminal device needs to switch to the downlink BWP corresponding to the identifier of the downlink BWP, to perform data communication, and also needs to start or restart the timer.

Alternatively, the PDCCH order message sent by the network device does not carry an identifier of a downlink BWP. In this case, in step 102c, the terminal device does not need to perform downlink BWP switching, and the terminal device still activates a downlink BWP used in a previous operation, and also starts or restarts the timer.

Figure 69:
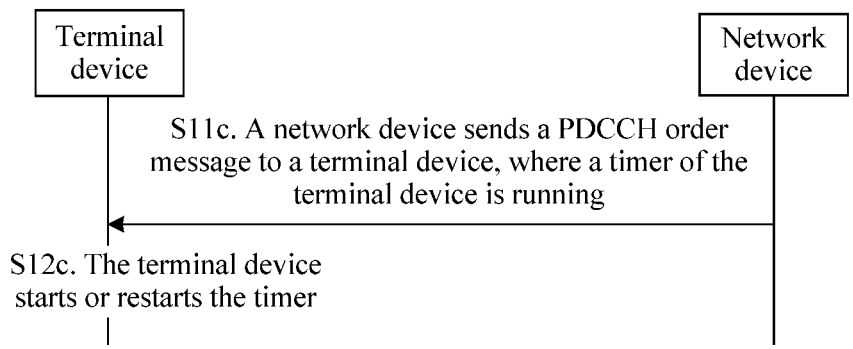
FIG. 69 is a signaling diagram of a timer handling method according to an embodiment of the present invention.

FIG. 69 is a signaling diagram of a timer handling method according to an embodiment of the present invention. As shown in FIG. 69, the method is specifically as follows:

S11c. A network device sends a PDCCH order message to a terminal device, where a timer of the terminal device is running, and the timer is a timer used by the terminal device to switch from an active downlink BWP to a default downlink BWP.

S12c. The terminal device starts or restarts the timer.

In an optional implementation, the PDCCH order message includes an identifier of a downlink BWP, and the downlink BWP indicated by the identifier of the downlink BWP is not a default downlink BWP.

Herein, step 101c in FIG. 68 is implemented in step S11c. For S12c, refer to step 102c in FIG. 68. Details are not described again.

In this embodiment, the terminal device receives the PDCCH order message sent by the network device, where the timer of the terminal device is running, and the timer is a timer used by the terminal device to switch from an active downlink BWP to a default downlink BWP, and the terminal device starts or restarts the timer. Therefore, when the timer of the terminal device is running, after the PDCCH order message sent by the network device is received, it is considered whether the timer is to be started or restarted. In this way, an operating scenario of the timer is provided.

Figure 70:
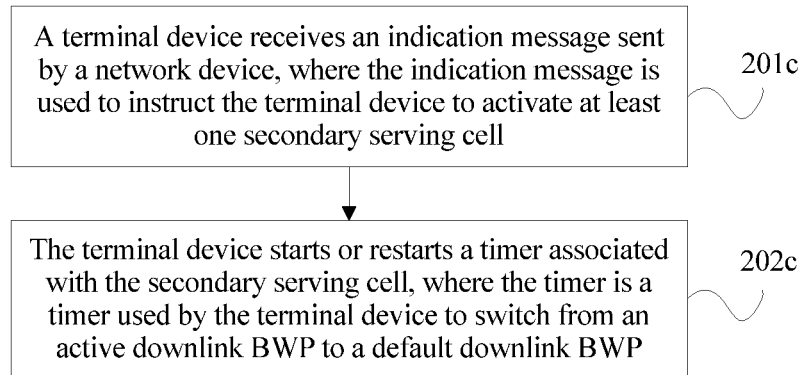
FIG. 70 is a schematic flowchart of another timer handling method according to an embodiment of the present invention.

FIG. 70 is a schematic flowchart of another timer handling method according to an embodiment of the present invention. As shown in FIG. 70, the method is specifically as follows:

201c. A terminal device receives an indication message sent by a network device, where the indication message is used to instruct the terminal device to activate at least one secondary serving cell.

In this embodiment, the network device sends the indication message to the terminal device, where the indication message is used to instruct the terminal device to activate one or more secondary serving cells.

In an optional implementation, the indication message is an activate command. The activate command may be a MAC CE for instructing to activate at least one secondary serving cell.

In an optional implementation, the secondary serving cell is in an inactive state.

In this embodiment, in step 201c, although the indication message is used to instruct the terminal device to activate the at least one secondary serving cell, only some of the at least one secondary serving cell may be in an inactive state, or each of the at least one secondary serving cell is in an inactive state.

202c. The terminal device starts or restarts a timer associated with the secondary serving cell, where the timer is a timer used by the terminal device to switch from an active downlink BWP to a default downlink BWP.

In this embodiment, at least one secondary serving cell is configured for the terminal device, and each secondary serving cell is associated with a timer. The timer is used for timing, and the timer has specified duration. When duration for which the timer runs is equal to or exceeds the specified duration, it is considered that the timer expires. In the prior art, if the terminal device determines that the timer expires, the terminal device performs BWP switching, in other words, the terminal device switches from a current active downlink BWP to a default downlink BWP in a current secondary serving cell. Optionally, the timer may be referred to as a BWP fallback timer.

In this step, after step 201c, after the terminal device receives the indication message, the terminal device may start or restart the timer associated with the serving cell.

Specifically, after the terminal device receives the indication message sent by the network device, the terminal device may start or restart a timer associated with each secondary serving cell indicated by the indication message. For example, the terminal device starts or restarts a timer associated with each secondary serving cell indicated by the indication message, or the terminal device starts or restarts a timer associated with some of a plurality of secondary serving cells indicated by the indication message.

Alternatively, after the terminal device receives the indication message sent by the network device, because the indication message indicates the at least one secondary serving cell, the terminal device starts or restarts only a timer of a secondary serving cell in an inactive state in the at least one secondary serving cell.

In an optional implementation, before step 201c, the method may further include the following step:

Step 203c: The terminal device receives an RRC message sent by the network device, where the RRC message includes indication information, the indication information is used to instruct to add or modify the at least one secondary serving cell, the RRC message further includes a first downlink BWP of the secondary serving cell, the first downlink BWP is a downlink BWP that is first activated when the secondary serving cell is activated, and the first downlink BWP is not a default downlink BWP.

In this embodiment, the network device first sends the RRC message to the terminal device. Optionally, the RRC message may be an RRC connection reconfiguration message. The RRC message includes the indication message, and the indication message is used to instruct the terminal device to add or modify the at least one secondary serving cell. In addition, the RRC message further includes first downlink BWPs of one or more of the at least one secondary serving cell. In other words, although the RRC message is used to instruct the terminal device to add or modify the at least one secondary serving cell, the RRC message may indicate first downlink BWPs of only one or more of the at least one secondary serving cell.

In addition, a first downlink BWP of a secondary serving cell is a downlink BWP that is first activated when the terminal device actives the secondary serving cell, and the first downlink BWP is not a default downlink BWP.

For example, the network device sends an RRC message to the terminal device, the RRC message includes indication information, and the indication information is used to instruct to add or modify a secondary serving cell 1, a secondary serving cell 2, a secondary serving cell 3, and a secondary serving cell 4, and the RRC message further includes a first downlink BWP 1 of the secondary serving cell 2, the first downlink BWP 1 is a downlink BWP 1 that is first activated when the secondary serving cell 2 is activated, and the first downlink BWP 1 is not a default downlink BWP.

For another example, the network device sends an RRC message to the terminal device, the RRC message includes indication information, and the indication information is used to instruct to add or modify a secondary serving cell 1, a secondary serving cell 2, a secondary serving cell 3, and a secondary serving cell 4, and the RRC message further includes a first downlink BWP 1 of the secondary serving cell 2 and a first downlink BWP 2 of the secondary serving cell 4, the first downlink BWP 1 is a downlink BWP that is first activated when the secondary serving cell 2 is activated, the first downlink BWP 2 is a downlink BWP that is first activated when the secondary serving cell 4 is activated, and neither the first downlink BWP 1 nor the first downlink BWP 2 is a default downlink BWP.

In an optional implementation, the timer associated with the secondary serving cell is a timer maintained by a physical layer of the terminal device, and step 202c specifically includes instructing, by the terminal device by using a MAC layer of the terminal device, the physical layer of the terminal device to start or restart the timer associated with the secondary serving cell.

In this embodiment, if the timer associated with the secondary serving cell is a timer maintained by the physical layer of the terminal device, in step 202c, the MAC layer of the terminal device sends an instruction command to the physical layer of the terminal device, so that the physical layer of the terminal device starts or restarts the timer associated with the secondary serving cell.

Figure 71:
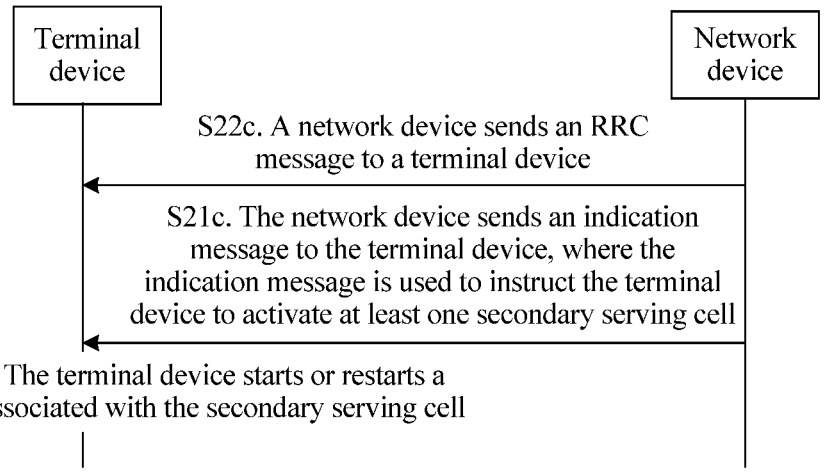
FIG. 71 is a signaling diagram of another timer handling method according to an embodiment of the present invention.

FIG. 71 is a signaling diagram of another timer handling method according to an embodiment of the present invention. As shown in FIG. 71, the method is specifically as follows:

S22c. A network device sends an RRC message to a terminal device, where the RRC message includes indication information, the indication information is used to instruct to add or modify at least one secondary serving cell, the RRC message further includes a first downlink BWP of the secondary serving cell, the first downlink BWP is a downlink BWP that is first activated when the secondary serving cell is activated, and the first downlink BWP is not a default downlink BWP.

S21c. The network device sends an indication message to the terminal device, where the indication message is used to instruct the terminal device to activate at least one secondary serving cell.

In an optional implementation, the indication message is an activate command. The activate command may be a MAC CE for instructing to activate at least one secondary serving cell.

In an optional implementation, the secondary serving cell is in an inactive state.

S23c. The terminal device starts or restarts a timer associated with the secondary serving cell, where the timer is a timer used by the terminal device to switch from an active downlink BWP to a default downlink BWP.

In an optional implementation, the timer associated with the secondary serving cell is a timer maintained by a physical layer of the terminal device, and step S23 specifically includes instructing, by the terminal device by using a MAC layer of the terminal device, the physical layer of the terminal device to start or restart the timer associated with the secondary serving cell.

Herein, step 201c in FIG. 70 is implemented in step S21c, step 203c in FIG. 70 is implemented in step S22c, and step 202c in FIG. 70 is implemented in step S23c. Details are not described again.

In this embodiment, the terminal device receives the indication message sent by the network device, where the indication message is used to instruct the terminal device to activate the at least one secondary serving cell, and the terminal device starts or restarts the timer associated with the secondary serving cell, where the timer is a timer used by the terminal device to switch from an active downlink BWP to a default downlink BWP. Therefore, when the terminal device receives the indication message that is sent by the network device and that is used to instruct to activate the at least one secondary serving cell, it is considered whether the terminal device is to start or restart the timer associated with the secondary serving cell. In this way, an operating scenario of the timer is provided.

Figure 72:
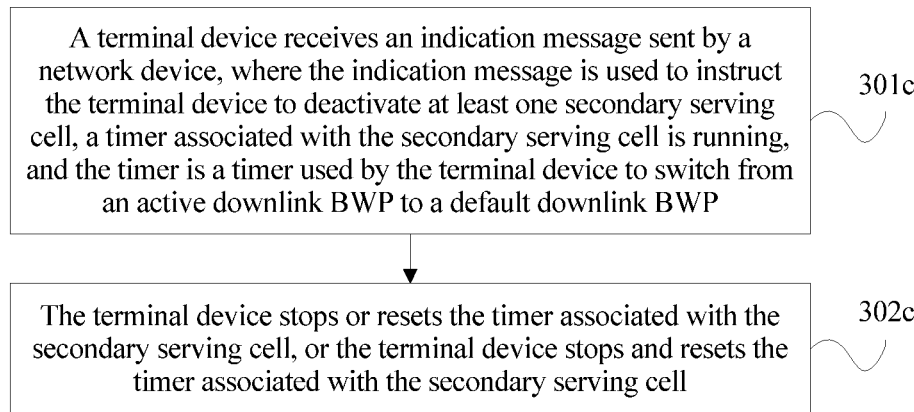
FIG. 72 is a schematic flowchart of another timer handling method according to an embodiment of the present invention.

FIG. 72 is a schematic flowchart of another timer handling method according to an embodiment of the present invention. As shown in FIG. 72, the method is specifically as follows:

301c. A terminal device receives an indication message sent by a network device, where the indication message is used to instruct the terminal device to deactivate at least one secondary serving cell, a timer associated with the secondary serving cell is running, and the timer is a timer used by the terminal device to switch from an active downlink BWP to a default downlink BWP.

In an optional implementation, the indication message is a deactivate command. The deactivate command may be a MAC CE for instructing to deactivate at least one secondary serving cell.

In this embodiment, at least one secondary serving cell is configured for the terminal device, and each secondary serving cell is associated with a timer. The timer is used for timing, and the timer has specified duration. When duration for which the timer runs is equal to or exceeds the specified duration, it is considered that the timer expires. In the prior art, if the terminal device determines that the timer expires, the terminal device performs BWP switching, in other words, the terminal device switches from a current active downlink BWP to a default downlink BWP in a current secondary serving cell. Optionally, the timer may be referred to as a BWP fallback timer.

In this step, the terminal device receives the indication message sent by the network device. The indication message indicates the at least one secondary serving cell, and the indication message is used to instruct the terminal device to deactivate the at least one secondary serving cell. In this case, the terminal device operates on a secondary serving cell in the at least one secondary serving cell, in other words, the terminal device performs data communication on an active downlink BWP of the secondary serving cell, and the active downlink BWP is not a default downlink BWP. In this case, it may be determined that a timer associated with the secondary serving cell is running.

302c. The terminal device stops or resets the timer associated with the secondary serving cell, or the terminal device stops and resets the timer associated with the secondary serving cell.

In this embodiment, when the conditions in step 301c are met, the terminal device needs to stop the timer associated with the secondary serving cell, or the terminal device needs to reset the timer associated with the secondary serving cell, or the terminal device needs to stop and reset the timer associated with the secondary serving cell.

In an optional implementation, the timer associated with the secondary serving cell is a timer maintained by a physical layer of the terminal device, and step 302c specifically includes instructing, by the terminal device by using a MAC layer of the terminal device, the physical layer of the terminal device to stop or reset the timer associated with the secondary serving cell, or instructing, by the terminal device by using a MAC layer of the terminal device, the physical layer of the terminal device to stop and reset the timer associated with the secondary serving cell.

In this embodiment, if the timer associated with the secondary serving cell is a timer maintained by the physical layer of the terminal device, in step 302c, the MAC layer of the terminal device sends an instruction command to the physical layer of the terminal device, so that the physical layer of the terminal device stops the timer associated with the secondary serving cell, or in step 302c, the MAC layer of the terminal device sends an instruction command to the physical layer of the terminal device, so that the physical layer of the terminal device resets the timer associated with the secondary serving cell, or in step 302c, the MAC layer of the terminal device sends an instruction command to the physical layer of the terminal device, so that the physical layer of the terminal device stops and resets the timer associated with the secondary serving cell.

Figure 73:
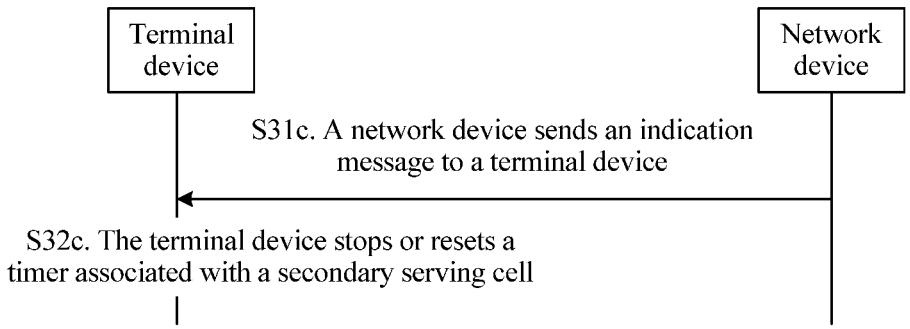
FIG. 73 is a signaling diagram of another timer handling method according to an embodiment of the present invention.

FIG. 73 is a signaling diagram of another timer handling method according to an embodiment of the present invention. As shown in FIG. 73, the method is specifically as follows:

S31c. A network device sends an indication message to a terminal device, where the indication message is used to instruct the terminal device to deactivate at least one secondary serving cell, a timer associated with the secondary serving cell is running, and the timer is a timer used by the terminal device to switch from an active downlink BWP to a default downlink BWP.

In an optional implementation, the indication message is a deactivate command. The deactivate command may be a MAC CE for instructing to deactivate at least one secondary serving cell.

S32c. The terminal device stops or resets the timer associated with the secondary serving cell, or the terminal device stops and resets the timer associated with the secondary serving cell.

In an optional implementation, the timer associated with the secondary serving cell is a timer maintained by a physical layer of the terminal device, and step S32c specifically includes instructing, by the terminal device by using a MAC layer of the terminal device, the physical layer of the terminal device to stop or reset the timer associated with the secondary serving cell, or instructing, by the terminal device by using a MAC layer of the terminal device, the physical layer of the terminal device to stop and reset the timer associated with the secondary serving cell.

Herein, step 301c in FIG. 72 is implemented in step S31c, and step 302c in FIG. 72 is implemented in step S32c. Details are not described again.

In this embodiment, the terminal device receives the indication message sent by the network device, where the indication message is used to instruct the terminal device to deactivate the at least one secondary serving cell, the timer associated with the secondary serving cell is running, and the timer is a timer used by the terminal device to switch from an active downlink BWP to a default downlink BWP, and the terminal device stops or resets the timer associated with the secondary serving cell, or the terminal device stops and resets the timer associated with the secondary serving cell. Therefore, when the terminal device receives the deactivate command sent by the network device, if the timer associated with the secondary serving cell that needs to be deactivated is running, it is considered whether the terminal device is to stop or reset the timer associated with the secondary serving cell. In this way, an operating scenario of the timer is provided.

Figure 74:
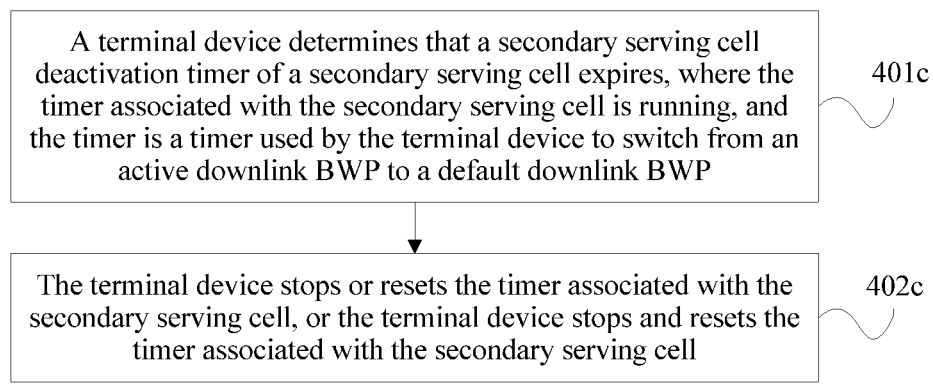
FIG. 74 is a schematic flowchart of another timer handling method according to an embodiment of the present invention.

FIG. 74 is a schematic flowchart of another timer handling method according to an embodiment of the present invention. As shown in FIG. 74, the method is specifically as follows:

401c. A terminal device determines that a secondary serving cell deactivation timer of a secondary serving cell expires, where the timer associated with the secondary serving cell is running, and the timer is a timer used by the terminal device to switch from an active downlink BWP to a default downlink BWP.

In this embodiment, at least one secondary serving cell is configured for the terminal device, and each secondary serving cell is associated with a timer. The timer is used for timing, and the timer has specified duration. When duration for which the timer runs is equal to or exceeds the specified duration, it is considered that the timer expires. In the prior art, if the terminal device determines that the timer expires, the terminal device performs BWP switching, in other words, the terminal device switches from a current active downlink BWP to a default downlink BWP in a current secondary serving cell. Optionally, the timer may be referred to as a BWP fallback timer.

In this step, when the terminal device performs data communication on a downlink BWP of a secondary serving cell, if a timer associated with the secondary serving cell is running, the terminal device needs to determine whether the secondary serving cell deactivation timer of the secondary serving cell expires.

402c. The terminal device stops or resets the timer associated with the secondary serving cell, or the terminal device stops and resets the timer associated with the secondary serving cell.

In this embodiment, if the terminal device determines that the secondary serving cell deactivation timer of the secondary serving cell in step 401c expires, the terminal device needs to stop the timer associated with the secondary serving cell, or the terminal device needs to reset the timer associated with the secondary serving cell, or the terminal device needs to stop and reset the timer associated with the secondary serving cell.

In an optional implementation, the timer associated with the secondary serving cell is a timer maintained by a physical layer of the terminal device, and step 302c specifically includes instructing, by the terminal device by using a MAC layer of the terminal device, the physical layer of the terminal device to stop or reset the timer associated with the secondary serving cell, or instructing, by the terminal device by using a MAC layer of the terminal device, the physical layer of the terminal device to stop and reset the timer associated with the secondary serving cell.

In this embodiment, if the timer associated with the secondary serving cell is a timer maintained by the physical layer of the terminal device, in step 402c, when the terminal device determines that the secondary serving cell deactivation timer of the secondary serving cell expires, the MAC layer of the terminal device sends an instruction command to the physical layer of the terminal device, so that the physical layer of the terminal device stops the timer associated with the secondary serving cell, or in step 402c, the MAC layer of the terminal device sends an instruction command to the physical layer of the terminal device, so that the physical layer of the terminal device resets the timer associated with the secondary serving cell, or in step 402c, the MAC layer of the terminal device sends an instruction command to the physical layer of the terminal device, so that the physical layer of the terminal device stops and resets the timer associated with the secondary serving cell.

Figure 75:
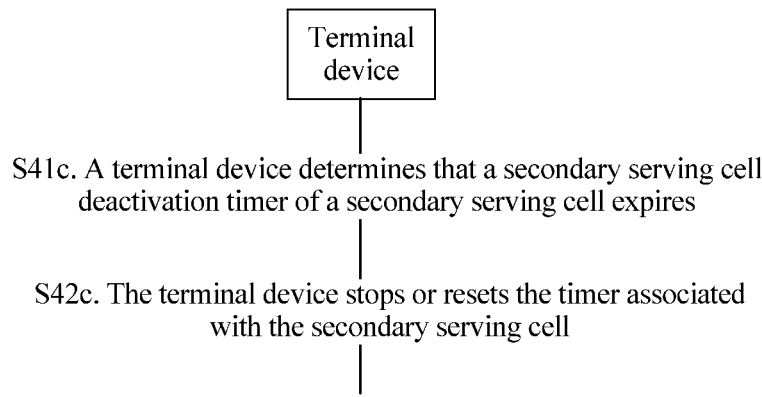
FIG. 75 is a signaling diagram of another timer handling method according to an embodiment of the present invention.

FIG. 75 is a signaling diagram of another timer handling method according to an embodiment of the present invention. As shown in FIG. 75, the method is specifically as follows:

S41c. A terminal device determines that a secondary serving cell deactivation timer of a secondary serving cell expires, where the timer associated with the secondary serving cell is running, and the timer is a timer used by the terminal device to switch from an active downlink BWP to a default downlink BWP.

S42c. The terminal device stops or resets the timer associated with the secondary serving cell, or the terminal device stops and resets the timer associated with the secondary serving cell.

In an optional implementation, the timer associated with the secondary serving cell is a timer maintained by a physical layer of the terminal device, and step S42c specifically includes instructing, by the terminal device by using a MAC layer of the terminal device, the physical layer of the terminal device to stop or reset the timer associated with the secondary serving cell, or instructing, by the terminal device by using a MAC layer of the terminal device, the physical layer of the terminal device to stop and reset the timer associated with the secondary serving cell.

Herein, step 401c in FIG. 74 is implemented in step S41c, and step 402c in FIG. 74 is implemented in step S42. Details are not described again.

In this embodiment, the terminal device determines that the secondary serving cell deactivation timer of the secondary serving cell expires, where the timer associated with the secondary serving cell is running, and the timer is a timer used by the terminal device to switch from an active downlink BWP to a default downlink BWP, and the terminal device stops or resets the timer associated with the secondary serving cell, or the terminal device stops and resets the timer associated with the secondary serving cell. Therefore, when the terminal device determines that the secondary serving cell deactivation timer of the secondary serving cell expires, it is considered whether the terminal device is to stop or reset the timer associated with the secondary serving cell. In this way, an operating scenario of the timer is provided.

Figure 76:
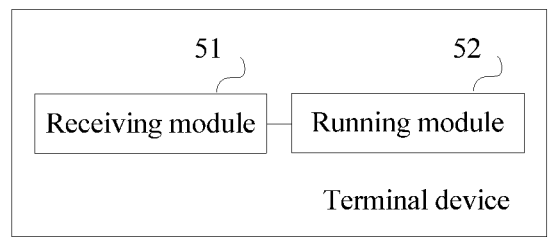
FIG. 76 is a schematic structural diagram of a terminal device according to an embodiment of this application.

FIG. 76 is a schematic structural diagram of a terminal device according to an embodiment of this application. As shown in FIG. 76, the terminal device includes a receiving module 51, configured to receive a PDCCH order message sent by a network device, where a timer of the terminal device is running, and the timer is a timer used by the terminal device to switch from an active downlink BWP to a default downlink BWP, and a running module 52, configured to start or restart the timer.

The receiving module 51 may perform step 101c in the method shown in FIG. 68, and the running module 52 may perform step 102c in the method shown in FIG. 68.

In an optional implementation, the PDCCH order message includes an identifier of a downlink BWP, and the downlink BWP indicated by the identifier of the downlink BWP is not a default downlink BWP.

The terminal device in the embodiment shown in FIG. 76 may be configured to perform the technical solutions of the embodiments shown in FIG. 68 and FIG. 69 in the foregoing methods. Implementation principles and technical effects of the terminal device are similar to those in the foregoing embodiments, and details are not described herein again.

Figure 77:
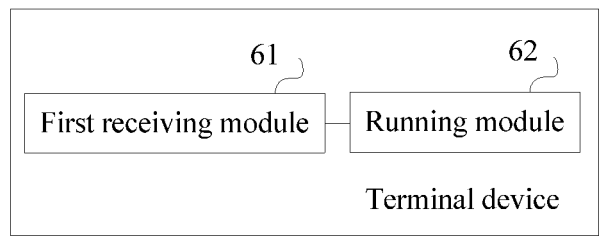
FIG. 77 is a schematic structural diagram of another terminal device according to an embodiment of this application.

FIG. 77 is a schematic structural diagram of another terminal device according to an embodiment of this application. As shown in FIG. 77, the terminal device includes a first receiving module 61, configured to receive an indication message sent by a network device, where the indication message is used to instruct the terminal device to activate at least one secondary serving cell, and a running module 62, configured to start or restart a timer associated with the secondary serving cell, where the timer is a timer used by the terminal device to switch from an active downlink BWP to a default downlink BWP.

The first receiving module 61 may perform step 201c in the method shown in FIG. 70, and the running module 62 may perform step 202c in the method shown in FIG. 70.

In a possible design, the secondary serving cell is in an inactive state.

In an optional implementation, the terminal device further includes a second receiving module, configured to: before the first receiving module 61 receives the indication message sent by the network device, receive an RRC message sent by the network device, where the RRC message includes indication information, the indication information is used to instruct to add or modify the at least one secondary serving cell, the RRC message further includes a first downlink BWP of the secondary serving cell, the first downlink BWP is a downlink BWP that is first activated when the secondary serving cell is activated, and the first downlink BWP is not a default downlink BWP.

The second receiving module may perform step 203c in the method shown in FIG. 70.

In an optional implementation, the timer associated with the secondary serving cell is a timer maintained by a physical layer of the terminal device, and the running module 62 is specifically configured to instruct, by using a MAC layer of the terminal device, the physical layer of the terminal device to start or restart the timer associated with the secondary serving cell.

The terminal device in the embodiment shown in FIG. 77 may be configured to perform the technical solutions of the embodiments shown in FIG. 70 and FIG. 71 in the foregoing methods. Implementation principles and technical effects of the terminal device are similar to those in the foregoing embodiments, and details are not described herein again.

Figure 78:
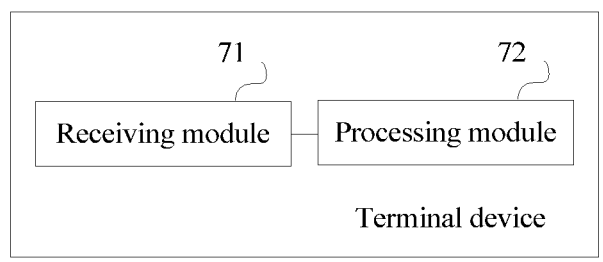
FIG. 78 is a schematic structural diagram of another terminal device according to an embodiment of this application.

FIG. 78 is a schematic structural diagram of another terminal device according to an embodiment of this application. As shown in FIG. 78, the terminal device includes a receiving module 71, configured to receive an indication message sent by a network device, where the indication message is used to instruct the terminal device to deactivate at least one secondary serving cell, a timer associated with the secondary serving cell is running, and the timer is a timer used by the terminal device to switch from an active downlink BWP to a default downlink BWP, and a processing module 72, configured to: stop or reset the timer associated with the secondary serving cell, or stop and reset, by the terminal device, the timer associated with the secondary serving cell.

In an optional implementation, the timer associated with the secondary serving cell is a timer maintained by a physical layer of the terminal device, and the processing module 72 is specifically configured to: instruct, by using a MAC layer of the terminal device, the physical layer of the terminal device to stop or reset the timer associated with the secondary serving cell, or instruct, by using a MAC layer of the terminal device, the physical layer of the terminal device to stop and reset the timer associated with the secondary serving cell.

The receiving module 71 may perform step 301c in the method shown in FIG. 72, and the processing module 72 may perform step 302c in the method shown in FIG. 72.

The terminal device in the embodiment shown in FIG. 78 may be configured to perform the technical solutions of the embodiments shown in FIG. 72 and FIG. 73 in the foregoing methods. Implementation principles and technical effects of the terminal device are similar to those in the foregoing embodiments, and details are not described herein again.

Figure 79:
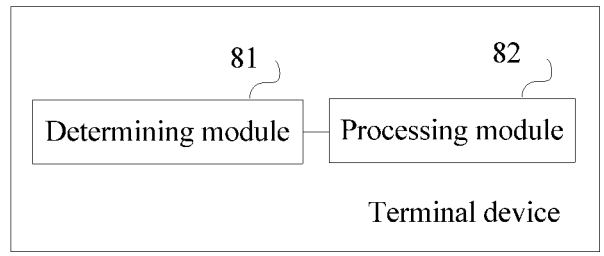
FIG. 79 is a schematic structural diagram of another terminal device according to an embodiment of this application.

FIG. 79 is a schematic structural diagram of another terminal device according to an embodiment of this application. As shown in FIG. 79, the terminal device includes a determining module 81, configured to determine that a secondary serving cell deactivation timer of a secondary serving cell expires, where the timer associated with the secondary serving cell is running, and the timer is a timer used by the terminal device to switch from an active downlink BWP to a default downlink BWP, and a processing module 82, configured to: stop or reset the timer associated with the secondary serving cell, or stop and reset, by the terminal device, the timer associated with the secondary serving cell.

In an optional implementation, the timer associated with the secondary serving cell is a timer maintained by a physical layer of the terminal device, and the processing module 82 is specifically configured to: instruct, by using a MAC layer of the terminal device, the physical layer of the terminal device to stop or reset the timer associated with the secondary serving cell, or instruct, by using a MAC layer of the terminal device, the physical layer of the terminal device to stop and reset the timer associated with the secondary serving cell.

The determining module 81 may perform step 401c in the method shown in FIG. 74, and the processing module 82 may perform step 402c in the method shown in FIG. 74.

The terminal device in the embodiment shown in FIG. 79 may be configured to perform the technical solutions of the embodiments shown in FIG. 74 and FIG. 75 in the foregoing methods. Implementation principles and technical effects of the terminal device are similar to those in the foregoing embodiments, and details are not described herein again.

It should be understood that division of the modules in the terminal device and the network device is merely logical function division. In actual implementation, all or some of the modules may be integrated into one physical entity, or the modules may be physically separated. In addition, these modules may all be implemented in a form of software invoked by using a processing element, or may all be implemented in a form of hardware, or some of the modules may be implemented in a form of software invoked by using a processing element and some of the modules may be implemented in a form of hardware. For example, the sending module may be an independently disposed processing element, or may be integrated into a chip of the terminal device or the network device for implementation. In addition, the sending module may be stored in a memory in the terminal device or the network device in a form of a program, and be invoked by a processing element in the terminal device or the network device, to perform the functions of the module. Implementations of other modules are similar to the implementation of the sending module. In addition, all or some of the modules may be integrated together, or may be implemented separately. The processing element herein may be an integrated circuit with a signal processing capability. In an implementation process, the steps of the foregoing methods or the foregoing modules may be implemented by using an integrated logic circuit of hardware in the processor element or by using a software instruction. In addition, the receiving module is a receiving control module, and may receive, by using a receiving apparatus, for example, an antenna or a radio frequency apparatus, of the terminal device or the network device, information sent by the network device. The sending module is a sending control module, and may send information to the terminal device by using a sending apparatus, for example, an antenna or a radio frequency apparatus, of the network device or the terminal device.

For example, the foregoing modules may be configured as one or more integrated circuits for implementing the foregoing methods, for example, one or more application-specific integrated circuits (Application Specific Integrated Circuit, ASIC), one or more microprocessors (digital signal processor, DSP), or one or more field programmable gate arrays (Field Programmable Gate Array, FPGA). For another example, when one of the foregoing modules is implemented in a form of a program scheduled by using a processing element, the processing element may be a general-purpose processor, for example, a central processing unit (Central Processing Unit, CPU) or another processor that can invoke the program. For another example, these units may be integrated together and implemented in a form of a system-on-a-chip (system-on-a-chip, SOC).

Figure 80:
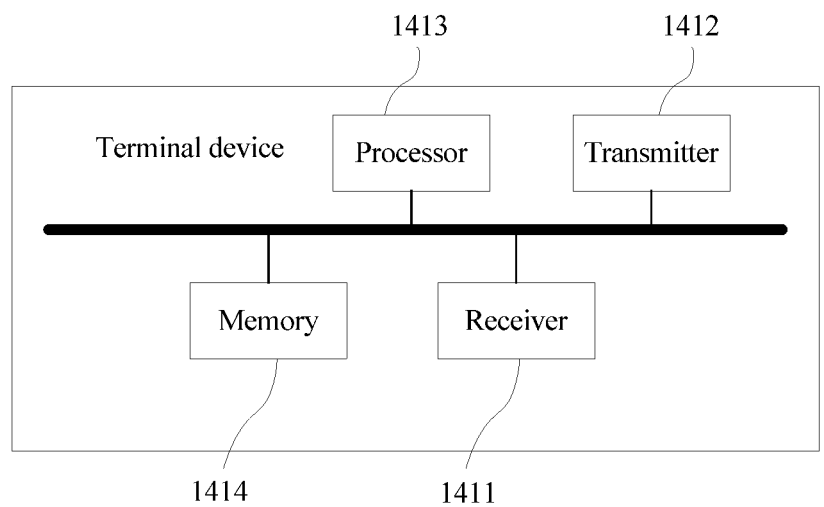
FIG. 80 is a schematic structural diagram of another terminal device according to an embodiment of this application.

FIG. 80 is a schematic structural diagram of another terminal device according to an embodiment of this application. As shown in FIG. 80, the terminal device may be configured to perform the actions or steps of the terminal device in the embodiments shown in FIG. 68 and FIG. 69. The terminal device includes a receiver 1411, a transmitter 1412, a processor 1413, and a memory 1414.

The receiver 1411 is configured to receive a PDCCH order message sent by a network device, where a timer of the terminal device is running, and the timer is a timer used by the terminal device to switch from an active downlink BWP to a default downlink BWP.

The processor 1413 is configured to start or restart the timer.

In an optional implementation, the PDCCH order message includes an identifier of a downlink BWP, and the downlink BWP indicated by the identifier of the downlink BWP is not a default downlink BWP.

The receiver 1411 may implement the function of the receiving module 51 in the terminal device shown in FIG. 76, and the processor 1413 may implement the function of the running module 52 in the terminal device shown in FIG. 76. Further, the receiver 1411 may perform step 101c in the method shown in FIG. 68, and the processor 1413 may perform step 102c in the method shown in FIG. 68, or the receiver 1411 may perform step S11c in the method shown in FIG. 69, and the processor 1413 may perform step S12c in the method shown in FIG. 69.

The terminal device in the embodiment shown in FIG. 80 may be configured to perform the technical solutions of the foregoing method embodiments. Implementation principles and technical effects of the terminal device are similar to those in the foregoing embodiments, and details are not described herein again.

The receiver 1411 and the transmitter 1412 may be connected to an antenna. In a downlink direction, the receiver 1411 receives, by using the antenna, information sent by the network device, and the transmitter 1412 sends, by using the antenna, the information to the processor 1413 for processing. In an uplink direction, the processor 1413 processes data of the terminal device, and sends data obtained after the processing to the network device by using the transmitter 1412.

The memory 1414 is configured to store programs for implementing the foregoing method embodiments or the modules in the embodiment shown in FIG. 76, and the processor 1413 invokes the programs to perform the operations in the foregoing method embodiments, to implement the modules shown in FIG. 76.

Alternatively, some or all of the foregoing modules may be implemented in a form of an integrated circuit that is embedded in a chip of the user equipment. The modules may be implemented separately or may be integrated together. The foregoing modules may be configured as one or more integrated circuits for implementing the foregoing methods, for example, one or more application-specific integrated circuits (Application Specific Integrated Circuit, ASIC), one or more microprocessors (digital signal processor, DSP), or one or more field programmable gate arrays (Field Programmable Gate Array, FPGA).

Figure 81:
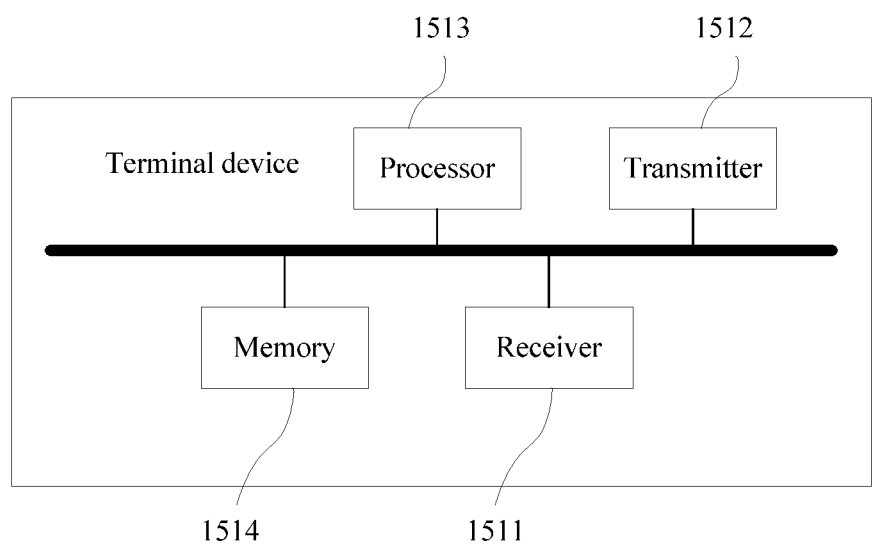
FIG. 81 is a schematic structural diagram of another terminal device according to an embodiment of this application.

FIG. 81 is a schematic structural diagram of another terminal device according to an embodiment of this application. As shown in FIG. 81, the terminal device may be configured to perform the actions or steps of the terminal device in the embodiments shown in FIG. 70 and FIG. 71. The terminal device includes a receiver 1511, a transmitter 1512, a processor 1513, and a memory 1514.

The receiver 1511 is configured to receive an indication message sent by a network device, where the indication message is used to instruct the terminal device to activate at least one secondary serving cell.

The processor 1513 is configured to start or restart a timer associated with the secondary serving cell, where the timer is a timer used by the terminal device to switch from an active downlink BWP to a default downlink BWP.

In a possible design, the secondary serving cell is in an inactive state.

In an optional implementation, the receiver 1511 is further configured to: before receiving the indication message sent by the network device, receive an RRC message sent by the network device, where the RRC message includes indication information, the indication information is used to instruct to add or modify the at least one secondary serving cell, the RRC message further includes a first downlink BWP of the secondary serving cell, the first downlink BWP is a downlink BWP that is first activated when the secondary serving cell is activated, and the first downlink BWP is not a default downlink BWP.

In an optional implementation, the timer associated with the secondary serving cell is a timer maintained by a physical layer of the terminal device, and the processor 1513 is specifically configured to instruct, by using a MAC layer of the terminal device, the physical layer of the terminal device to start or restart the timer associated with the secondary serving cell.

The receiver 1511 may implement the functions of the first receiving module 61 and the second receiving module in the terminal device shown in FIG. 77, and the processor 1513 may implement the function of the running module 62 in the terminal device shown in FIG. 77. Further, the receiver 1511 may perform step 201c and step 203c in the method shown in FIG. 70, and the processor 1513 may perform step 202c in the method shown in FIG. 70, or the receiver 1511 may perform step S21c and step S22c in the method shown in FIG. 71, and the processor 1513 may perform step S23c in the method shown in FIG. 71.

The terminal device in the embodiment shown in FIG. 81 may be configured to perform the technical solutions of the foregoing method embodiments. Implementation principles and technical effects of the terminal device are similar to those in the foregoing embodiments, and details are not described herein again.

The receiver 1511 and the transmitter 1512 may be connected to an antenna. In a downlink direction, the receiver 1511 receives, by using the antenna, information sent by the network device, and the transmitter 1512 sends, by using the antenna, the information to the processor 1513 for processing. In an uplink direction, the processor 1513 processes data of the terminal device, and sends data obtained after the processing to the network device by using the transmitter 1512.

The memory 1514 is configured to store programs for implementing the foregoing method embodiments or the modules in the embodiment shown in FIG. 77, and the processor 1513 invokes the programs to perform the operations in the foregoing method embodiments, to implement the modules shown in FIG. 77.

Alternatively, some or all of the foregoing modules may be implemented in a form of an integrated circuit that is embedded in a chip of the user equipment. The modules may be implemented separately or may be integrated together. The foregoing modules may be configured as one or more integrated circuits for implementing the foregoing methods, for example, one or more ASICs, one or more DSPs, or one or more FPGAs.

Figure 82:
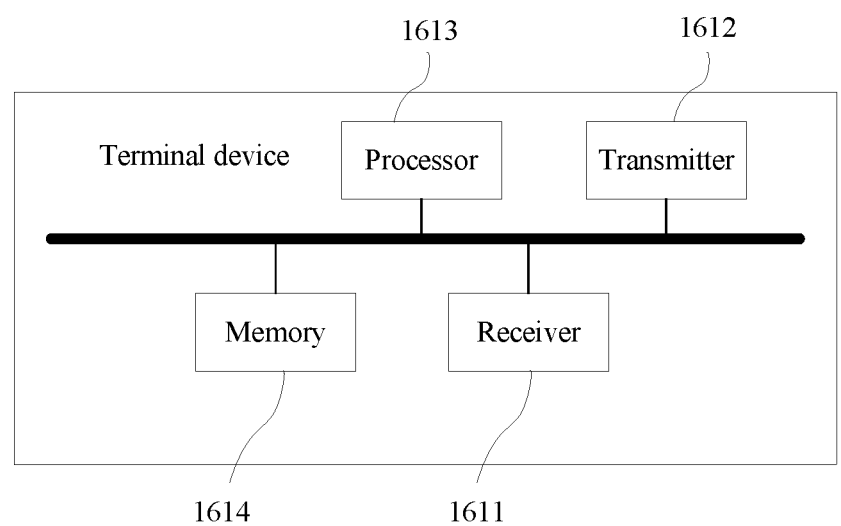
FIG. 82 is a schematic structural diagram of another terminal device according to an embodiment of this application.

FIG. 82 is a schematic structural diagram of another terminal device according to an embodiment of this application. As shown in FIG. 82, the terminal device may be configured to perform the actions or steps of the terminal device in the embodiments shown in FIG. 72 and FIG. 73. The terminal device includes a receiver 1611, a transmitter 1612, a processor 1613, and a memory 1614.

The receiver 1611 is configured to receive an indication message sent by a network device, where the indication message is used to instruct the terminal device to deactivate at least one secondary serving cell, a timer associated with the secondary serving cell is running, and the timer is a timer used by the terminal device to switch from an active downlink BWP to a default downlink BWP.

The processor 1613 is configured to: stop or reset the timer associated with the secondary serving cell, or stop and reset, by the terminal device, the timer associated with the secondary serving cell.

In an optional implementation, the timer associated with the secondary serving cell is a timer maintained by a physical layer of the terminal device, and the processor 1613 is specifically configured to: instruct, by using a MAC layer of the terminal device, the physical layer of the terminal device to stop or reset the timer associated with the secondary serving cell, or instruct, by using a MAC layer of the terminal device, the physical layer of the terminal device to stop and reset the timer associated with the secondary serving cell.

The receiver 1611 may implement the function of the receiving module 71 in the terminal device shown in FIG. 78, and the processor 1613 may implement the function of the processing module 72 in the terminal device shown in FIG. 78. Further, the receiver 1611 may perform step 301c in the method shown in FIG. 72, and the processor 1613 may perform step 302c in the method shown in FIG. 72, or the receiver 1611 may perform step S31c in the method shown in FIG. 73, and the processor 1613 may perform step S32c in the method shown in FIG. 73.

The terminal device in the embodiment shown in FIG. 82 may be configured to perform the technical solutions of the foregoing method embodiments. Implementation principles and technical effects of the terminal device are similar to those in the foregoing embodiments, and details are not described herein again.

The receiver 1611 and the transmitter 1612 may be connected to an antenna. In a downlink direction, the receiver 1611 receives, by using the antenna, information sent by the network device, and the transmitter 1612 sends, by using the antenna, the information to the processor 1613 for processing. In an uplink direction, the processor 1613 processes data of the terminal device, and sends data obtained after the processing to the network device by using the transmitter 1612.

The memory 1614 is configured to store programs for implementing the foregoing method embodiments or the modules in the embodiment shown in FIG. 78, and the processor 1613 invokes the programs to perform the operations in the foregoing method embodiments, to implement the modules shown in FIG. 78.

Alternatively, some or all of the foregoing modules may be implemented in a form of an integrated circuit that is embedded in a chip of the user equipment. The modules may be implemented separately or may be integrated together. The foregoing modules may be configured as one or more integrated circuits for implementing the foregoing methods, for example, one or more ASICs, one or more DSPs, or one or more FPGAs.

Figure 83:
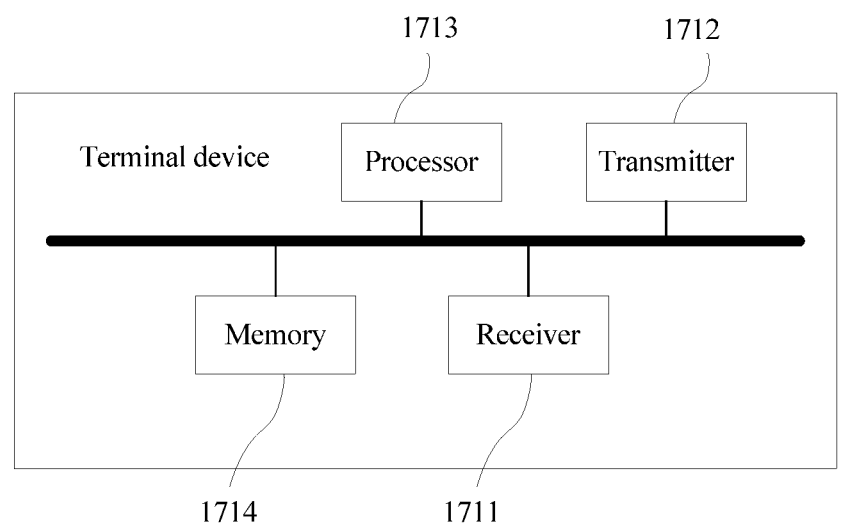
FIG. 83 is a schematic structural diagram of another terminal device according to an embodiment of this application.

FIG. 83 is a schematic structural diagram of another terminal device according to an embodiment of this application. As shown in FIG. 83, the terminal device may be configured to perform the actions or steps of the terminal device in the embodiments shown in FIG. 74 and FIG. 75. The terminal device includes a receiver 1711, a transmitter 1712, a processor 1713, and a memory 1714.

The processor 1713 is configured to: determine that a secondary serving cell deactivation timer of a secondary serving cell expires, where the timer associated with the secondary serving cell is running, and the timer is a timer used by the terminal device to switch from an active downlink BWP to a default downlink BWP, and stop or reset the timer associated with the secondary serving cell, or stop and reset, by the terminal device, the timer associated with the secondary serving cell.

In an optional implementation, the timer associated with the secondary serving cell is a timer maintained by a physical layer of the terminal device, and the processor 1713 is specifically configured to: instruct, by using a MAC layer of the terminal device, the physical layer of the terminal device to stop or reset the timer associated with the secondary serving cell, or instruct, by using a MAC layer of the terminal device, the physical layer of the terminal device to stop and reset the timer associated with the secondary serving cell.

The processor 1713 may implement the functions of the determining module 81 and the processing module 82 in the terminal device shown in FIG. 79. Further, the processor 1713 may perform step 401c and step 402c in the method shown in FIG. 74, or the processor 1713 may perform steps S41c and S42c in the method shown in FIG. 75.

The terminal device in the embodiment shown in FIG. 83 may be configured to perform the technical solutions of the foregoing method embodiments. Implementation principles and technical effects of the terminal device are similar to those in the foregoing embodiments, and details are not described herein again.

The receiver 1711 and the transmitter 1712 may be connected to an antenna. In a downlink direction, the receiver 1711 receives, by using the antenna, information sent by the network device, and the transmitter 1712 sends, by using the antenna, the information to the processor 1713 for processing. In an uplink direction, the processor 1713 processes data of the terminal device, and sends data obtained after the processing to the network device by using the transmitter 1712.

The memory 1714 is configured to store programs for implementing the foregoing method embodiments or the modules in the embodiment shown in FIG. 79, and the processor 1713 invokes the programs to perform the operations in the foregoing method embodiments, to implement the modules shown in FIG. 79.

Alternatively, some or all of the foregoing modules may be implemented in a form of an integrated circuit that is embedded in a chip of the user equipment. The modules may be implemented separately or may be integrated together. The foregoing modules may be configured as one or more integrated circuits for implementing the foregoing methods, for example, one or more ASICs, one or more DSPs, or one or more FPGAs.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the procedures or functions according to the embodiments of this application are generated. The computer may be a general-purpose computer, a dedicated computer, a computer network, or another programmable apparatus. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer readable storage medium may be any usable medium accessible to a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (solid state disk, SSD)), or the like.

A person skilled in the art should be aware that in the foregoing one or more examples, functions described in the embodiments of this application may be implemented by hardware, software, firmware, or any combination thereof. When this application is implemented by software, these functions may be stored in a computer readable medium or transmitted as one or more instructions or code in the computer readable medium. The computer readable medium includes a computer storage medium and a communications medium, where the communications medium includes any medium that enables a computer program to be transmitted from one place to another. The storage medium may be any usable medium accessible to a general-purpose or dedicated computer.

What is claimed is:

1. A random access method applied in user equipment, the method comprising:
   receiving a radio resource control (RRC) connection reconfiguration message from a first network device, wherein the RRC connection reconfiguration message indicates a primary serving cell of a second network device for the user equipment, and the RRC connection reconfiguration message includes a bandwidth part (BWP) identifier of an active BWP in the primary serving cell for the user equipment, and wherein the active BWP includes an uplink BWP and a downlink BWP;
   in response to receiving the RRC connection reconfiguration message, activating the uplink BWP and the downlink BWP based on the BWP identifier of the active BWP in the RRC connection reconfiguration message: and
   performing a random access procedure with the second network device on the uplink BWP and the downlink BWP.

2. The method according to claim 1, wherein the first network device is a source network device, wherein the second network device is a target network device, and wherein the RRC connection reconfiguration message is included in a first message that is a handover request acknowledgment message.

3. The method according to claim 1, wherein the first network device is a primary network device node, wherein the second network device is a secondary network device node, and wherein the RRC connection reconfiguration message is included in a first message that is a secondary node addition request acknowledgment message.

4. The method according to claim 1, wherein the random access procedure is triggered by the RRC connection reconfiguration message.

5. The method according to claim 1, wherein the uplink BWP and the downlink BWP are each a BWP other than an initial BWP and other than a default BWP.

6. The method according to claim 1, wherein the performing the random access procedure with the second network device comprises sending, to the second network device, a random access preamble on the uplink BWP.

7. The method according to claim 6, wherein performing the random access procedure with the second network device further comprises receiving, from the second network device, a random access response (RAR) on the downlink BWP.

8. An apparatus, comprising:
   a processor; and
   a non-transitory computer-readable storage medium storing a program to be executed by the processor, the program including instructions for:
   receiving a radio resource control (RRC) connection reconfiguration message from a first network device, wherein the RRC connection reconfiguration message indicates a primary serving cell of a second network device for user equipment, and the RRC connection reconfiguration message includes a bandwidth part (BWP) identifier of an active BWP in the primary serving cell for the user equipment, and wherein the active BWP includes an uplink BWP and a downlink BWP;
   in response to receiving the RRC connection reconfiguration message, activating the uplink BWP and the downlink BWP based on the BWP identifier of the active BWP in the RRC connection reconfiguration message; and
   performing a random access procedure with the second network device on the uplink BWP and the downlink BWP.

9. The apparatus according to claim 8, wherein the first network device is a source network device, wherein the second network device is a target network device, and wherein the RRC connection reconfiguration message is included in a first message that is a handover request acknowledgment message.

10. The apparatus according to claim 8, wherein the first network device is a primary network device node, wherein the second network device is a secondary network device node, and wherein the RRC connection reconfiguration message is included in a first message that is a secondary node addition request acknowledgment message.

11. The apparatus according to claim 8, wherein the random access procedure is triggered by the RRC connection reconfiguration message.

12. The apparatus according to claim 8, wherein the uplink BWP and the downlink BWP are each a BWP other than an initial BWP and other than a default BWP.

13. The user equipment according to claim 8, wherein the instructions for performing the random access procedure with the second network device include instructions for sending, to the second network device, a random access preamble on the uplink BWP.

14. The user equipment according to claim 13, wherein the instructions for performing the random access procedure with the second network device further include instructions for receiving, from the second network device, a random access response (RAR) on the downlink BWP.

15. A method applied in a first network device, the method comprising:
sending a radio resource control (RRC) connection reconfiguration message, wherein the RRC connection reconfiguration message indicates a primary serving cell of a second network device for user equipment, and the RRC connection reconfiguration message includes a bandwidth part (BWP) identifier of an active BWP in the primary serving cell for the user equipment, and wherein the active BWP includes an uplink BWP and a downlink BWP on which the user equipment performs a random access procedure with the second network device, and wherein the user equipment activates the uplink BWP and the downlink BWP based on the BWP identifier of the active BWP in the RRC connection reconfiguration message in response to receiving the RRC connection reconfiguration message.

16. The method according to claim 15, wherein the first network device is a source network device, wherein the second network device is a target network device, and wherein the RRC connection reconfiguration message is included in a first message that is a handover request acknowledgment message.

17. The method according to claim 15, wherein the first network device is a primary network device node, wherein the second network device is a secondary network device node, and wherein the RRC connection reconfiguration message is included in a first message that is a secondary node addition request acknowledgment message.

18. The method according to claim 15, wherein the random access procedure is triggered by the RRC connection reconfiguration message.

19. The method according to claim 15, wherein the uplink BWP and the downlink BWP are each a BWP other than an initial BWP and other than a default BWP.

\* \* \* \* \*

UNITED STATES PATENT AND TRADEMARK OFFICE
CERTIFICATE OF CORRECTION

PATENT NO. : 12,101,822 B2
APPLICATION NO. : 17/982988
DATED : September 24, 2024
INVENTOR(S) : Xu et al.

It is certified that error appears in the above-identified patent and that said Letters Patent is hereby corrected as shown below:

In the Claims

In Column 115, in Claim 13, Line 13, delete "The user equipment" and insert -- The apparatus --.

In Column 115, in Claim 14, Line 18, delete "The user equipment" and insert -- The apparatus --.

Signed and Sealed this
Twenty-ninth Day of October, 2024

Katherine Kelly Vidal
Director of the United States Patent and Trademark Office